United States Patent [19]

Smalley et al.

[11] Patent Number: 5,597,520
[45] Date of Patent: Jan. 28, 1997

[54] SIMULTANEOUS MULTIPLE LAYER CURING IN STEREOLITHOGRAPHY

[76] Inventors: Dennis R. Smalley, 25029 Wheeler Rd., Newhall, Calif. 91321; Thomas J. Vorgitch, 4846 Summit Ave., Simi Valley, Calif. 93063; Chris R. Manners, 4337 Riverglen St., Moorpark, Calif. 93021; Charles W. Hull, 15605 Live Oak Springs, Santa Clarita, Calif. 91351; Stacie L. VanDorin, 27923 Harwood Dr., Saugus, Calif. 91350

[21] Appl. No.: 233,027

[22] Filed: Apr. 25, 1994

Related U.S. Application Data

[63] Continuation-in-part of Ser. No. 16,202, Feb. 9, 1993, abandoned, which is a continuation of Ser. No. 606,802, Oct. 30, 1990, Pat. No. 5,192,469.

[51] Int. Cl.$^6$ .................... B29C 35/08; B29C 41/02; B29C 41/52
[52] U.S. Cl. .................... 264/401; 118/429; 118/620; 118/712; 156/64; 156/273.3; 156/273.5; 156/275.5; 156/307.1; 156/378; 156/379.6; 250/492.1; 264/40.1; 264/308; 364/468.27; 365/106; 365/107; 395/119; 425/135; 425/174.4; 427/8; 427/510; 427/512; 427/553; 427/554; 427/555
[58] Field of Search .................... 264/22, 40.1, 255, 264/308; 425/135, 174, 174.4; 156/64, 242, 273.3, 273.5, 275.5, 307.1, 378, 379.6, 538; 427/8, 393.5, 407.1, 430.1, 508, 510, 512, 553, 554, 581, 555; 118/429, 500, 620, 712; 250/492.1; 364/468, 476; 365/106, 107, 119, 120, 126, 127; 395/119

[56] References Cited

U.S. PATENT DOCUMENTS

| | | | |
|---|---|---|---|
| 4,575,330 | 3/1986 | Hull | 425/174.4 |
| 4,752,498 | 6/1988 | Fudim | 427/510 |
| 4,801,477 | 1/1989 | Fudim | 427/510 |
| 4,961,154 | 10/1990 | Pomerantz et al. | 395/119 |
| 5,151,813 | 9/1992 | Yamamoto et al. | 359/202 |

FOREIGN PATENT DOCUMENTS

| | | | |
|---|---|---|---|
| 388129 | 9/1990 | European Pat. Off. . | |
| 61-225012 | 10/1986 | Japan | 264/22 |
| 63-145015 | 6/1988 | Japan | 425/174.4 |
| 2-95831 | 4/1990 | Japan . | |
| 2-95830 | 4/1990 | Japan . | |

OTHER PUBLICATIONS

"A Photopolymerization Method of Preparing Three-dimensional Terrain Models," C. Claus, et al., Published in *Photographic Science and Engineering*, vol. 5, No. 4, Jul.–Aug. 1961, pp. 211–215.

"A New Method of Three-Dimensional Micromachining," E. Fudim, Published in *Mechanical Engineering*, Sep. 1985, pp. 54–59.

"Sculpting with Light," E. Fudim, Published in *Machine Design*, Mar. 6, 1986, pp. 102–106.

*Primary Examiner*—Leo B. Tentoni
*Attorney, Agent, or Firm*—Dennis R. Smalley

[57] ABSTRACT

A method and apparatus for making high resolution objects by stereolithography utilizing low resolution materials which are limited by their inability to form unsupported structures of desired thinness and/or their inability to form coatings of desired thinness. Data manipulation techniques, based on layer comparisons, are used to control exposure in order to delay solidification of the material on at least portions of at least some cross-sections until higher layers of material are deposited so as to allow down-facing features of the object to be located at a depth in the building material which is equal to or exceeds a minimum cure depth that can effectively be used for solidifying these features. Similar data manipulations are used to ensure minimum reliable coating thicknesses exist, above previously solidified material, before attempting solidification of a next layer. In addition, horizontal comparison techniques are used to provide enhanced cross-sectional data for use in forming the object.

31 Claims, 148 Drawing Sheets

PRIOR ART METHOD USING HIGH RESOLUTION MATERIAL

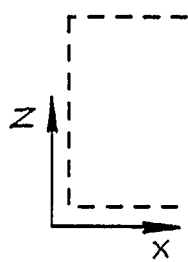
FIG. 8-1.
FIG. 8-2.
FIG. 8-3
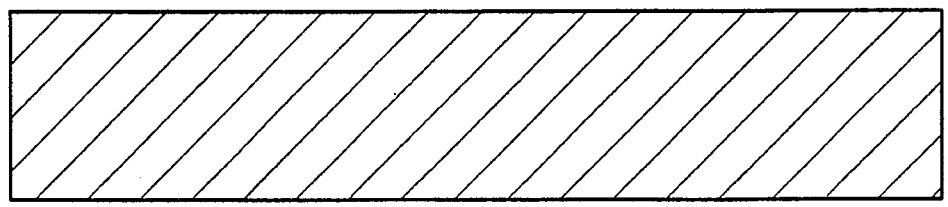
FIG. 8-4.
 = MSD CURE DEPTH
 = NOT NECESSARILY MSD CURE DEPTH

◰ = MSD CURE DEPTH

◳ = NOT NECESSARILY MSD CURE DEPTH

PRIOR ART METHOD USING
A HIGH RESOLUTION MATERIAL

LB-1

LB-2

FDB-1

FDB-2

NFDB-1

NFDB-2

FUB-1

FUB-2

NFUB-1

NFUB-2

LB-3  LB-4

7FDB-3  FDB-4

NFDB-3  NFDB-4

FUB-3  FUB-4

NFUB-3  NFUB-4

LB-5

LB-6

FDB-5

FDB-6

NFDB-5

NFDB-6

FUB-5

FUB-6

NFUB-5

NFUB-6

LB-7

LB-8

FDB-7

FDB-8

NFDB-7

NFDB-8

FUB-7

FUB-8

NFUB-7

NFUB-8

LB-9

LB-10

FDB-9

FDB-10

NFDB-9

NFDB-10

FUB-9

FUB-10

NFUB-9

NFUB-10

LB-11  LB-12

FDB-11  FDB-12

NFDB-11  NFDB-12

FUB-11  FUB-12

NFUB-11  NFUB-12

LB-13

LB-14

FDB-13

FDB-14

NFDB-13

NFDB-14

FUB-13

FUB-14

NFUB-13

NFUB-14

LB-15  LB-16

FDB-15  FDB-16

NFDB-15  NFDB-16

FUB-15  FUB-16

NFUB-15  NFUB-16

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4
BIN 3 FROM PREVIOUS LAYER

BIN 5
BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4 / D117
BIN 3 FROM PREVIOUS LAYER

BIN 5 / D122
BIN 4 FROM PREVIOUS LAYER

D118
ABOVE + NFDB + FDB

D123
ABOVE + NFDB + FDB

D119
ABOVE − NFUB − FUB

D124
ABOVE − NFUB − FUB

D120
BOUNDARIES TESTED

D125
BOUNDARIES TESTED

D121
PLV

D126
PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 2                       F107

CCSB2 FROM PREVIOUS LAYER

BIN 3                       F112

BIN 2 FROM PREVIOUS LAYER

F108

ABOVE + NFDB + FDB

F113

ABOVE + NFDB + FDB

F109

ABOVE − NFUB − FUB

F114

ABOVE − NFUB − FUB

F110

BOUNDARIES TESTED

F115

BOUNDARIES TESTED

F111

PLV

F116

PLV

BIN 4 / F117
BIN 3 FROM PREVIOUS LAYER

BIN 5 / F122
BIN 4 FROM PREVIOUS LAYER

F118
ABOVE + NFDB + FDB

F123
ABOVE + NFDB + FDB

F119
ABOVE − NFUB − FUB

F124
ABOVE − NFUB − FUB

F120
BOUNDARIES TESTED

F125
BOUNDARIES TESTED

F121
PLV

F126
PLV

PLV (BIN 4)

PLV (BIN 5) = TCSB4

ABOVE − BIN 5' = TCSB3

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4 / G117
BIN 3 FROM PREVIOUS LAYER

BIN 5 / G122
BIN 4 FROM PREVIOUS LAYER

G118
ABOVE + NFDB + FDB

G123
ABOVE + NFDB + FDB

G119
ABOVE − NFUB − FUB

G124
ABOVE − NFUB − FUB

G120
BOUNDARIES TESTED

G125
BOUNDARIES TESTED

G121
PLV

G126
PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

PLV (BIN 4)

PLV (BIN 5) = TCSB4

ABOVE - BIN 5' = TCSB3

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

PLV (BIN 4)

PLV (BIN 5) = TCSB4

ABOVE – BIN 5' = TCSB3

BIN 2

CCSB2 FROM PREVIOUS LAYER — K107

BIN 3

BIN 2 FROM PREVIOUS LAYER — K112

ABOVE + NFDB + FDB — K108

ABOVE + NFDB + FDB — K113

ABOVE − NFUB − FUB — K109

ABOVE − NFUB − FUB — K114

BOUNDARIES TESTED — K110

BOUNDARIES TESTED — K115

PLV — K111

PLV — K116

BIN 4 / K117
BIN 3 FROM PREVIOUS LAYER

BIN 5 / K122
BIN 4 FROM PREVIOUS LAYER

K118
ABOVE + NFDB + FDB

K123
ABOVE + NFDB + FDB

K119
ABOVE − NFUB − FUB

K124
ABOVE − NFUB − FUB

K120
BOUNDARIES TESTED

K125
BOUNDARIES TESTED

K121
PLV

K126
PLV

CCSB2 FROM PREVIOUS LAYER

BIN 2 FROM PREVIOUS LAYER

ABOVE + NFDB + FDB

ABOVE − NFUB − FUB

BOUNDARIES TESTED

BOUNDARIES TESTED

PLV

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4    N117
BIN 3 FROM PREVIOUS LAYER

BIN 5    N122
BIN 4 FROM PREVIOUS LAYER

N118
ABOVE + NFDB + FDB

N123
ABOVE + NFDB + FDB

N119
ABOVE − NFUB − FUB

N124
ABOVE − NFUB − FUB

N120
BOUNDARIES TESTED

N125
BOUNDARIES TESTED

N121
PLV

N126
PLV

PLV (BIN 4)

PLV (BIN 5) = TCSB4

ABOVE - BIN 5' = TCSB3

BIN 2  0107

CCSB2 FROM PREVIOUS LAYER

BIN 3  0112

BIN 2 FROM PREVIOUS LAYER

0108

ABOVE + NFDB + FDB

0113

0109

ABOVE − NFUB − FUB

0114

0110

BOUNDARIES TESTED

0115

BOUNDARIES TESTED

0111

PLV

0116

PLV

BIN 3 FROM PREVIOUS LAYER

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

3D OBJECT TO FORM

STANDARD FORMATION

SDFB

IUFB

SUFB

1D

2D

3D

SLB

1A

2A

3A

STANDARD SL
CMSD=2

STANDARD SL
CMSD = 3

STANDARD SL
CMSD=2 RMSD=2

1B

2B

3B

STANDARD SL
CMSD=3 RMSD=3

EMBODIMENT A

1A

2A

3A

EMBODIMENT B

FDFB
EMBODIMENT C

FUFB
EMBODIMENT C

FLB

FORMATION

1A

2A

3A

EMBODIMENT D

1A

2A

3A

FORMATION
EMBODIMENT E

FORMATION EMBODIMENT F

FDFB
EMBODIMENT G

FUFB

FLB

1D

2D

3D

FORMATION

1A

2A

3A

FORMATION
EMBODIMENT H

FORMATION

EMBODIMENT I

FORMATION EMBODIMENT J

1A

2A

3A

FORMATION

EMBODIMENT L

A + B

A n B
or
A * B

SIMULTANEOUS MULTIPLE LAYER CURING IN STEREOLITHOGRAPHY

This application is a continuation-in-part of U.S. patent application Ser. No. 08/016,202, filed Feb. 9, 1993, now abandoned; which is in turn a continuation of U.S. patent application Ser. No. 07/606,802, filed Oct. 30, 1990, now U.S. Pat. No. 5,192,469.

BACKGROUND OF THE INVENTION

The field of the invention is stereolithography, and more particularly improved stereolithography methods and apparatus for manufacturing parts or objects more rapidly, reliably, accurately, and economically.

It is common practice in the production of plastic parts or objects to first design the part and then produce a prototype of the part. This requires considerable time, effort, and expense. For example, tooling or molds may be required, even to produce just the prototype. The design is then reviewed and often times the laborious and expensive process is again and again repeated until the design has been optimized. After design optimization, the next step is production. Most production plastic parts are injection molded. Since the design time and tooling costs are very high, plastic parts are often only practical in high volume production. While other processes are available for the production of plastic parts, including direct machine work, vacuum-forming and direct forming, such methods are typically only cost effective for short run production, and the parts produced are usually inferior in quality to molded parts.

Techniques have been developed in the past for making three-dimensional objects within a fluid medium. These techniques involve selectively curing the medium, e.g., a resin, with a beam of radiation. U.S. Pat. Nos. 4,041,476; 4,078,229; 4,238,840 and 4,288,861 describe some of these techniques. All of these techniques or systems rely on the buildup of synergistic energization, or curing energy, at selected points deep within the volume of the fluid medium, to the exclusion of all other points in the fluid volume. These systems however, encounter a number of problems with resolution and exposure control. The loss of radiation intensity and image forming resolution of the focused spots of the beam, as they are directed deeper into the fluid medium, create complex beam control situations. Absorption, diffusion, dispersion and diffraction all contribute to the difficulties of working deep within the fluid medium on an economical and reliable basis.

In recent years, "stereolithography" systems, such as those described in U.S. Pat. No. 4,575,330, which patent is incorporated herein by reference as if set forth herein in full, have come into use. Stereolithography is a method for automatically building simple or complex parts (e.g., plastic parts) by successively "printing" cross-sections or layers of a solidified fluid-like building material on top of each other, with all of the layers joined together to form a whole part. The building material may be, for example, a photopolymer which is solidifiable upon exposure to UV radiation or the like. Powder material, which forms a solidified mass when sintered by conducted or radiated heat from a heated element or source of IR radiation or the like, and powders which are solidifiable by the addition of a reactive chemical such as a binder, may also be utilized. This method of fabrication is extremely powerful for quickly reducing design ideas to physical form and for making prototypes.

One type of useful fluid medium, photocurable polymers (photopolymers) change from a liquid to solid when exposed to light. Their photospeed under ultraviolet light (UV) is fast enough to make them practical building materials. The material that is not polymerized when a part is made is still usable and remains in the vat as successive parts are made. In one embodiment, an ultraviolet laser generates a small intense spot of UV. This spot is moved across the liquid surface with a galvanometer mirror X-Y scanner. The scanner is driven by computer generated vectors. After each successive surface is exposed by the laser, an elevator lowers the object further into the vat and allows another layer of fresh liquid to cover the surface of the object for formation of the next layer. Precise complex patterns can be rapidly produced with this technique.

The laser, scanner, photopolymer vat and elevator, along with a controlling computer and possibly a separate computer for creating appropriate cross-section data from initially supplied three-dimensional object data, combine together to form a stereolithography apparatus, referred to as an "SLA." An SLA is programmed to automatically make a part by drawing its various cross-sections, one layer at a time, and building the part up layer-by-layer.

Stereolithography does not use tooling, molds, dies, etc. Since it depends on using a computer to generate cross-sectional layers or patterns, an SLA can be readily linked (i.e., a data link) to computer aided design as a computer aided manufacturing (CAD/CAM) apparatus.

Many photopolymers have a "minimum solidifiable thickness," i.e., a minimum thickness below which they cannot be sufficiently cured to form unsupported regions of transformed, cohesive material. For example, with presently preferred fluid photopolymers, if an attempt is made to try to form a feature of an object having a thickness less than the minimum solidifiable depth (MSD) or thickness, that feature will either simply fail to sufficiently solidify to become part of the object, or it will slump (i.e., fail to hold its shape) when the object or individual layer is moved relative to the vat of fluid photopolymer. The minimum solidifiable thickness of a building medium (e.g. photopolymer) is not only a characteristic of the building medium or material itself but it also depends on the synergistic stimulation source chosen (e.g. the solidifying radiation such as ultraviolet light) and the environmental conditions surrounding the material. For example, oxygen absorbed in a photopolymer can act as a reaction inhibitor. Therefore, as used herein, "MSD" refers to the minimum solidification depth obtainable with a given material/solidification environment combination. The minimum solidification depth can also be considered the depth resulting from the minimum exposure that is preferred for curing down-facing features of an object regardless the basis for this preferred minimum. This preferred minimum exposure may be based on a desire to form a minimum solidified thickness of material from a single layer, which minimum thickness is selected for its ability to withstand curl distortion or to supply sufficient structural integrity. These definitions can apply to any fluid-like material whether liquid, powder, paste or emulsion. Furthermore, these definitions can also apply to building material that is applied in sheet form and then transformed.

Many liquid building materials also have a Minimum Recoating Depth, MRD, or thickness; i.e. a minimum coating thickness that can reliably be formed over previously solidified material. This minimum recoating depth, may derive from a dewetting phenomenon that occurs between the liquid material and the previously solidified material. Alternatively, the MRD may simply be based on apparatus or process limitations regarding the timely formation of coatings; in other words, the minimum thickness may be set by a maximum acceptable recoating time or accuracy limitation. This alternative definition can be applied to both liquid and powder materials.

Stereolithography makes objects layer by layer. Since the MSD is the minimum solidification depth for forming unsupported regions of layers (i.e., down-facing features of the object), these regions must be given a cure depth of at least the MSD regardless of the thickness between individual layers or cross-sections from which the object is being formed. Therefore, due to the layer-by-layer formation process, even if the layers being used are thinner than the MSD, the accuracy of the stereolithographically reproduced object is limited by the MSD of the material being used.

Stereolithography makes objects layer-by-layer, and thus the MRD sets the minimum coating thicknesses that can be effectively utilized by standard stereolithographic techniques. This minimum coating thickness directly sets the vertical accuracy obtainable when using standard stereolithographic techniques.

In the remainder of the specification, the MSD and MRD may be expressed in either (1) particular units of length or (2) without units or followed by an "LT". "LT" is an acronym for "layer thickness" and in particular the thickness for layers having the desired resolution. If the MRD is expressed without units, or followed by an LT, it should be understood that it is expressed in terms of the number of layers, each possessing the desired resolution that yield a thickness equal to the MRD.

Accordingly, it is an object of the invention to overcome the MSD limitation by providing a method and apparatus of practicing high resolution stereolithography when using a building material that is inherently incapable of making unsupported thicknesses of solidified material as thin as the desired level of accuracy when solidified by the chosen synergistic stimulation.

Additionally, it is an object of the invention to overcome the MRD limitation by providing a method and apparatus of practicing high resolution stereolithography when using a fluid-like building material that is inherently incapable of reliably forming coating over previously solidified material as thin as the level of accuracy desired when forming the object.

Another object of this invention is to provide a method and apparatus for enhancing object production by horizontally and/or vertically distinguishing regions of an object, to be formed, based on their distance from a given point or points, surface or surfaces so as to form those regions with different building parameters.

A further object of the invention is to merge any two or more of the above objects into combination methods and combination apparatus to provide further enhancements to stereolithography.

RELATED APPLICATIONS

Additional details about stereolithography are available in the following U.S. Patents and Patent Applications, all of which are hereby fully incorporated by reference herein as though set forth in full:

| APPLICATION SER. NO. | FILING DATE | INVENTOR(S) | STATUS |
| --- | --- | --- | --- |
| U.S. 07/182,830 | April 18, 1988 | Hull et al. | U.S. Pat. No. 5,059,359 |
| U.S. 07/183,016 | April 18, 1988 | Modrek | U.S. Pat. No. 4,996,010 |
| U.S. 07/182,801 | April 18, 1988 | Hull et al. | U.S. Pat. No. 4,999,143 |
| U.S. 07/183,015 | April 18, 1988 | Smalley | U.S. Pat. No. 5,015,424 |
| U.S. 07/268,816 | November 8, 1988 | Spence | U.S. Pat. No. 5,058,988 |
| U.S. 07/268,837 | November 8, 1988 | Spence et al. | U.S. Pat. No. 5,123,734 |
| U.S. 07/268,907 | November 8, 1988 | Spence et al. | U.S. Pat. No. 5,059,021 |
| U.S. 07/331,644 | March 31, 1989 | Hull et al. | U.S. Pat. No. 5,184,307 |
| U.S. 07/339,246 | April 7, 1989 | Hull et al. | U.S. Pat. No. 5,104,592 |
| U.S. 07/365,444 | June 12, 1989 | Leyden et al. | U.S. Pat. No. 5,143,663 |
| U.S. 07/415,134 | September 26, 1989 | Jacobs et al. | Abandoned |
| U.S. 07/429,911 | October 27, 1989 | Spence et al. | U.S. Pat. No. 5,182,056 |
| U.S. 07/429,301 | October 30, 1989 | Lewis et al. | Abandoned |
| U.S. 07/428,492 | October 30, 1989 | Vorgitch et al. | Abandoned |
| U.S. 07/429,435 | October 30, 1989 | Smalley et al. | U.S. Pat. No. 5,130,064 |
| U.S. 07/515,479 | April 27, 1990 | Almquist et al. | U.S. Pat. No. 5,174,931 |
| U.S. 07/545,517 | June 28, 1990 | Cohen | U.S. Pat. No. 5,096,530 |
| U.S. 08/148,544 | November 8, 1993 | Almquist et al. | Pending |

U.S. patent application Ser. No. 07/606,191, referenced above, is particularly relevant to the instant invention. This application was filed concurrently with the instant application's grandparent application (U.S. patent application Ser. No. 07/606,802). It describes the use of Boolean operations in determining which portions of each layer continue from the previous layer through the present layer and through the next successive layer and which portions are up-facing or down-facing or both. Therefore, this referenced application describes methods and apparatus for comparing initial data associated with each layer, and comparing such data between layers to form resulting data that will be used in the process of physically reproducing the object. Additionally, this referenced application describes the use of such operations to yield appropriately sized objects (e.g. undersized or oversized). Utility of the concepts of this referenced application, to the instant invention, will become apparent by following the teaching of the instant invention as described hereinafter.

SUMMARY OF THE INVENTION

This invention allows the formation of higher resolution objects than traditionally thought possible when using a given building material (e.g. a given liquid photopolymer or powdered material).

The invention allows materials which are not considered capable of producing high resolution objects by stereolithographic methods to be used to create many of these high resolution objects through improved stereolithographic techniques. In terms of photopolymers, these heretofore non-high resolution photopolymers typically have absorption and solidification properties which make them incapable of being converted to a cohesive solid plastic of thickness less than some amount (e.g. 1 mm). In the normal practice of stereolithography, using one of these materials, all vertical features of an object occur at positions that are nominally integral multiples of a layer thickness which is greater than or equal to the MSD. Alternatively, if a finer layer thickness is used, all down-facing features are supplied with an amount of exposure that results in a net depth of cure greater than the layer thickness which results in misplacement of down-facing features and associated errors in object configuration.

The techniques described herein involve delaying the curing of at least portions of some cross-sections until recoating one or more additional cross-sections after which sufficient exposure is applied to achieve the desired depth of cure. In other words the techniques described herein provide an improved stereolithographic method for forming a three-dimensional object wherein data descriptive of at least portions of two cross-sections is modified by shifting the data from a first cross-section to a second cross-section which is located at least one layer thickness from said first cross-section and by differencing the shifted data from any other data on the second cross-section and on any intermediate cross-sections between the first, second cross-sections, wherein the modified data is used in forming said three-dimensional object.

In the practice of the present invention, the smallest single solid vertical feature is still equivalent to the MSD. However, vertical features of the object are no longer necessarily reproduced in steps that are integral multiples of a layer thickness which is greater than or equal to the MSD or wherein exposures are blindly applied that result in cure depth that cause misplacement of down-facing features of the object. Using the techniques as taught herein, vertical features can be formed from smaller steps (layer thicknesses) than the MSD while simultaneously ensuring that down-facing features are not misplaced (as long as the feature's minimum thickness is greater than the MSD).

The typical practice of stereolithography involves the transformation (curing), to a depth substantially equal to or greater than the layer thickness, of all areas of each cross-section prior to coating the partially formed object with a layer of untransformed or unsolidified material in preparation for formation of a next layer of the object. This typical practice may or may not involve the utilization of somewhat different depths of cure, wherein the depth of cure depends on whether the area being cured is used for adhesion to the previously formed layer or is being cured as a down-facing feature of the object. In the practice of the present invention deviations are made from the typical approach. These deviations involve leaving untransformed material on at least one portion of one cross-section, at least until after the cross-section has been coated over with untransformed material in preparation for formation of an additional layer of the object, and wherein the portion(s) will be solidified by transformation of material after the formation of the coating.

Layer-to-layer comparisons are made to determine the depth to which the material can be solidified to ensure adequate adhesion to previously formed layers, and to ensure adequate strength (modulus of solidifiable material) while simultaneously ensuring that material is not solidified to a depth that causes penetration into a region that should remain unsolidified. Solidification depth is achieved by appropriate specification and control of synergistic stimulation which is used to expose the surface of the material.

These comparisons form the basis of selective curing which enable individual portions of each cross-section to be transformed in association with the most appropriate layer and vertical level during the object formation. By the selective curing aspect of the invention, a balance is maintained between necessary structural integrity, desired resolution, and the resulting accuracy.

When using a photopolymer material, the minimum solidification depth (MSD) is related to the wavelength of the radiation used. The MSD is typically directly related to the penetration depth of the material. The use of various penetration depths in the stereolithography process is described in U.S. patent application Ser. No. 07/429,911. The methods of this referenced application can be combined with the teachings of the present invention.

Many objects that cannot be built accurately with standard stereolithography while using one of these materials of relatively high MSD, can be built accurately with the techniques of this invention. However, even with the techniques of the present invention some objects i.e., those having solid vertical features thinner than the MSD may suffer from accuracy problems. However, these can be handled in various ways as described herein.

The present method leads to a more accurate creation of objects than is possible by use of typical stereolithographic techniques for a given building material with a given MSD. It also provides a more rigid "green" part or object. Reduction in distortion may also be achieved due to increased green strength along with staggered solidification of the material. Not all material to be solidified in a given area of a cross-section is necessarily solidified on that cross-section. It may be solidified through and simultaneously with a higher cross-section or layer, i.e., with the solidifying radiation penetrating downward through higher layers into the appropriate region.

As noted above, a portion of a layer forming a down-facing feature should only be cured to a depth of one layer thickness. However, in actual practice, down-facing regions are typically given a cure depth significantly greater than one layer thickness. This excess cure depth results in a distortion of the vertical dimensions of the object. The instant invention may be used to correct this over-curing problem by delaying the exposure of a down-facing region of the object for one or more layers until the object thickness is at least as great as the minimum cure-depth that will be obtained when exposing the down-facing region. In this embodiment, the MSD is defined as the minimum solidification depth that will be used in forming down-facing regions. This embodiment becomes especially attractive when the desired resolution becomes extremely small. For example, as resolution demands become higher, layer thicknesses become smaller. Typical layer thicknesses are on the order of 4, 5, 6 or 10 mils, but are steadily being pushed down to 2 mils, 1 mil or even less, whereas with current materials the exposures typically preferred result in cure-depths for down-facing features of typically between 8 and 16 mils. Furthermore, in this class of embodiments the cure depth applied to down-facing features may be based on the exposure applied in a single layer or alternatively it may be based on the exposure applied to two or more consecutive layers wherein the depth of cure, as measured from the top of the first layer, is increased by print through of exposure from one or more higher layers.

Another feature of the present invention is the use of cross-sectional slices thinner than the MSD. These thin cross-sections in combination with the present solidifying or curing techniques will yield higher resolution parts than those obtainable using cross-sectional slices equal to the MSD. The minimum feature thickness will still be the MSD. Any errors due to this minimum feature thickness will present a problem in only a small percentage of the objects that can be built using stereolithography.

The invention also contemplates a method for making the surface of an object built with a particular layer thickness (for the bulk of the object) appear as if it were constructed from finer layers. In addition, the instant method relates not only to making the surface appear more continuous (i.e., finer layers) but also to building the bulk of the object with thick layers while maintaining the overall accuracy associated with finer layers. This method is based on creating cross-sections having a vertical spacing equal to the desired resolution and comparing these cross-sections two or more at a time. This may be used to determine which portions of a cross-section require building at fine layer increments and cure depths (e.g. 5 mils or less); which portions can be built using greater cure depths; and which portions can be skipped altogether for building at even coarser layer increments (e.g. 10, 15, or 20 mils or more). Many of these methods require the use of a material that has the capability of being solidified to unsupported thicknesses at least as thin as the fine layer increments (e.g. 5 mils or less). Several embodiments to these novel methods are described herein.

A further embodiment of the instant invention can be used to form higher resolution objects than normally considered possible when using a building material that will not reliably form coatings thinner than a given amount. The minimum thickness for reliably forming a coating is referred to as the MRD. For example, one may wish to form an object with a layer thickness, or resolution, of 5 mils or less when using a material that won't reliably form coatings thinner than 10 mils or more. These recoating problems can be based on two phenomena: (1) excess time involved in forming coatings of the desired thinness when a thicker coating can be formed in a more timely manner; and/or (2) dewetting of all or portions of the previously formed layer of the object when one attempts to form a coating which is too thin. This dewetting phenomenon is based on an incompatibility between the solidified building material and the liquid material. It has been found that the seriousness of this dewetting phenomenon is greatly influenced by the exposure style which is used to solidify the layer being coated over. For a more detailed discussion of exposure styles, reference is made to U.S. patent application Ser. No. 08/233,026, filed on Apr. 25, 1994, now pending which is a continuation-in-part of U.S. patent application Ser. No. 08/121,846 filed on Sep. 14, 1993, now allowed. This 233,026 application is incorporated by reference herein as if set forth in full. In this embodiment, layer comparisons are utilized to derive exposure data for each layer wherein the net thickness of unsolidified material for each region, to be exposed, is greater than or equal to the minimum coating thickness that can be reliably formed. It is preferred that all portions of each layer which are to be cured in association with a given cross-section should be exposed only when the coating thickness is greater than or equal to the minimum coating thickness. However, it is envisioned that in certain situations it may not be critical to ensure proper coating depth prior to exposure for some regions. In these circumstances only critical portions of layers may be involved in the potentially staggered curing required by this embodiment.

An additional embodiment involves the use of layer comparisons to define additional types of regions to be cured. These layer comparisons can be used to define a variety of regions. For example, these layer comparisons can be used to define extra regions to be skinned or to indicate which portions of the object are located above down-facing features by a particular distance and/or located below up-facing features by a particular distance. More particularly, skin regions can be defined which are one, two or more layers above a down-facing feature. It is to be understood that these extra skin regions can be in addition to any shifting of skins required by the utilization of an embodiment which compensates for MSD values greater than the layer thickness. The supplying of multiple skins to strengthen up-facing and down-facing regions has particular advantages when attempting to form drainable parts that can be used as patterns for investment casting. This use of multiple skins is discussed further in U.S. patent application Ser. No. 08/233,026.

An additional aspect of this invention, which can be used independently or in combination with the other embodiments disclosed herein, involves the use of horizontal comparison techniques to further differentiate cross-sections into separate curable regions. These different regions may be obtained from the cross-section as a whole, from within a single boundary type on the cross-section, from a combination of boundary types on a given cross-section, or from intermediate or final boundaries involved in the layer comparison techniques described herein. The horizontal comparison technique may utilize an erosion or buildup technique to define the distance between points on a cross-section or even within the object as a whole. This erosion or buildup technique may involve the use of one or more positive cure width (i.e. line width) compensation type manipulations (i.e. reductions in area) or negative cure width compensation type manipulations (i.e. expansions in area). For example, based on these operations each portion of the cross-section can be designated as being a certain distance from the exterior surfaces of the cross-section. As an alternative to labeling each portion of a cross-section, boundaries can be defined that separate selected portions of the cross-section into designated regions. As a second example, portions of the cross-section can be designated as being located a certain distance from the deepest interior point of the cross-section. As an additional example, each portion can be labeled based on its distance from the centroid of the cross-section or an axis around which the object is to be rotated. Cure parameters appropriate to each defined regions or location can be defined. These cure parameters may be related to scanning speeds, vector density, vector types, or the like. For example, when forming an object that is to be built with enclosed liquid building material that is to be drained from the interior walls of the object after formation, these techniques can be used to increase the spacing between hatch vectors as one moves deeper into the interior of the object. An object can thus be formed with its internal regions being separated into two or more regions where each region is given a different exposure style.

The techniques of the present method may also be implemented solely as a distortion reduction technique that can be achieved by manipulating vectors defining boundaries, by manipulating pixels or voxels, by other data manipulation techniques, or by any other technique that results in appropriate treatment of the cross-sections, or by any combination of these.

Typically, in stereolithography, objects are built on webs or some other form of supporting structure. With the present method, the selection and placement of support structures should be carefully considered. Because of the possibility of staggering the formation of various regions of an initial cross-section to different layers, support placement is critical. Supports should be designed and placed to catch the regions that will be locally cured in association with the lowest layers.

Apparatus for implementing the above methods are also disclosed.

BRIEF DESCRIPTION OF THE DRAWINGS

FIGS. 7-1 through 7-28 show horizontal views of layers 1-28 used to build the object of FIG. 2.

FIGS. 8-1 through 8-28 show horizontal views of layers 1-28 used to build the object of FIG. 5. Phantom lines in the Figures indicate region(s) at which no curing occurs on the layer of the region(s). Shaded lines indicate curing.

FIGS. 9-1 through 9-28 show horizontal views of layers 1-28 used to build the object of FIG. 6.

FIG. 10 is a side view of a second object that can be built using stereolithography.

FIG. 11 is a side view of the object of FIG. 10 showing the slices and reproduction of the object by stereolithography using a high resolution material (MSD<=Layer thickness).

FIG. 12 is a side view of the object of FIG. 10 but now showing the portions that can be built (and the slice planes) with high resolution while using a material that has an MSD 4 times greater than the layer thickness. Also shown are the corner tip portions that require special handling.

FIGS. 14-1 through 14-21 are schematic illustrations of cross-sectional information (compressed along the Y axis) obtained by the application of "Slice Style 1" to the object depicted in FIG. 10 to produce the object of FIG. 11.

FIG. 15 is a perspective view of a more complex three-dimensional object, which is intended to illustrate the detailed computational advantages of the first preferred embodiment as opposed to illustrating the usefulness of the present invention for forming high-resolution objects.

FIG. 16 is a perspective view of the object shown in FIG. 15 as built with standard stereolithographic techniques and with 10 mil layers and a material with an MSD equal to or less than 10 mils.

FIG. 18 is a perspective view of the object shown in FIG. 15 as created utilizing the first preferred embodiment.

FIG. 20 depicts a side view of the three-dimensional object of FIG. 5 which is formed using an alternative embodiment wherein the material has both an MSD and an MRD which are four times the desired resolution.

FIG. 25 depicts side views of the first, second and third objects, respectively, as formed with the FDFBs, FUFBs, and FLBs for embodiment A.

FIG. 26 depicts side views of the first, second and third objects, respectively, as formed with the FDFBs, FUFBs, and FLBs for embodiment B.

FIG. 28 depicts side views of the first, second, and third objects, respectively, as formed with the FDFBs, FUFBs, FXDFBs, FXUFBs, and FLBs for embodiment D.

DETAILED DESCRIPTION OF THE PREFERRED EMBODIMENTS

A. The simple case

Figure 1:
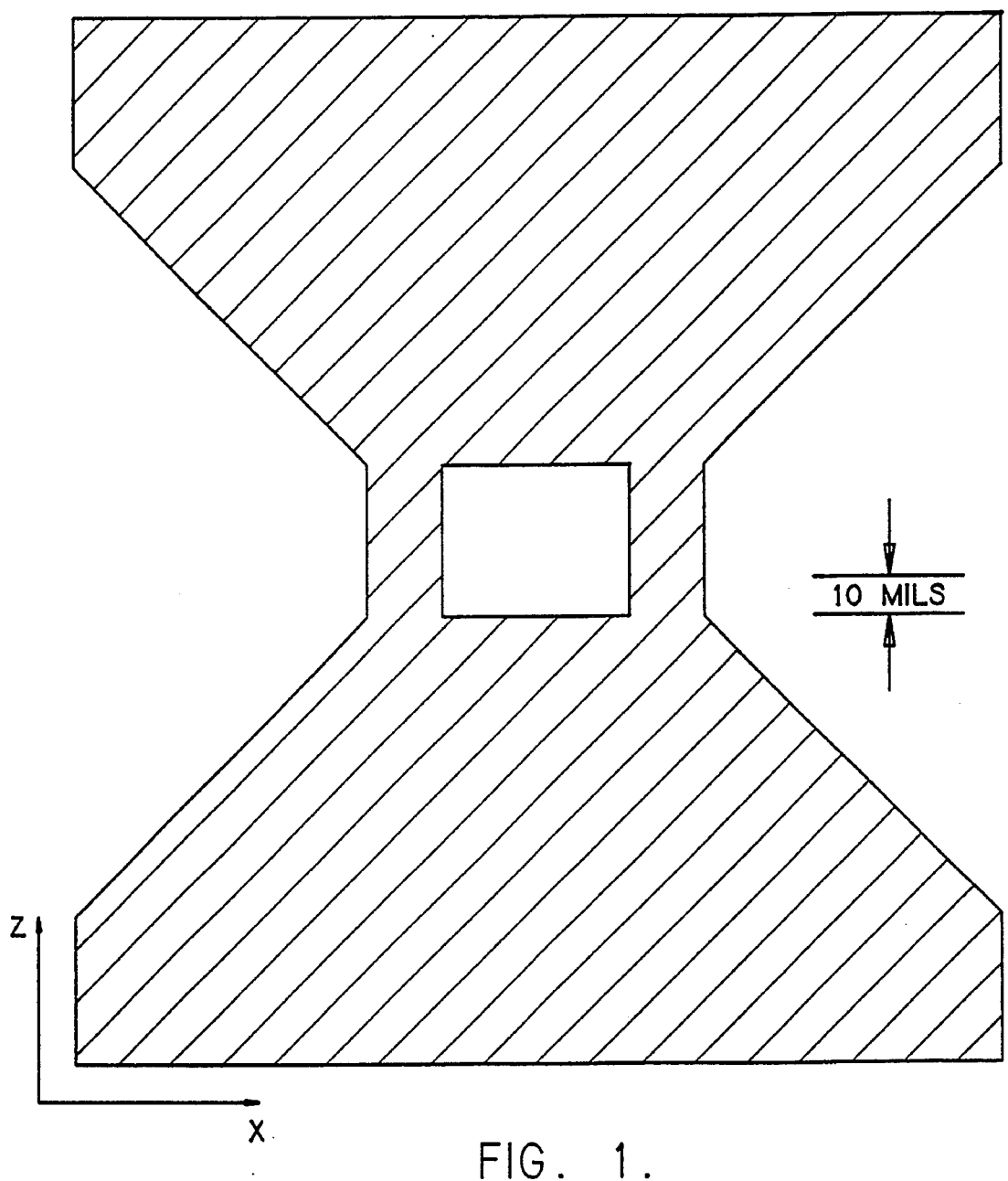
FIG. 1 is a schematic side view of an object or part that can be built using stereolithography.

Data corresponding to an object to be built is sliced with a layer thickness less than or corresponding to the desired vertical resolution. Preferably, but not necessarily, the MSD is an integral multiple of this layer thickness.

In the normal practice of stereolithography the next step would be to build the object based on the created slices with each layer or slice being cured to a depth corresponding to the layer thickness. However, the next step in the implementation of the present invention is based on the fact that we cannot cure thicknesses of material as thin as the slices (at least unsupported thicknesses). Groups of these slices are compared to determine on which layers various portions of each cross-section will be built. For this comparison the slices are grouped consecutively with each group containing a sufficient number of slices to form a thickness equivalent to the MSD. If the MSD is 40 mils and the layer thickness is 10 mils, each group will contain 4 cross-sections. In the first preferred embodiment of the invention, group 1 contains cross-sections 1, 2, 3, and 4, group 2 contains cross-sections 2, 3, 4, and 5, and group "N" contains cross-sections N, N+1, N+2, N+3.

Turning to the drawings, FIG. 1 shows a side view of an hourglass shaped object that can be built using stereolithography. For simplicity, FIG. 1 shows only one horizontal dimension "X" along with the vertical dimension "Z". The other horizontal dimension extends into the page one inch. In total, this drawing represents a rectangular hourglass.

Figure 2:
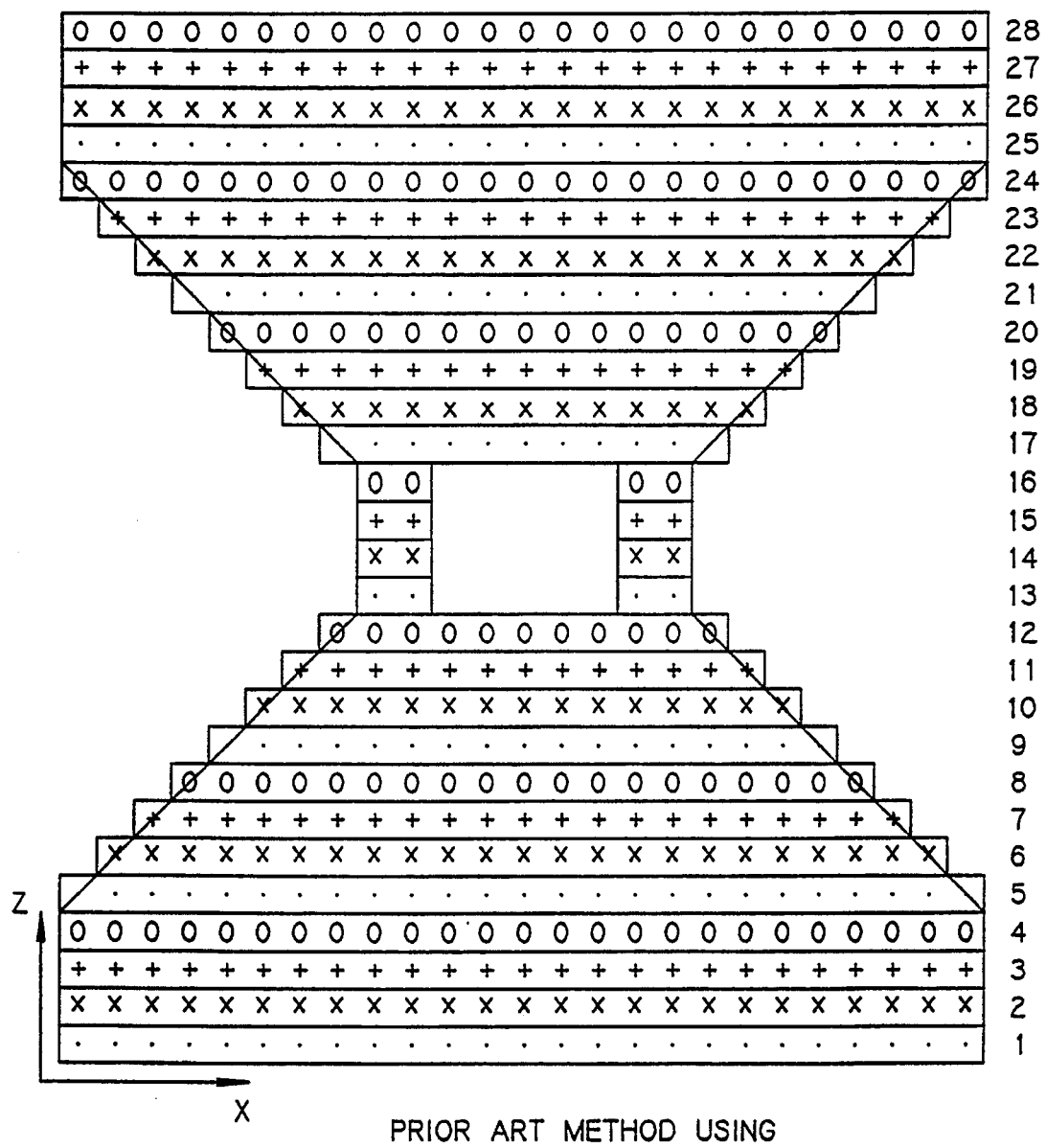
FIG. 2 is a side view of the object of FIG. 1 sliced using 10 mil cross-sections and constructed using a material that can form 10 mil thicknesses.

FIG. 2 is a side view of the hourglass or object of FIG. 1 but this view shows the object as reproduced by stereolithography using 10 mil thick layers or cross-sections and a material whose MSD is less than or equal to 10 mils. The layers are designated by one of four symbols ".", "x", "+", or "o". The use of these symbols is only to emphasize the distinction between layers. The numbers to the right side of FIG. 2 designate the various layers. There are 28 layers derived from 28 cross-sections of data which are derived from 29 slicing planes. This method of obtaining cross-sectional data is described in the previously referenced 07/331,644 patent application.

Figure 3:
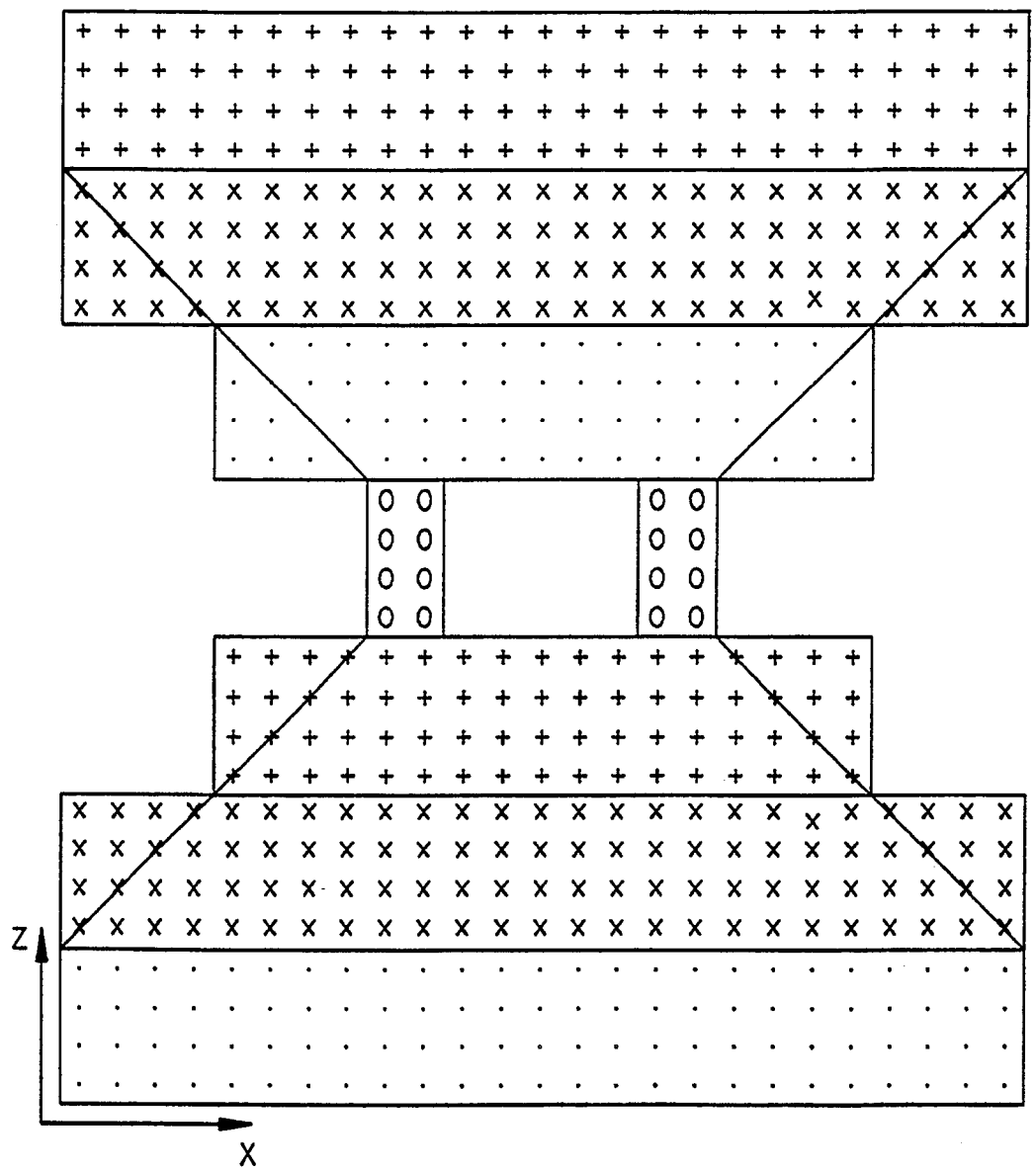
FIG. 3 is a side view of the object of FIG. 1 but this time sliced using 40 mil (1 mm) cross-sections along with a material cured to a 40 mil depth.

FIG. 3 is similar to FIG. 2 except that instead of 10 mil separation between cross-sections (i.e., 10 mil layer thickness) there is a 40 mil separation. When using a material with an MSD of 40 mils, in the prior art one would have to use 40 mil cross-sections or greater. Therefore this Figure represents the best resolution possible with such a material using prior art techniques.

Figure 4:
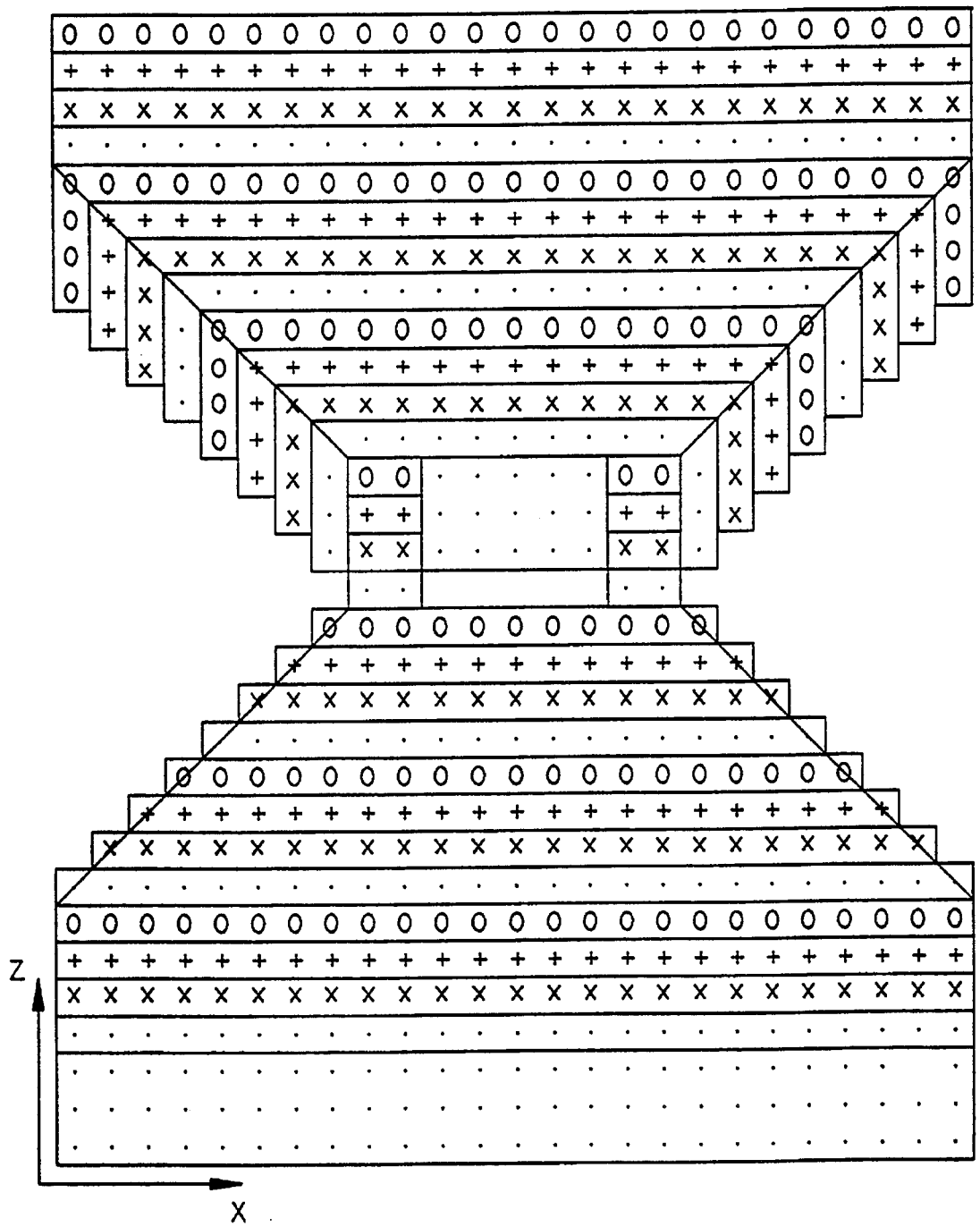
FIG. 4 is a side view of the object of FIG. 1 sliced using 10 mil cross-sections but constructed using a material that cannot form unsupported layers less than 40 mils in thickness (i.e., a 40 mil MSD material) using a typical stereolithography approach.

FIG. 4 represents an example of an alternative typical stereolithographic technique intended for achieving high resolution accuracy from a lower resolution material. FIG. 4 shows the object of FIG. 2 again depicted but built with 10 mil cross-sections along with a material having a 40 mil MSD. In the hope of obtaining better resolution using a 40 mil MSD material, one might try to slice the object using finer cross-sections but still solidifying it to a 40 mil cure depth. The result of doing this is shown in FIG. 4 which illustrates that the steps between layers have been made smaller but that the vertical location of features is grossly inaccurate.

Figure 5:
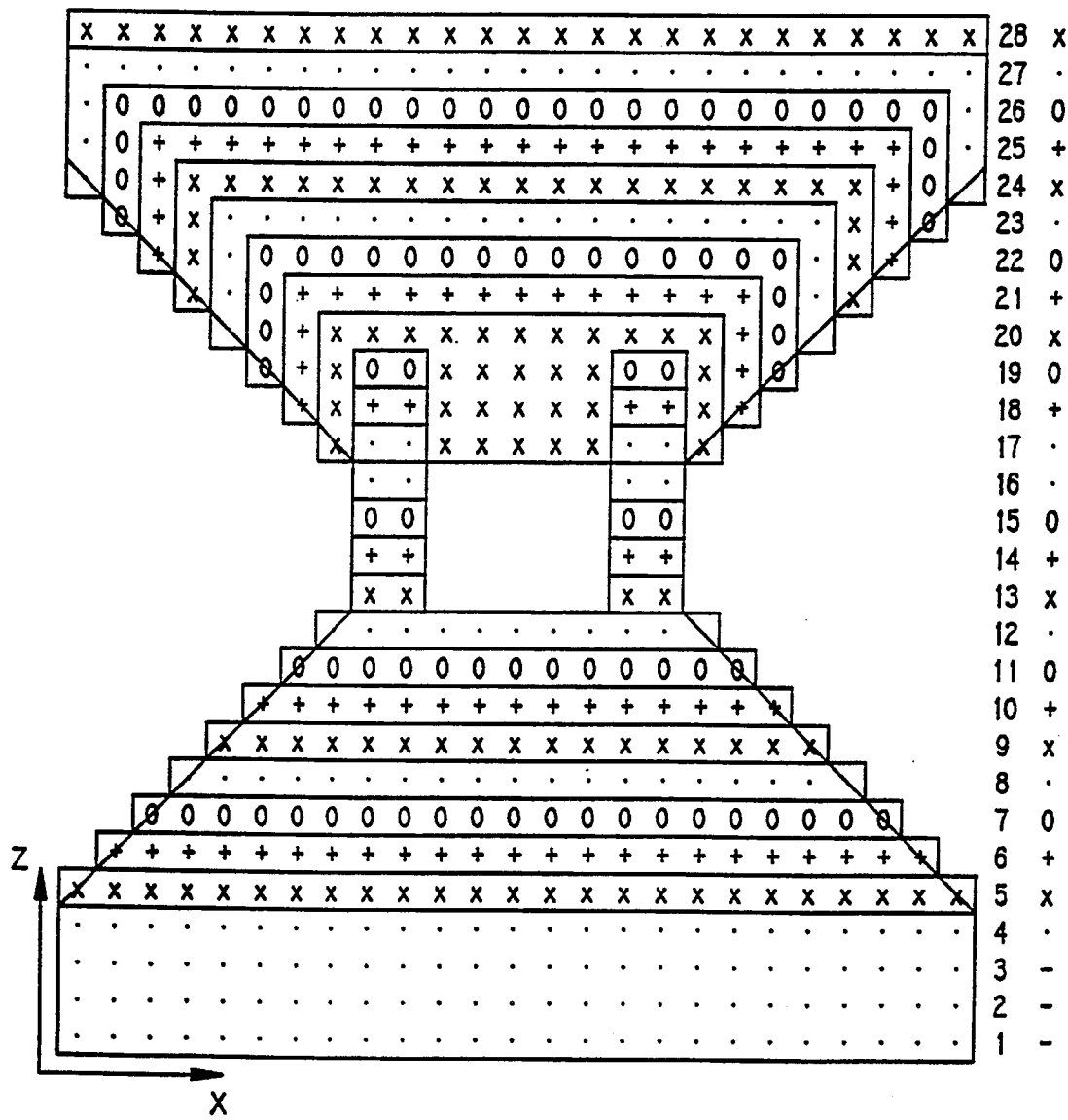
FIG. 5 is a side view of the object of FIG. 1 sliced using 10 mil cross-sections but constructed using a material that cannot form unsupported layers less than 40 mils (MSD) in thickness using a first embodiment of this invention.

FIG. 5 represents the object of FIG. 2 again but now built using the techniques of the present invention along with 10 mil layers or cross-sections and a material of 40 mil MSD. Comparing FIG. 5 to FIG. 2, it can be seen that an object has been produced while using a low resolution stereolithographic material which has the same degree of accuracy as when a high resolution material was used. The layers are again numbered 1 to 28 and the dashes, "-", at the right side of layers 1 to 3 indicate that no material is cured directly in association with these layers.

This result of obtaining the same degree of accuracy is not possible in the prior art. It should be noted that all objects cannot be built with this degree of accuracy while using low resolution (LR) materials. The key to being able to obtain the same or better resolution than what is obtainable with high resolution (HR) materials using typical stereolithography is that the object cannot have vertical features thinner than the MSD of the lower resolution material. These features are "too thin". If an object has such vertical features then there will be a corresponding loss of reproduction accuracy. However, this loss of reproduction accuracy occurs only in the regions of these "too thin" features. Additionally, careful planning can reduce the adverse affect that these deviations have on the part. Techniques for handling such cases are described hereinafter. Included in these techniques are careful selection of the slice axis; building along more than one axis as disclosed in U.S. Pat. No. 4,575,330; and post processing by sanding or filling as may be generally required using standard stereolithography anyway.

Figures 1, 7:
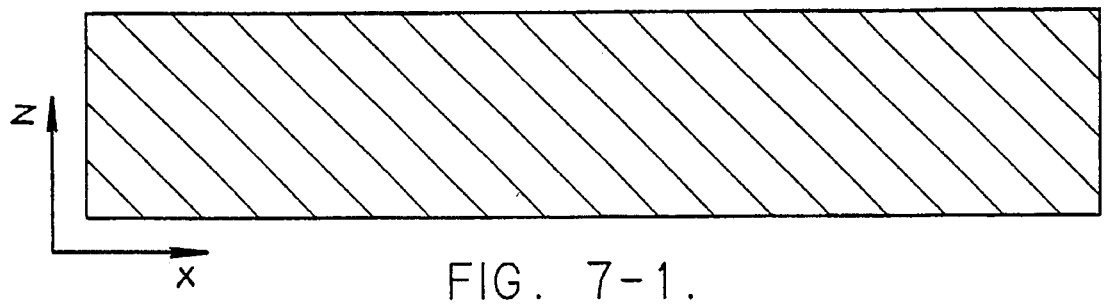
Figures 2, 7:
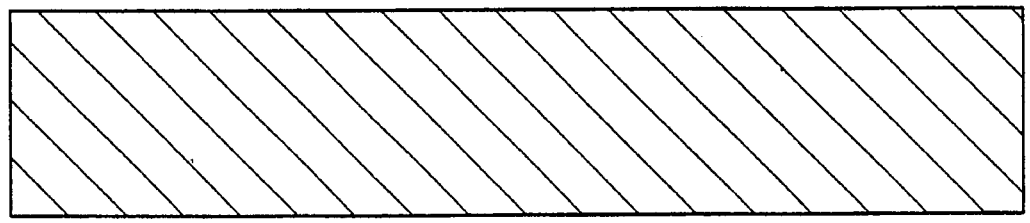
Figures 3, 7:
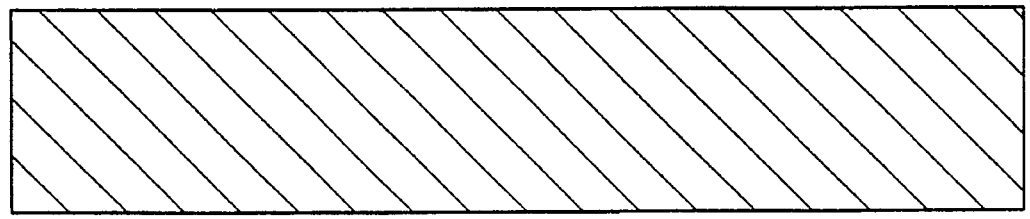
Figures 4, 7:
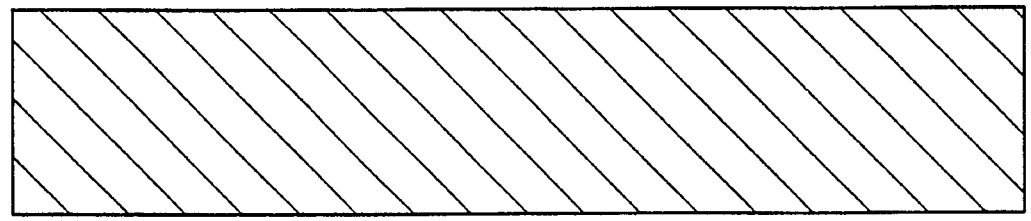
Figures 5, 7:
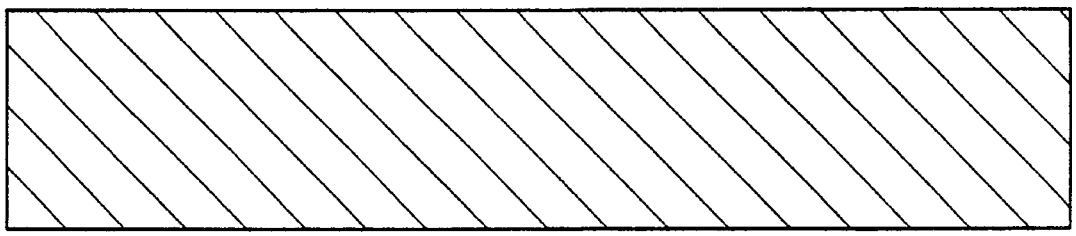
Figures 6, 7:
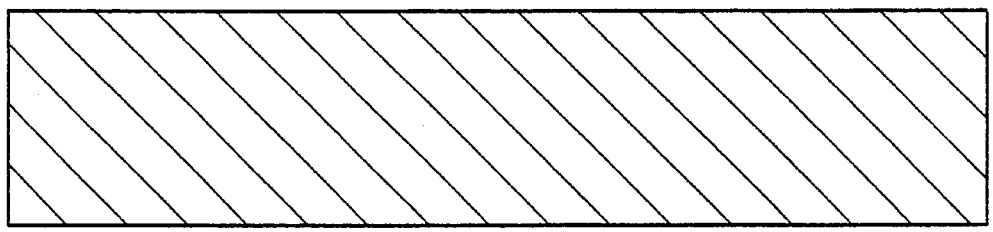
Figure 7:
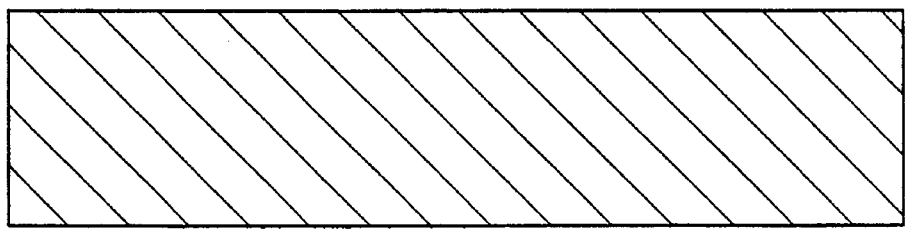
Figures 7, 8:
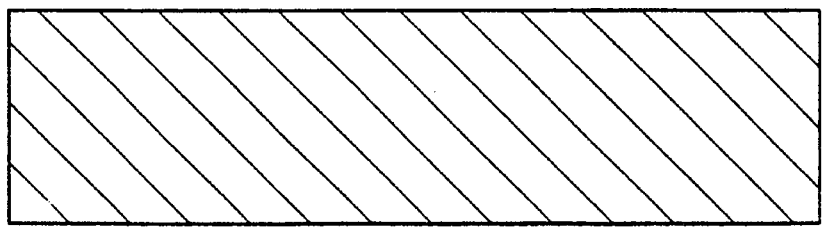

To illustrate the conceptual details of accomplishing the reproduction depicted in FIG. 5, it is useful to compare the material cured in association with each layer in producing the objects shown in FIGS. 2 and 5. FIGS. 7 and 8 show these cross-sections and corresponding areas of cure for each of the 28 possible layers. Specifically, FIG. 7 shows the curing regions for each layer of the object of FIG. 2, and FIG. 8 shows the curing regions for each layer of the object of FIG. 5. In the following we refer to curing layer thickness depths of material. In actuality, we may cure somewhat more than this thickness where appropriate to get good adhesion between layers to enable formation of a cohesive three-dimensional object. As with standard stereolithography, up-facing and down-facing features when cured must be skinned to prevent leakage if the objects are being built with crosshatched interior (as described in U.S. patent application Ser. No. 07/331,644).

Keeping in mind the less than or equal to 10 mil MSD of FIG. 2, and the 40 mil MSD of FIG. 5, from FIG. 7, we see for cross-section 1 that a 10 mil layer of material is cured which forms the first layer of the object shown in FIG. 2. However from FIG. 8 we see that no material is cured in association with the first cross-section of the object of FIG. 5 since the minimum cure would have caused the formation of a layer that would have been 30 mils over cured. The second and third cross-sections shown in FIGS. 7 and 8 depict similar situations.

The reverse slashes, "\", in FIG. 7 represent regions which are cured to approximately 1-layer thickness in association with a given layer (plus any necessary over cure). Whereas in FIG. 8, the forward slashes, "/", represent regions that are cured to a depth approximately equal to the MSD while the reverse slashes, "\", represent regions which are not necessarily cured to a depth approximately equal to the MSD. The fourth cross-section begins to reveal a key aspect of the instant invention. In FIG. 7 the fourth cross-section shows the same cure as does the previous 3 layers. The fourth cross-section of FIG. 8 depicts the curing of material to form the first layer of the object depicted in FIG. 5. The material cured in association with this cross-section penetrates down through the previous 3 layers to form a 40 mil thickness of material. This is identical to what we have formed up to this point for the object of FIG. 2. In essence the first 4 cross-sections of FIG. 8 were compared and a decision was made as to the inappropriateness of curing a 40 mil thickness of material in association with the first 3 cross-sections. A corresponding decision was made regarding the appropriateness of curing material in association with the fourth cross-section. We note that any time a region is first cured (therefore not supported by previously cured material) it must be skinned if the object is built with open spaced crosshatch, or else the down-facing features will leak and drain. Additionally, we note that when building a part utilizing the present invention we need only recoat in association with those layers with which curing will be associated.

The fifth cross-section of FIG. 7 cures down an additional 10 mils completing the No. 5 layer of the object of FIG. 2. The fifth cross-section of FIG. 8 is also cured but the question arises as to the depth of cure. The amount of untransformed material between the last cured cross-section (layer) and the material surface is ten mils. This entire ten mil gap (according to this embodiment)is to be filled in by solidifying the intervening material in association with the fifth cross-section. The MSD for the building material is 40 mils and represents the minimum unsupported solidifiable depth. However, when a region is completely supported, the "supported minimum solidification depth" (SMSD) is generally less than the MSD for a particular material. This minimum could conceivably drop from 40 to 10 mils or less. Therefore, the cure depth for this fifth cross-section can be anything greater than the greater of the SMSD or the ten mil cross-section thickness (plus an over cure amount). The maximum cure depth associated with this fifth cross-section is a depth that does not cause the bottom surface of the junction between solidified material and unsolidified material to grow down and thereby cause a significant change in accuracy of the lower surface or down-facing feature of the object.

Generally there is an associated change in cure width with a change in cure depth when using a beam to expose the material. One approach to handling this change in cure width is to allow a different line width compensation factor for boundary types that are cured to different depths. In this regard, if the cure depths are close, a single line width compensation prior to doing the layer comparisons will be adequate. However, it the cure depths are significantly different and/or if the variation in line width with cure depth is significant, multiple line width compensations may be necessary. One technique for implementing, multiple line width compensations can begin with an overall line width compensation, on the original boundaries of the cross-section as a whole, according to the maximum cure depth to be used anywhere on the cross-section followed by negative line width compensations on regions (i.e. the boundaries surrounding those regions) of less cure depth. Alternatively, a second implementation can involve performing a positive (i.e. contracting) compensation on portions of boundaries which form external boundaries of the cross-section then followed by performing negative (i.e. expanding) line width compensation on at least some of the internal portions of the boundaries. Line width compensation is further discussed in U.S. patent application Ser. No. 07/331,644 and further discussed in U.S. patent application Ser. No. 07/606,191.

For the sixth through thirteenth cross-sections, each successive cross-section is smaller than and sits completely on or over the previous cross-section. The up-facing regions of each of these cross-sections can be cured in a different way from the non-up-facing regions if desired (e.g. up-facing regions skinned while non-up-facing regions only hatched). The explanation applied to the fifth cross-section above therefore also applies to these cross-sections.

The fourteenth through sixteenth cross-sections similarly completely overlap the preceding cross-sections so that no further explanation of these sections is necessary.

Cross-section 17 partially overlaps 16 but there are some regions which form down-facing features. FIG. 7 shows that the entire cross-section is properly cured to a 10 mil depth. The down-facing regions of the cross-section of FIG. 7 may be given different cure parameters than the non-down-facing regions, e.g. down-facing regions skinned and cured to a depth of 10 mils, non-down-facing regions only crosshatched and cured to a depth of 10 mils plus an over cure amount for adhesion.

FIG. 8 shows that only a portion of the layer is cured with the remaining portions uncured due to the inability to cure depths thinner than 40 mils. Hatched areas of FIG. 8 represent cured portions. Phantom lines designate uncured portions of the layer.

Cross-section 18 has ends which are unsupported by the previous cross-section. FIG. 7 shows the whole cross-section being cured to a depth of 10 mils. Referring to FIG. 8, cross-section 18 has a first region that is supported by what was previously cured in association with cross-section 17, a second region that overlaps the portion of 17 that was not cured, as well as a third set of regions that do not overlap any part of cross-section 17. As FIG. 8 shows, only the supported regions are cured in association with this layer or cross-section.

The regions that overlap the portion of 17 that was not previously cured are now 20 mils thick. If we cure these regions at this time, in association with this layer, we would over cure them by 20 mils. Therefore, we do not cure these regions in association with this layer. The regions that do not overlap any portion of 17 should only have a 10 mil cure depth associated with them. We therefore also do not cure them with this cross-section.

Cross-section 19 again has ends which are unsupported by the previous cross-section. FIG. 7 shows the whole cross-section being cured to a depth of 10 mils. Referring to FIG. 8, cross-section 19 has regions that are supported by material that was cured in association with cross-section 18, another set of regions that overlap the portion of 18 that was not cured (actually these regions consist of two parts: one that overlaps uncured areas on both 17 and 18, and the other which only overlaps regions that were not cured in association with cross-section 18), as well as a third set of regions that do not overlap 18 at all.

As FIG. 8 shows, only the supported regions are cured in association with cross-section 19. The region that overlaps the portion of 18 that was not previously cured is now 20 or 30 mils thick depending on whether they also overlap uncured material associated with cross-section 17. If we cure these regions at this time, we would over cure them by 10 or 20 mils. Therefore, we do not cure these regions in association with this cross-section. If we cured the regions that do not overlap 18 at all, then these regions would be over cured by 30 mils. Therefore, again, we do not cure these regions in association with this cross-section.

Cross-section 20 has ends which are unsupported by the previous cross-section. Again as expected, FIG. 7 shows the whole cross-section being cured to a depth of 10 mils. However, FIG. 8 shows something different about the curing of cross-section 20 as opposed to the curing of the previous 2 cross-sections. Cross-section 20 can be divided into 5 distinct sections:

1) the portion of the cross-section that does not overlap the previous cross-section (required thickness of cure=10 mils), 2) the portion of the cross-section that only overlaps the previous cross-section (required thickness of cure=20 mils), 3) the portion of the cross-section that overlaps the previous 2 cross-sections (required thickness of cure=30 mils), 4) the portion of the cross-section that overlaps the previous 3 cross-sections (required thickness of cure=40 mils), and 5) the portion of the cross-section that overlaps material cured on the previous layer, i.e., the portion that overlaps the previous four or more cross-sections.

From this dissection of the cross-section, it can be seen that we can cure the fourth set of regions to a depth of 40 mils. This will cause the lower surface of solidified material to properly extend downward to the bottom of cross-section 17. As on previous cross-sections, we can also cure the fifth region any appropriate amount since it is supported. It should be noted that in the actual curing process we would generally cure region five before region four and that region four must be skinned if the object is being built with open faced crosshatch. This is generally done when using a liquid medium to advantageously cure regions that are supported by previously cured material, before curing regions that are not supported by previously cured material. This is an advantageous method of curing because it allows each cured region to adhere to previously cured material whether through horizontal or vertical adhesion.

Cross-sections 21 through 24 are very much like cross-section 20 in that each of these cross-sections contain regions requiring 10, 20, 30, and 40 mil cures, along with deeper overlapping regions requiring any appropriate cure depth. Only the regions requiring the 40 mil cure and the supported regions are cured in association with each one of these layers. As expected, each of the cross-sections associated with FIG. 7 are cured in turn to a thickness of 10 mils plus any necessary over cure. Again, with regard to FIG. 8, regions requiring a 40 mil cure also require skinning if building with crosshatch.

Cross-sections 25 through 27 are again similar to cross-sections 21 through 24 in that they possess regions that can be cured to the proper depth (40 mils), regions that are supported, and regions that cannot be cured (without unacceptable introduction of error) due to the MSD. Again, the cross-sections of FIG. 7 are cured to a 10 mil depth. As usual for FIG. 8, regions of 40 mil depth must be skinned if building with cross-hatch supported regions can be cured in any appropriate manner. The regions requiring less than a 40 mil cure are not cured in association with this cross-section but instead are cured in association with higher layers or cross-sections when the necessary MSD cure depth can be utilized without the introduction of errors.

Finally, cross-section 28 fully overlaps cross-sections 27, 26, and 25 and is therefore given an appropriate cure to form a cohesive cross-section of solidified material.

The foregoing comparison thus far has demonstrated the typical approach to stereolithography versus a particular embodiment for curing material using the present invention. This comparison, i.e. comparing FIGS. 2 and 5, shows that the present method, even using a low resolution material, can generally closely match the high reproduction accuracy previously obtainable only by using a high resolution material.

Figure 6:
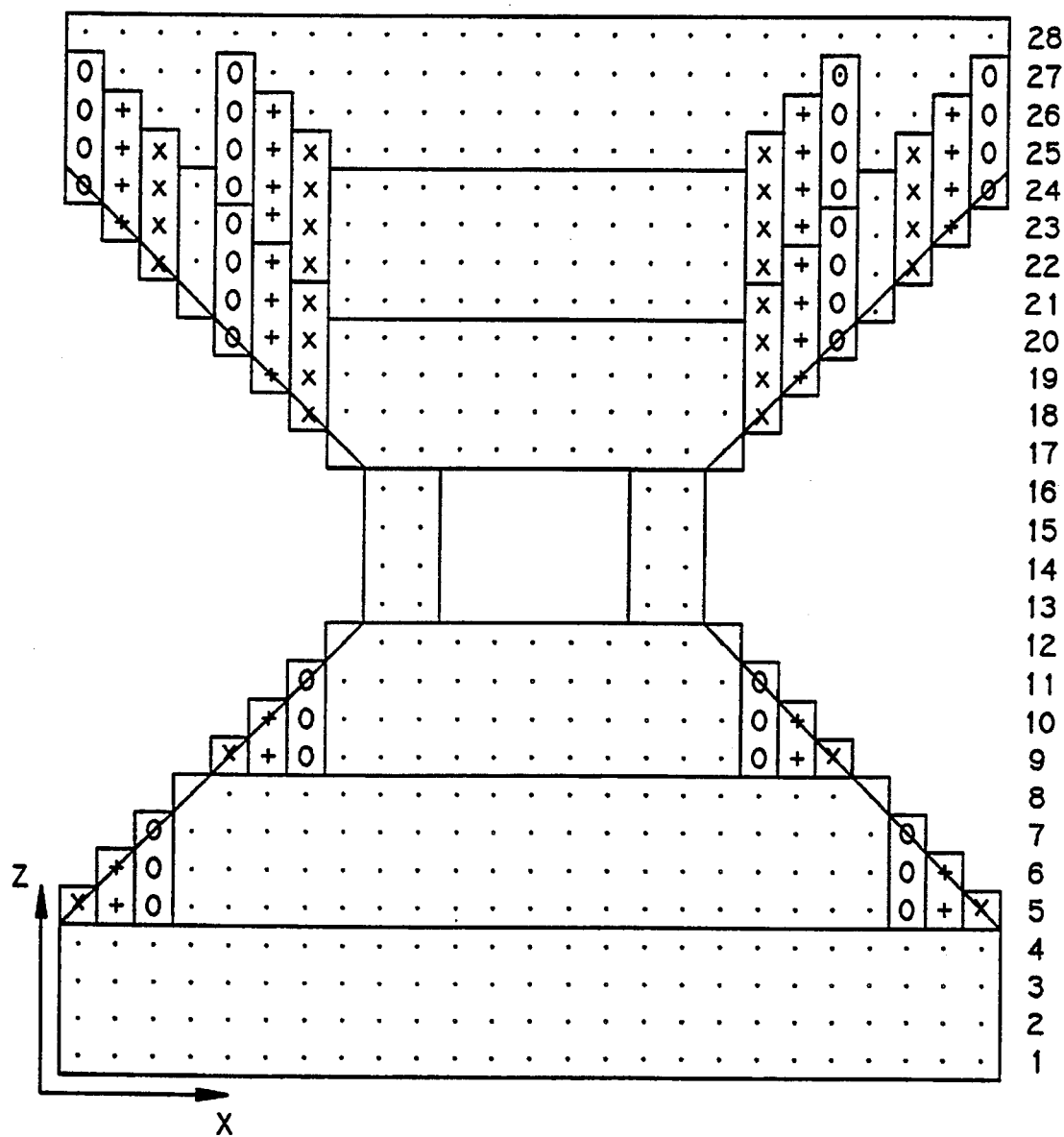
FIG. 6 is a side view of the object of FIG. 1 sliced using 10 mil cross-sections but constructed using a material that cannot form unsupported layers less than 40 mils in thickness using a second embodiment of the invention.
Figures 7, 8, 9:
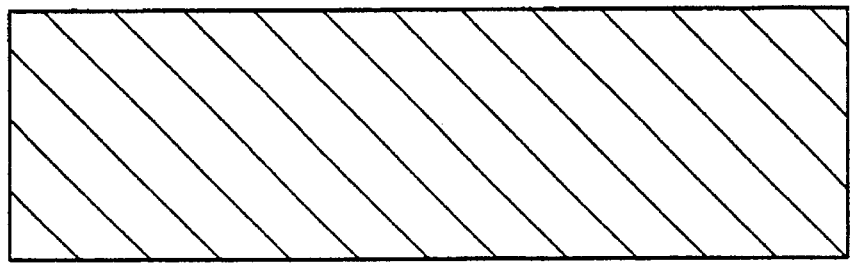

FIGS. 6 and 9 illustrate other embodiments. Comparing FIGS. 5 and 6 illustrates that different cure patterns are used to cure material in association with each cross-section. FIG. 9 depicts the various cross-sections of the object of FIG. 6 and what will be cured in association with each layer. FIG. 9 can be compared to FIG. 8 (which illustrates the cross-sections of the object of FIG. 5) to reveal the differences between these two embodiments. The forward and reverse slashes in FIG. 9 have the same meaning as they do for FIG. 8.

The Complex Case

Embodiments of the present invention embody a combination of two criteria. The first of these is based on the method of curing that will be used to emphasize maximum strength or other "internal curing order" related approaches. Here "internal curing order" refers to a variety of options utilized in the curing of an object that do not affect the external dimensions of the object. Two examples of this first criterion are depicted in FIGS. 5 and 6.

The second criterion is based on the approach that will be followed to obtain a desired final object shape when the object has features smaller (i.e., thinner in the vertical dimension) than the MSD. Examples of this second criterion are shown in FIGS. 13a through 13e. This second criterion involves the selection of one of a variety of alternatives for obtaining the most appropriate reproduction of external features when it is impossible to create them as accurately as desired because of the MSD of the material.

The simple case, studied above, had a particular characteristic that made it possible to use a low resolution material along with a high resolution layer thickness to obtain reproductions that are equivalent to those obtainable from the use of a high resolution material and layer thickness. This characteristic is that the object has no vertical solid feature thinner than the MSD. This allowed slicing and curing of features such that inaccuracies in building would not be greater than the chosen layer thickness. It should be noted that most regions of most objects fit into this category. Therefore, a viable embodiment based on objects having no vertical features thinner than the MSD can be developed.

When a particular object to be reproduced has solid vertical features thinner than the MSD, the object can be reoriented for building by redefining the vertical axis of the object, thereby hopefully removing the thinner than MSD features. If the object cannot be reoriented, there will be a loss of accuracy in creating these thin features.

This loss of accuracy can be manifested in two ways:

1) Thin features (i.e., features thinner than the MSD designated herein as "<MSD" features) will be made too thick; or 2) Thin features will not be cured and therefore will be completely removed.

For clarity and brevity in the following description, thin features are always assumed to be cured. However, in other embodiments user options can be made available so that volume selections can be made so individual <MSD features can be cured to the MSD or not cured at all. This will not solve accuracy related problems as a whole but can certainly be used to deemphasize them by bringing out the more important features, namely solid volumes or hollow volumes. Additionally, if only a few regions of a part or object are over cured or under cured due to MSD limitations, minor post processing can generally be done to sand off or fill regions as needed.

Figures 7, 8, 9, 10:
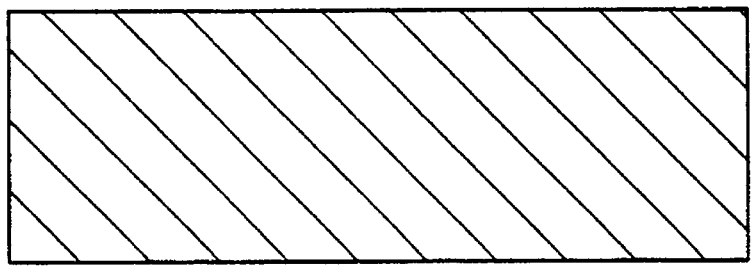

FIG. 10 depicts a side view of another object that can be reproduced using stereolithography. This object has features a, b, c, and d which form thin vertical features. In building the object using typical conventional stereolithographic techniques, on a layer-by-layer basis, these features will naturally be removed or be formed to a thickness greater than or equal to the minimum vertical resolution (layer thickness) with which the part is being reproduced. The series of numbers to the left of the object represent the slicing planes which intersect the object.

Figures 7, 8, 9, 10, 11:
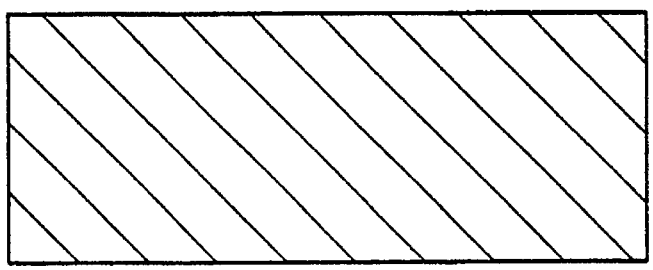

FIG. 11 depicts the prior art method of reproduction of the object of FIG. 10 using a high resolution layer thickness (e.g. 10 mils) and a high resolution material (MSD<=10 mils). The series of numbers closest to the object represent cross-section numbers corresponding to the slicing plane numbers of FIG. 10, while the series of numbers further to the right represent the layer numbers.

Figures 7, 8, 9, 10, 11, 12:
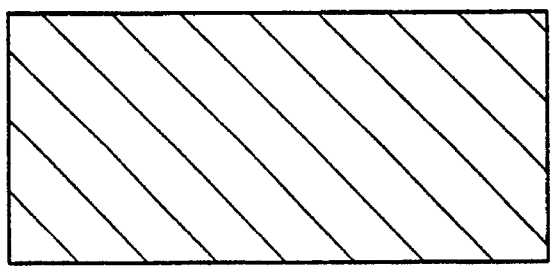
Figures 7, 8, 9, 10, 11, 12, 13:
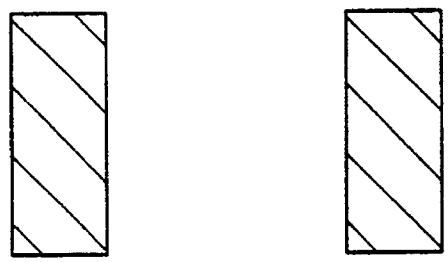
Figures 7, 8, 9, 10, 11, 12, 13, 14:
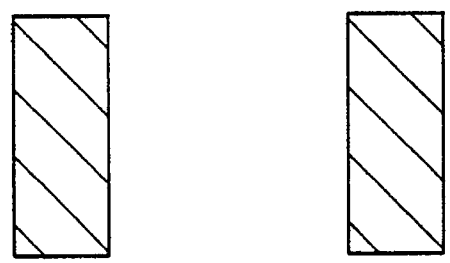

FIG. 14 represents the cross-sectional data obtained from and associated with each slicing plane by the application of slice style 1 to the object of FIG. 10 to produce the object of FIG. 11. It is noted that the FUB associated with slicing planes 9 and 21 are moved to planes 8 and 20, respectively, to produce the final FUB's associated with layers 8 and 20.

FIG. 12 depicts the same object as reproduced using the present invention in combination with a high resolution layer thickness and a low resolution material (MSD=4 times the layer thickness, e.g. 40 mils). This Figure depicts an embodiment where the second criterion discussed above was chosen such that all object features thinner than the MSD were not formed. The series of numbers to the left of the object represent the slicing plane numbers.

Figure 13A:
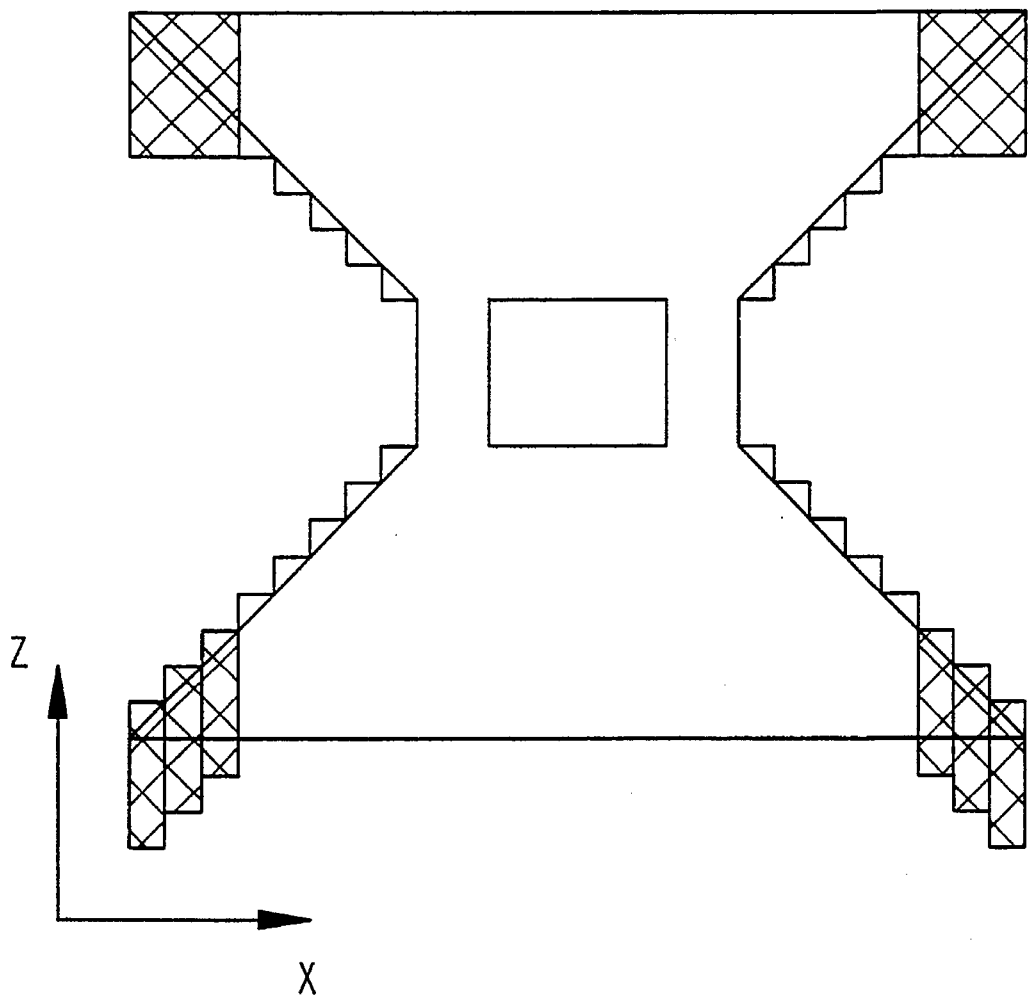
FIGS. 13a–e show the object of FIG. 10 emphasizing several of the various ways that the sections (corner portions) thinner than the MSD can be handled to minimize inaccuracies or to maximize aesthetic appeal.

FIG. 13 depicts examples of several other embodiments where the other selections of criterion 2 are made. FIG. 13a depicts the reproduction of the object where priority is given to up-facing features. In other words, if a region is thinner than the MSD (i.e. too thin), material in the region will be cured in such a way as to place the up-facing features in they positions where the would occur if a higher resolution material were being used. Correspondingly, the down-facing features will necessarily be cured to a depth below the level on which they would be formed when building with higher resolution material. This embodiment is referred to as "up-facing priority".

Figure 13B:
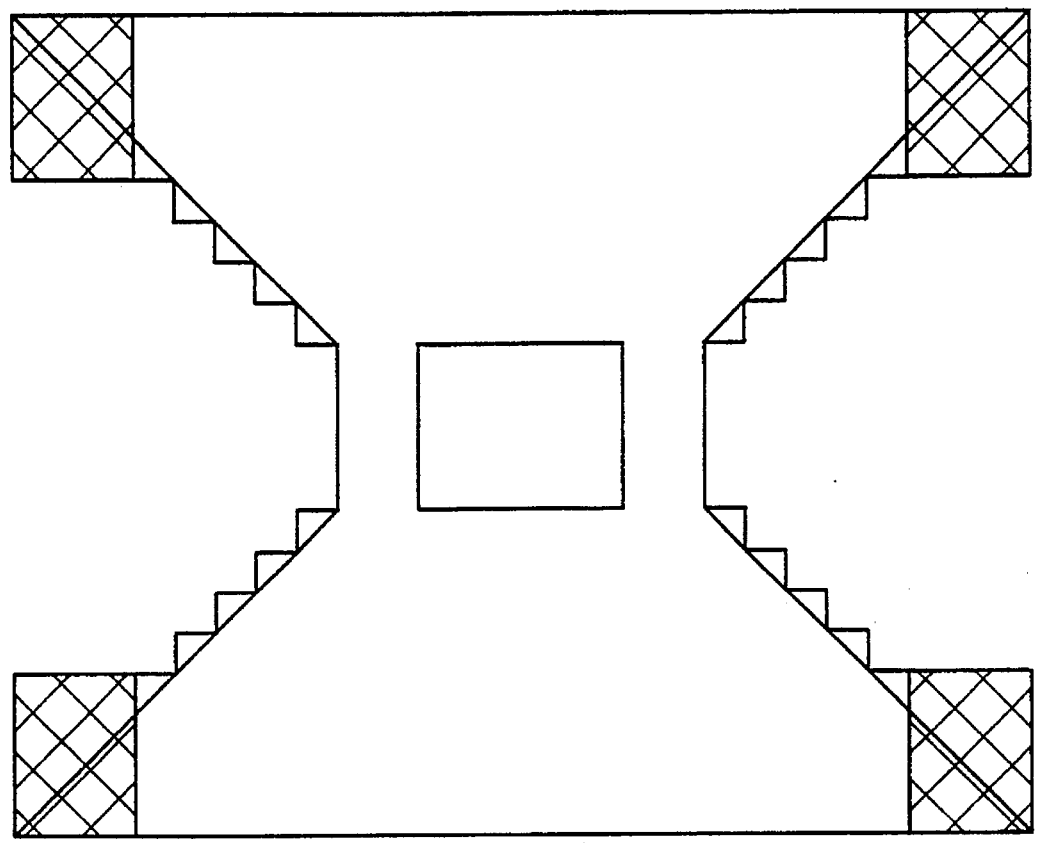

FIG. 13b depicts an embodiment where flat features are given priority thereby increasing aesthetic appeal of the object in some circumstances. The down-facing flat features and up-facing flat features are cured so that they are formed at the same position they would be formed at if a higher resolution material were being used. If regions exist that are both up- and down-facing so that both up- and down-facing flat features cannot be simultaneously cured to the desired level, the placement of down-facing flat features will dominate. The non-flat, sloped, features are pushed up or down. Therefore, they are formed above or below the level at which they would be formed had the object been built with a higher resolution material. If two non-flat features oppose each other in a region that is thinner than the MSD, the features can be shifted proportionally according to the slopes of their upper and lower surfaces. Alternatively, the upper or lower surface may be placed at the position it would be formed at if a higher resolution material were being used. FIG. 13b accordingly illustrates a "flat priority/down-facing dominate" embodiment.

Figure 13C:
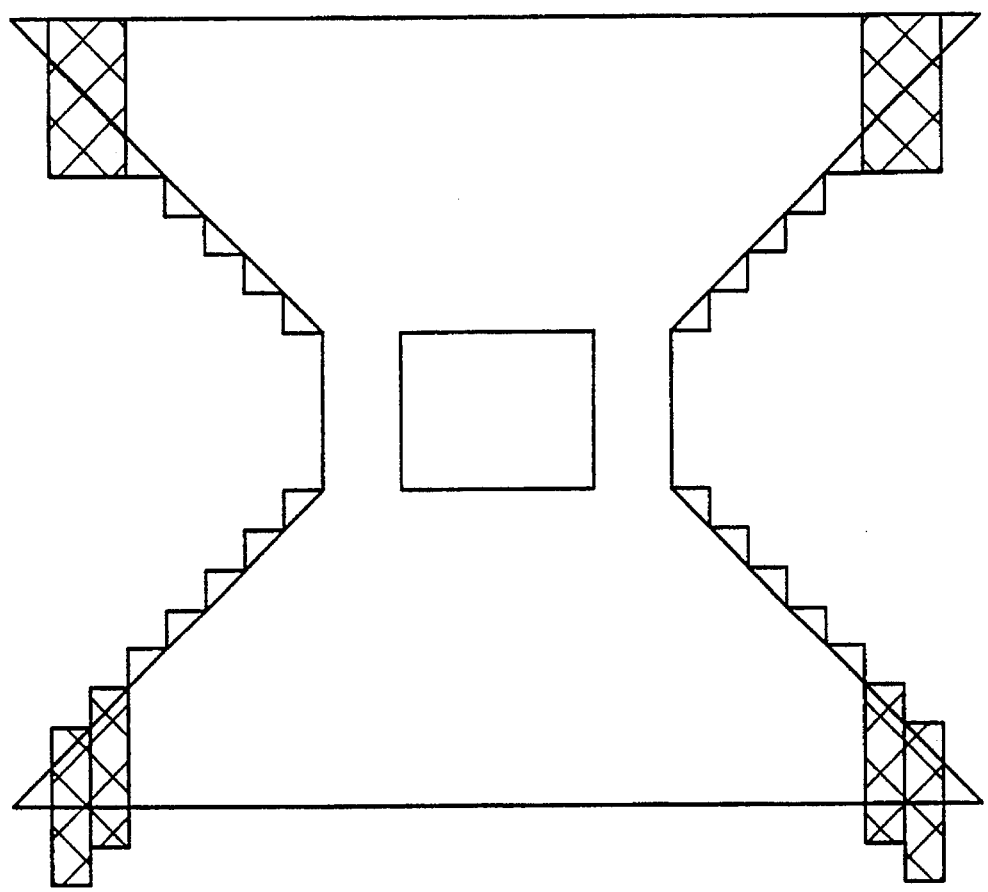

FIG. 13c depicts an embodiment where features thinner than ½ of the MSD are not formed along with priority being given to up-facing features.

Figure 13D:
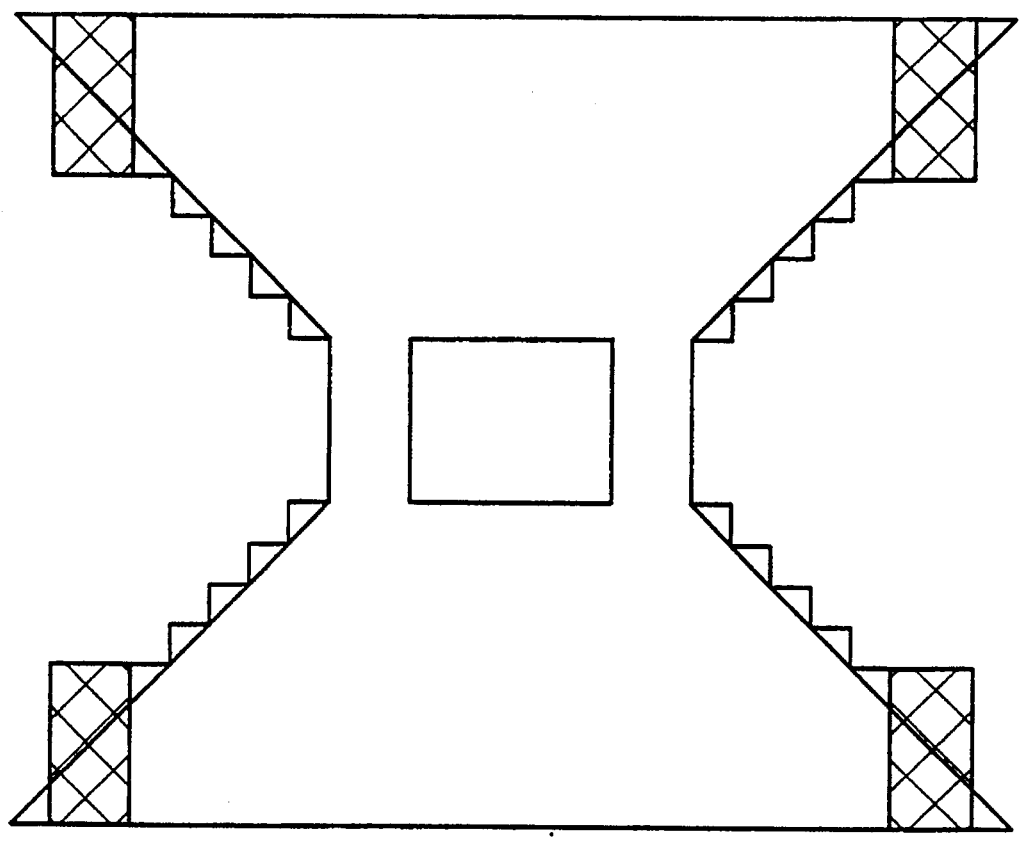

FIG. 13d depicts an embodiment where features thinner than ½ of the MSD are not formed along with priority being given to flat features.

Of course, the "½" parameter in the embodiments of FIGS. 13c and 13d can be varied to any other fraction or percentage of the MSD.

Figure 13E:
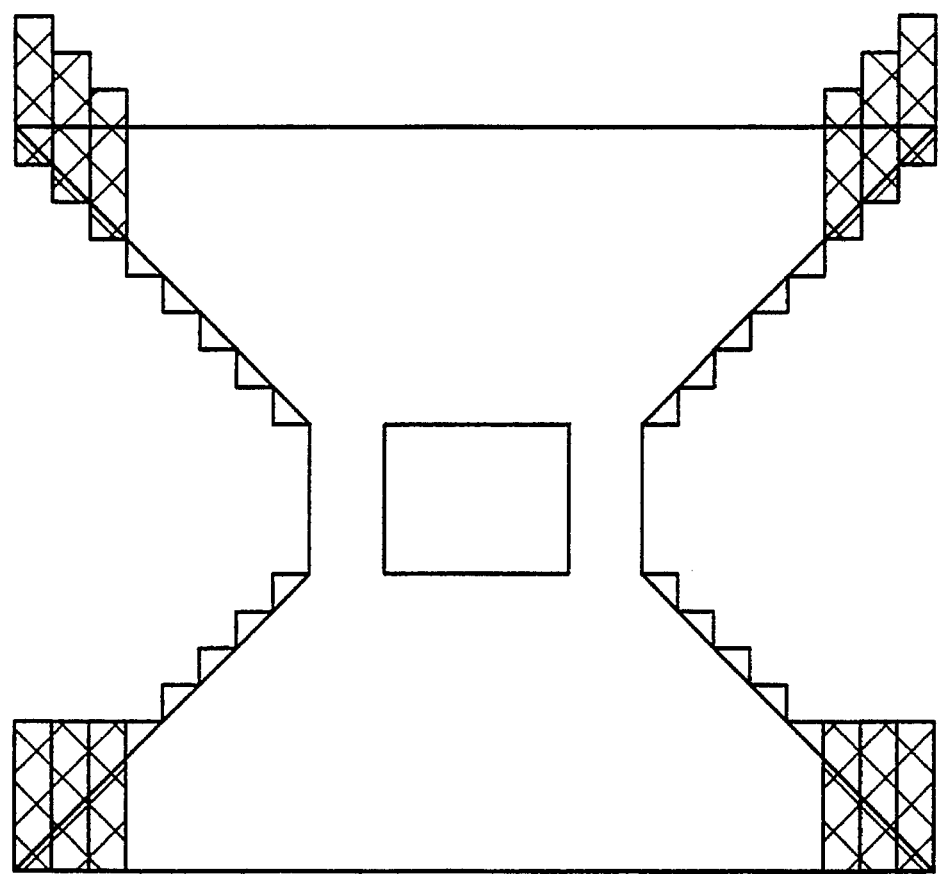
Figures 1, 14:
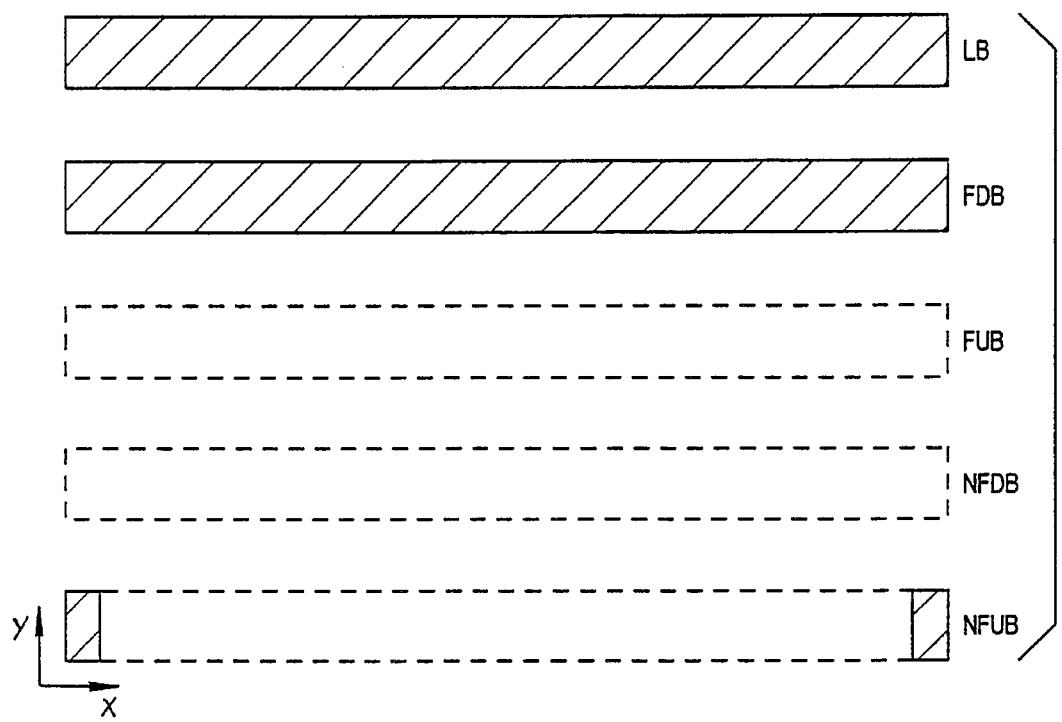
Figures 2, 14:
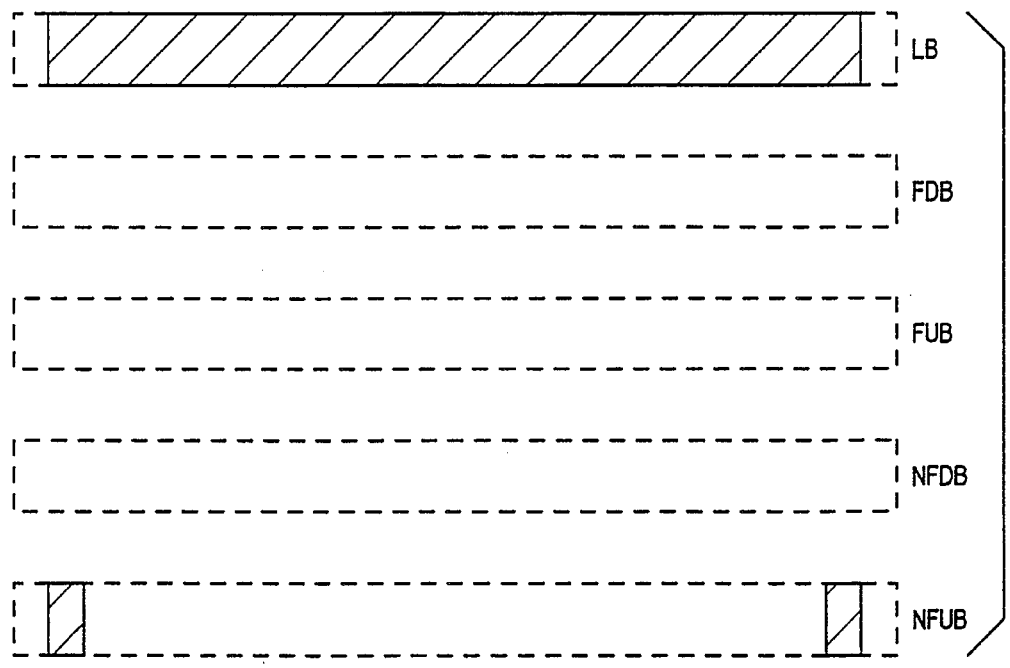
Figures 3, 14:
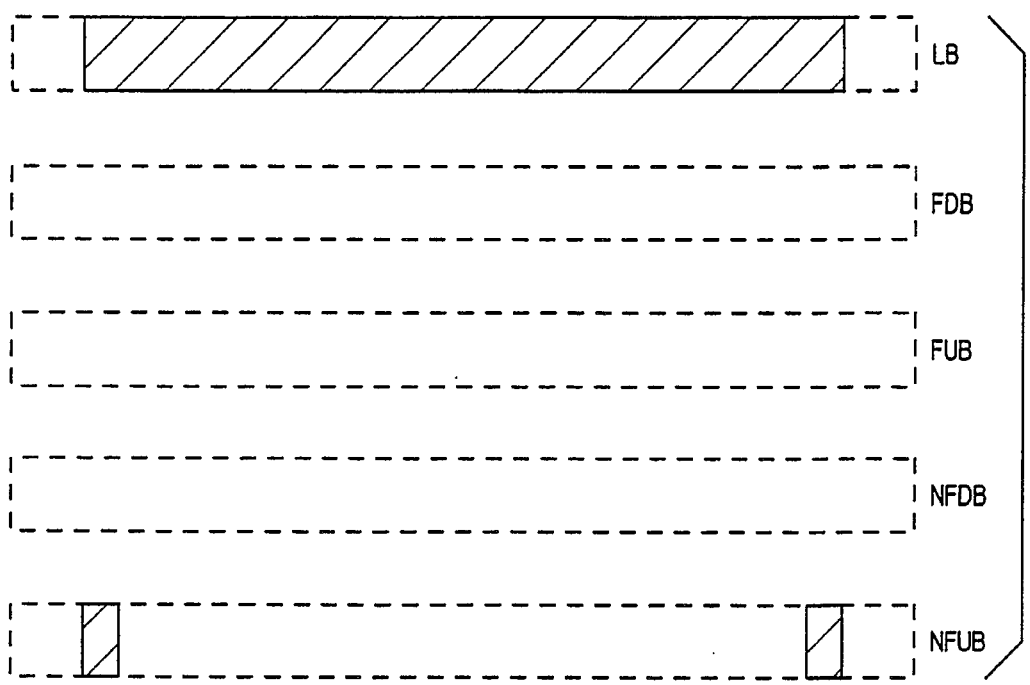
Figures 4, 14:
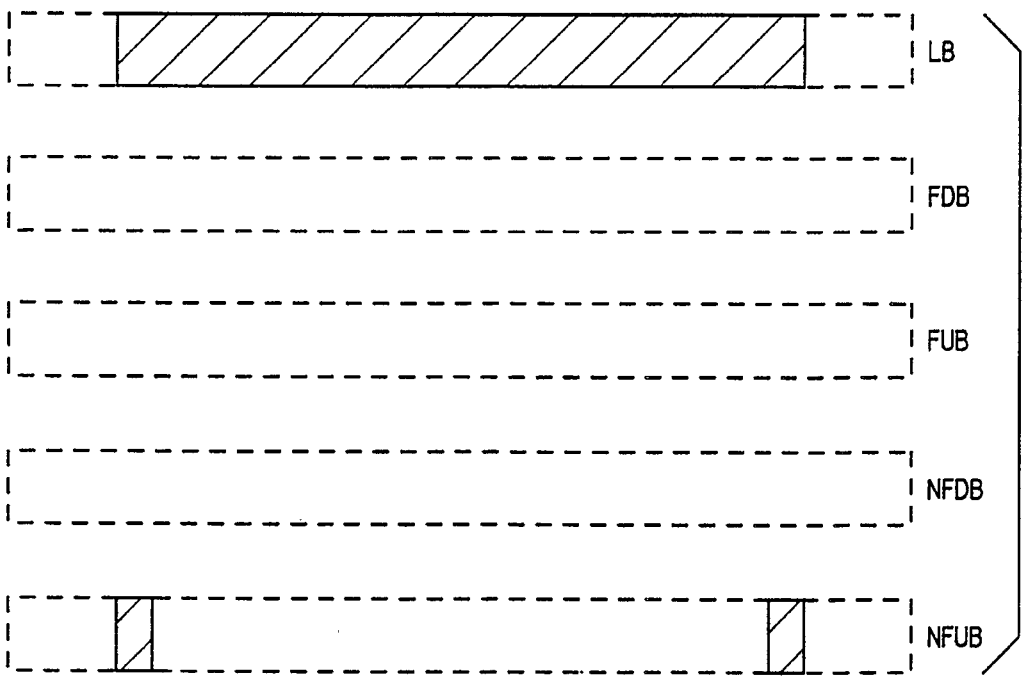
Figures 5, 14:
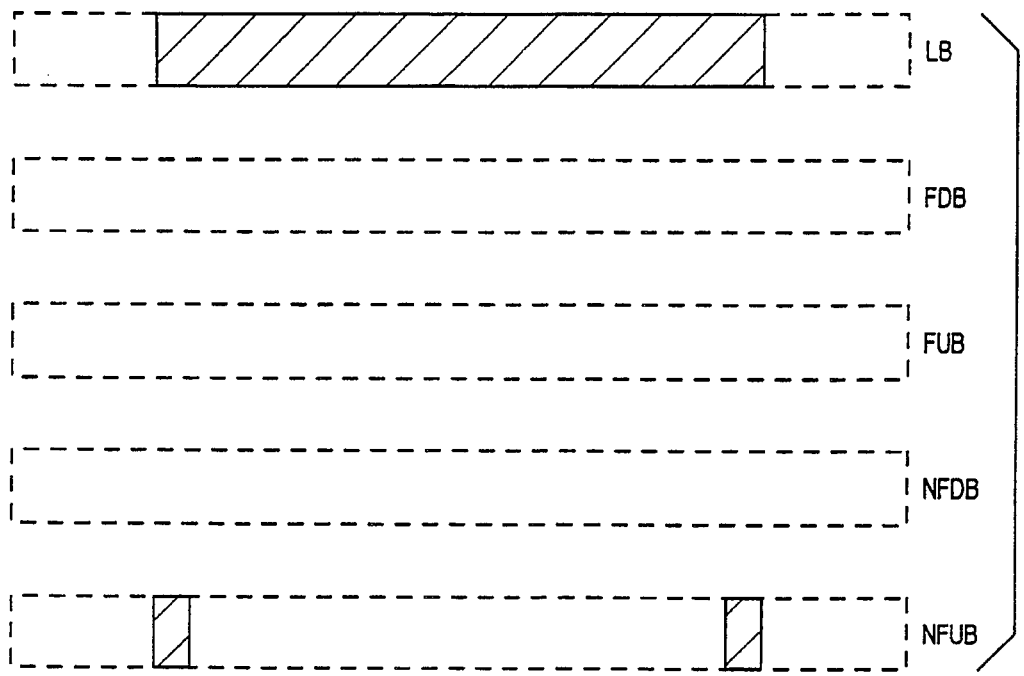
Figures 6, 14:
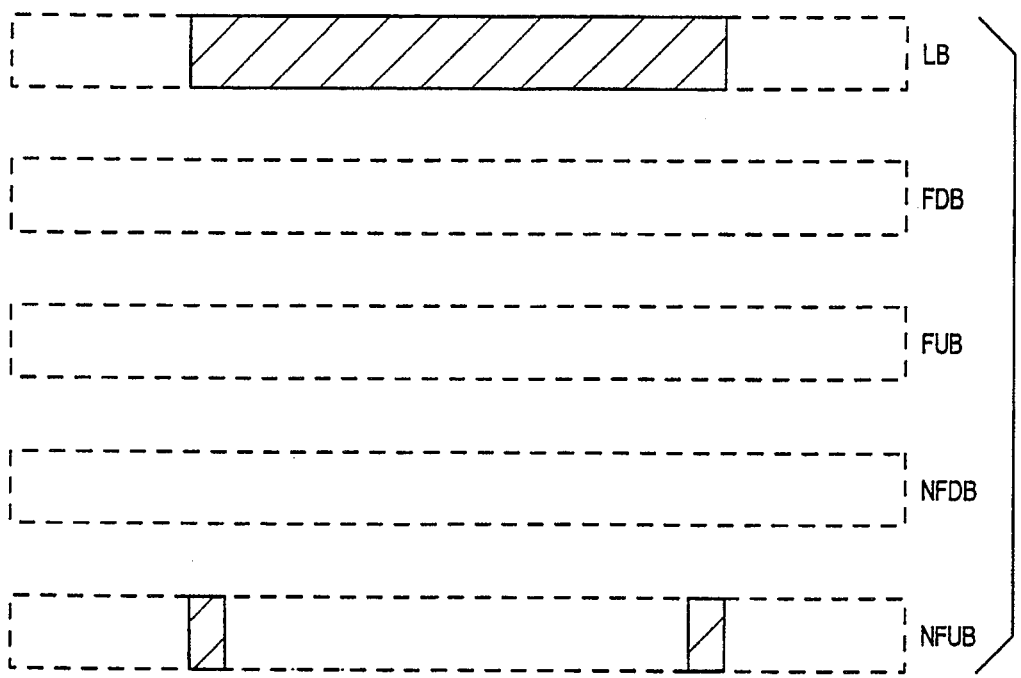
Figures 7, 14:
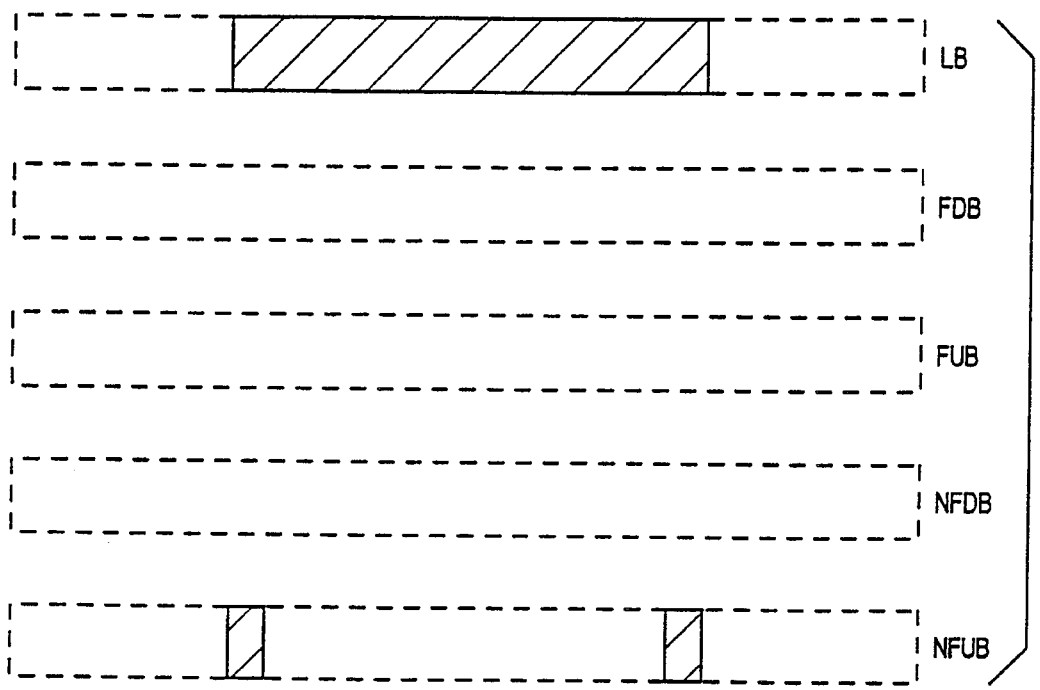
Figures 8, 14:
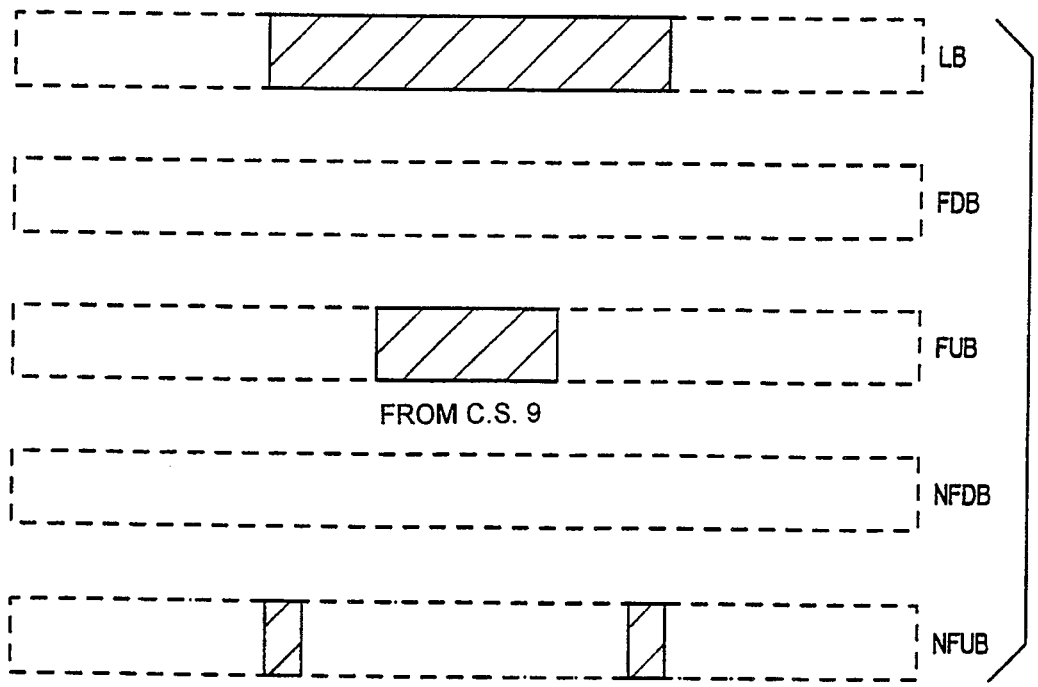
Figures 9, 14:
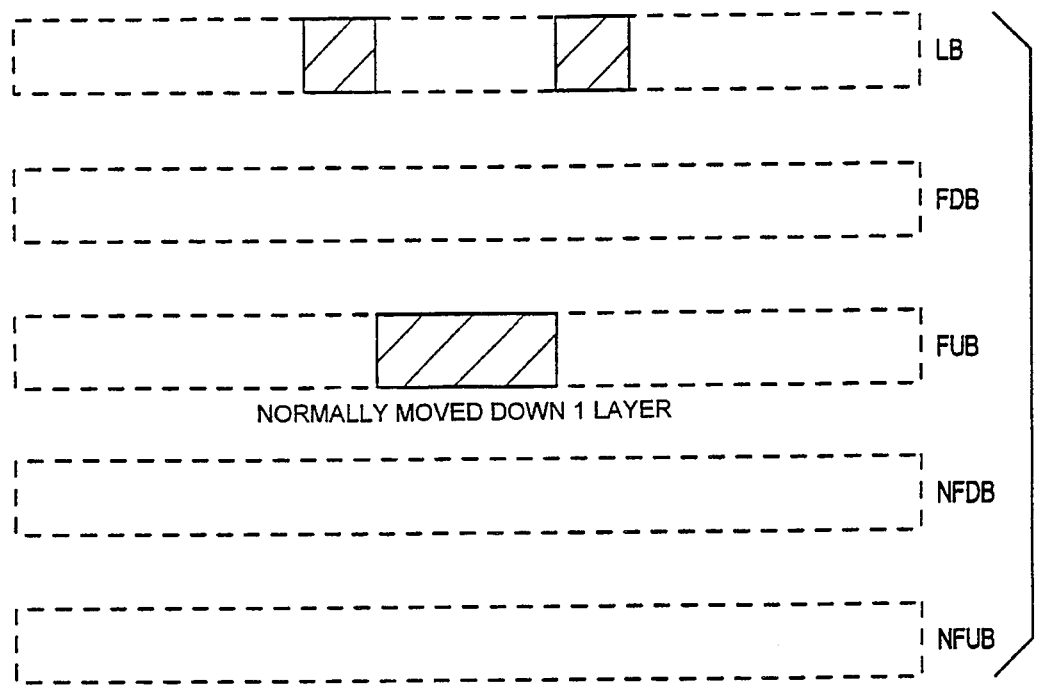
Figures 10, 14:
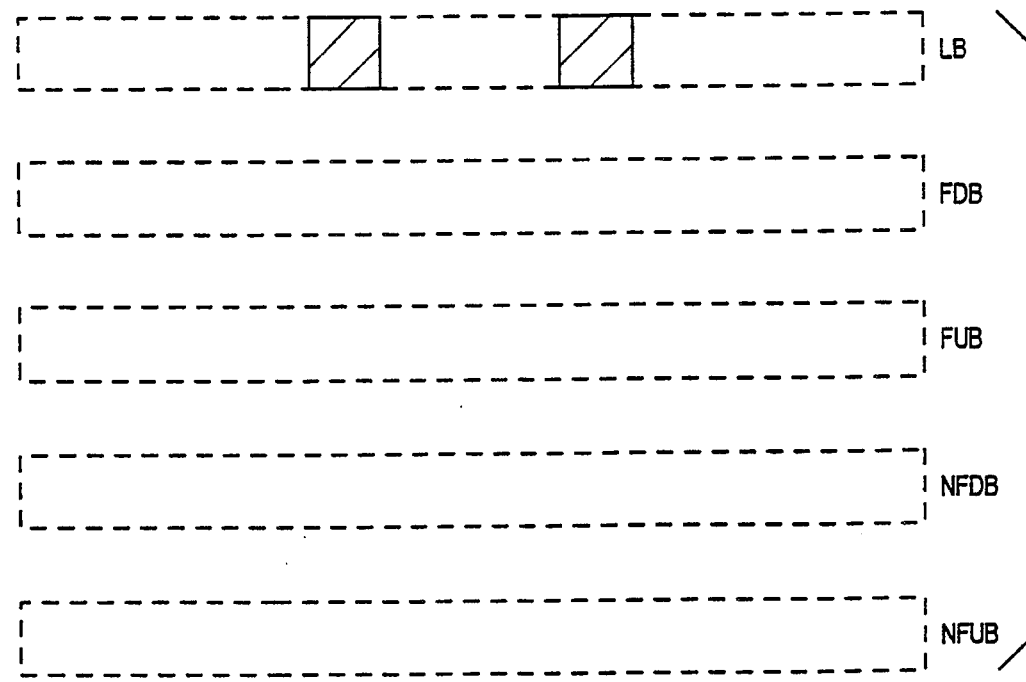
Figures 11, 14:
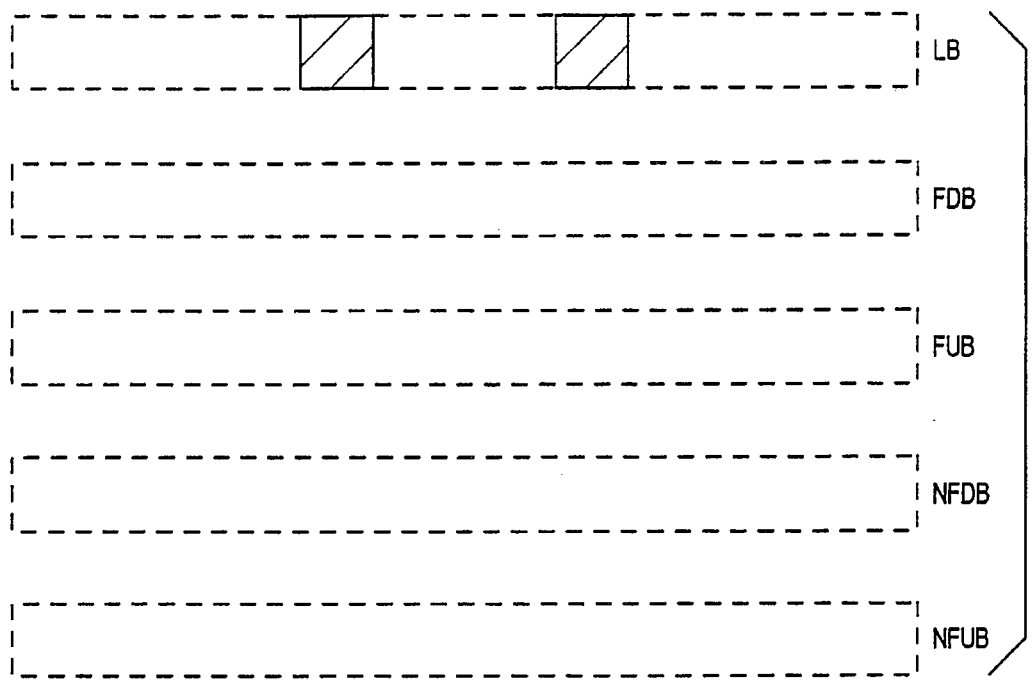
Figures 12, 14:
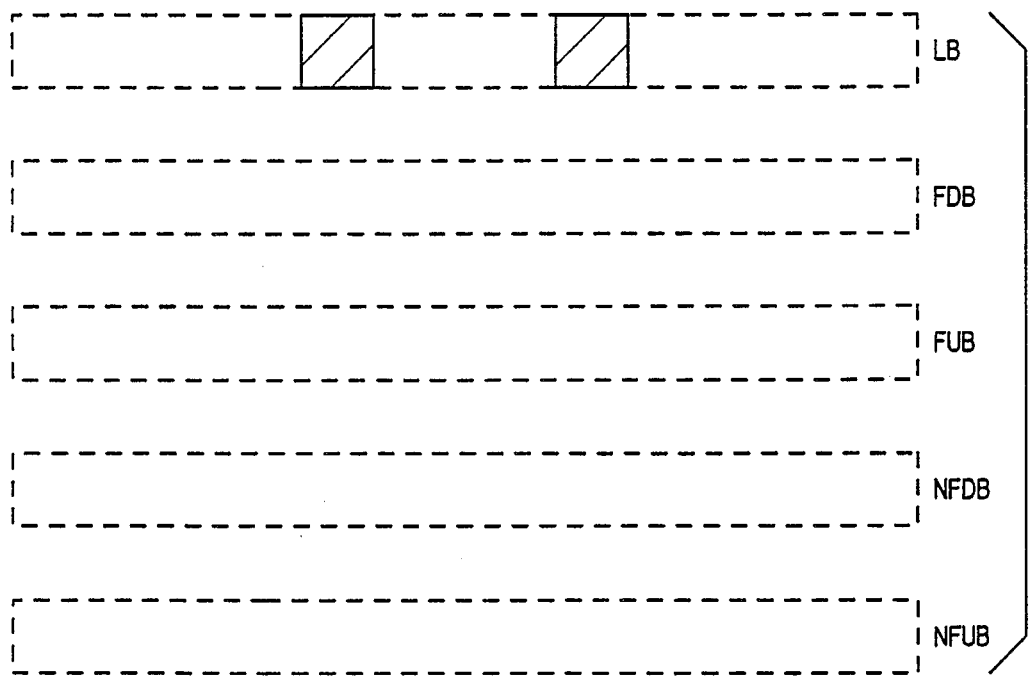
Figures 13, 14:
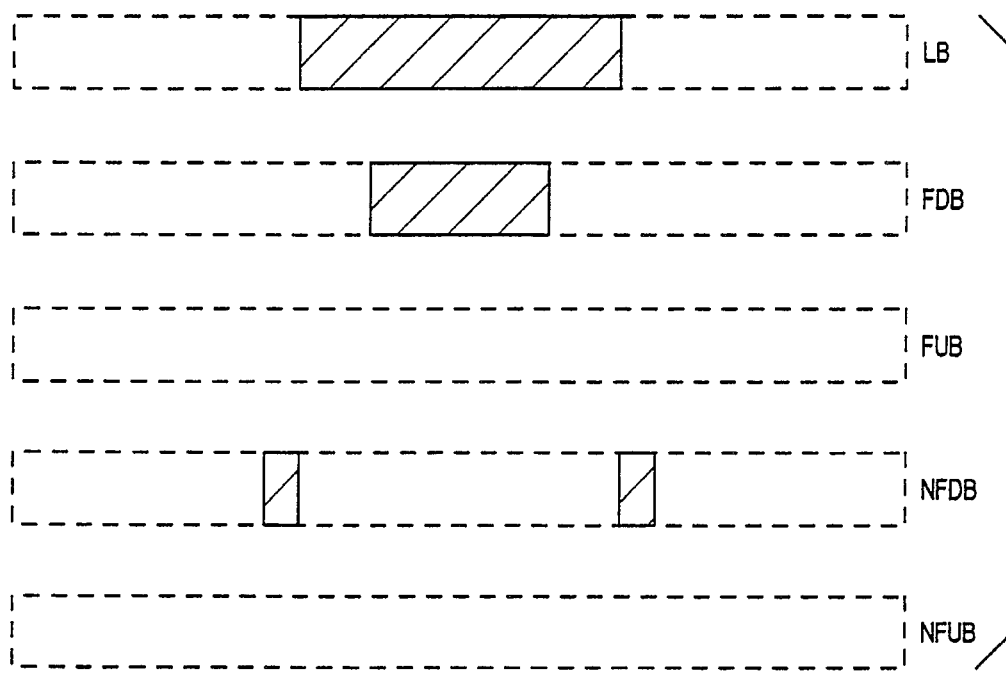
Figure 14:
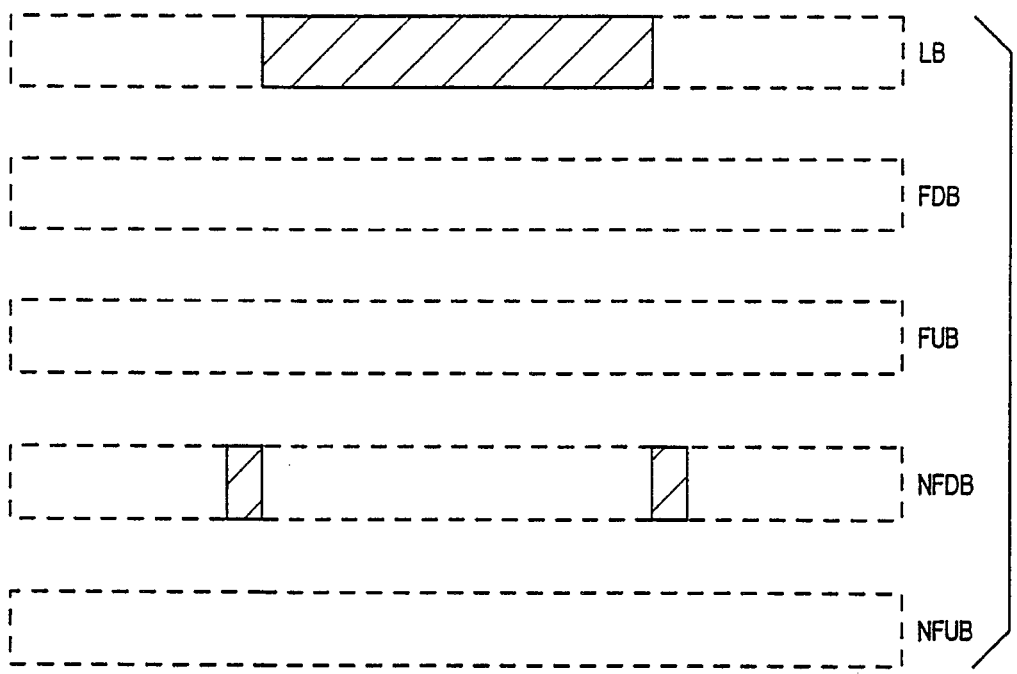
Figures 14, 15:
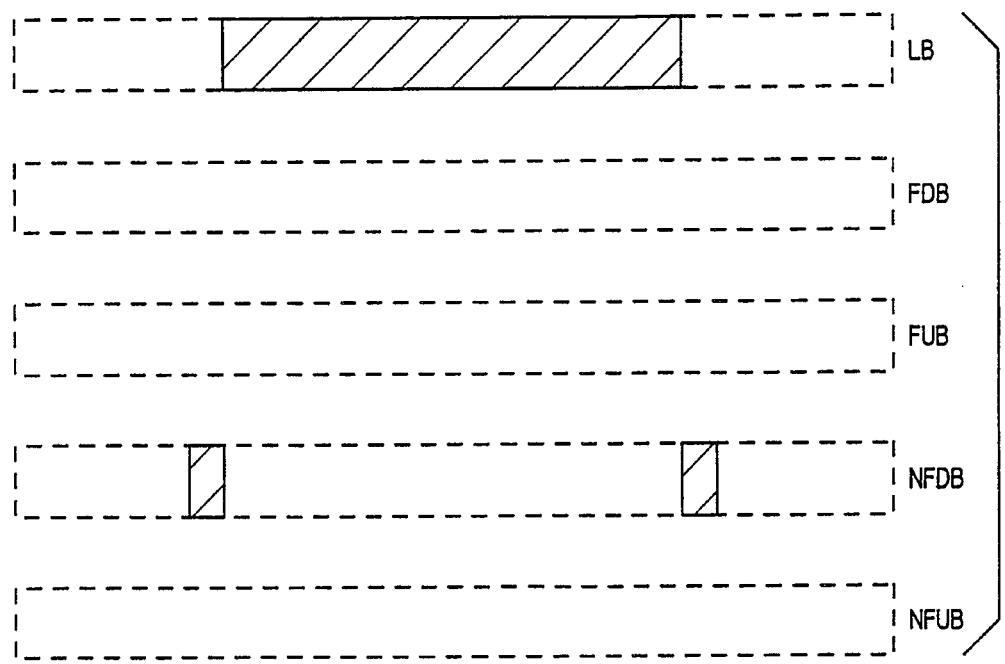
Figures 14, 15, 16:
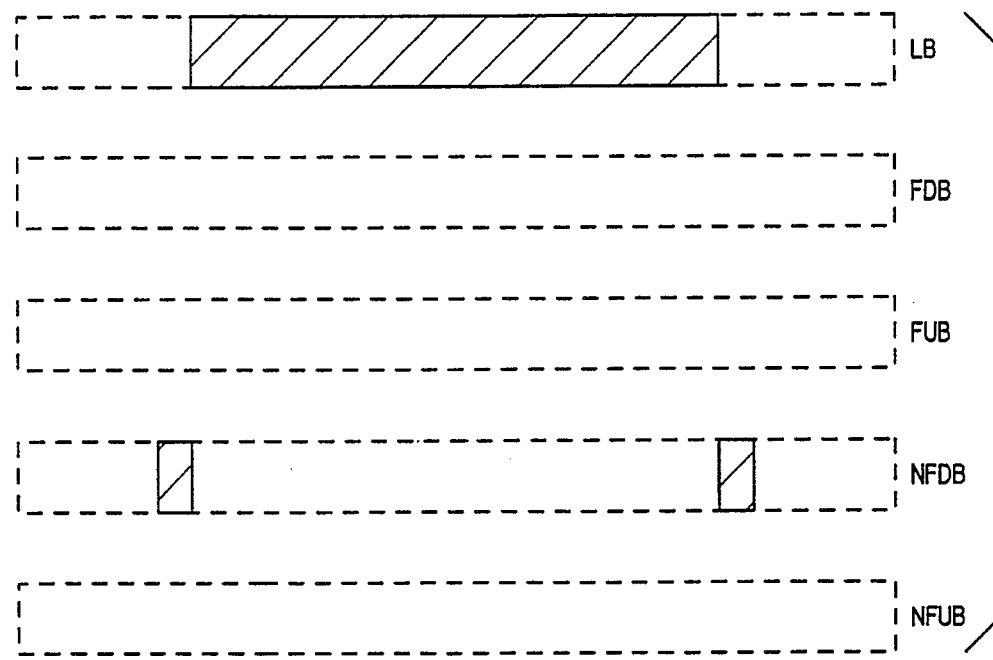
Figures 14, 15, 16, 17:
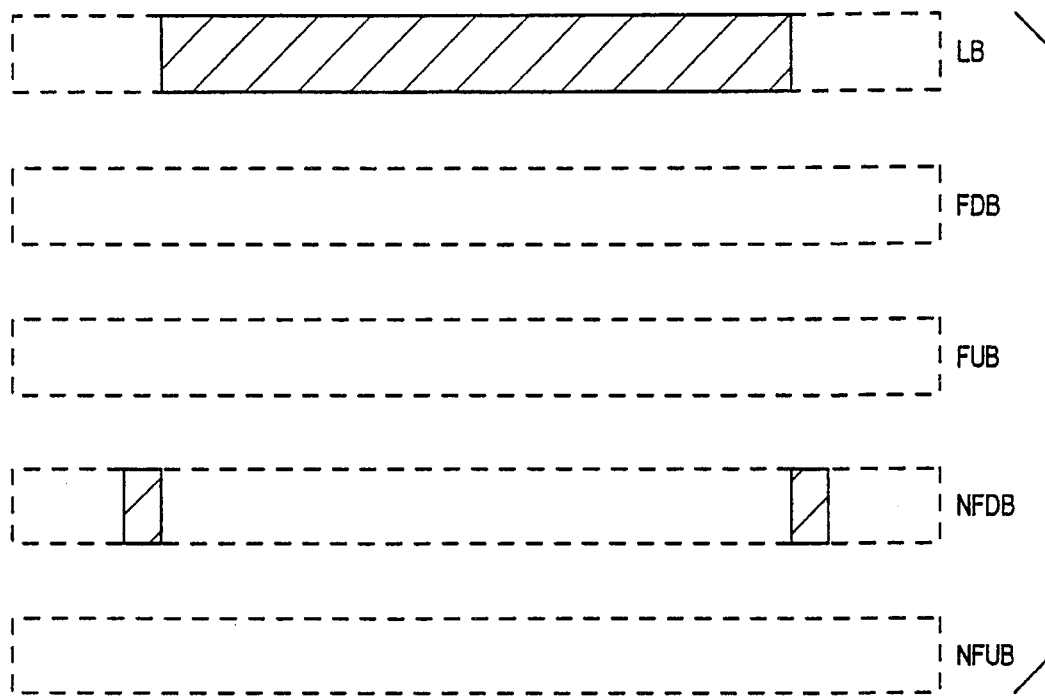
Figures 14, 15, 16, 17, 18:
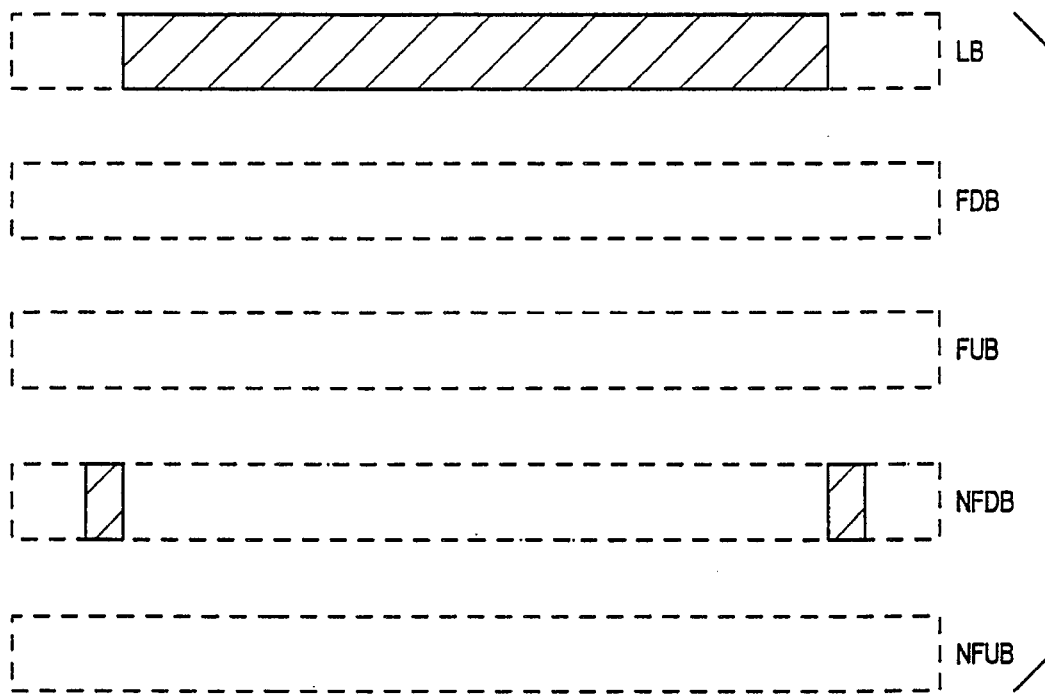
Figures 14, 15, 16, 17, 18, 19:
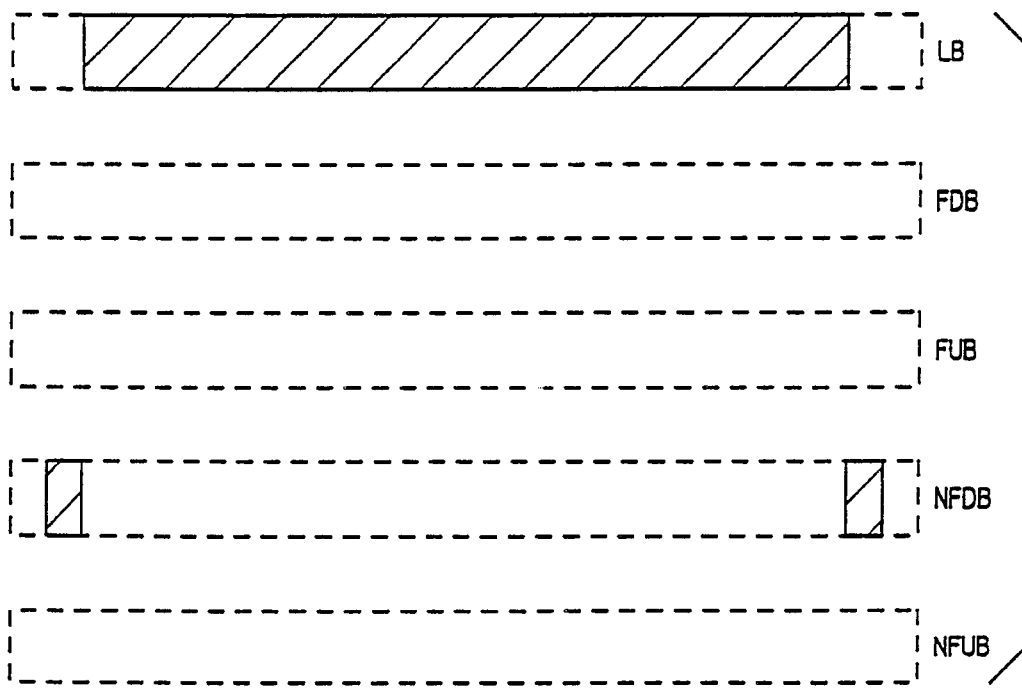
Figures 14, 15, 16, 17, 18, 19, 20:
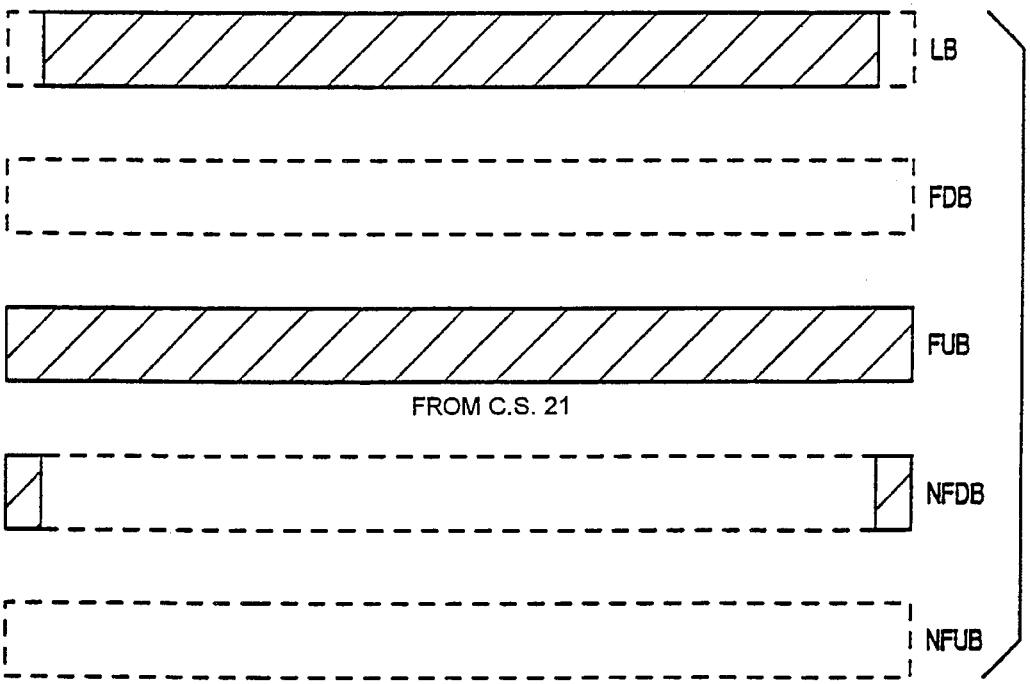
Figures 14, 15, 16, 17, 18, 19, 20, 21:
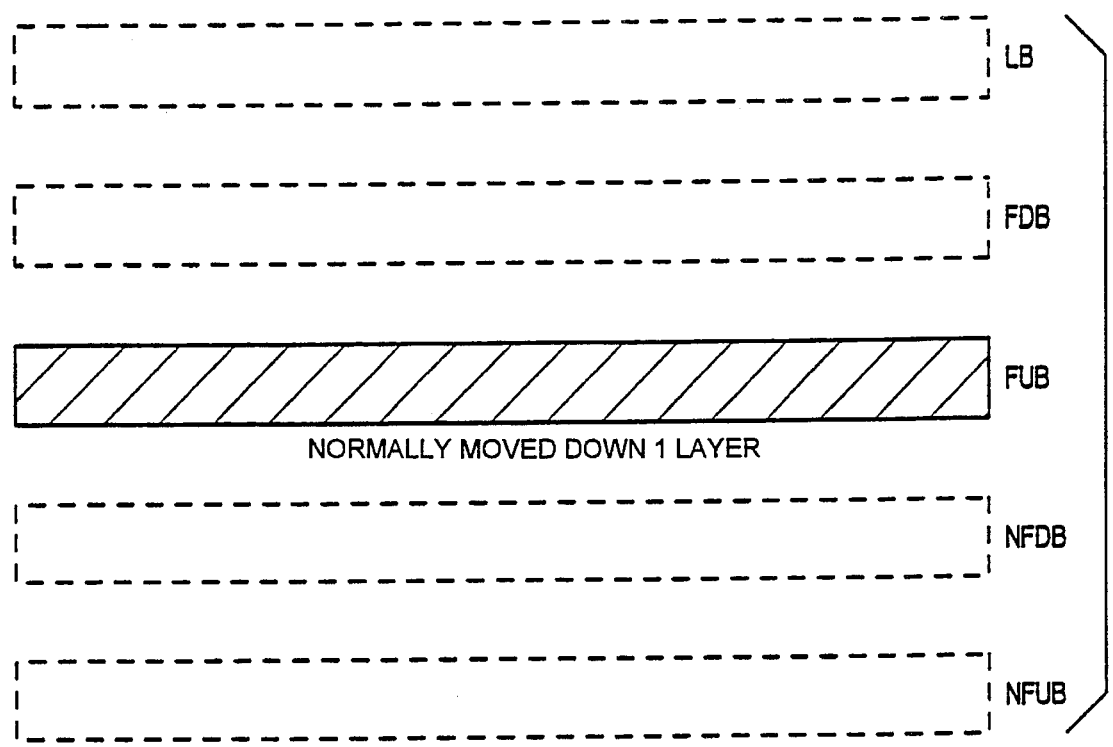
Figure 15:
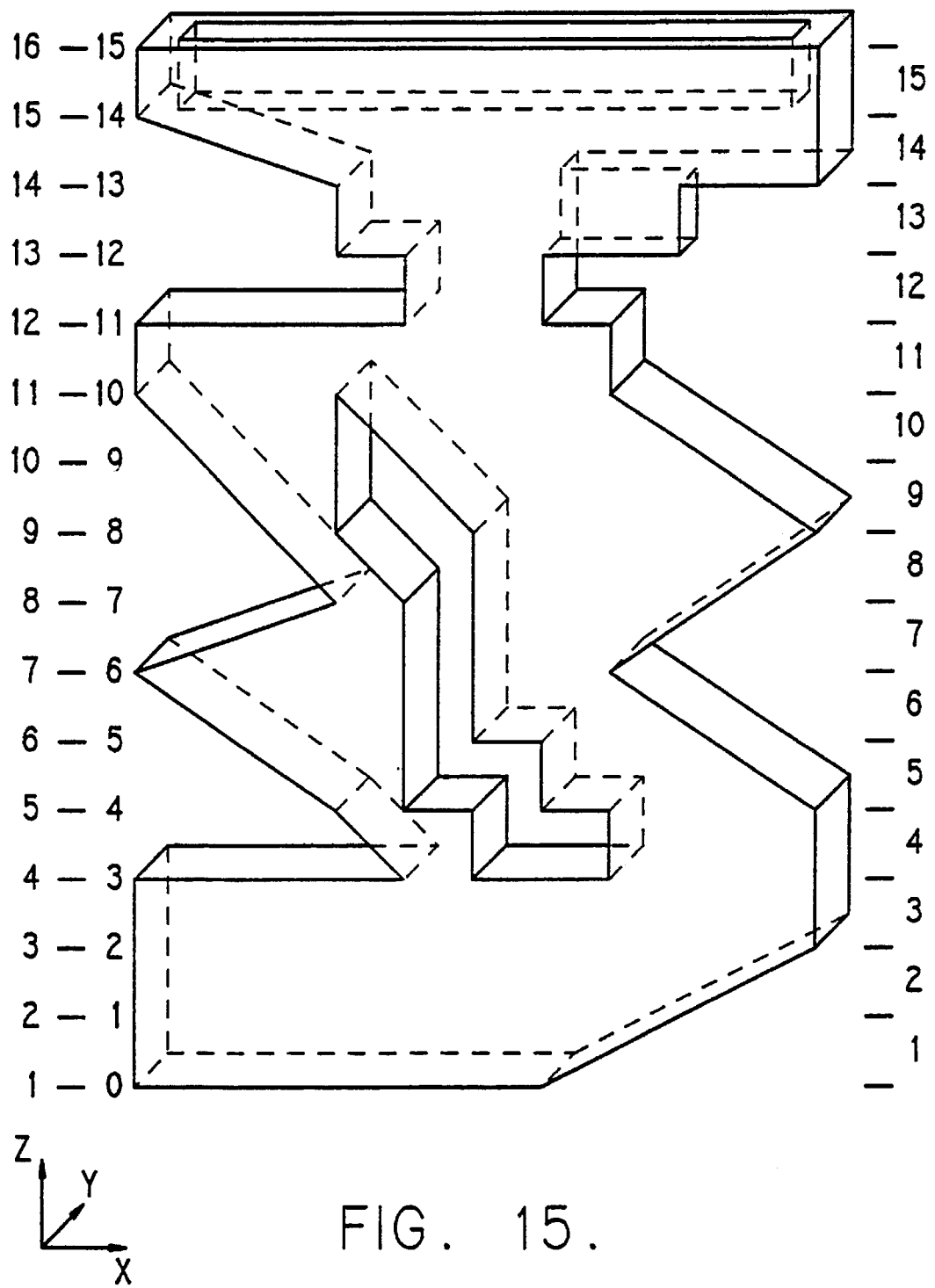
Figure 16:
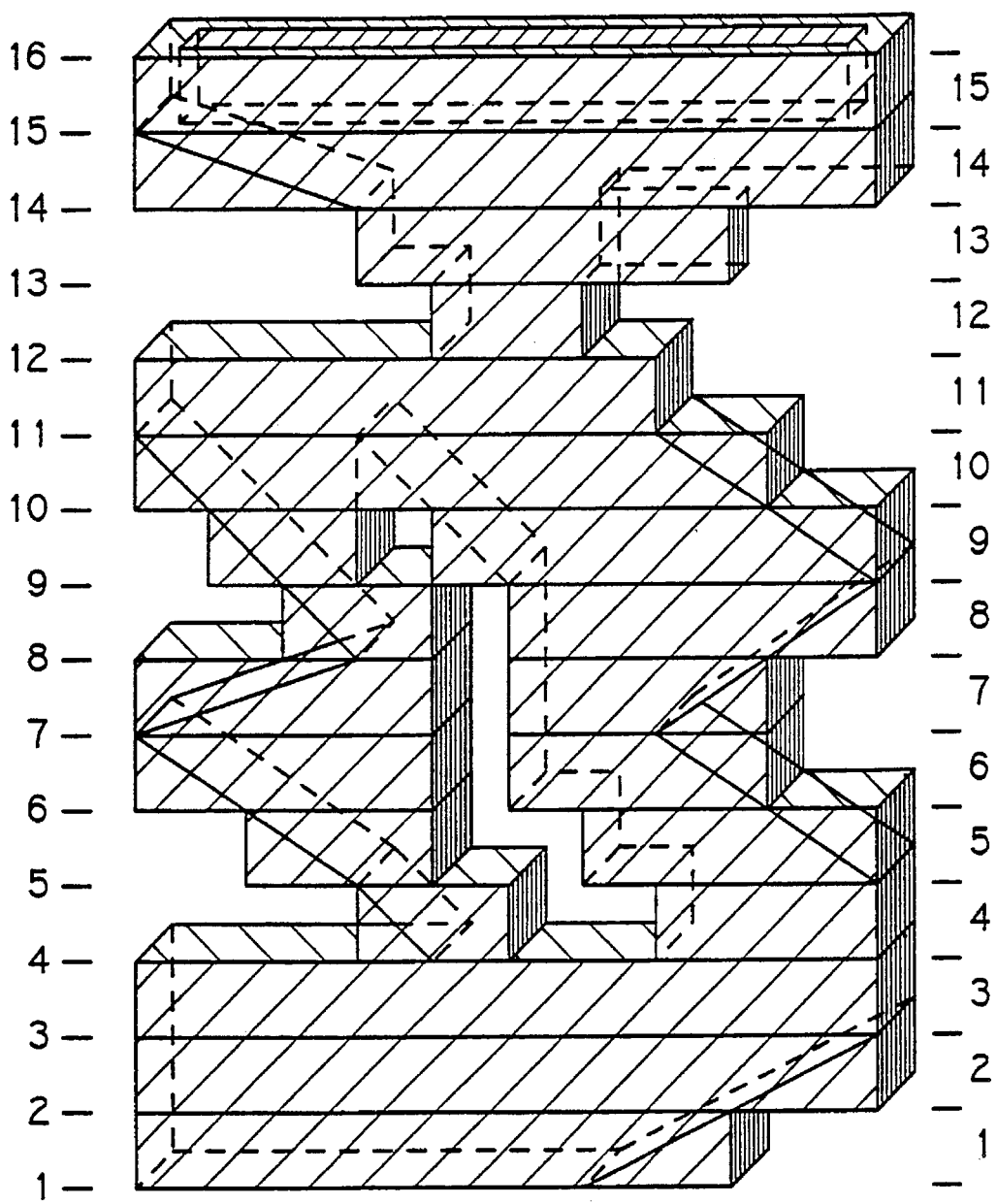
Figure 17A:
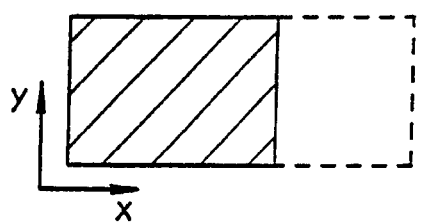
FIGS. 17A through 17H show cross-sectional information (compressed along the X-axis) obtained by the application of "Slice Style 1" to the object depicted in FIG. 15 to produce the object of FIG. 16.
Figure 17A:
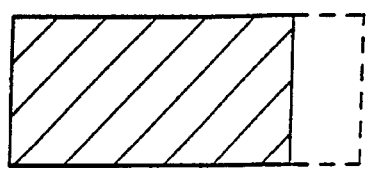
Figure 17A:
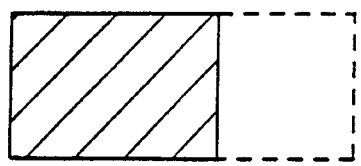
Figure 17A:
Figure 17A:
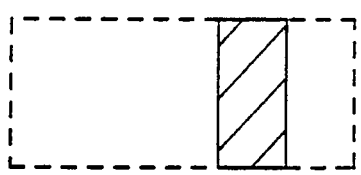
Figure 17A:
Figure 17A:
Figure 17A:
Figure 17A:
Figure 17A:
Figure 17B:
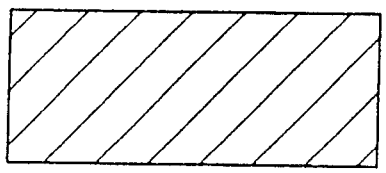
Figure 17B:
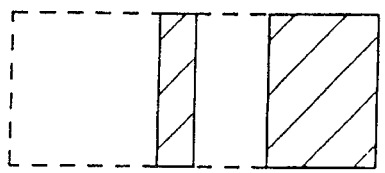
Figure 17B:
Figure 17B:
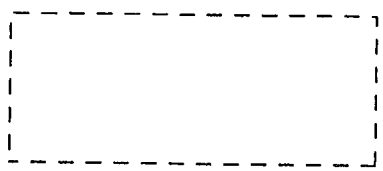
Figure 17B:
Figure 17B:
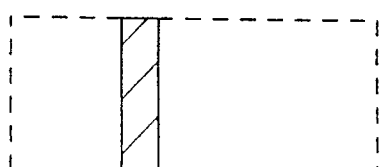
Figure 17B:
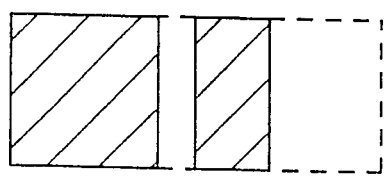
Figure 17B:
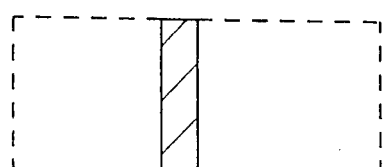
Figure 17B:
Figure 17B:
Figure 17C:
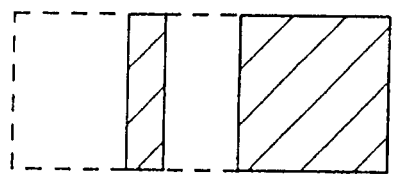
Figure 17C:
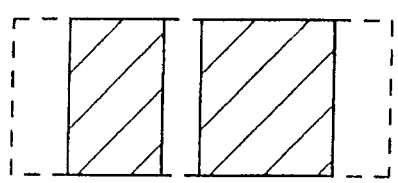
Figure 17C:
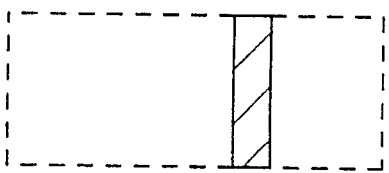
Figure 17C:
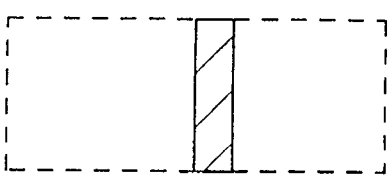
Figure 17C:
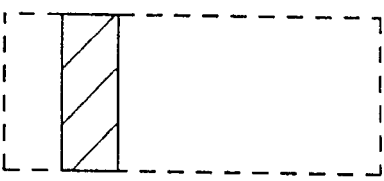
Figure 17C:
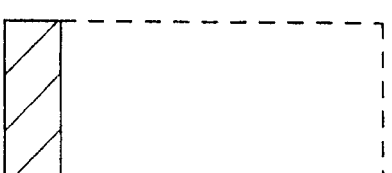
Figure 17C:
Figure 17C:
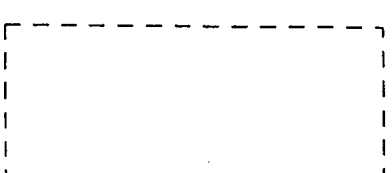
Figure 17C:
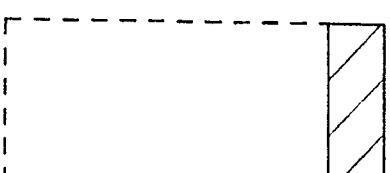
Figure 17C:
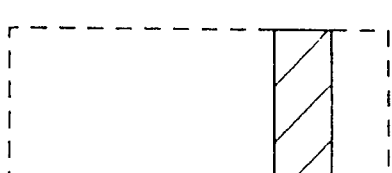
Figure 17D:
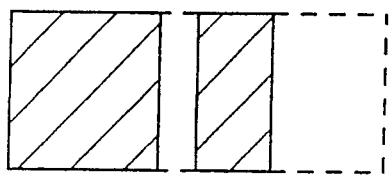
Figure 17D:
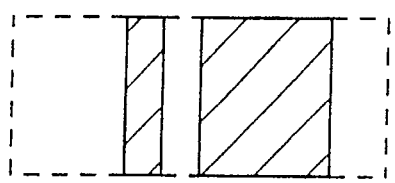
Figure 17D:
Figure 17D:
Figure 17D:
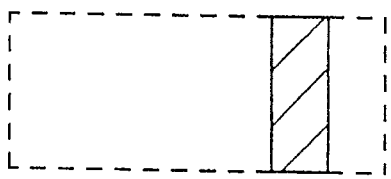
Figure 17D:
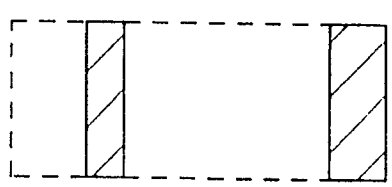
Figure 17D:
Figure 17D:
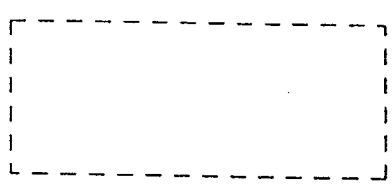
Figure 17D:
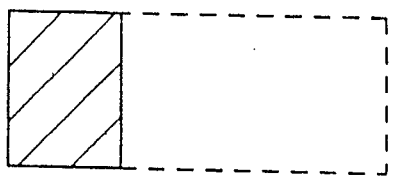
Figure 17D:
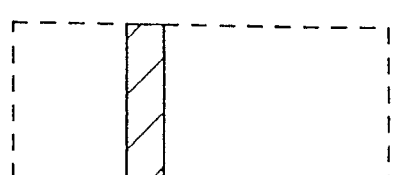
Figure 17E:
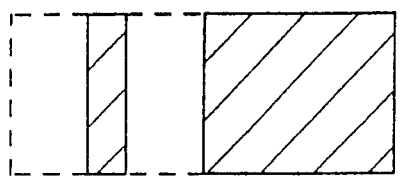
Figure 17E:
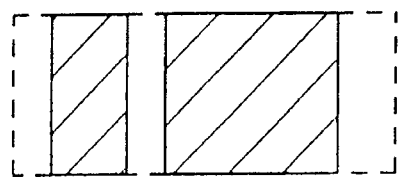
Figure 17E:
Figure 17E:
Figure 17E:
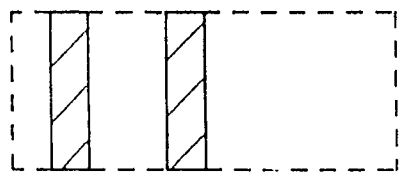
Figure 17E:
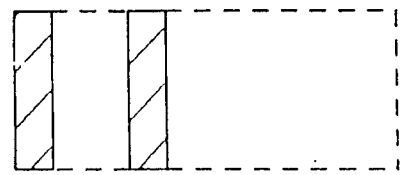
Figure 17E:
Figure 17E:
Figure 17E:
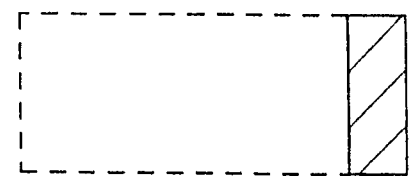
Figure 17E:
Figure 17F:
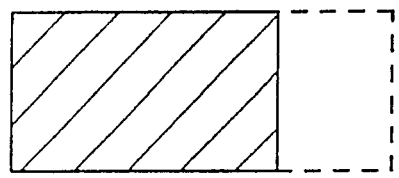
Figure 17F:
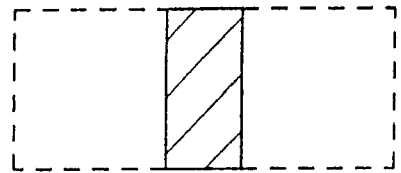
Figure 17F:
Figure 17F:
Figure 17F:
Figure 17F:
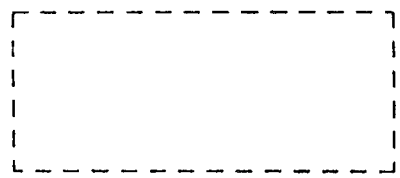
Figure 17F:
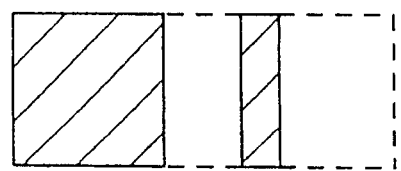
Figure 17F:
Figure 17F:
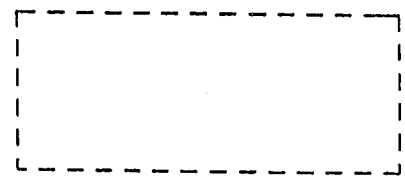
Figure 17F:
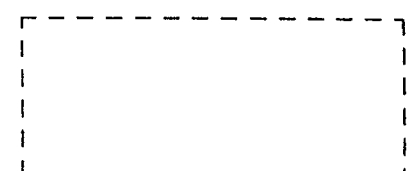
Figure 17G:
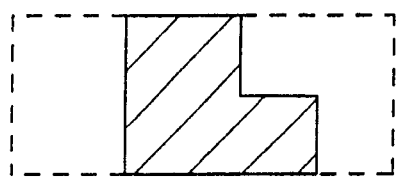
Figure 17G:
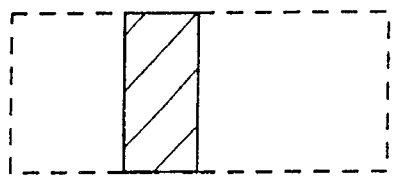
Figure 17G:
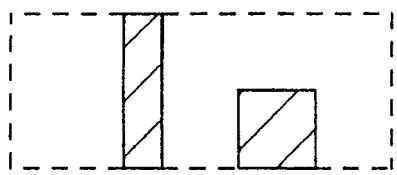
Figure 17G:
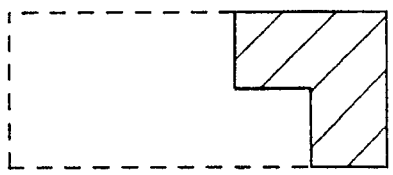
Figure 17G:
Figure 17G:
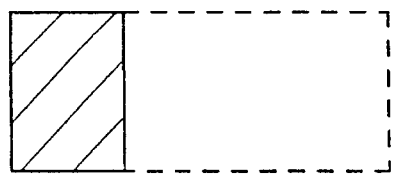
Figure 17G:
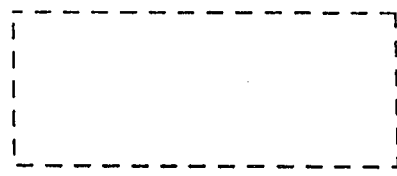
Figure 17G:
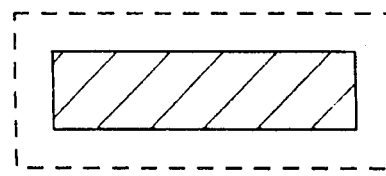
Figure 17G:
Figure 17G:
Figure 17H:
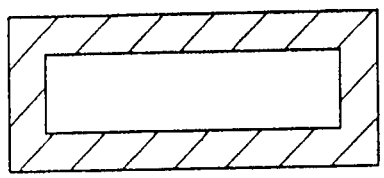
Figure 17H:
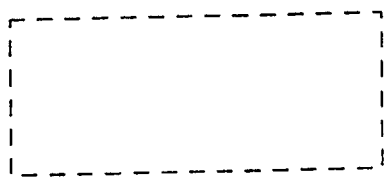
Figure 17H:
Figure 17H:
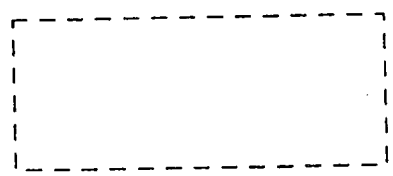
Figure 17H:
Figure 17H:
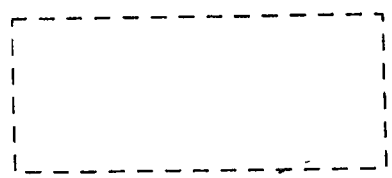
Figure 17H:
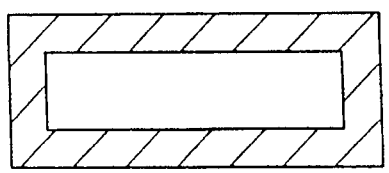
Figure 17H:
Figure 17H:
Figure 17H:
Figure 18:
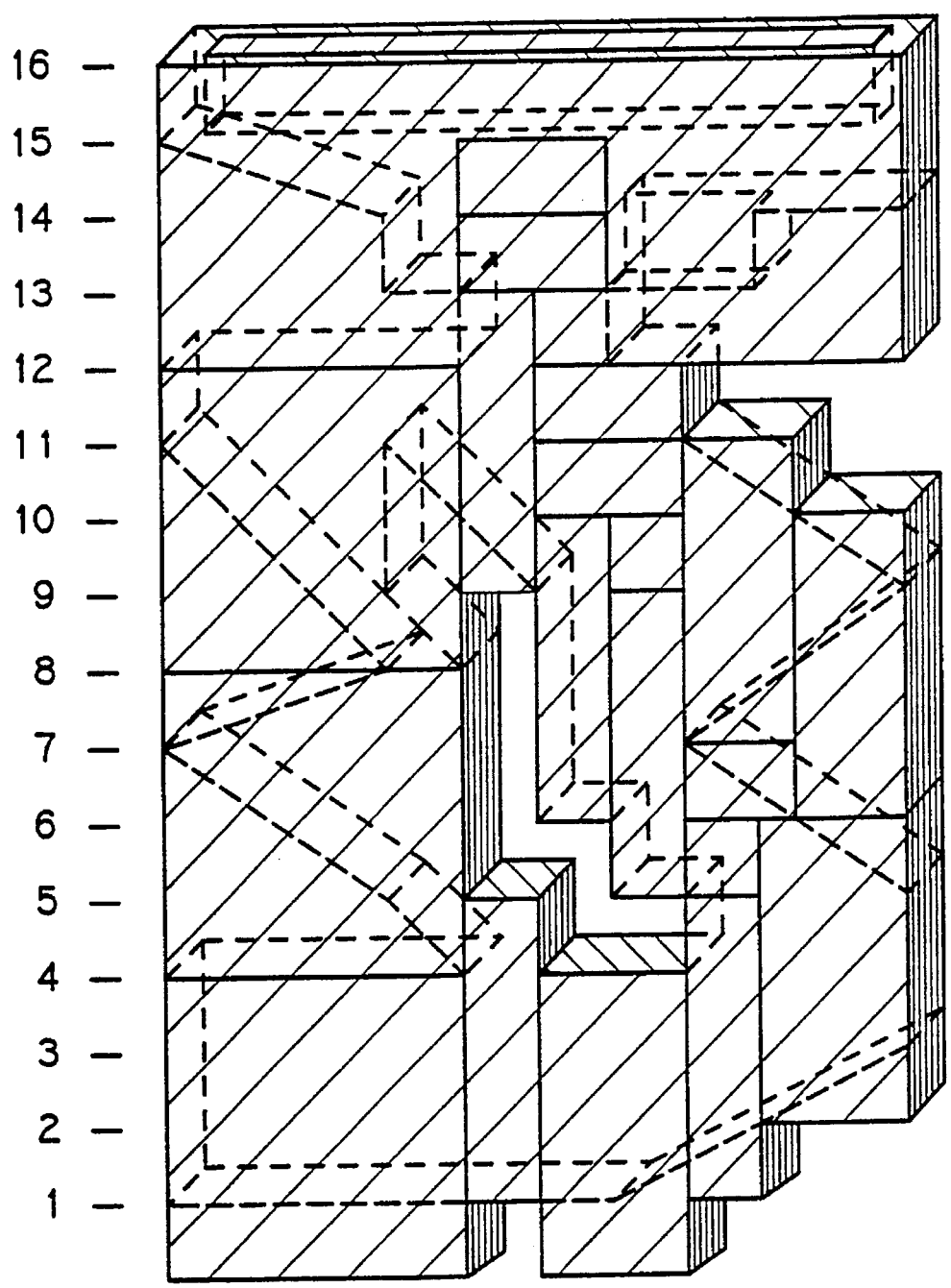
Figure 19A:
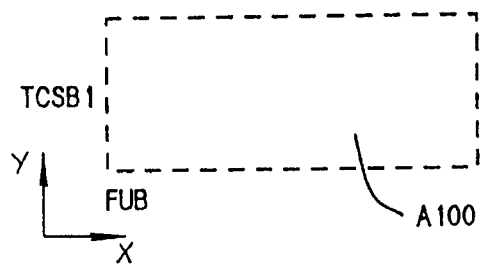
FIGS. 19A through 19BH show detailed cross-sectional information obtained from the application of the first preferred embodiment to create object shown in FIG. 18.
Figure 19A:
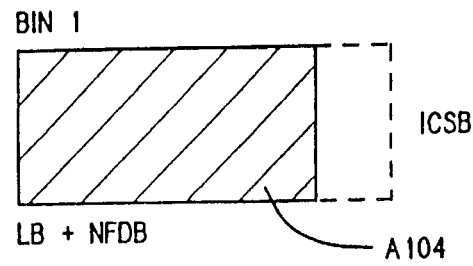
Figure 19A:
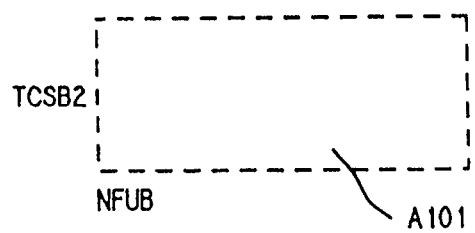
Figure 19A:
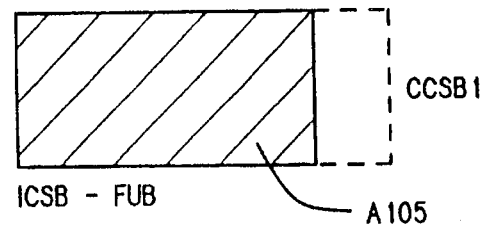
Figure 19A:
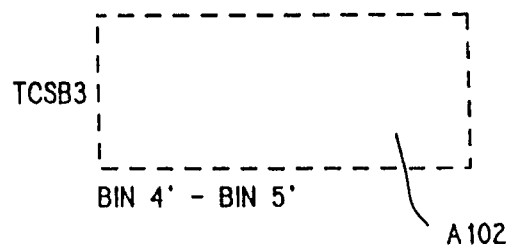
Figure 19A:
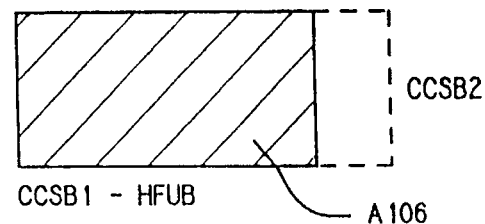
Figure 19A:
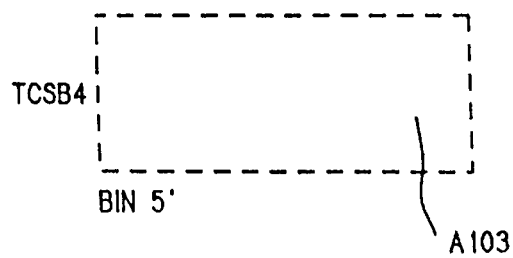
Figure 19B:
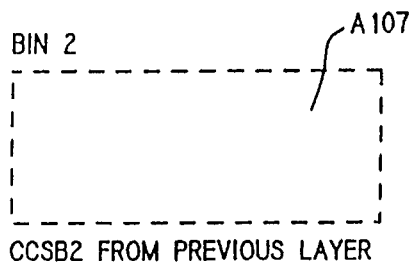
Figure 19B:
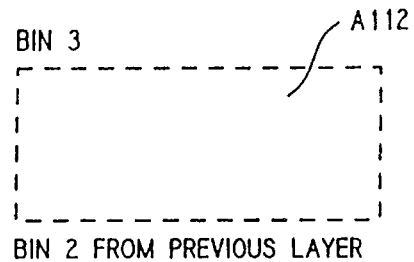
Figure 19B:
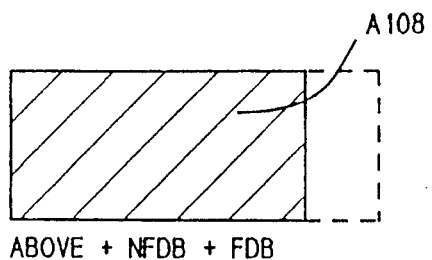
Figure 19B:
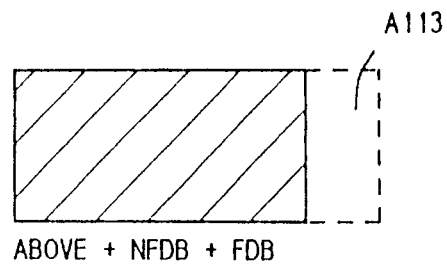
Figure 19B:
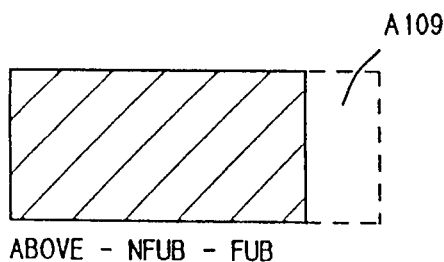
Figure 19B:
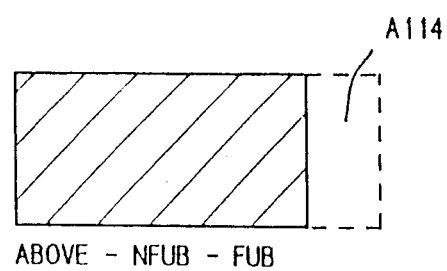
Figure 19B:
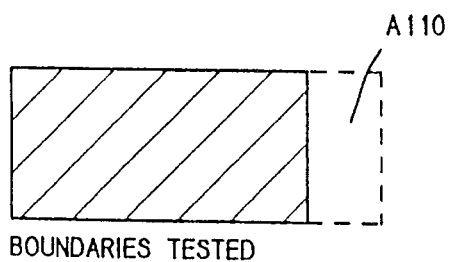
Figure 19B:
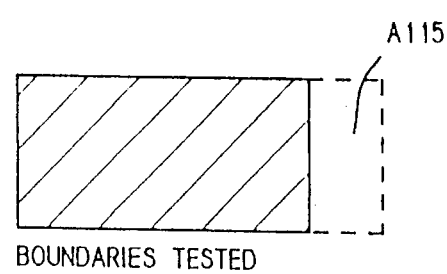
Figure 19B:
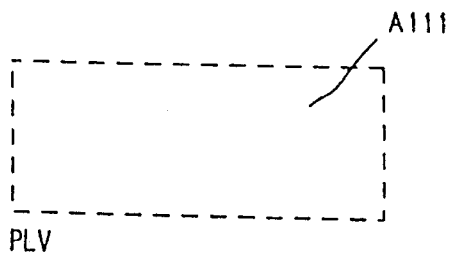
Figure 19B:
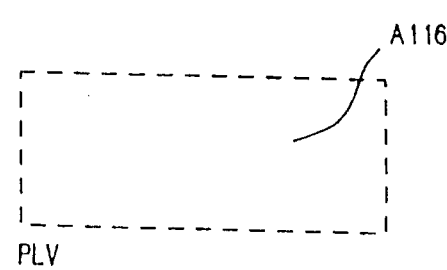
Figure 19C:
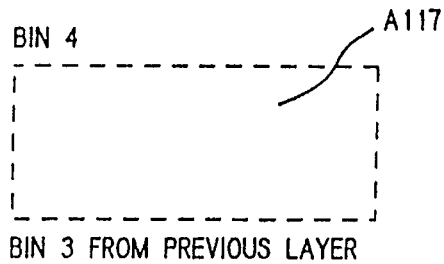
Figure 19C:
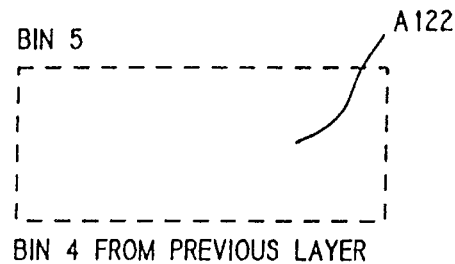
Figure 19C:
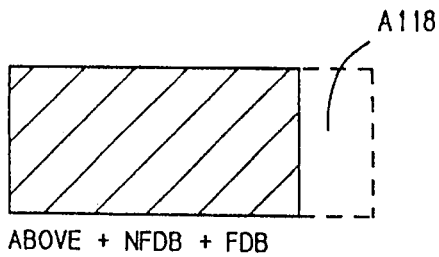
Figure 19C:
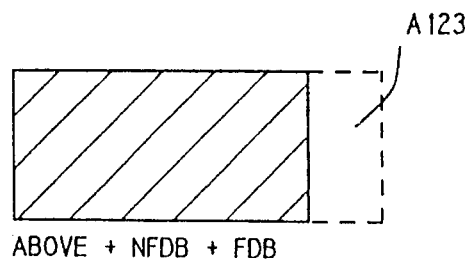
Figure 19C:
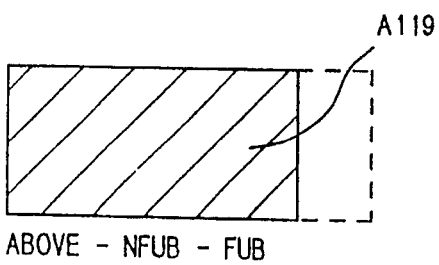
Figure 19C:
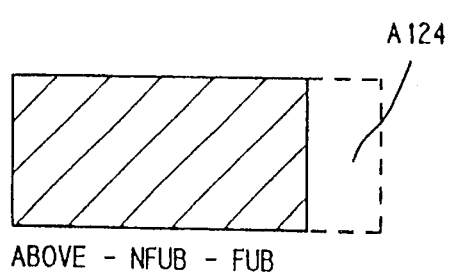
Figure 19C:
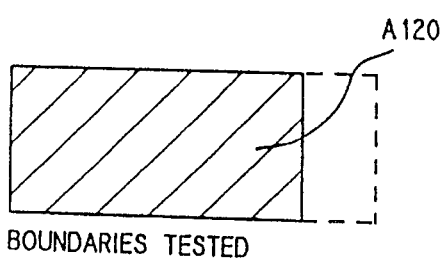
Figure 19C:
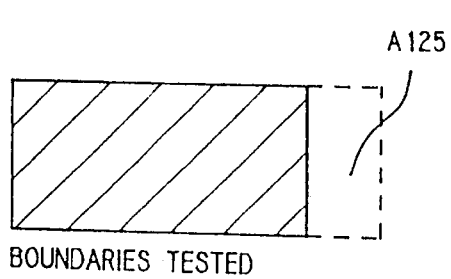
Figure 19C:
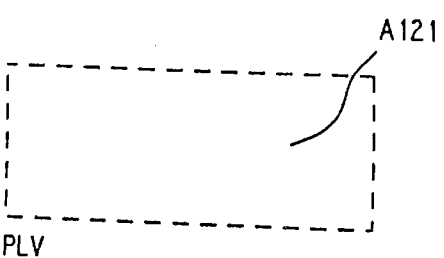
Figure 19C:
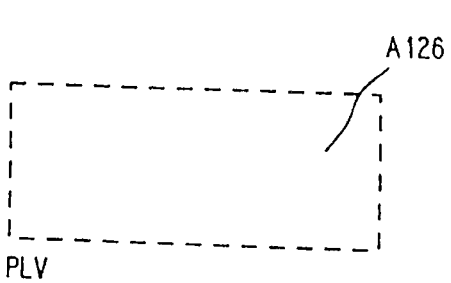
Figure 19D:
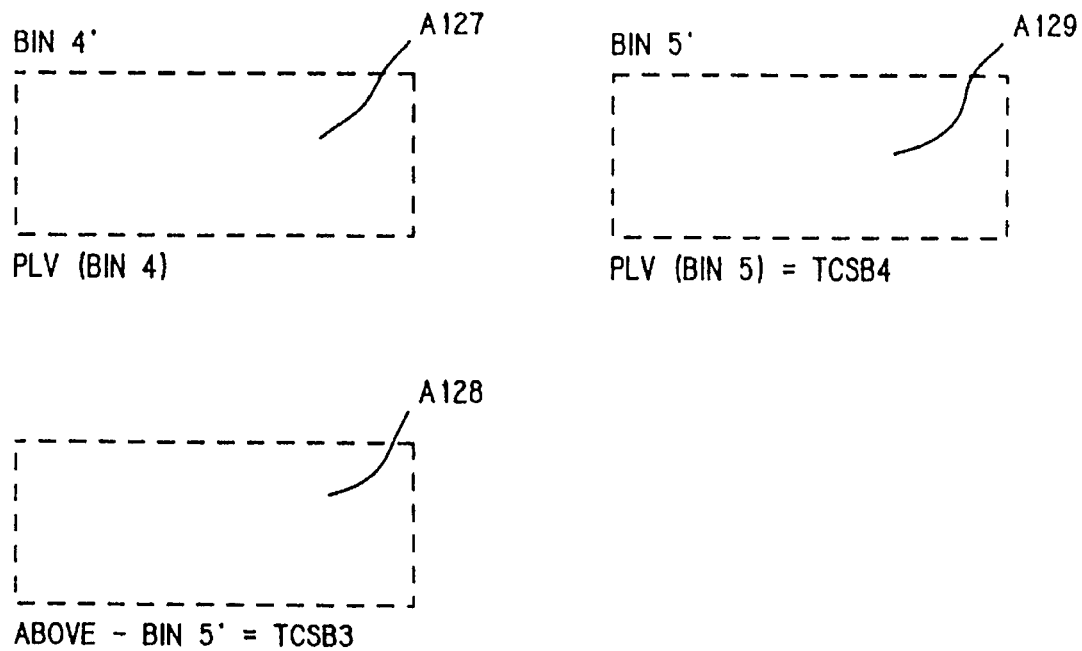
Figure 19E:
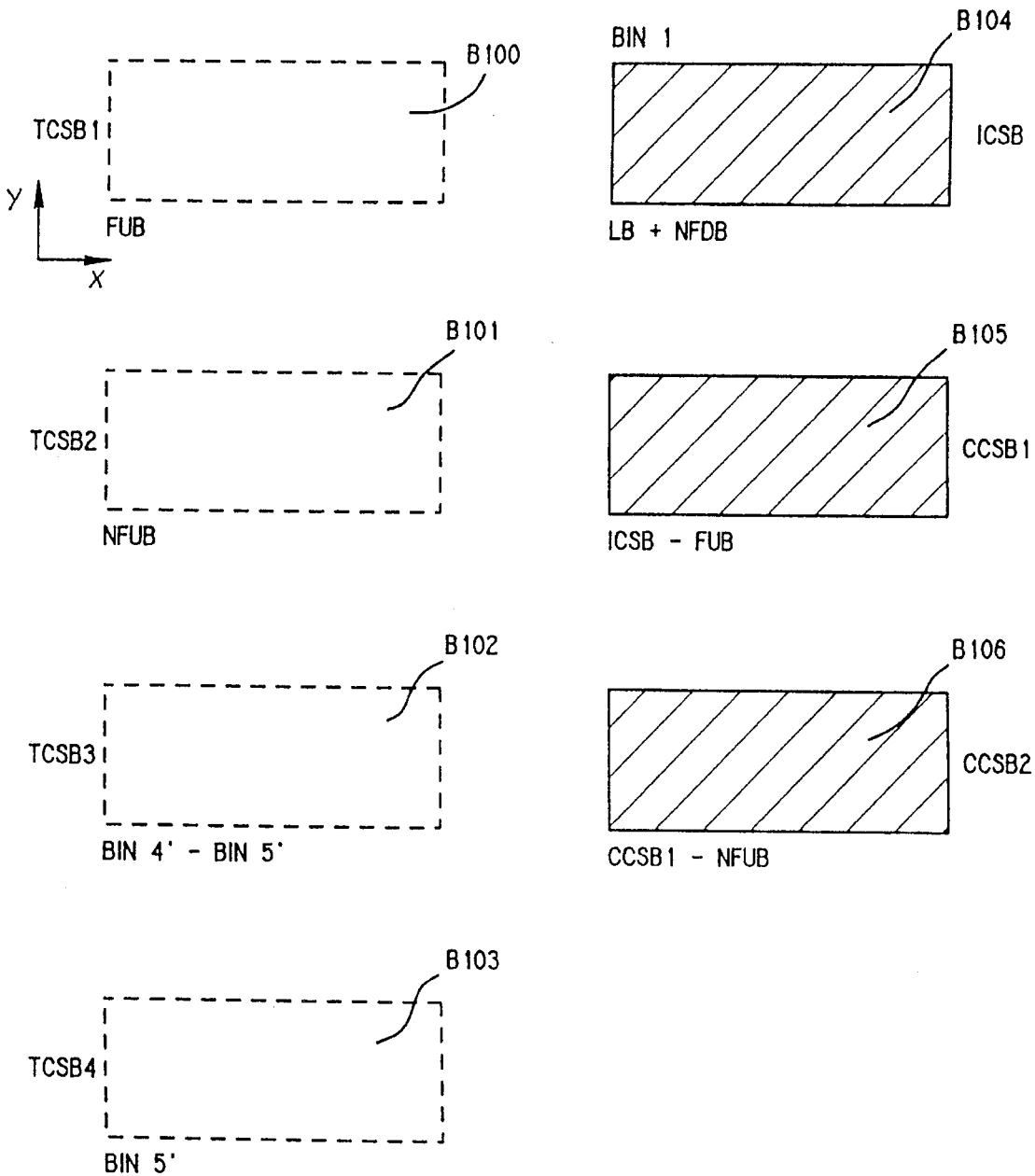
Figure 19F:
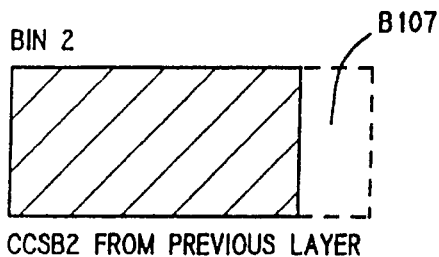
Figure 19F:
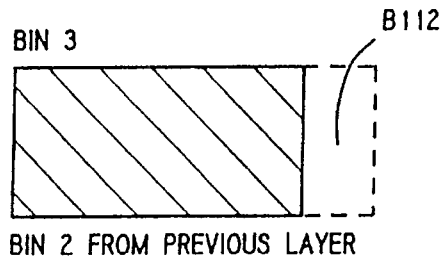
Figure 19F:
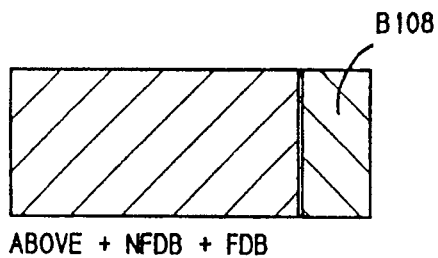
Figure 19F:
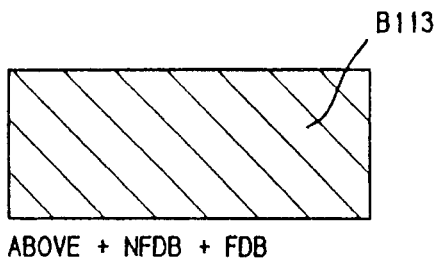
Figure 19F:
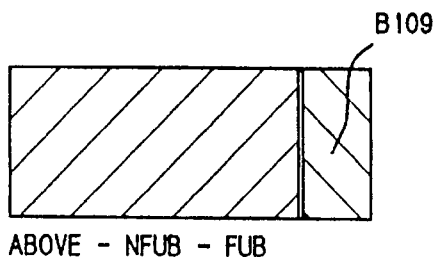
Figure 19F:
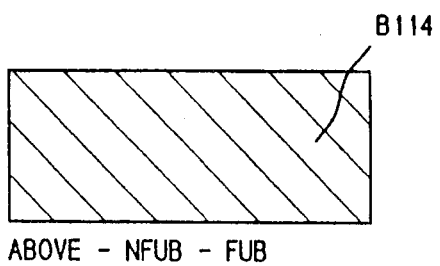
Figure 19F:
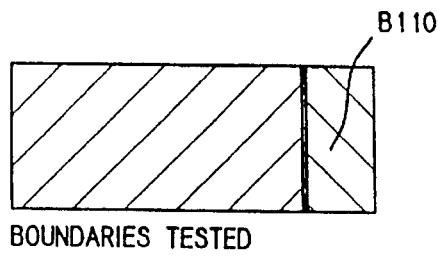
Figure 19F:
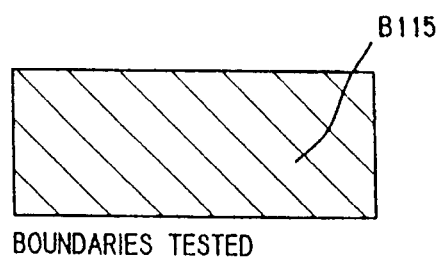
Figure 19F:
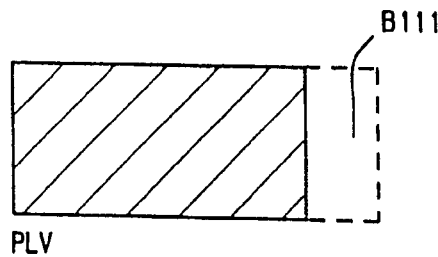
Figure 19F:
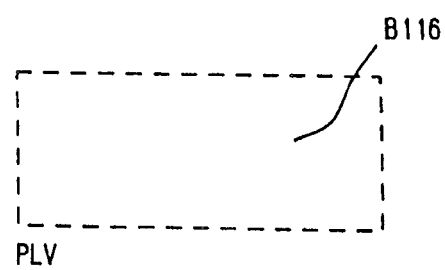
Figure 19G:
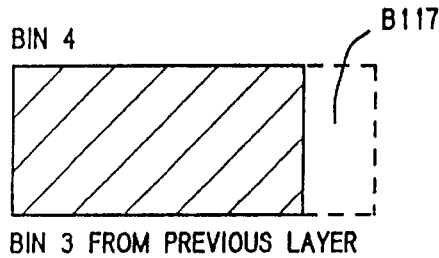
Figure 19G:
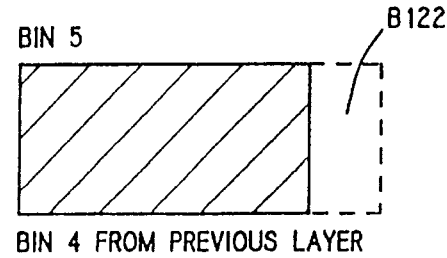
Figure 19G:
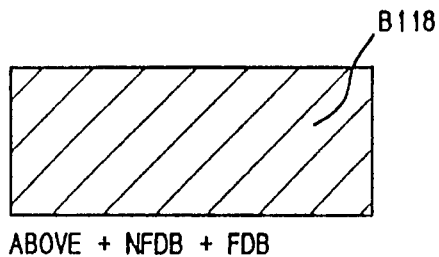
Figure 19G:
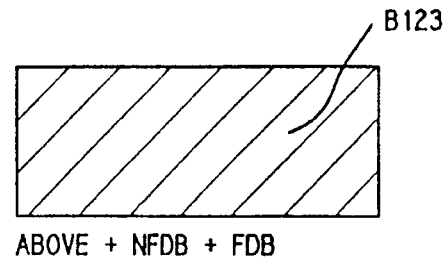
Figure 19G:
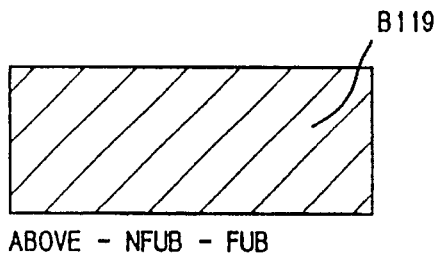
Figure 19G:
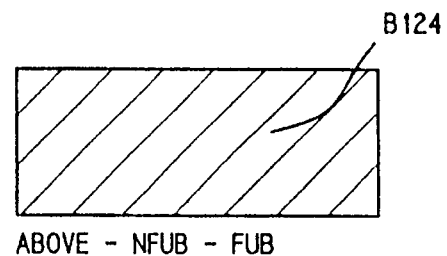
Figure 19G:
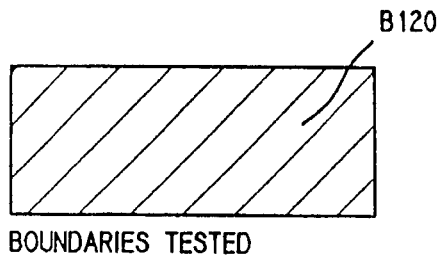
Figure 19G:
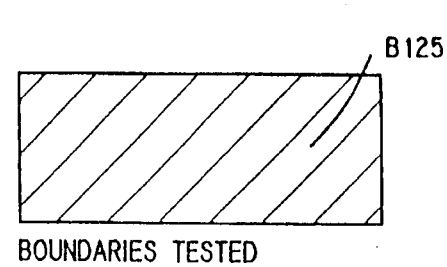
Figure 19G:
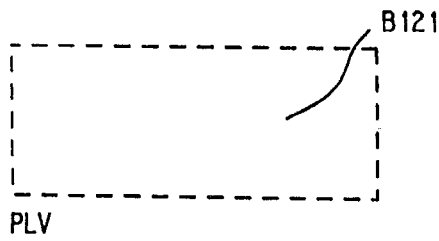
Figure 19G:
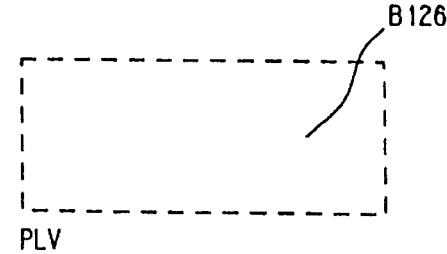
Figure 19H:
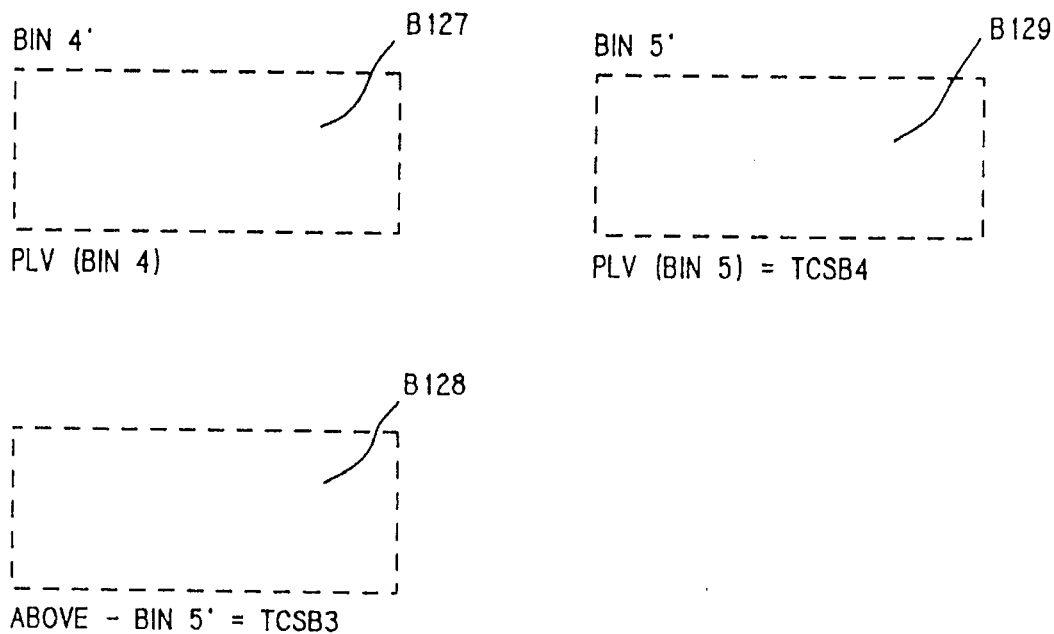
Figure 19I:
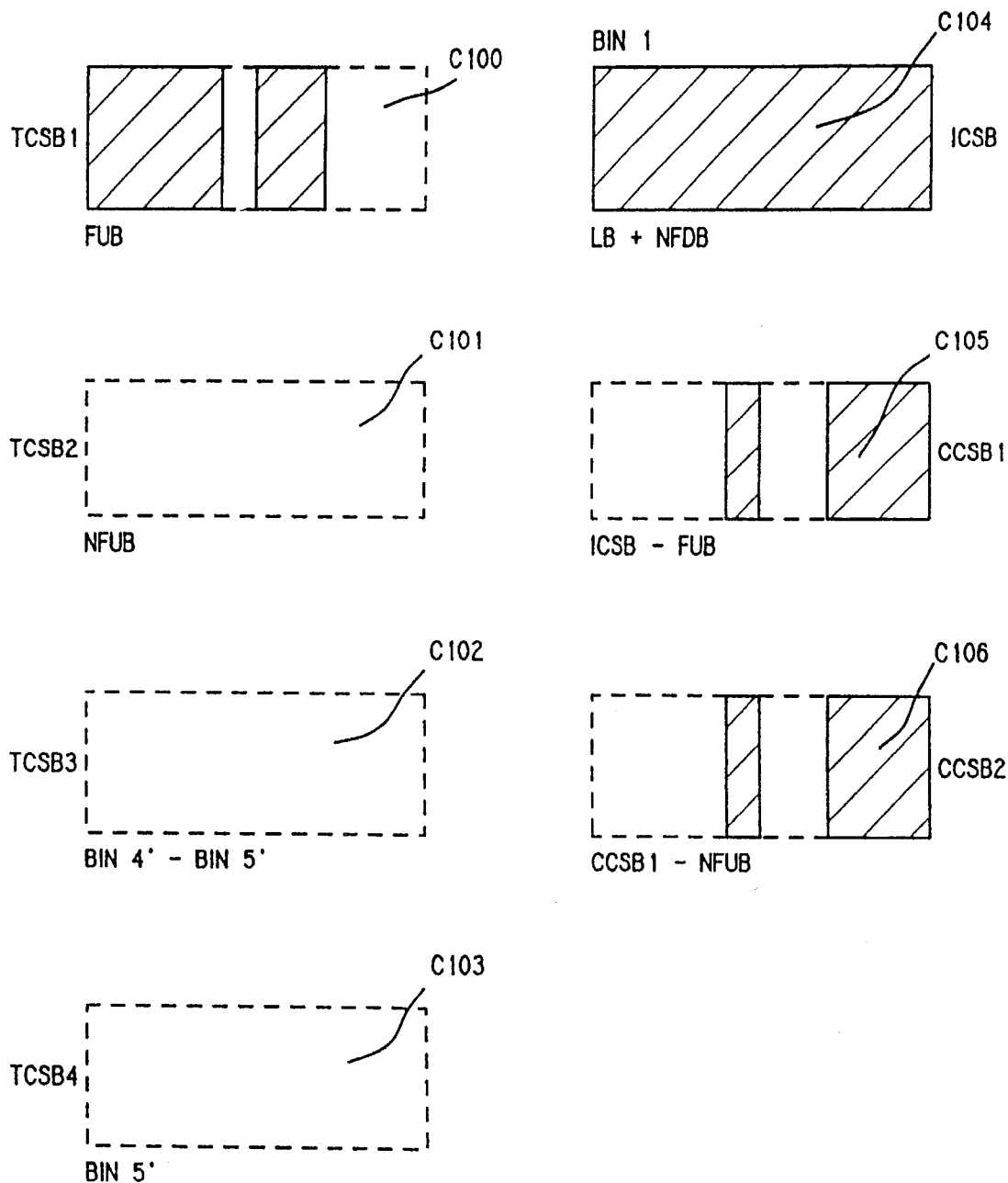
Figure 19J:
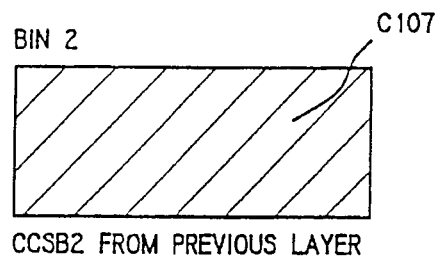
Figure 19J:
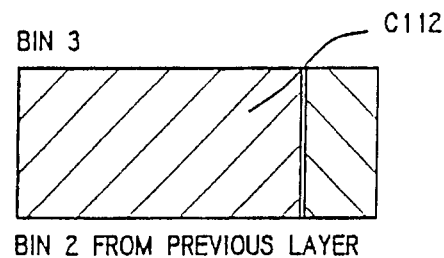
Figure 19J:
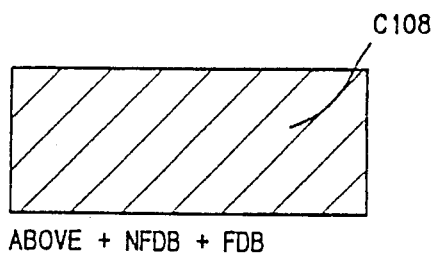
Figure 19J:
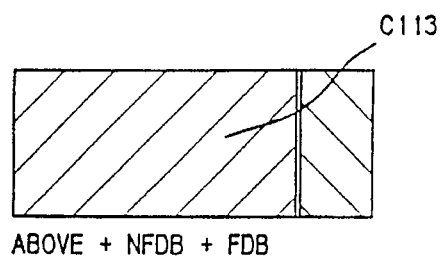
Figure 19J:
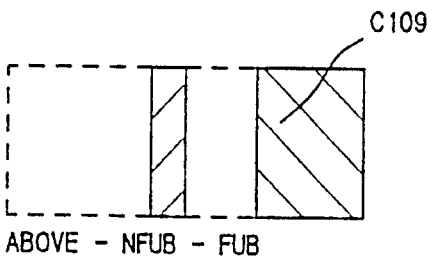
Figure 19J:
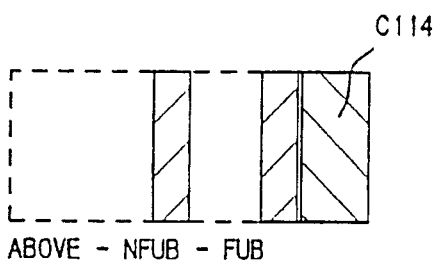
Figure 19J:
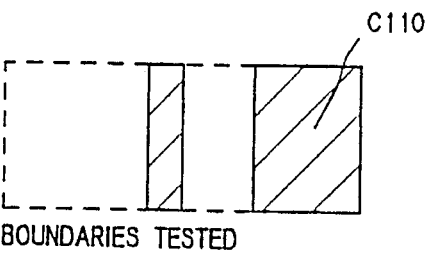
Figure 19J:
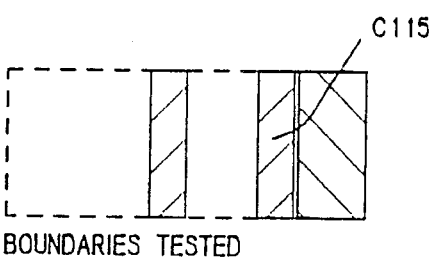
Figure 19J:
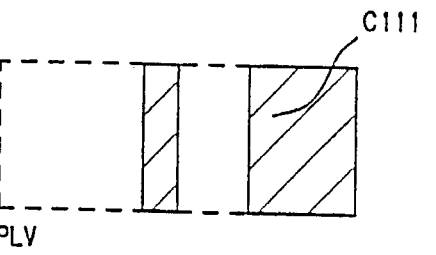
Figure 19J:
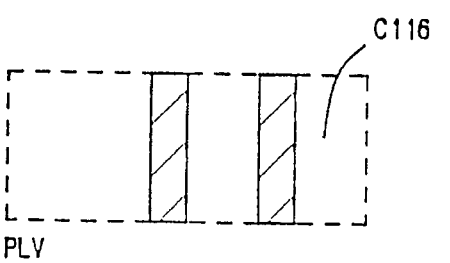
Figure 19K:
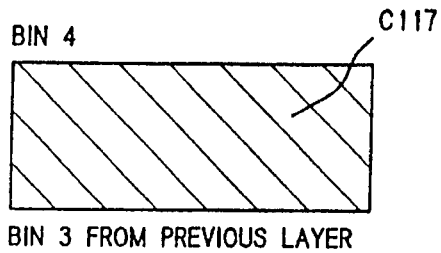
Figure 19K:
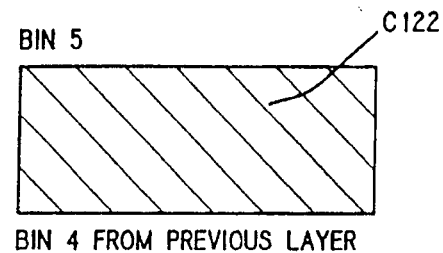
Figure 19K:
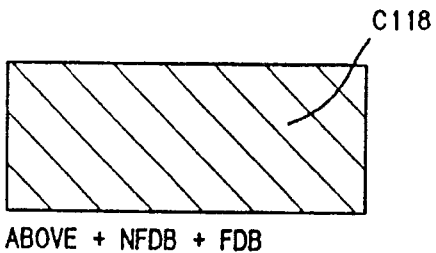
Figure 19K:
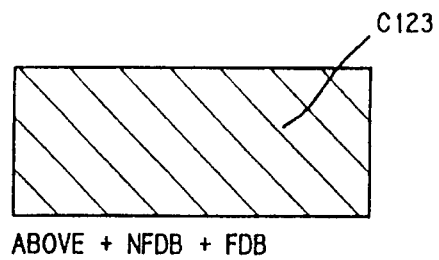
Figure 19K:
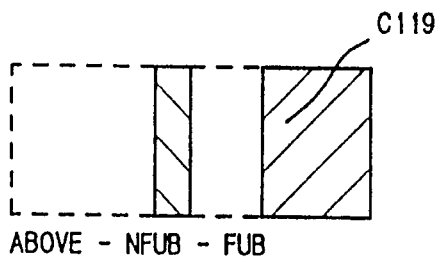
Figure 19K:
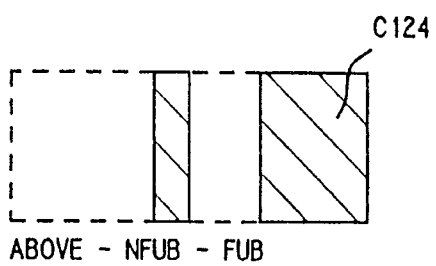
Figure 19K:
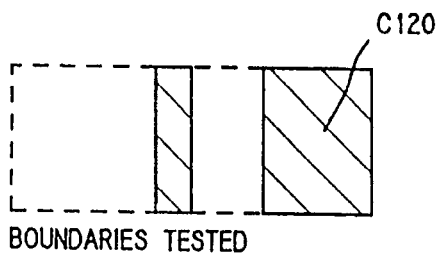
Figure 19K:
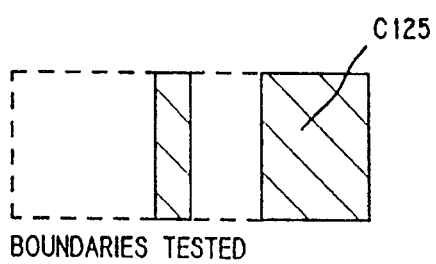
Figure 19K:
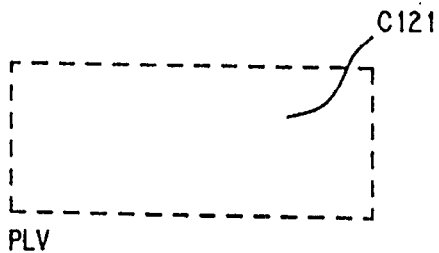
Figure 19K:
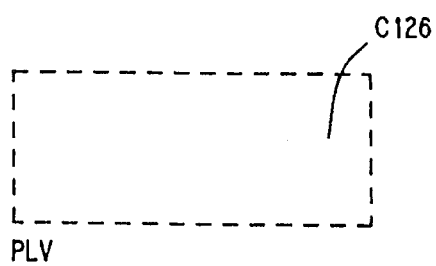
Figure 19L:
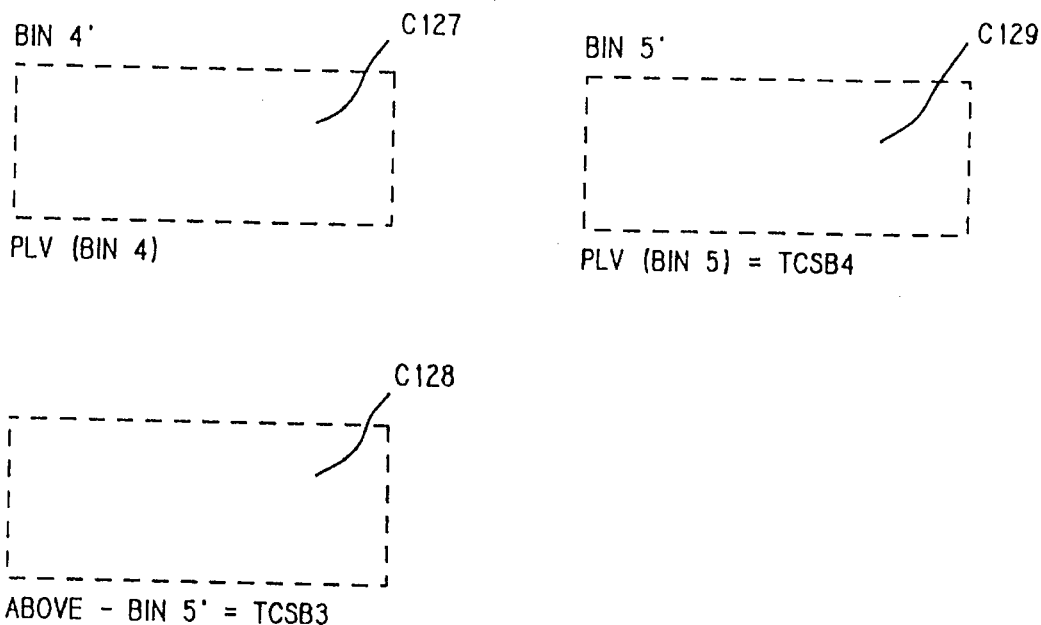
Figure 19M:
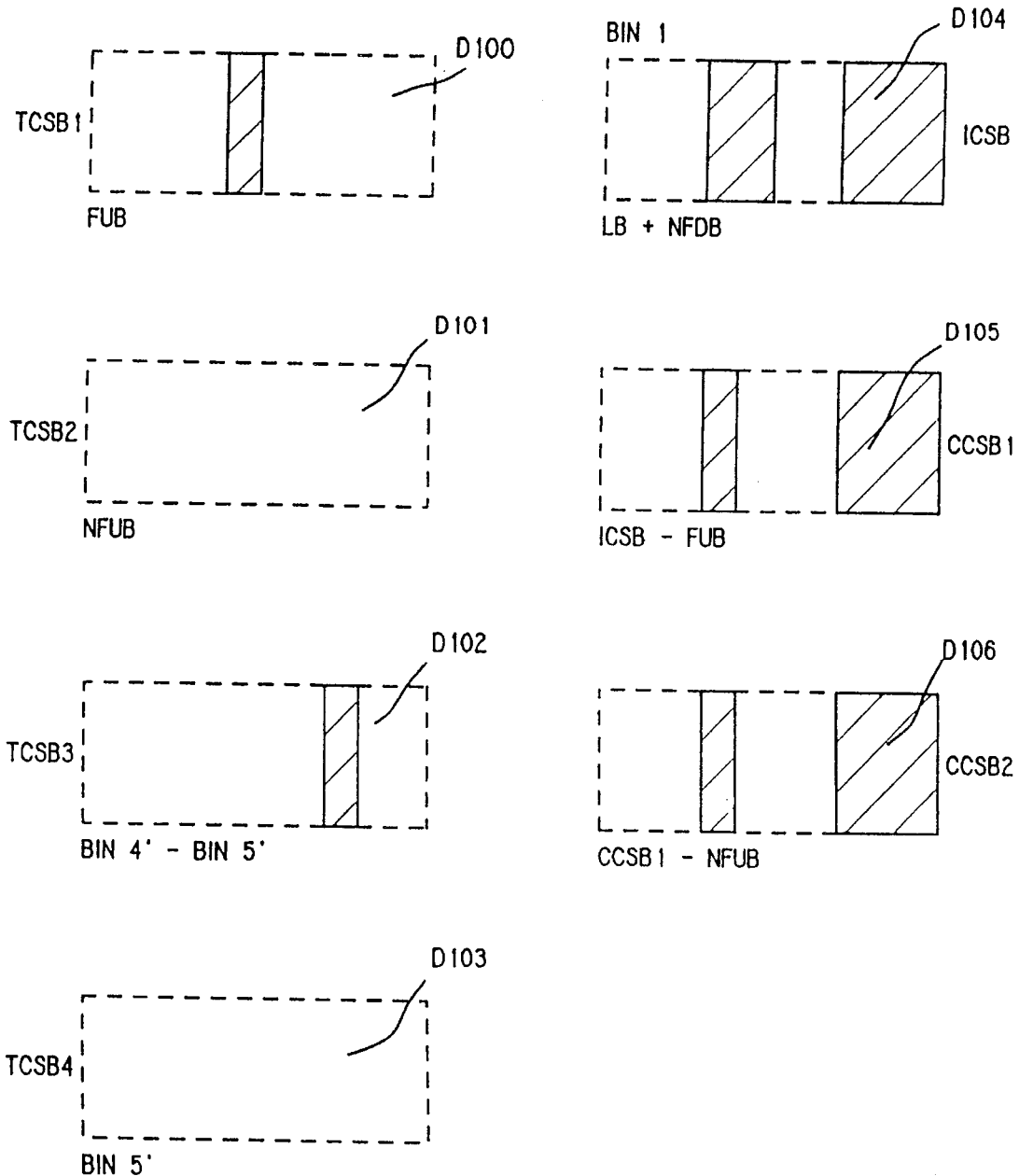
Figure 19N:
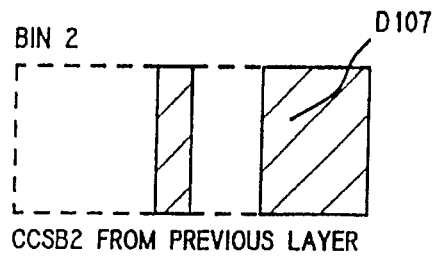
Figure 19N:
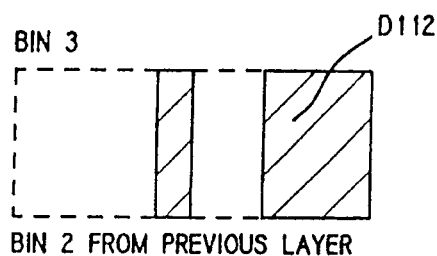
Figure 19N:
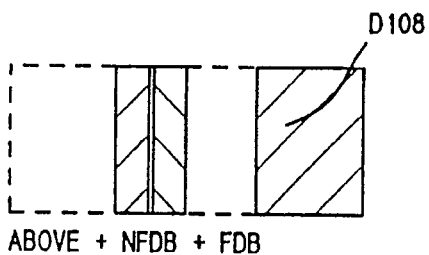
Figure 19N:
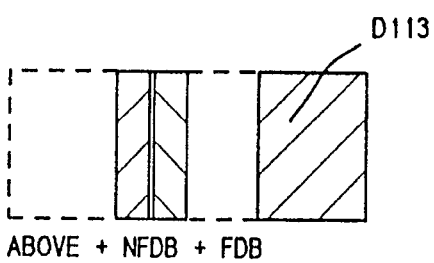
Figure 19N:
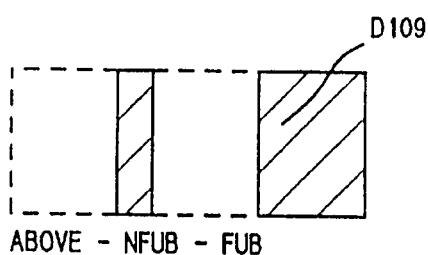
Figure 19N:
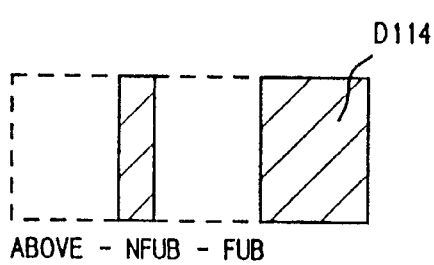
Figure 19N:
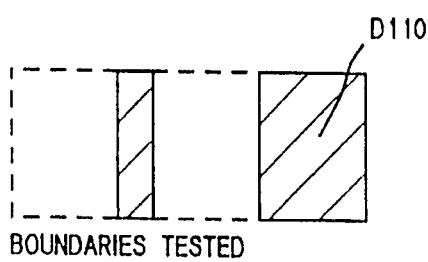
Figure 19N:
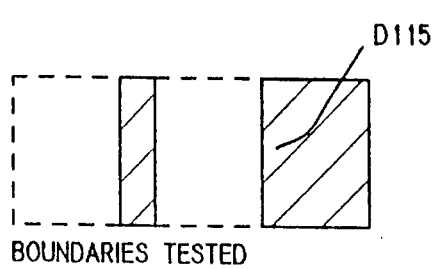
Figure 19N:
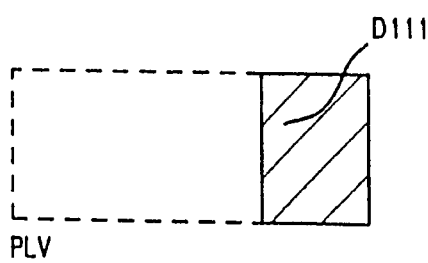
Figure 19N:
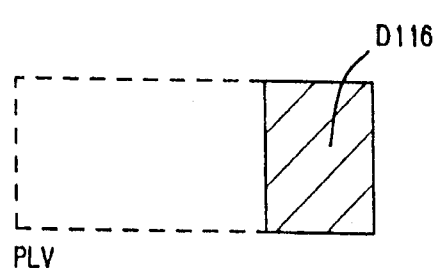
Figure 19O:
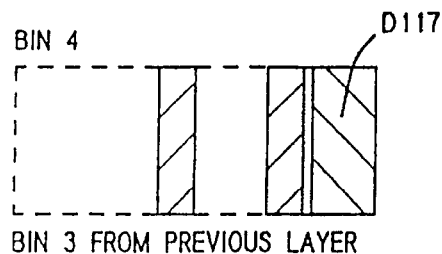
Figure 19O:
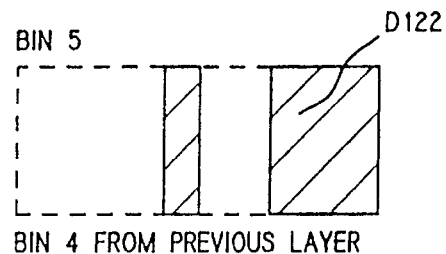
Figure 19O:
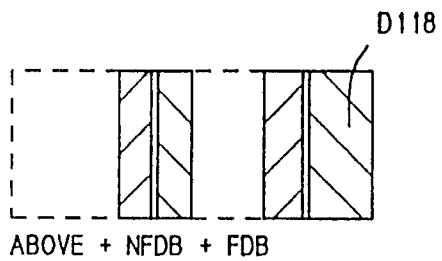
Figure 19O:
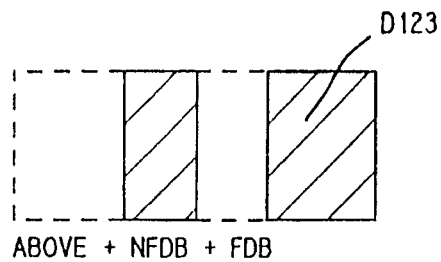
Figure 19O:
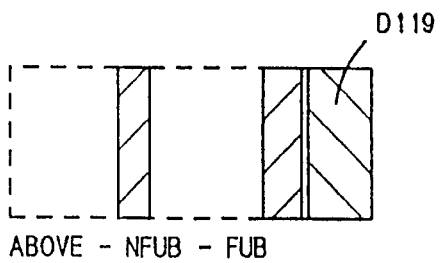
Figure 19O:
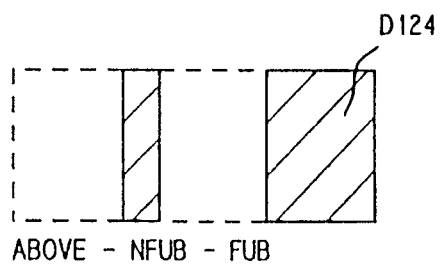
Figure 19O:
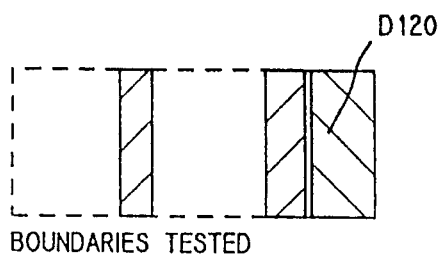
Figure 19O:
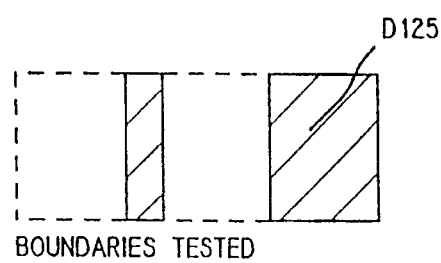
Figure 19O:
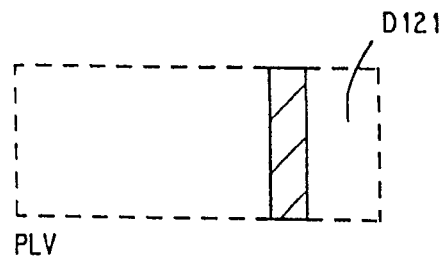
Figure 19O:
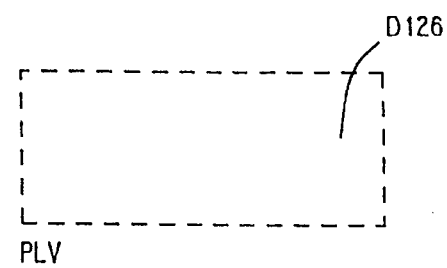
Figure 19P:
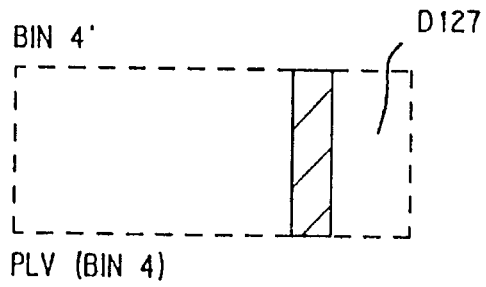
Figure 19P:
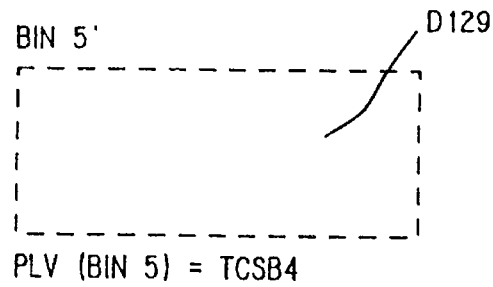
Figure 19P:
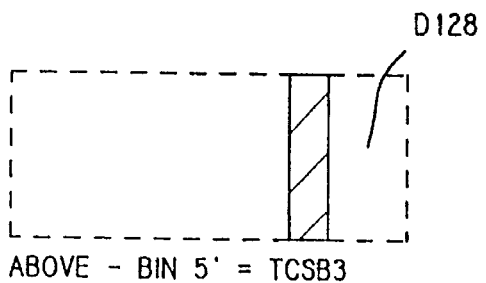
Figure 19Q:
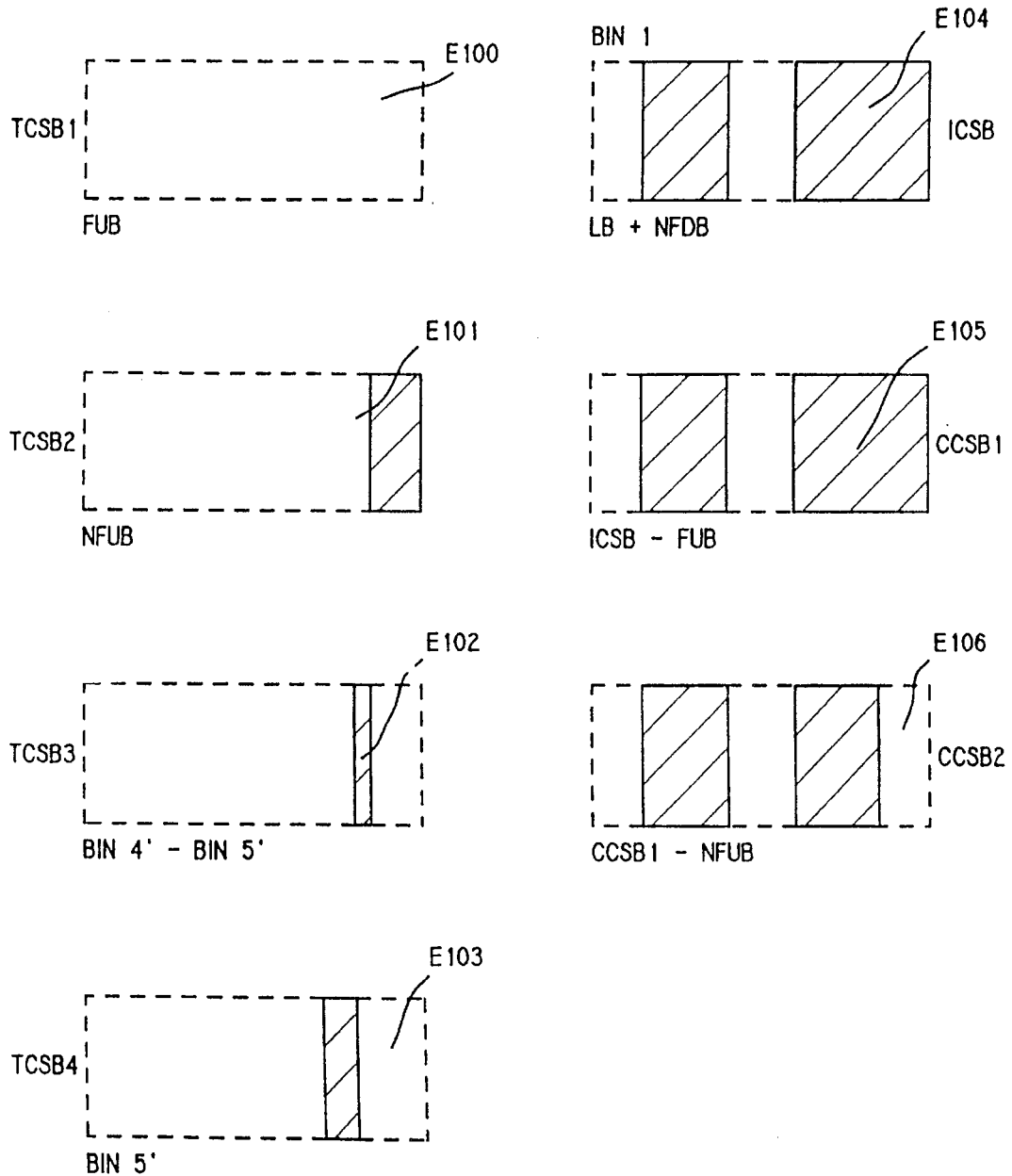
Figure 19R:
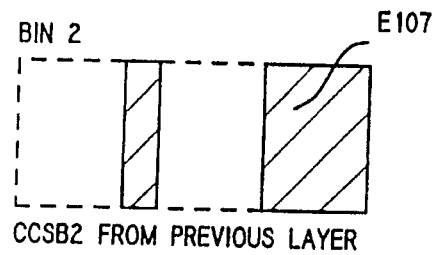
Figure 19R:
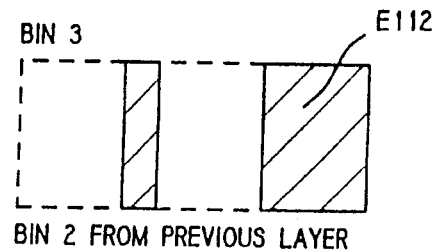
Figure 19R:
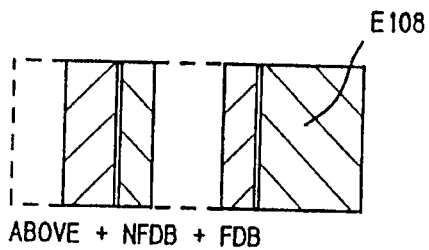
Figure 19R:
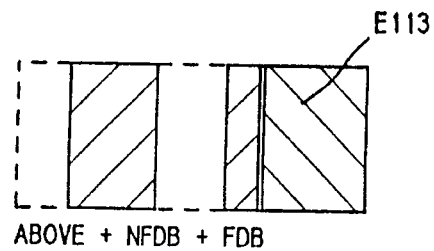
Figure 19R:
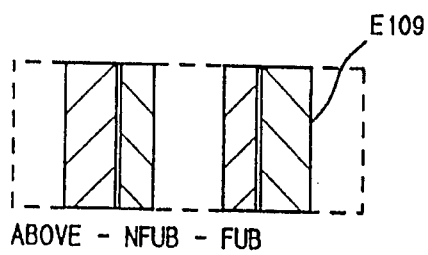
Figure 19R:
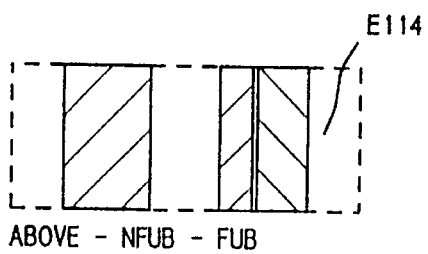
Figure 19R:
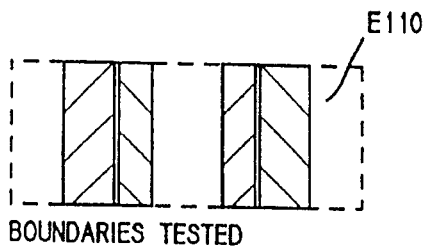
Figure 19R:
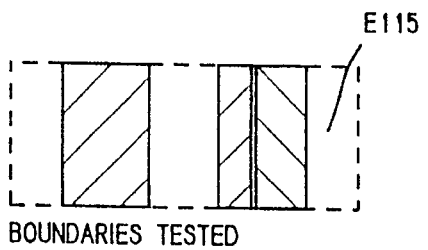
Figure 19R:
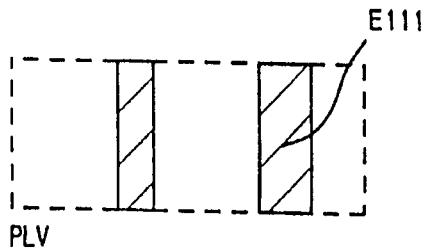
Figure 19R:
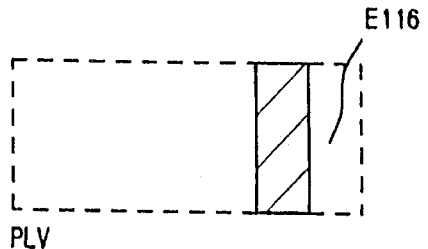
Figure 19S:
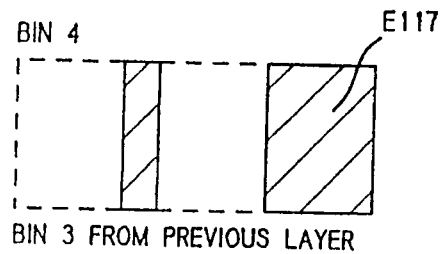
Figure 19S:
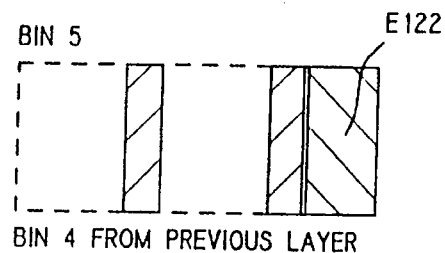
Figure 19S:
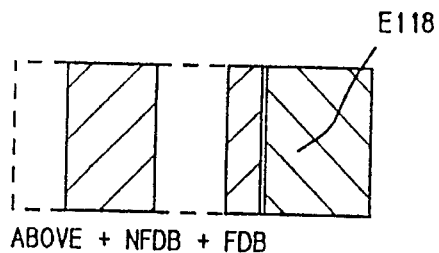
Figure 19S:
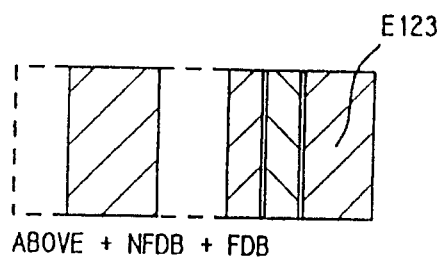
Figure 19S:
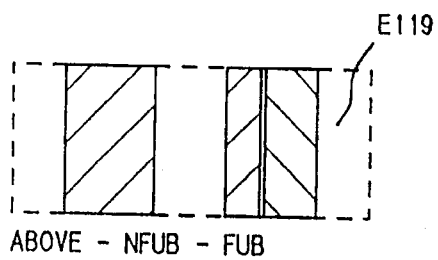
Figure 19S:
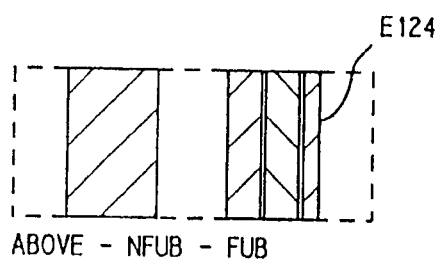
Figure 19S:
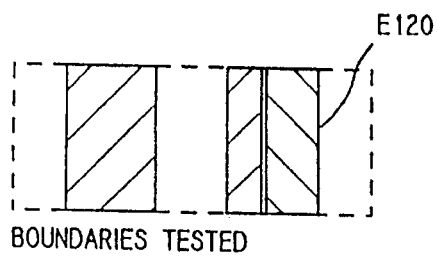
Figure 19S:
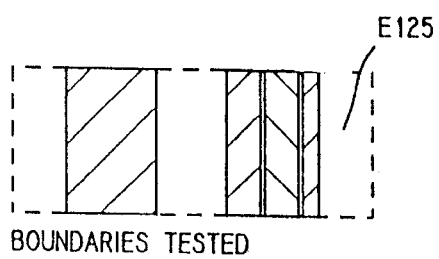
Figure 19S:
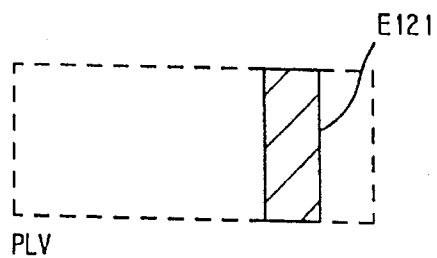
Figure 19S:
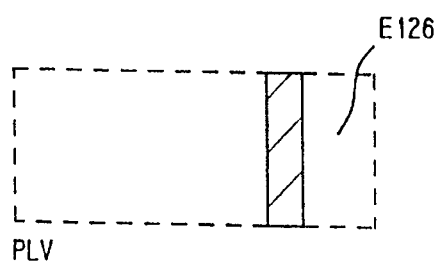
Figure 19T:
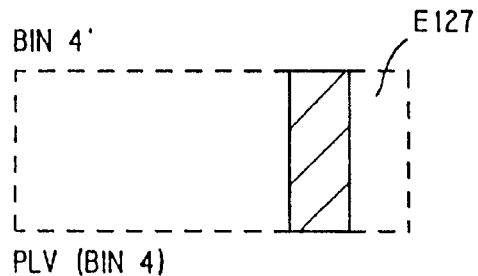
Figure 19T:
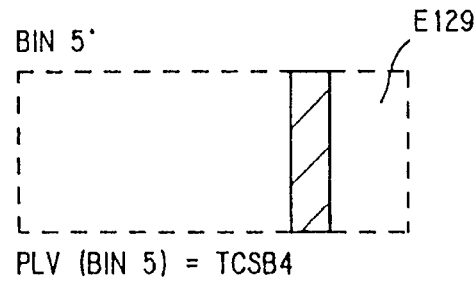
Figure 19T:
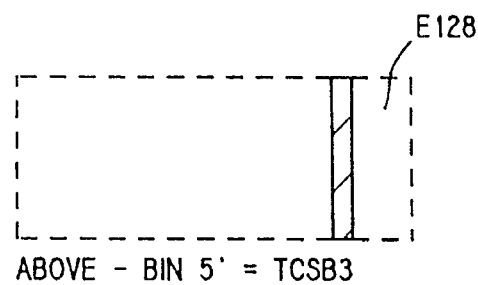
Figure 19U:
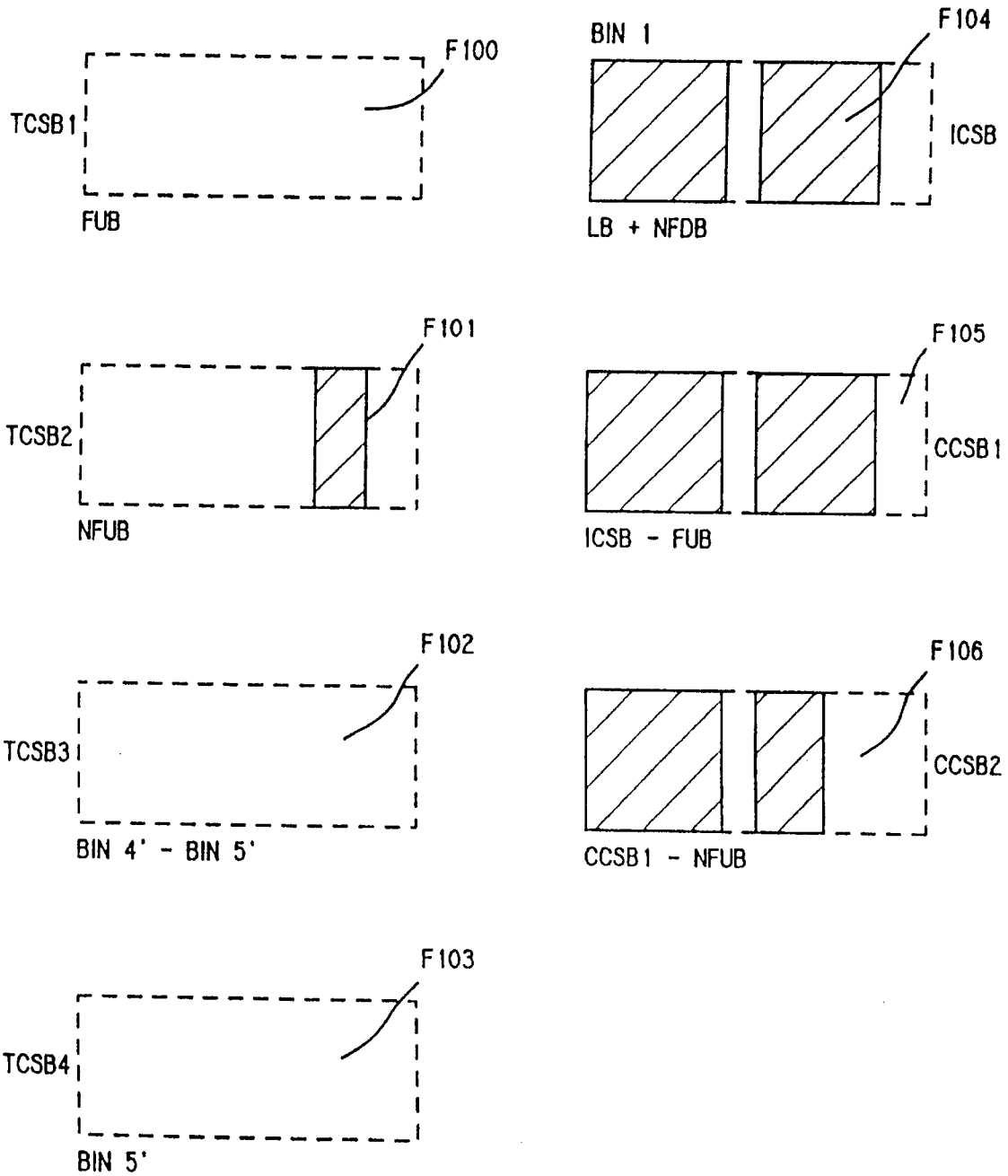
Figure 19V:
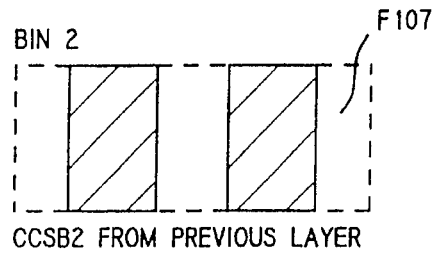
Figure 19V:
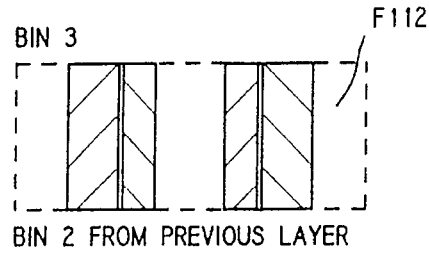
Figure 19V:
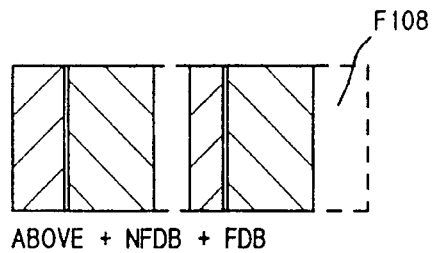
Figure 19V:
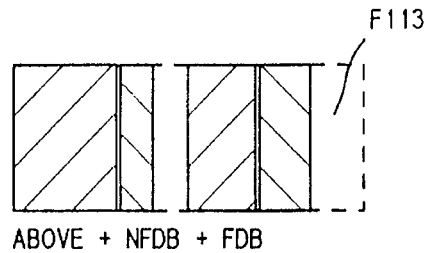
Figure 19V:
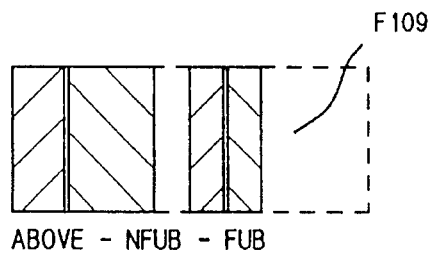
Figure 19V:
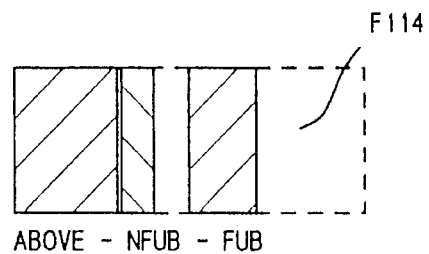
Figure 19V:
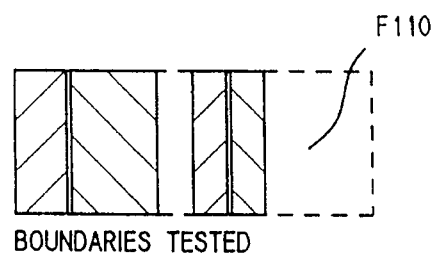
Figure 19V:
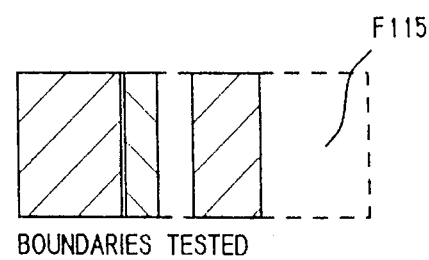
Figure 19V:
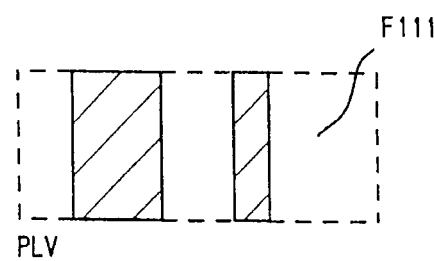
Figure 19V:
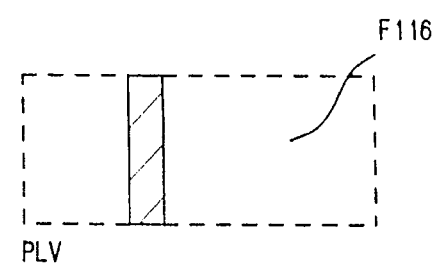
Figure 19W:
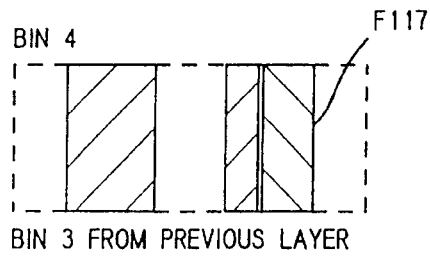
Figure 19W:
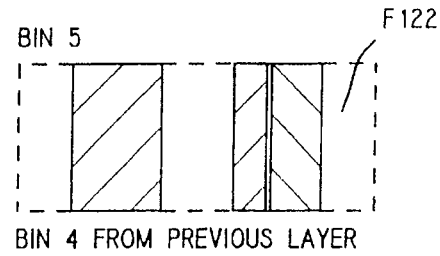
Figure 19W:
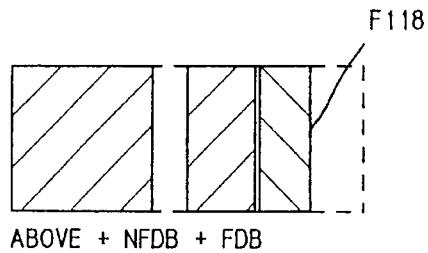
Figure 19W:
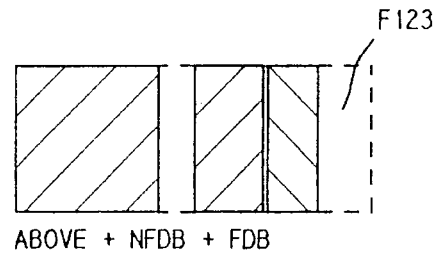
Figure 19W:
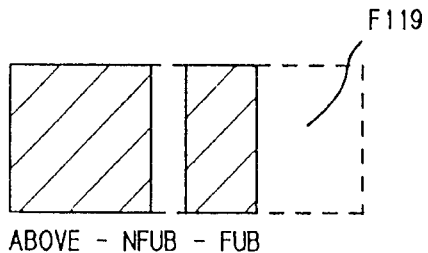
Figure 19W:
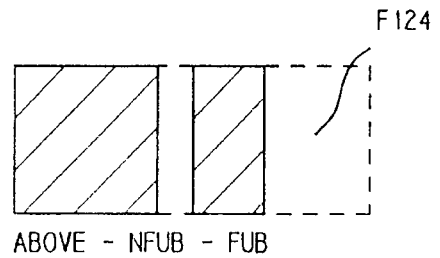
Figure 19W:
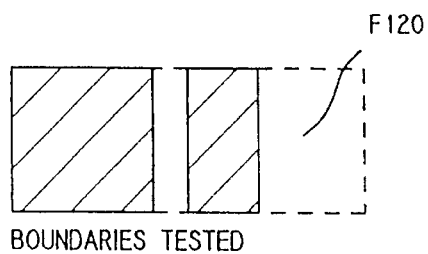
Figure 19W:
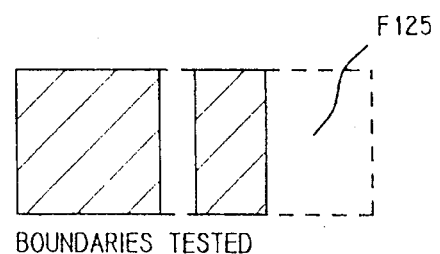
Figure 19W:
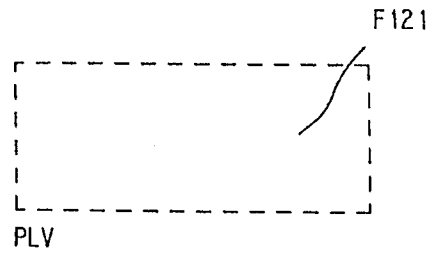
Figure 19W:
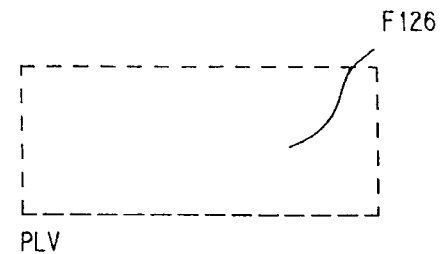
Figure 19X:
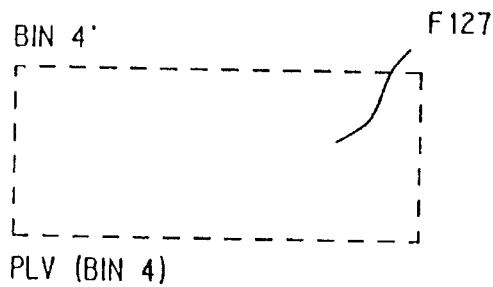
Figure 19X:
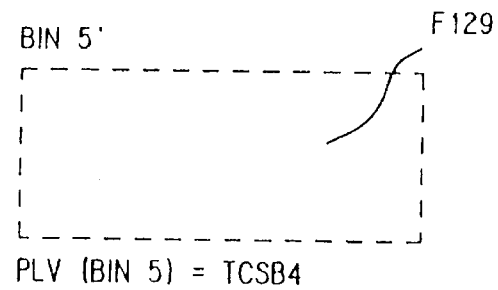
Figure 19X:
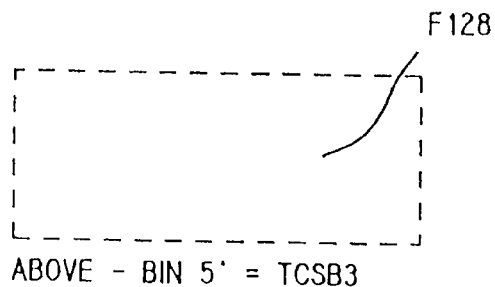
Figure 19Y:
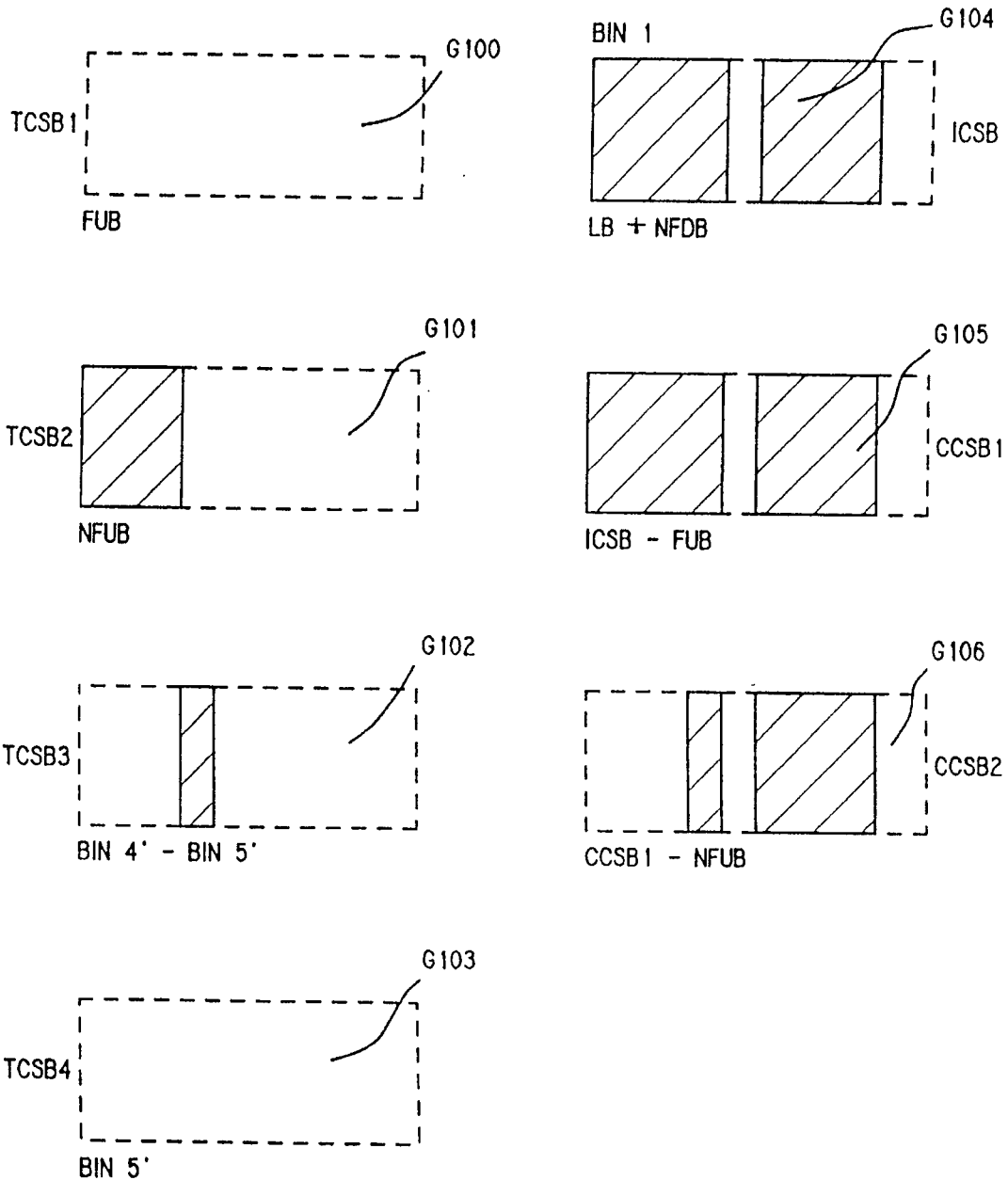
Figure 19Z:
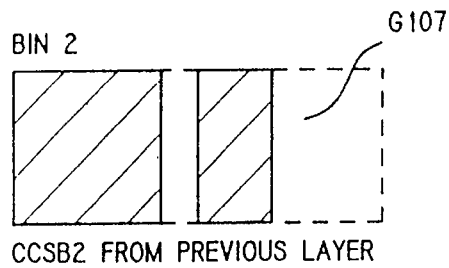
Figure 19Z:
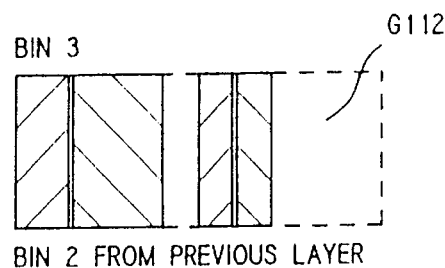
Figure 19Z:
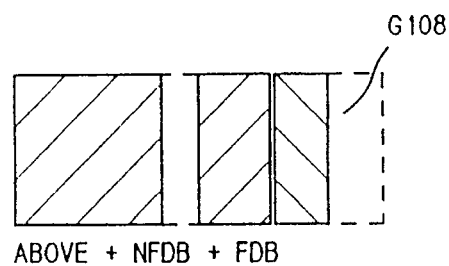
Figure 19Z:
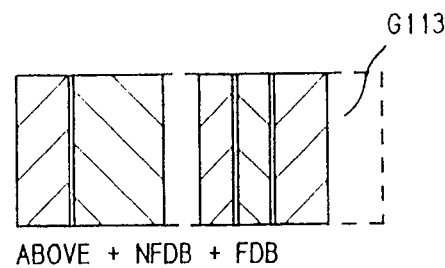
Figure 19Z:
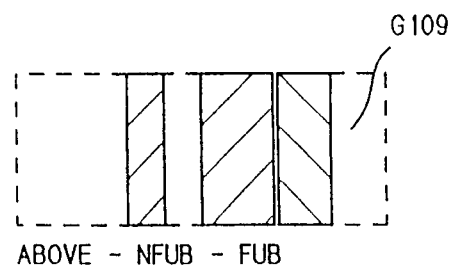
Figure 19Z:
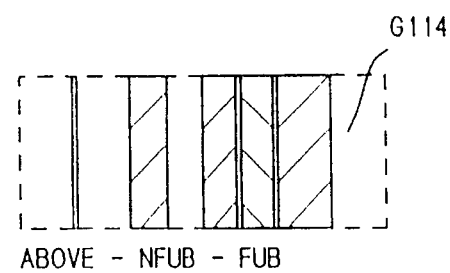
Figure 19Z:
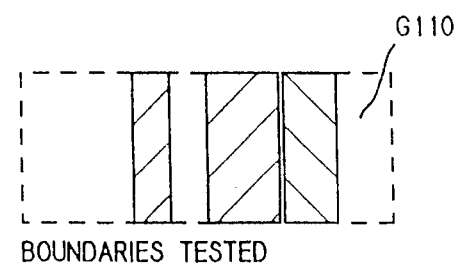
Figure 19Z:
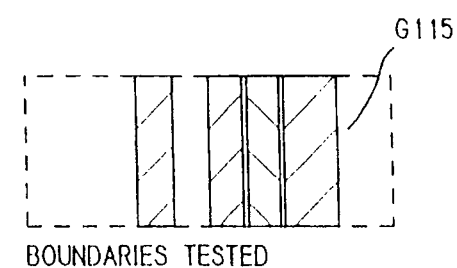
Figure 19Z:
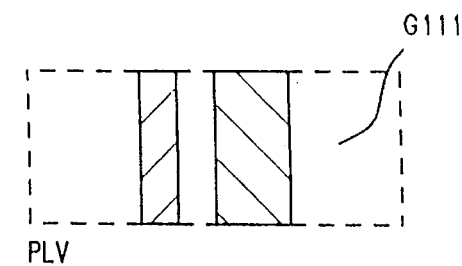
Figure 19Z:
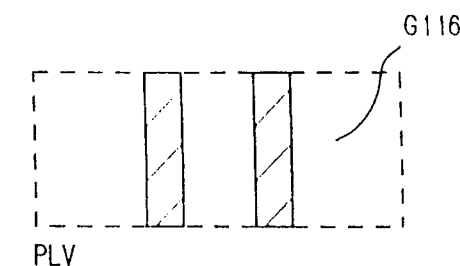
Figure 19A:
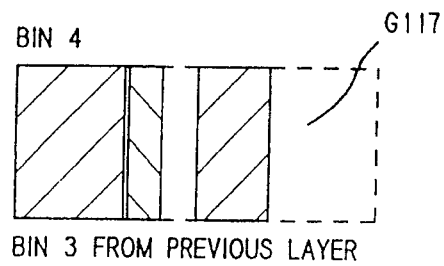
Figure 19A:
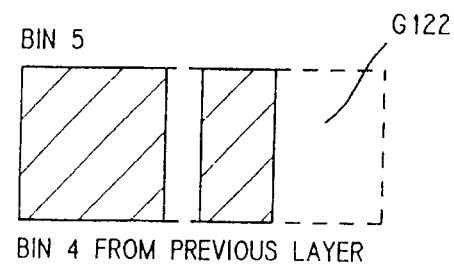
Figure 19A:
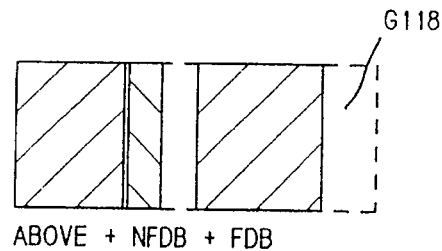
Figure 19A:
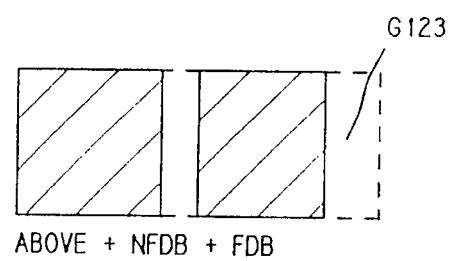
Figure 19A:
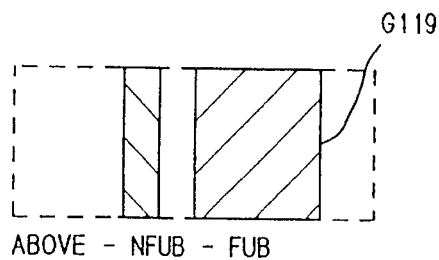
Figure 19A:
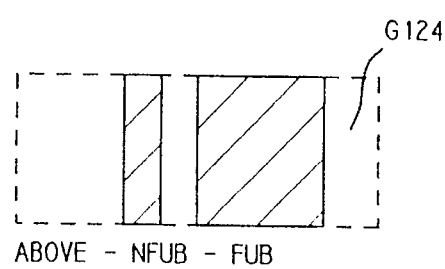
Figure 19A:
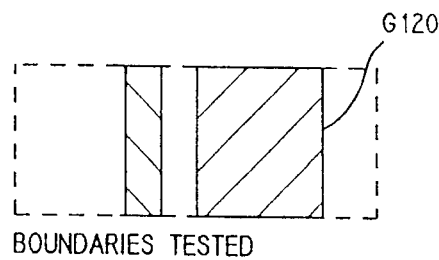
Figure 19A:
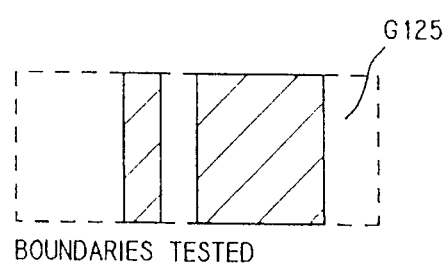
Figure 19A:
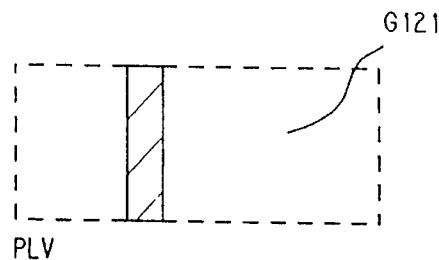
Figure 19A:
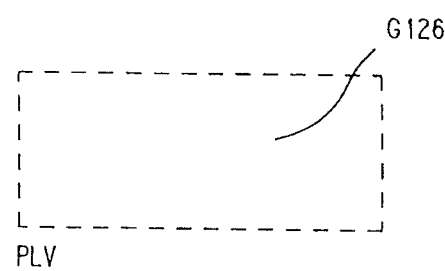
Figure 19A:
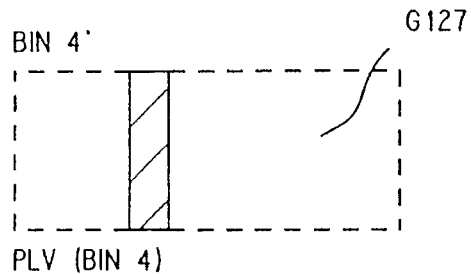
Figure 19A:
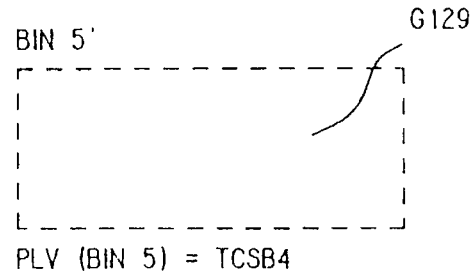
Figure 19A:
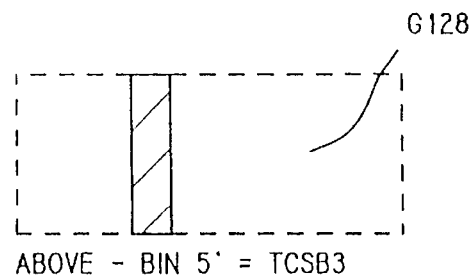
Figure 19A:
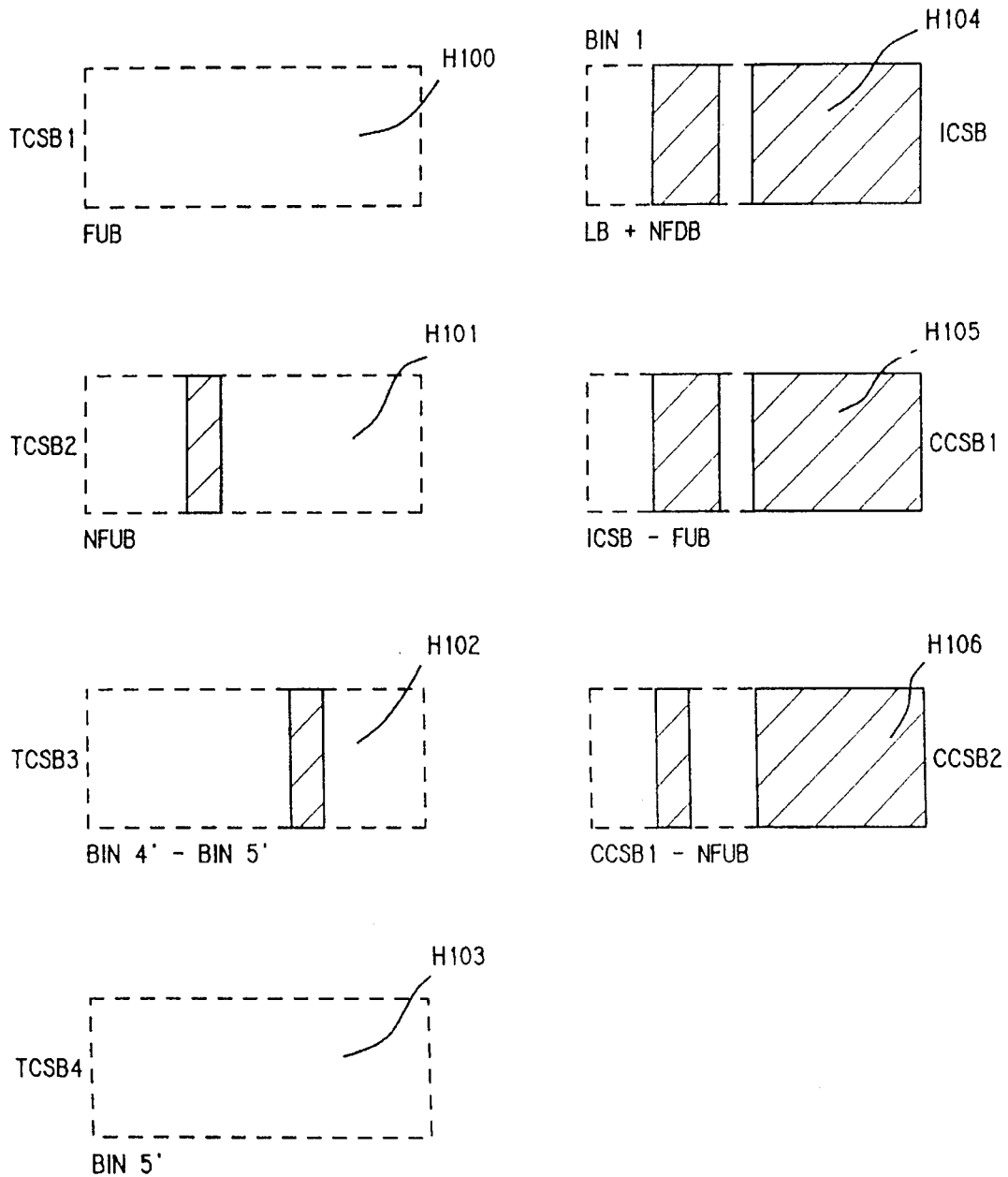
Figure 19A:
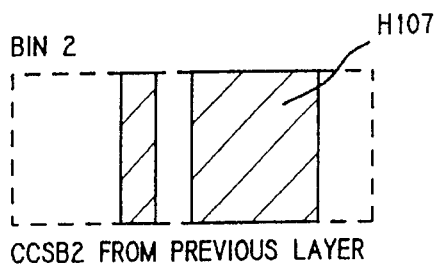
Figure 19A:
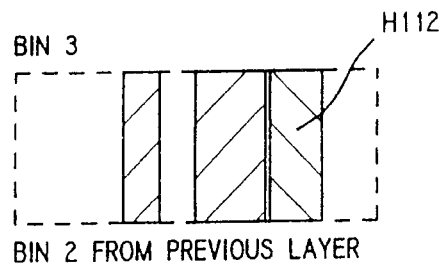
Figure 19A:
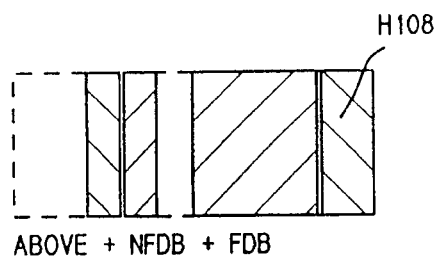
Figure 19A:
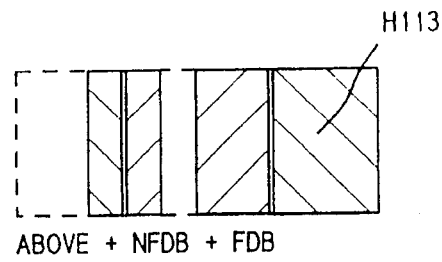
Figure 19A:
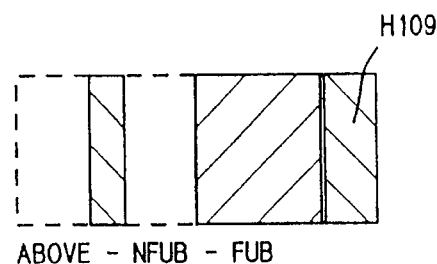
Figure 19A:
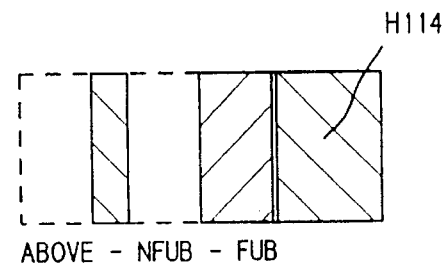
Figure 19A:
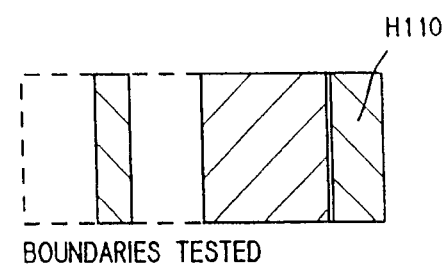
Figure 19A:
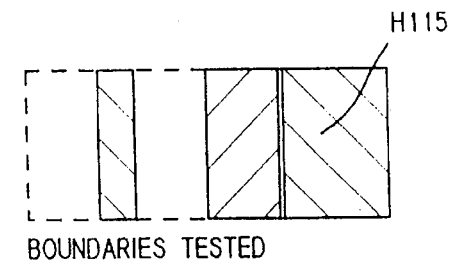
Figure 19A:
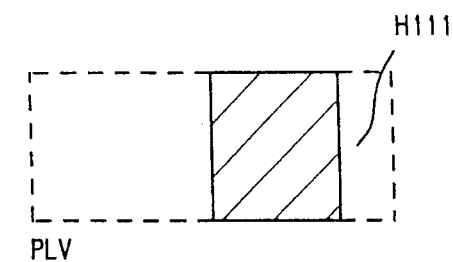
Figure 19A:
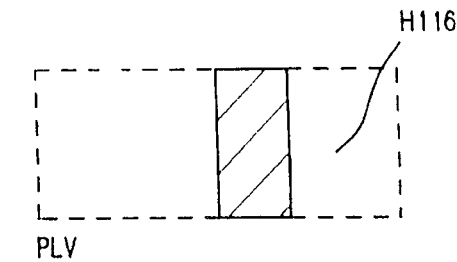
Figure 19A:
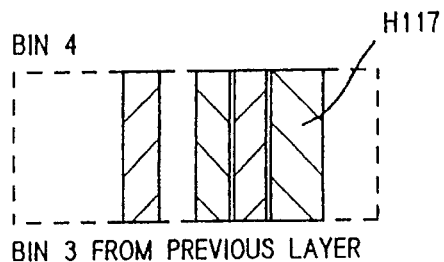
Figure 19A:
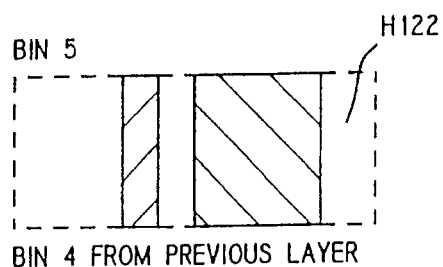
Figure 19A:
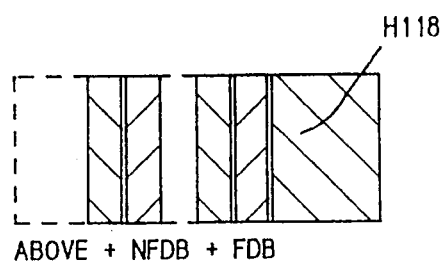
Figure 19A:
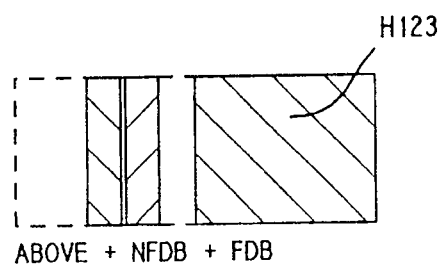
Figure 19A:
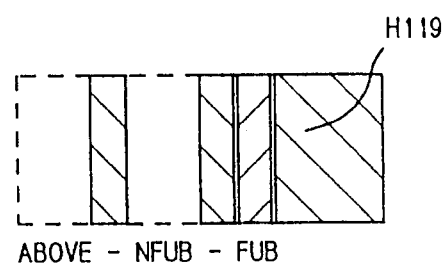
Figure 19A:
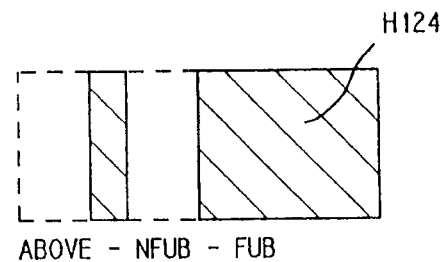
Figure 19A:
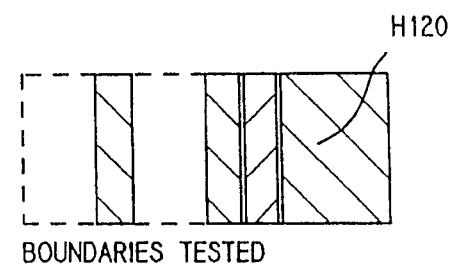
Figure 19A:
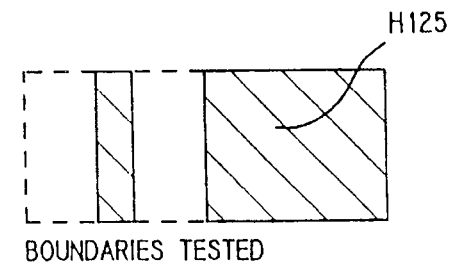
Figure 19A:
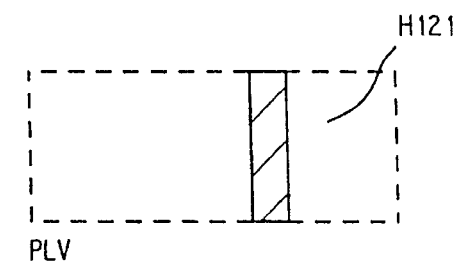
Figure 19A:
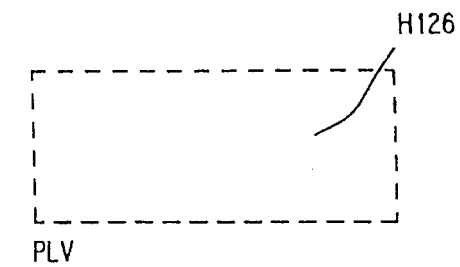
Figure 19A:
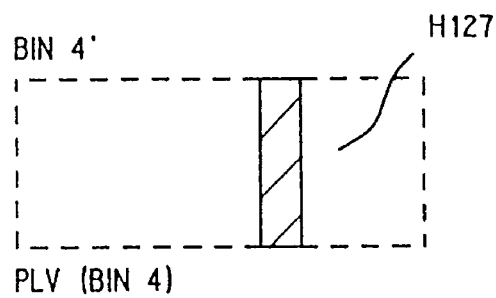
Figure 19A:
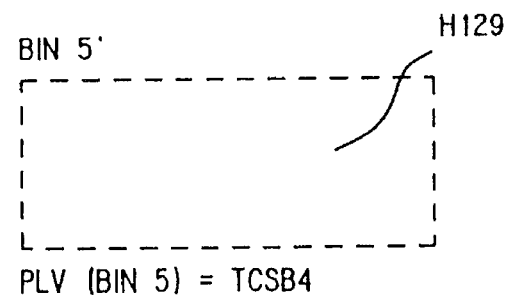
Figure 19A:
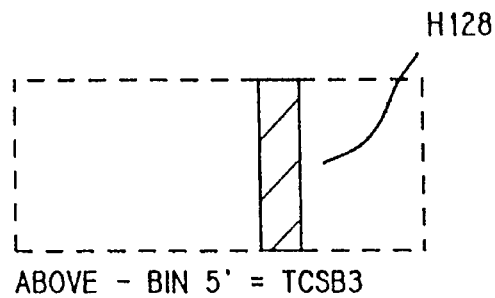
Figure 19A:
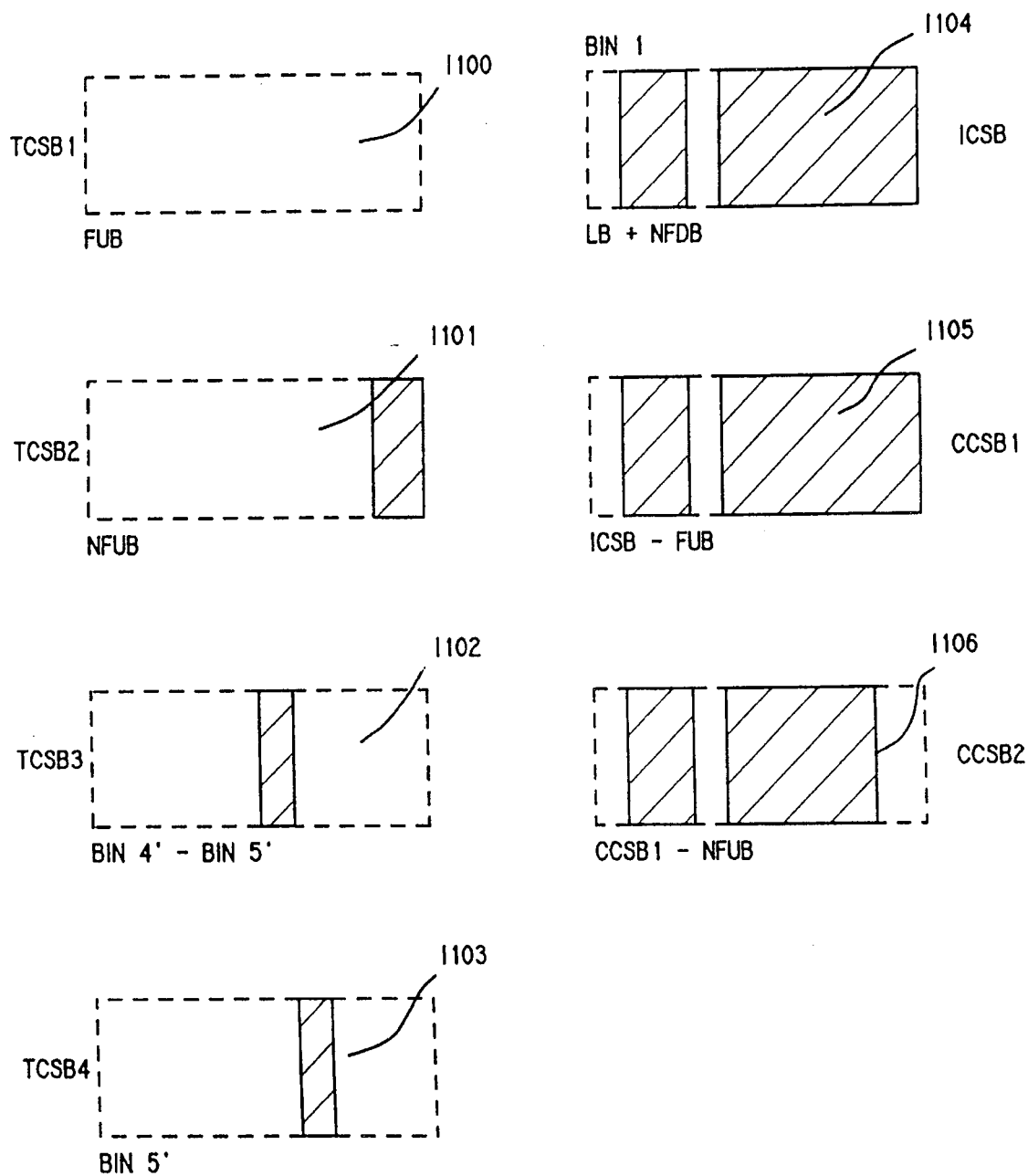
Figure 19A:
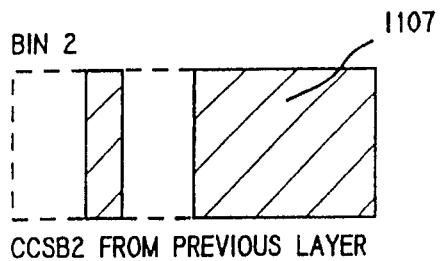
Figure 19A:
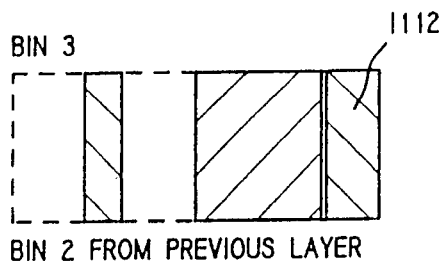
Figure 19A:
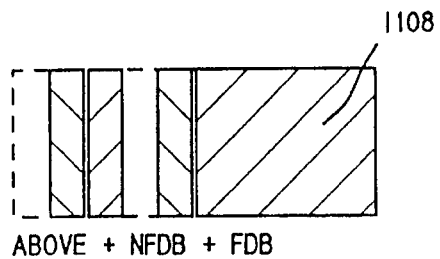
Figure 19A:
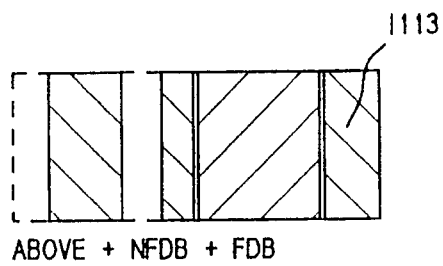
Figure 19A:
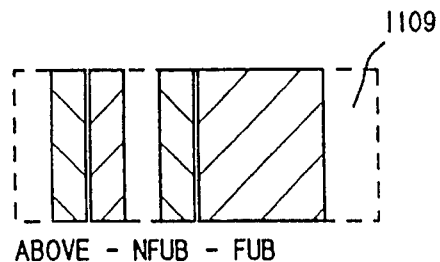
Figure 19A:
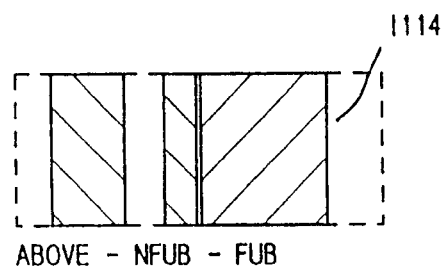
Figure 19A:
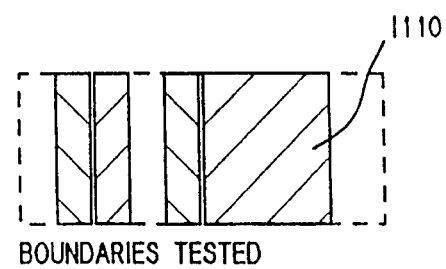
Figure 19A:
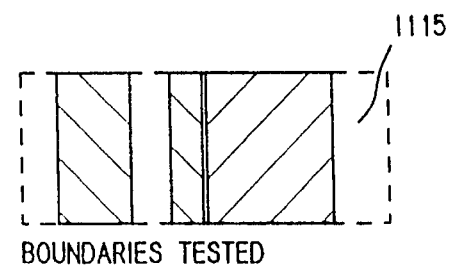
Figure 19A:
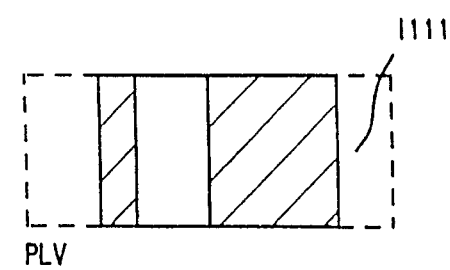
Figure 19A:
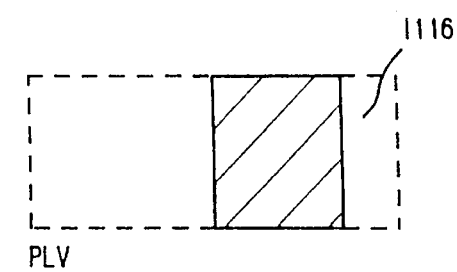
Figure 19A:
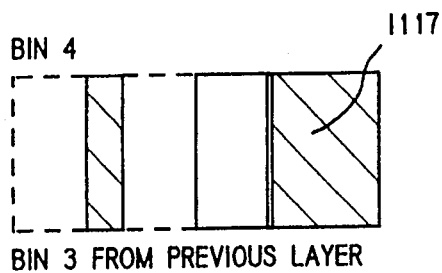
Figure 19A:
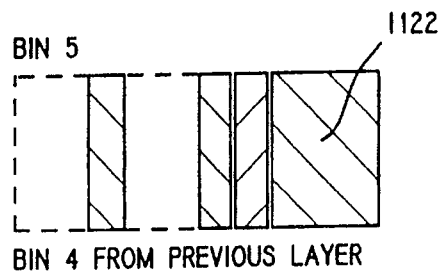
Figure 19A:
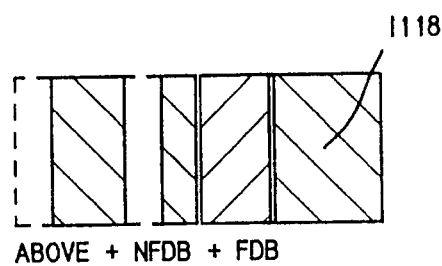
Figure 19A:
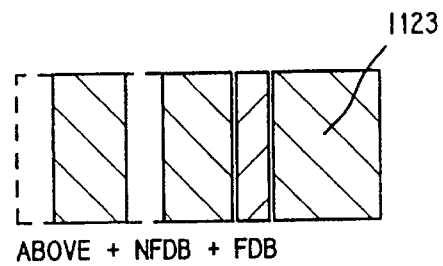
Figure 19A:
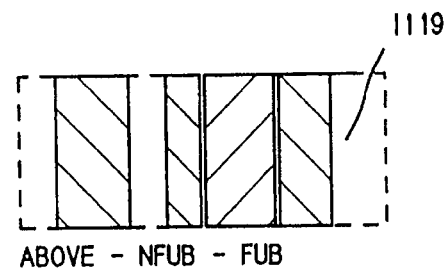
Figure 19A:
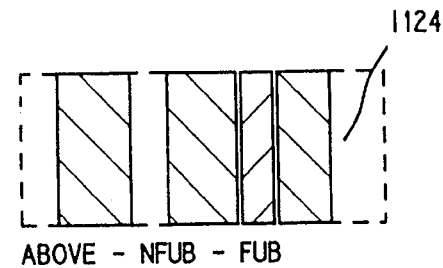
Figure 19A:
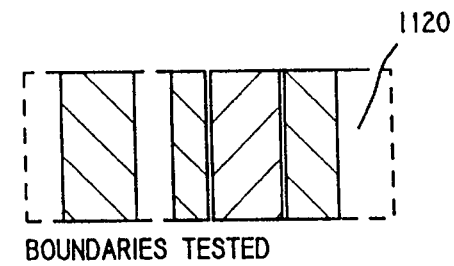
Figure 19A:
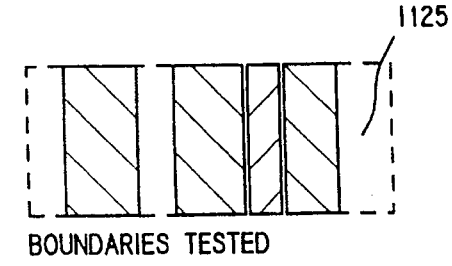
Figure 19A:
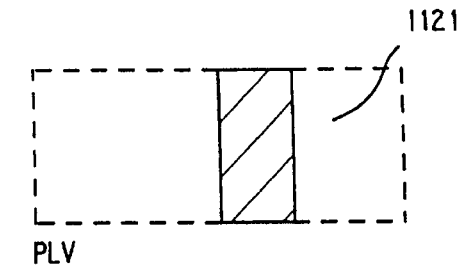
Figure 19A:
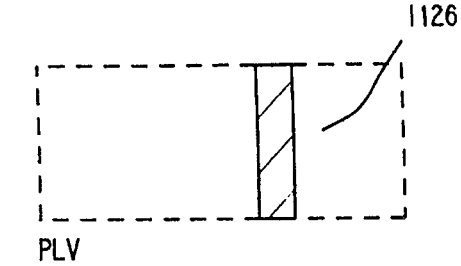
Figure 19A:
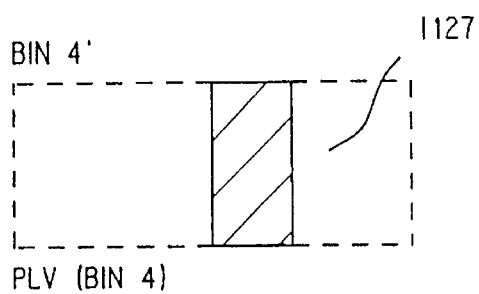
Figure 19A:
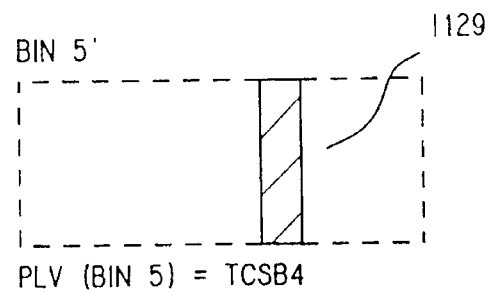
Figure 19A:
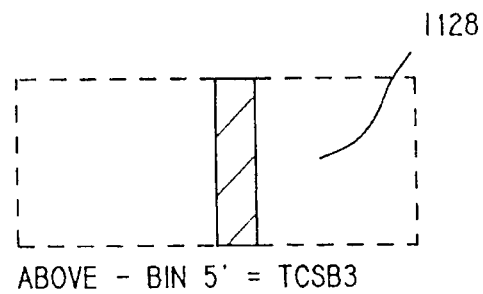
Figure 19A:
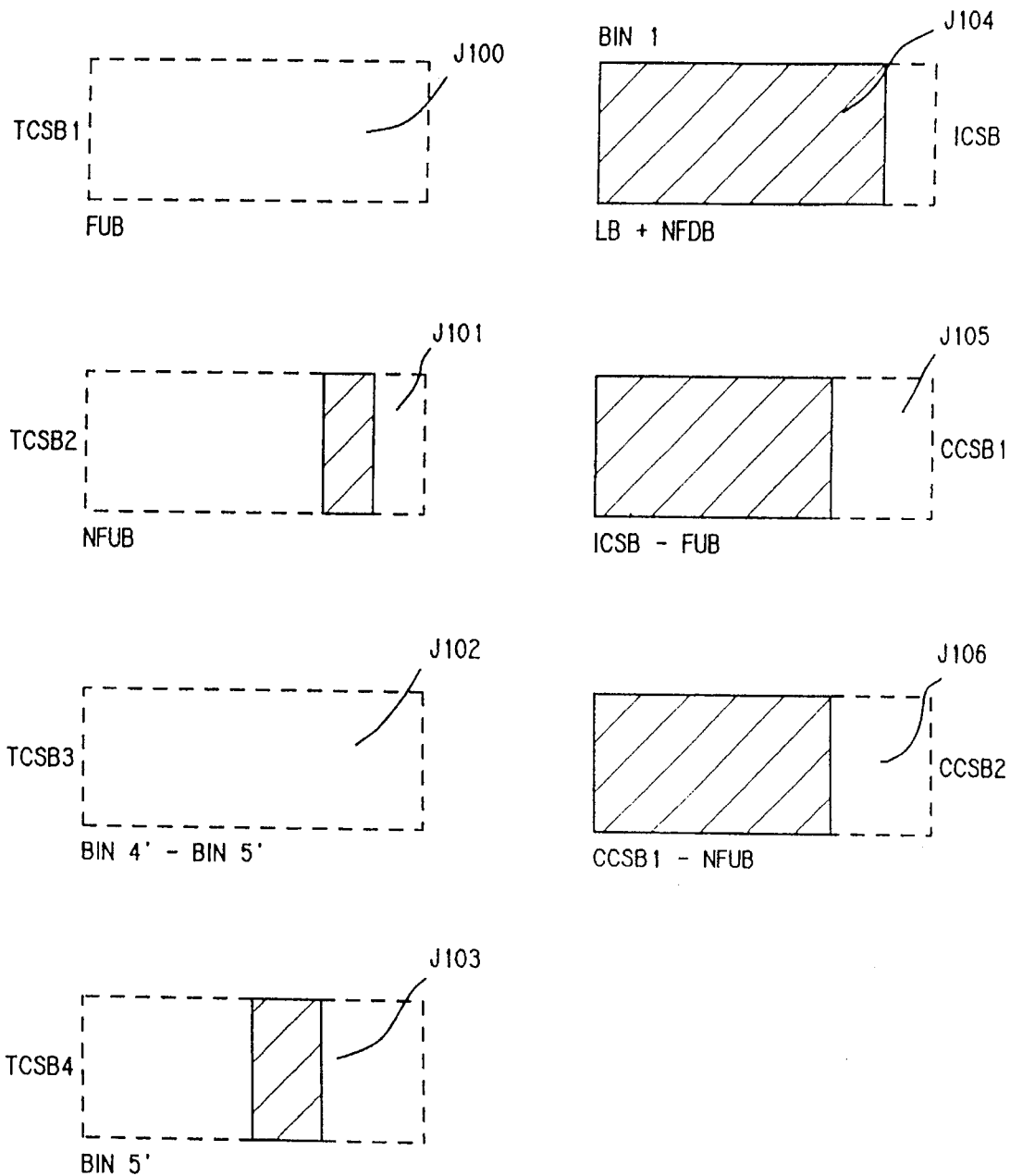
Figure 19A:
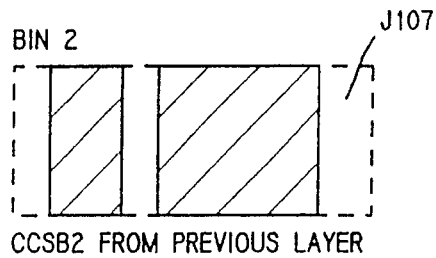
Figure 19A:
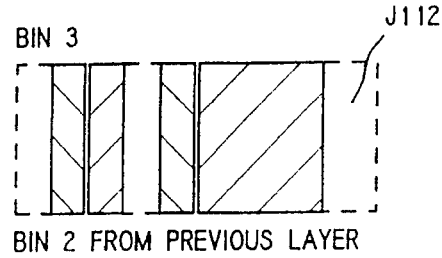
Figure 19A:
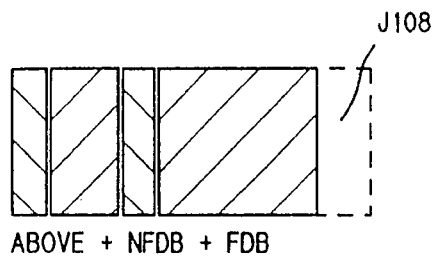
Figure 19A:
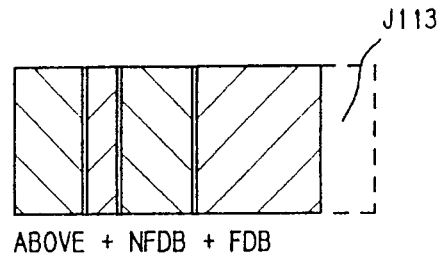
Figure 19A:
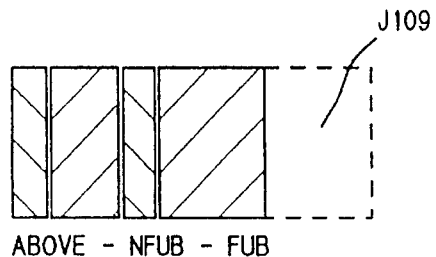
Figure 19A:
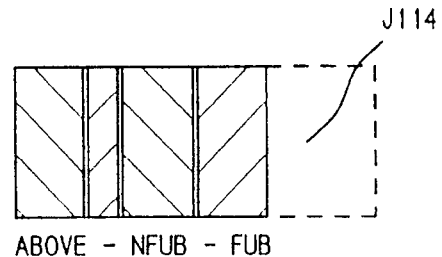
Figure 19A:
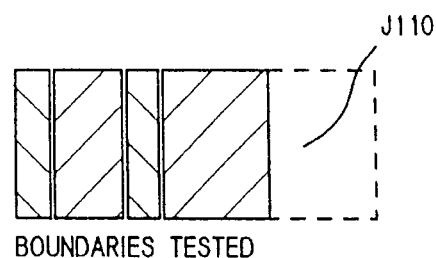
Figure 19A:
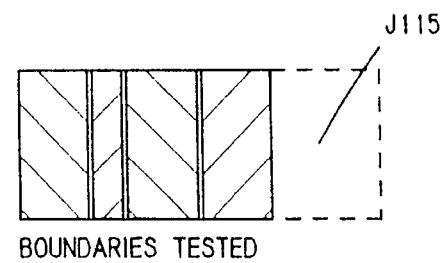
Figure 19A:
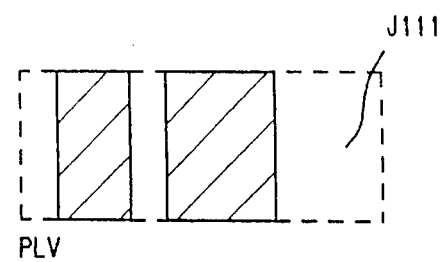
Figure 19A:
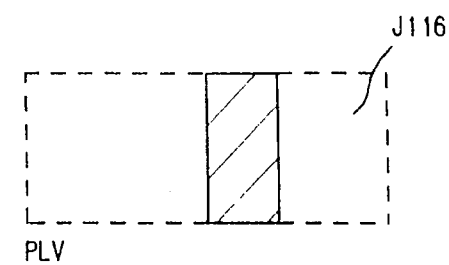
Figure 19A:
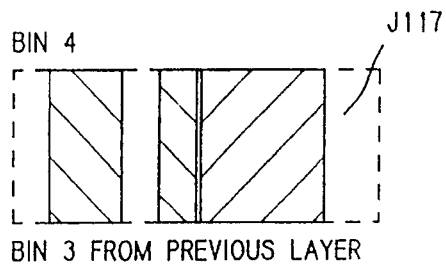
Figure 19A:
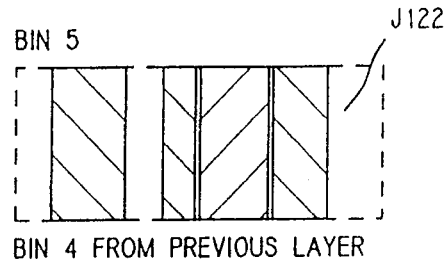
Figure 19A:
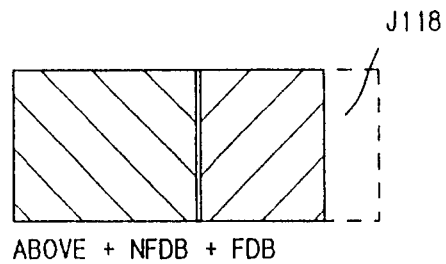
Figure 19A:
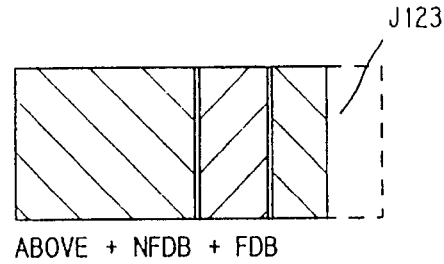
Figure 19A:
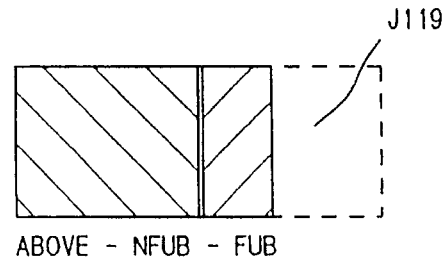
Figure 19A:
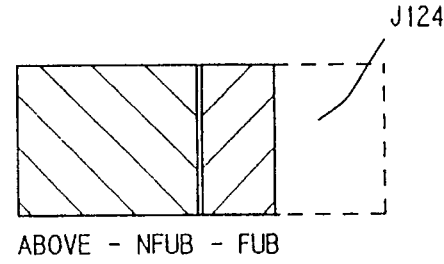
Figure 19A:
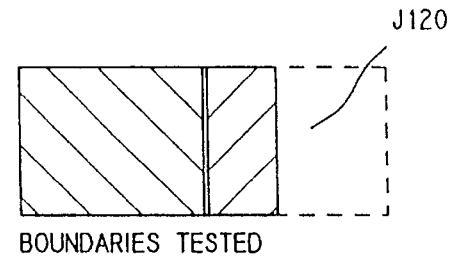
Figure 19A:
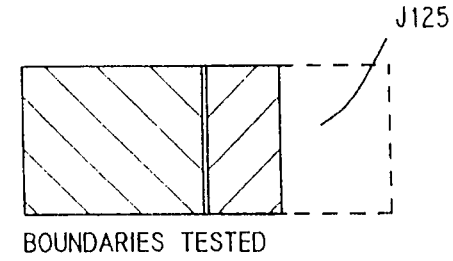
Figure 19A:
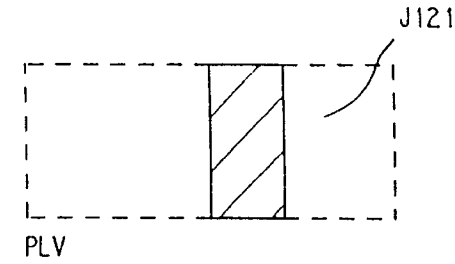
Figure 19A:
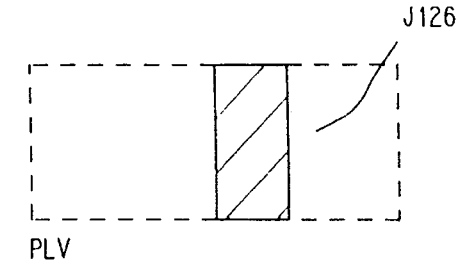
Figure 19A:
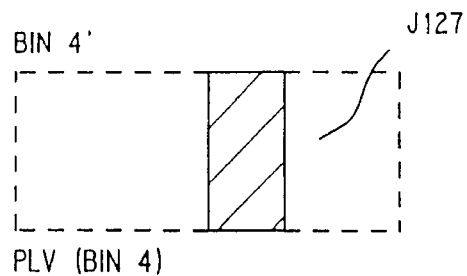
Figure 19A:
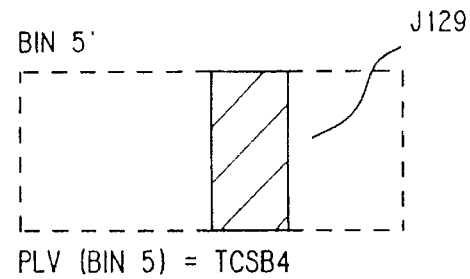
Figure 19A:
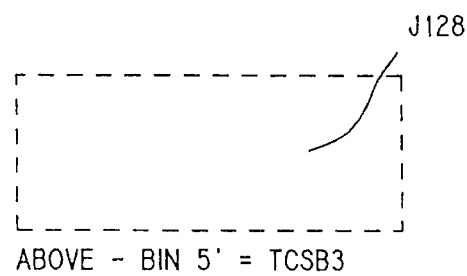
Figure 19A:
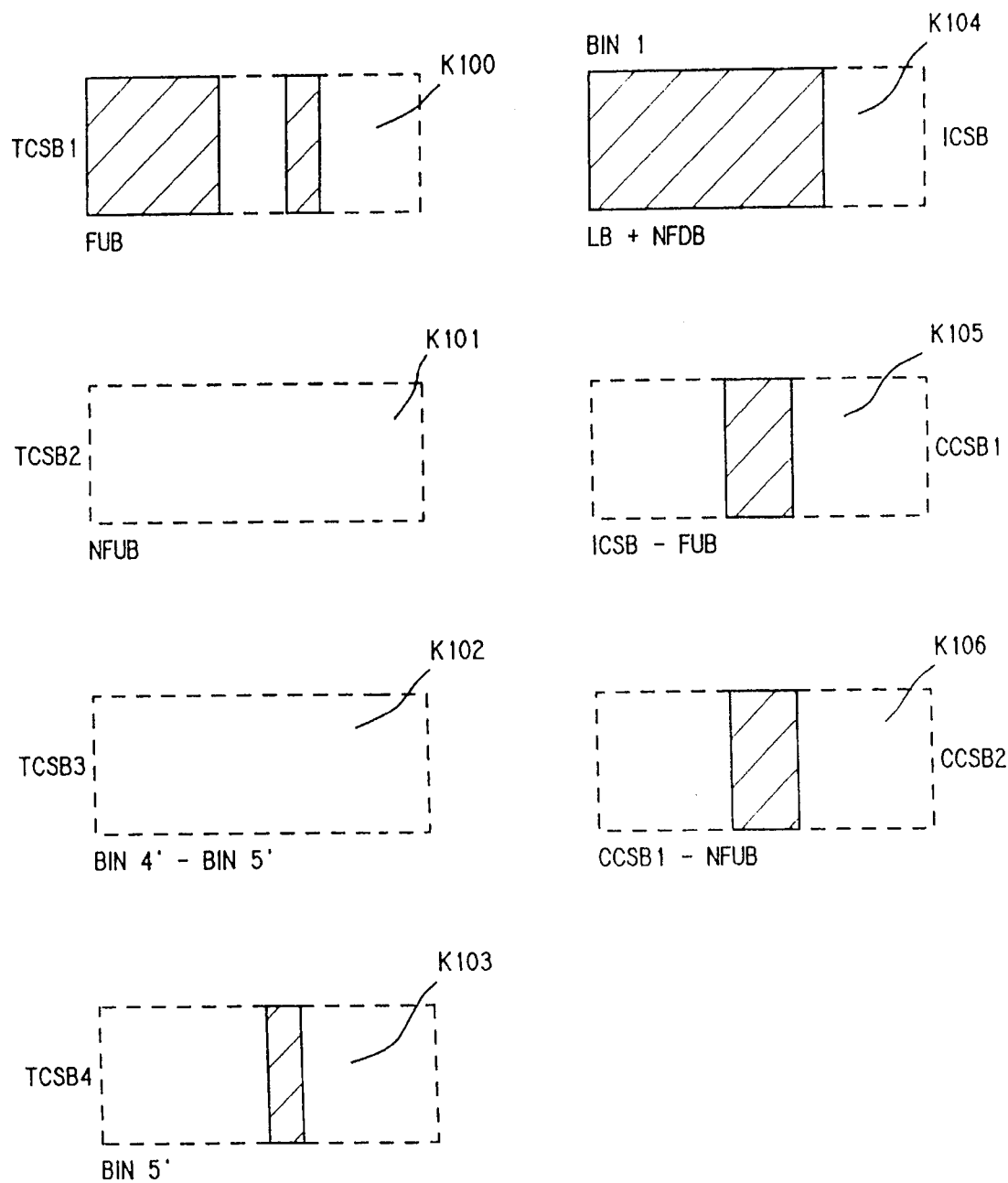
Figure 19A:
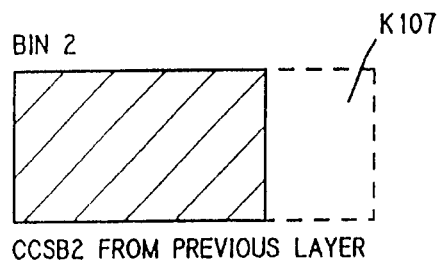
Figure 19A:
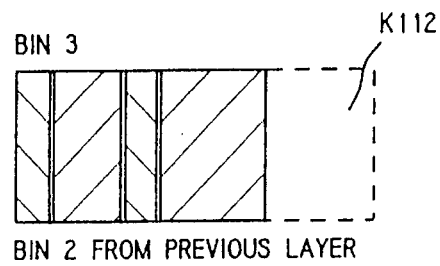
Figure 19A:
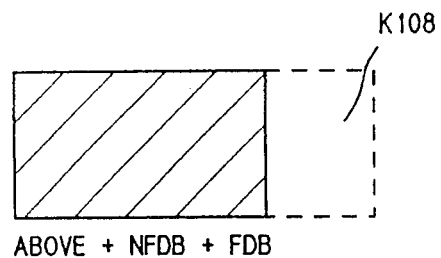
Figure 19A:
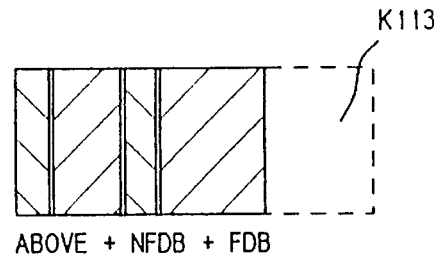
Figure 19A:
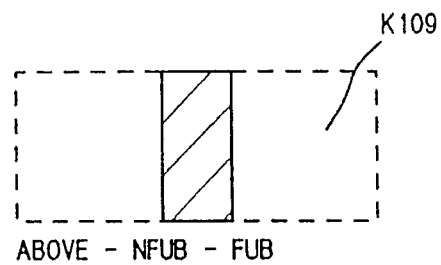
Figure 19A:
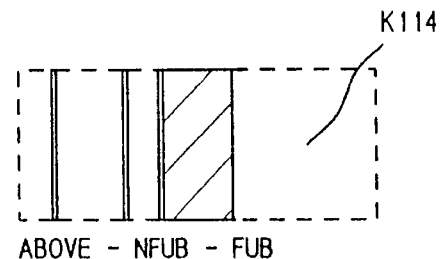
Figure 19A:
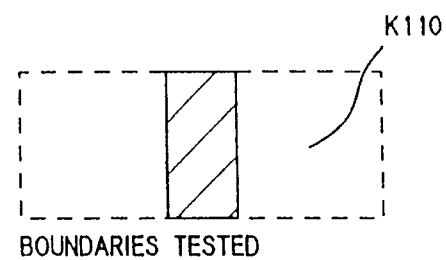
Figure 19A:
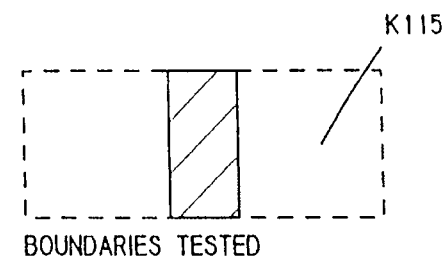
Figure 19A:
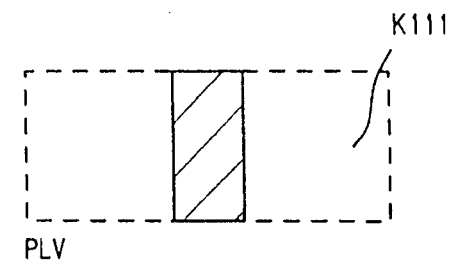
Figure 19A:
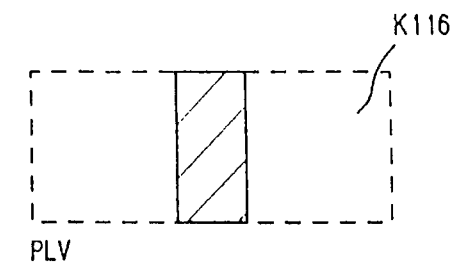
Figure 19A:
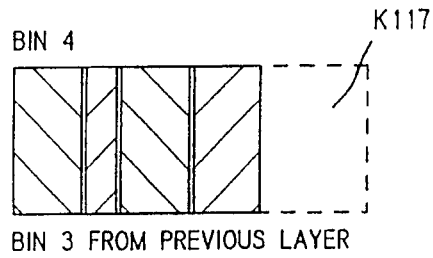
Figure 19A:
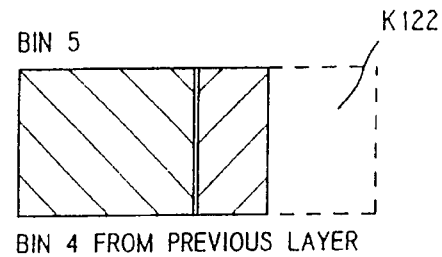
Figure 19A:
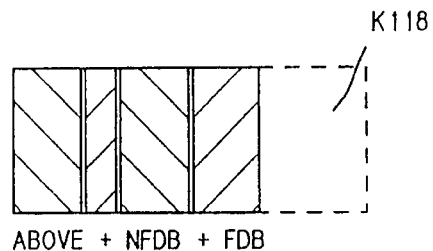
Figure 19A:
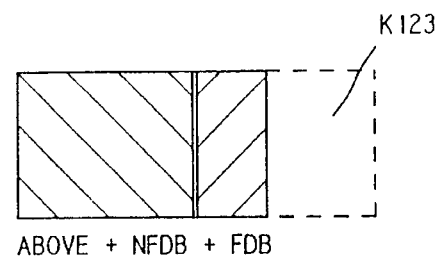
Figure 19A:
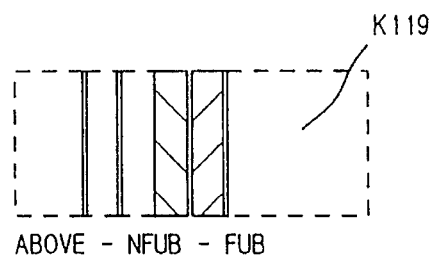
Figure 19A:
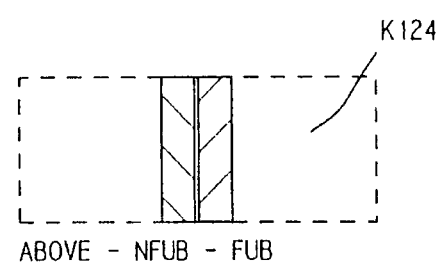
Figure 19A:
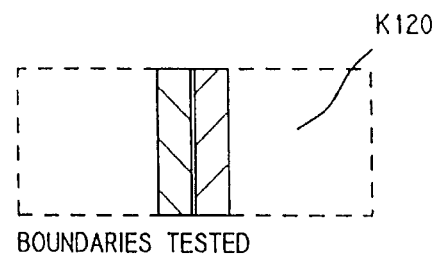
Figure 19A:
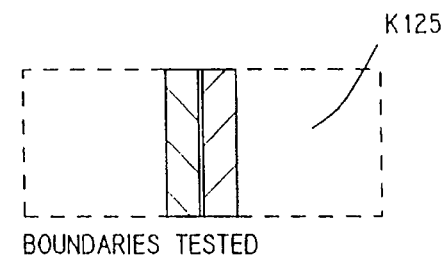
Figure 19A:
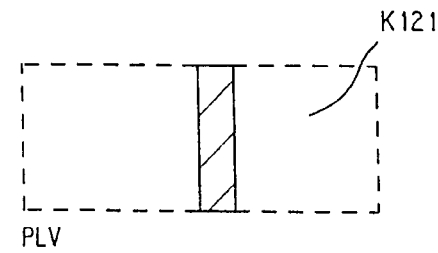
Figure 19A:
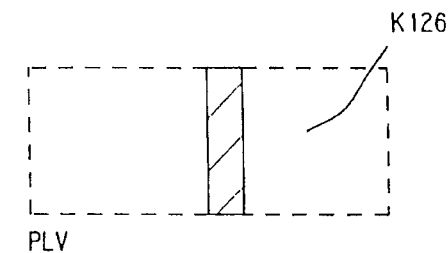
Figure 19A:
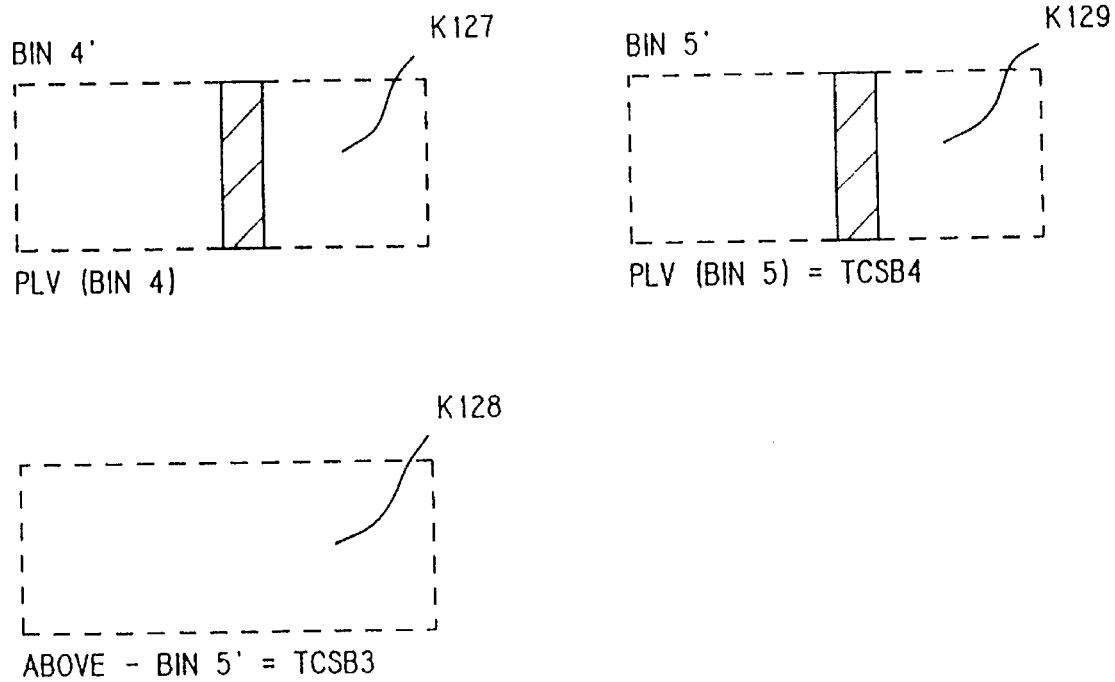
Figure 19A:
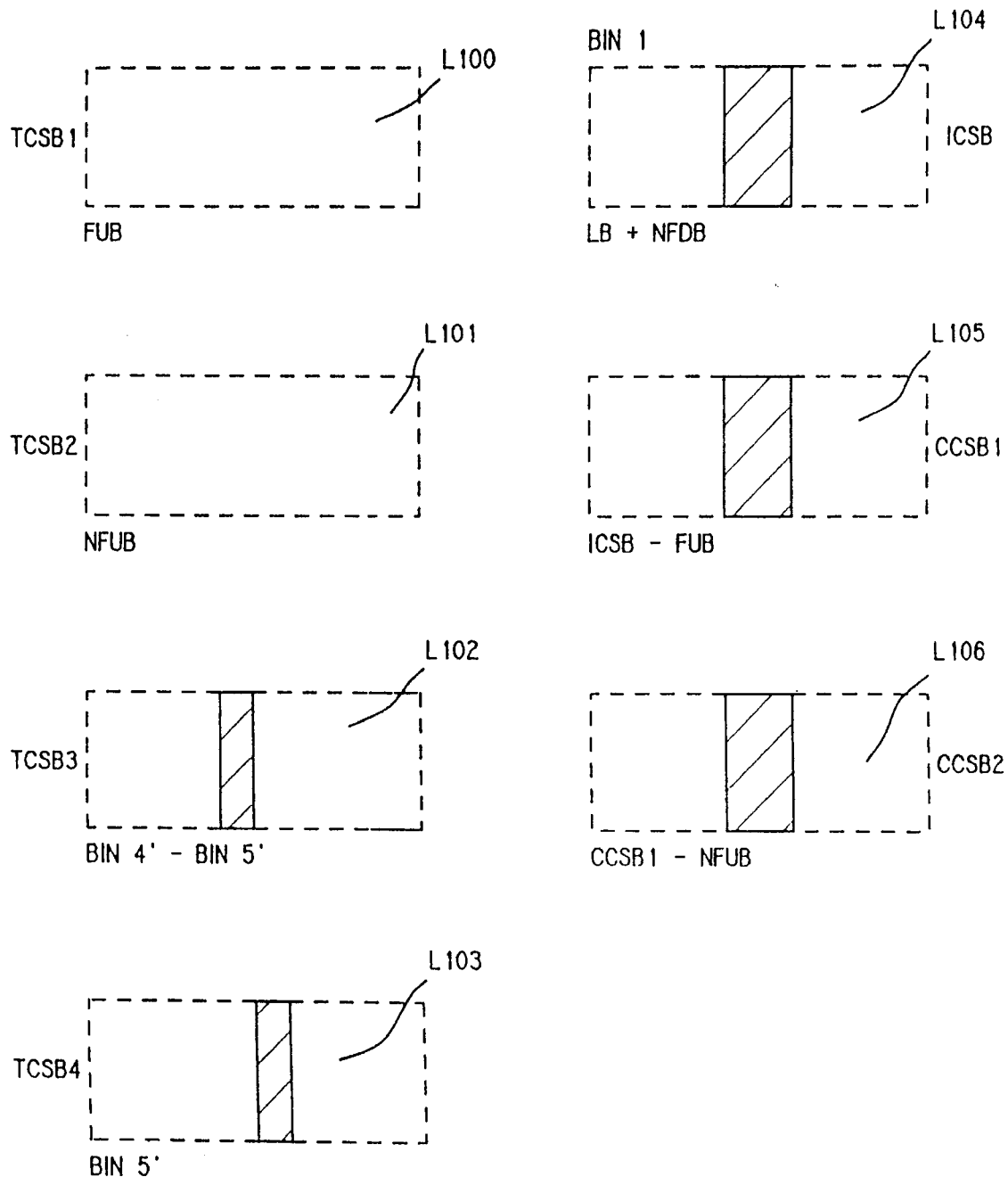
Figure 19A:
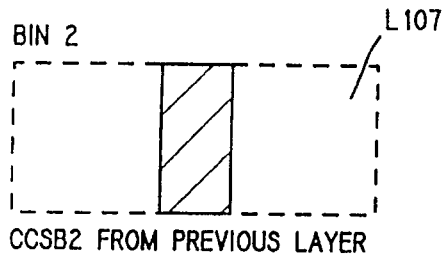
Figure 19A:
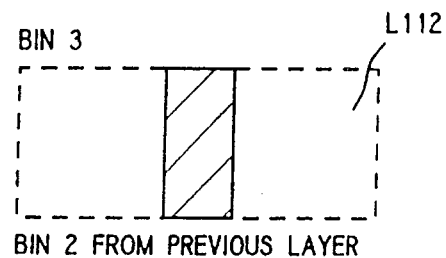
Figure 19A:
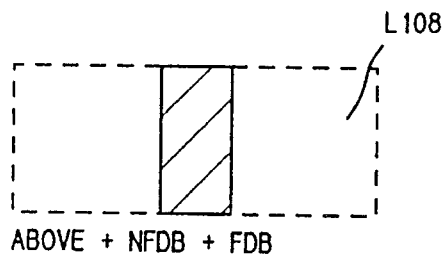
Figure 19A:
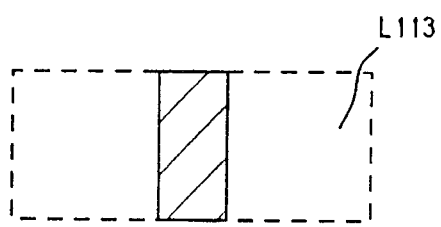
Figure 19A:
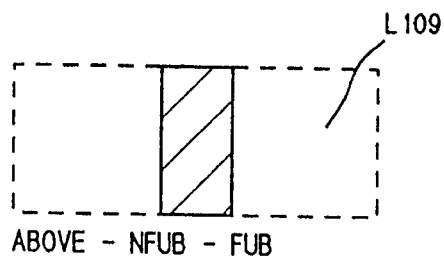
Figure 19A:
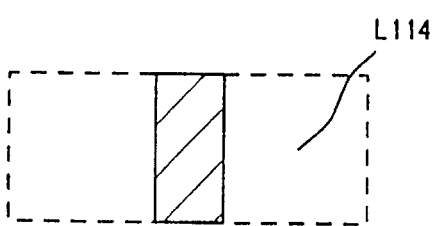
Figure 19A:
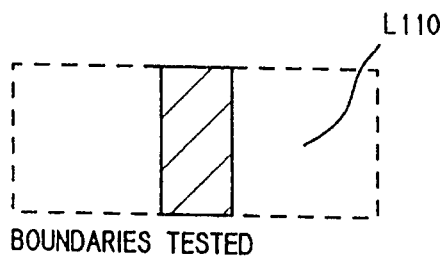
Figure 19A:
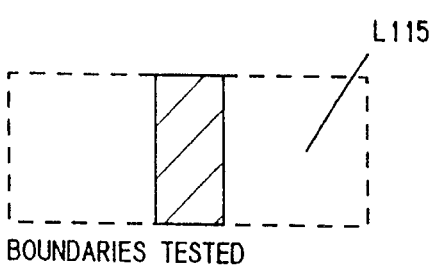
Figure 19A:
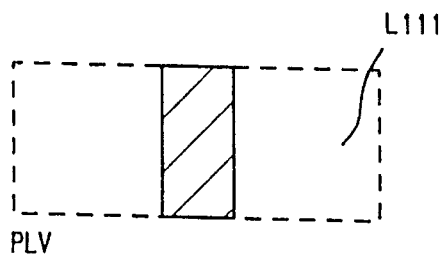
Figure 19A:
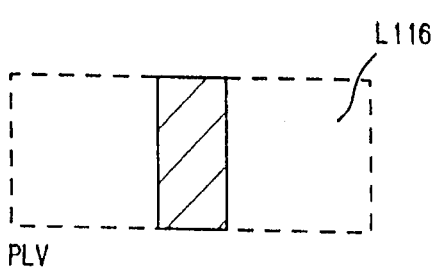
Figure 19A:
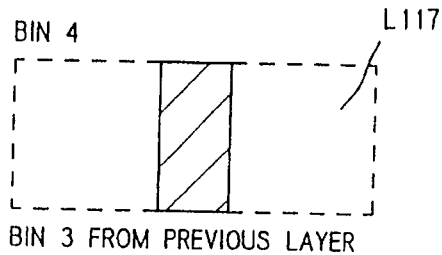
Figure 19A:
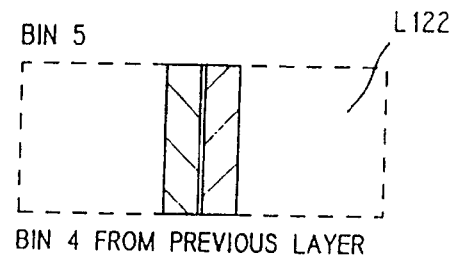
Figure 19A:
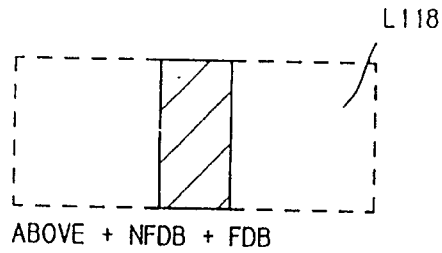
Figure 19A:
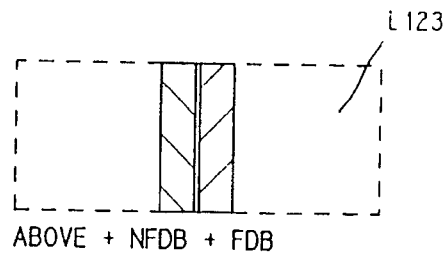
Figure 19A:
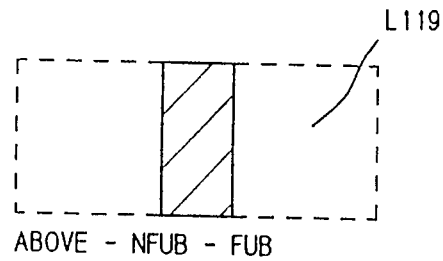
Figure 19A:
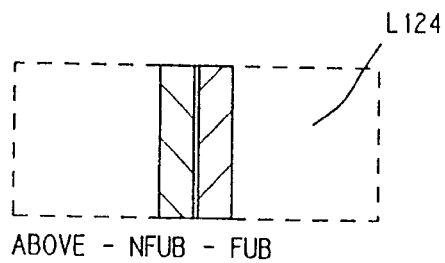
Figure 19A:
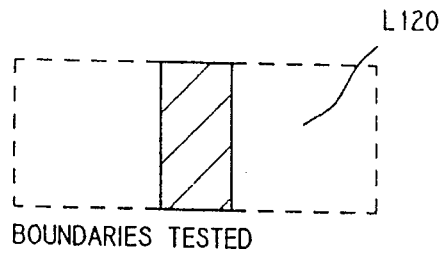
Figure 19A:
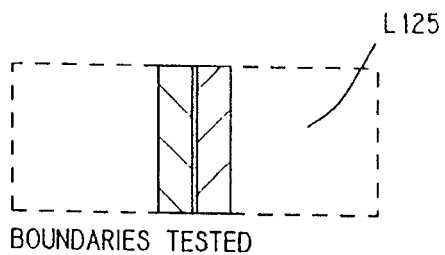
Figure 19A:
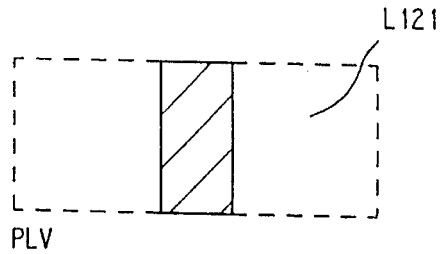
Figure 19A:
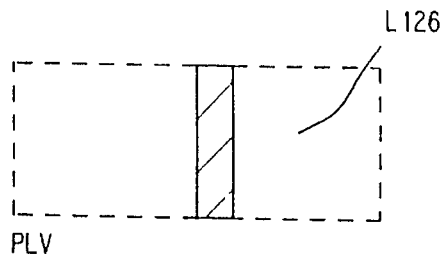
Figure 19A:
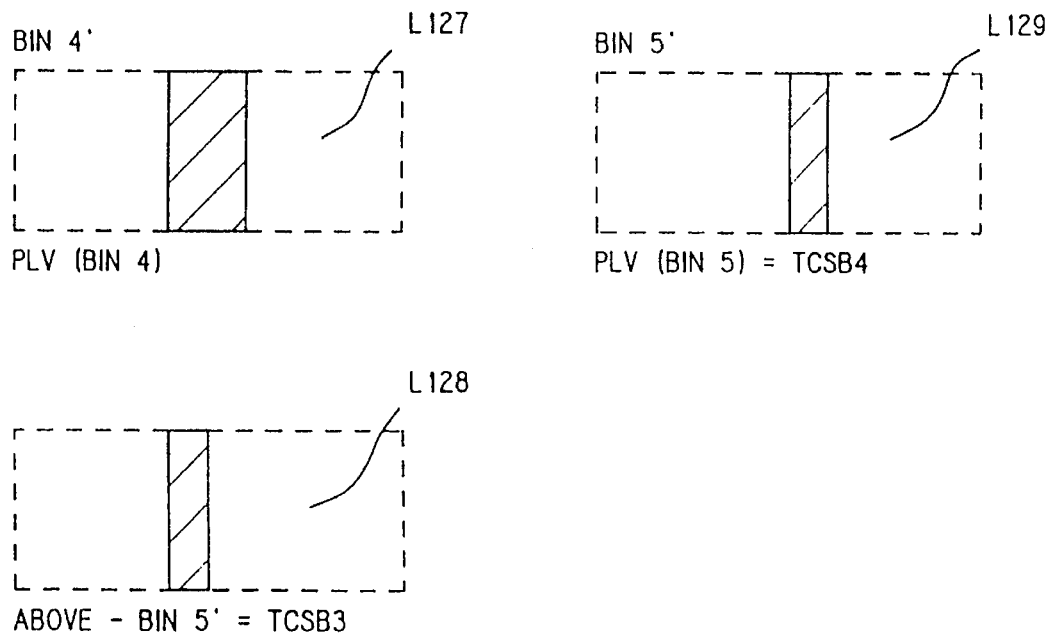
Figure 19A:
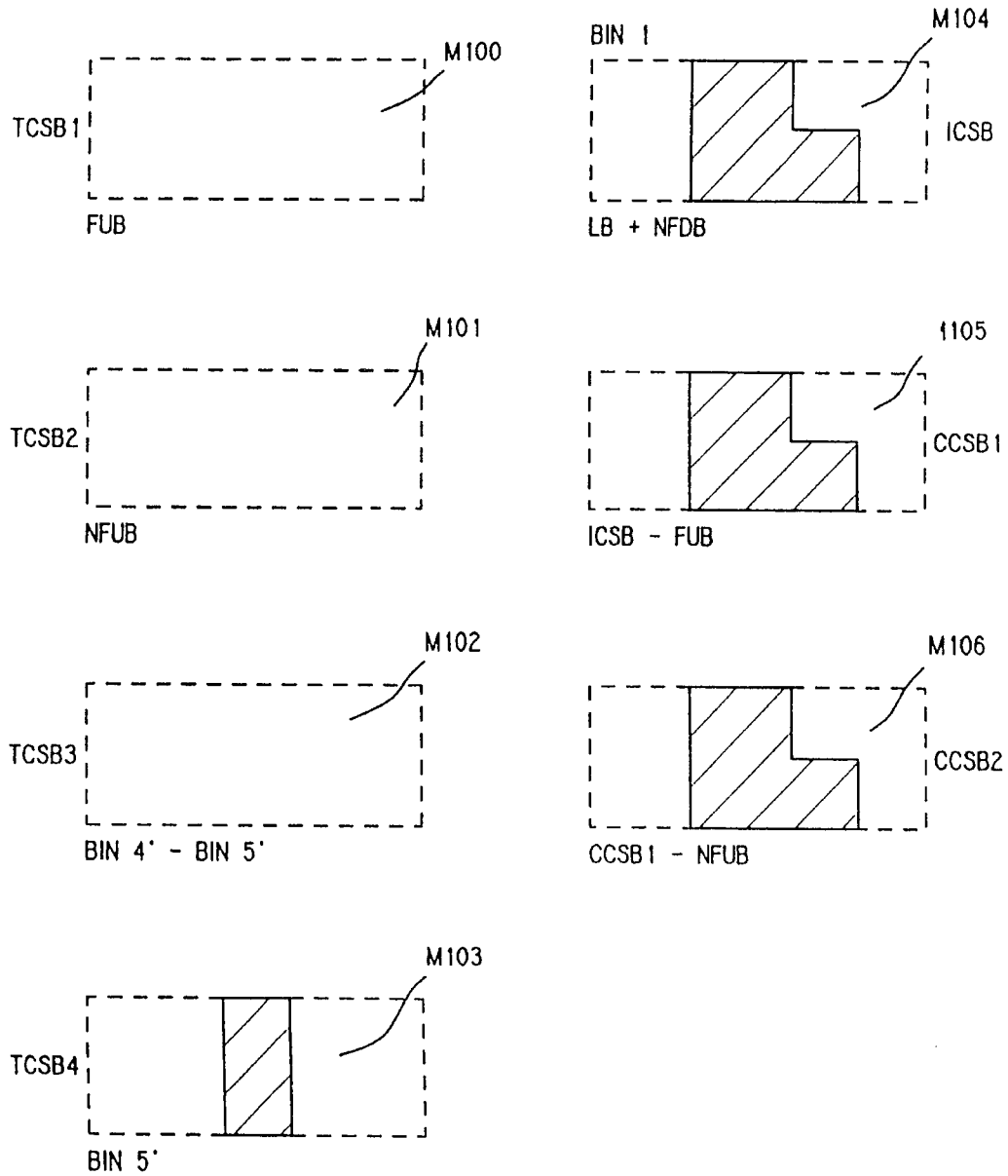
Figure 19A:
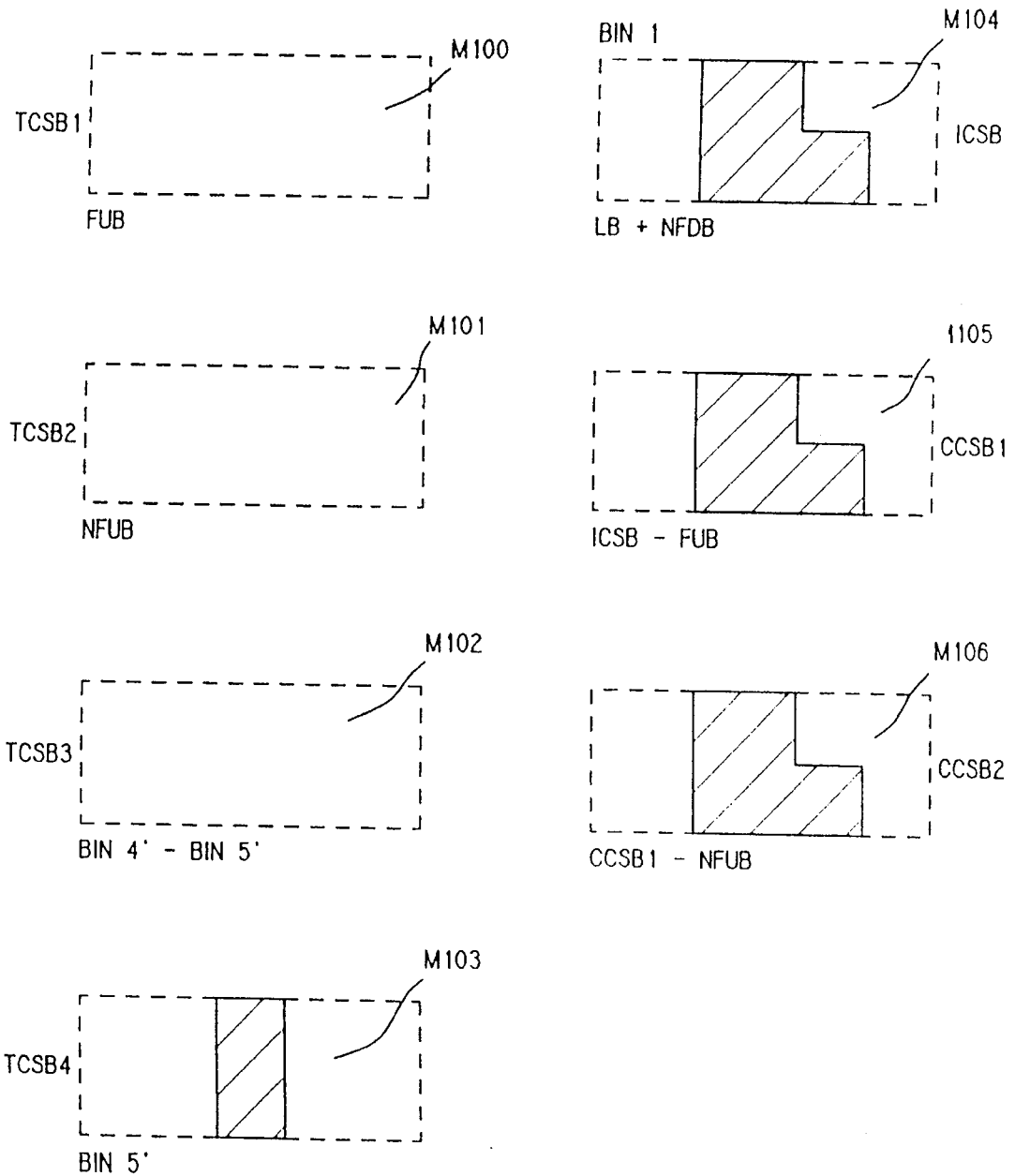
Figure 19A:
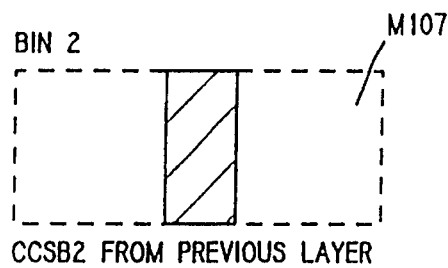
Figure 19A:
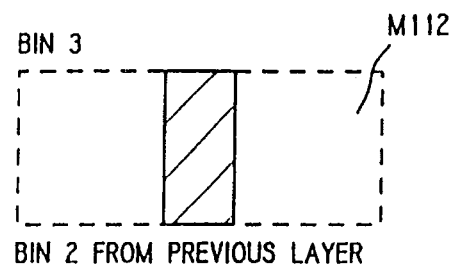
Figure 19A:
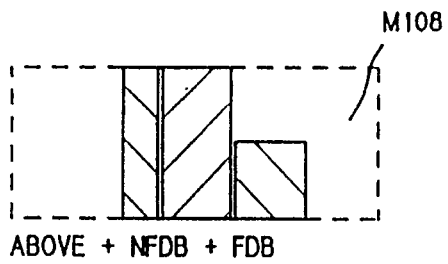
Figure 19A:
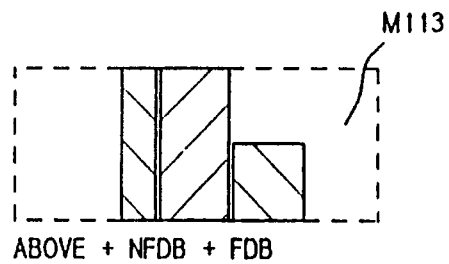
Figure 19A:
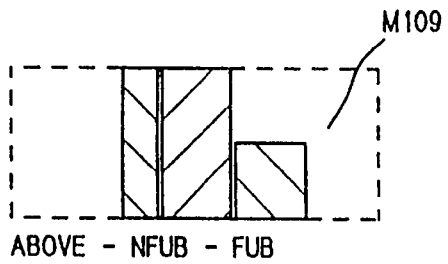
Figure 19A:
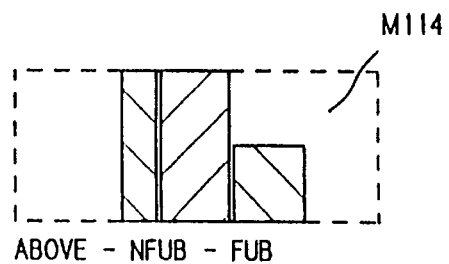
Figure 19A:
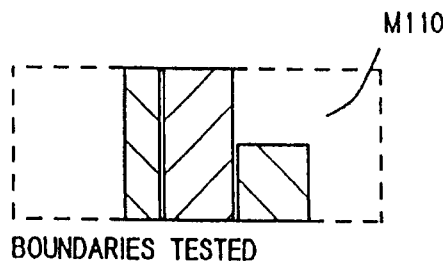
Figure 19A:
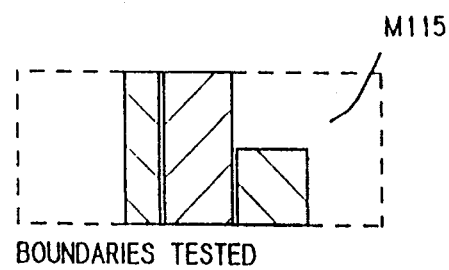
Figure 19A:
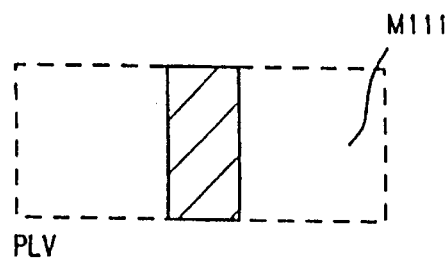
Figure 19A:
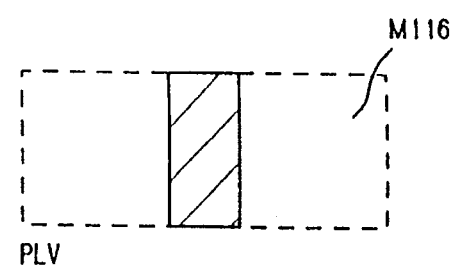
Figure 19A:
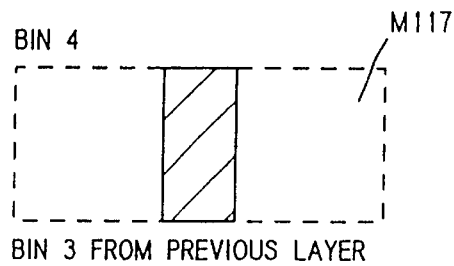
Figure 19A:
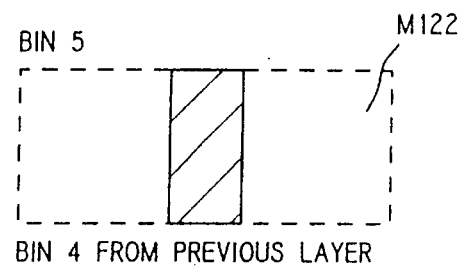
Figure 19A:
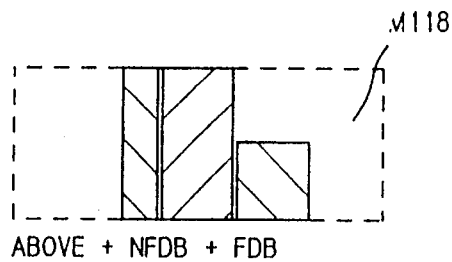
Figure 19A:
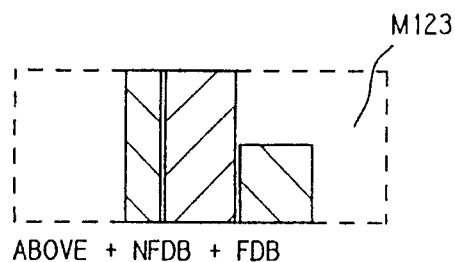
Figure 19A:
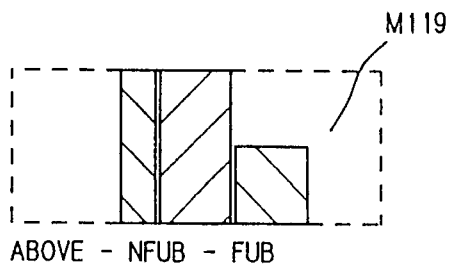
Figure 19A:
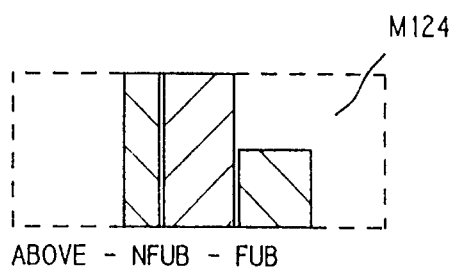
Figure 19A:
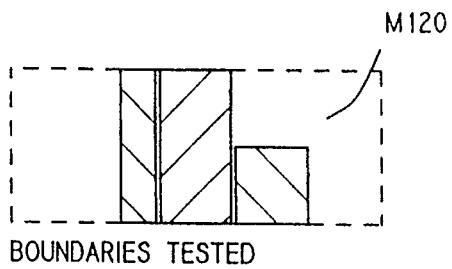
Figure 19A:
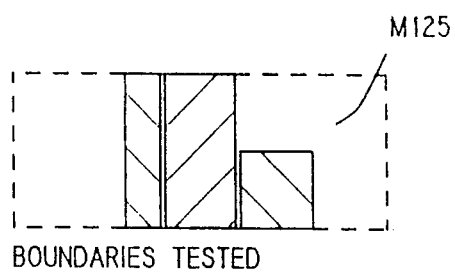
Figure 19A:
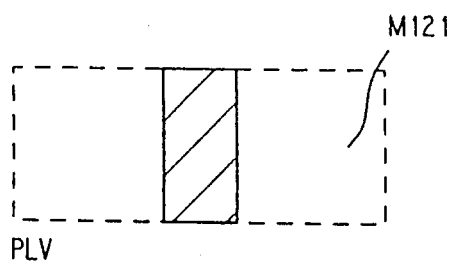
Figure 19A:
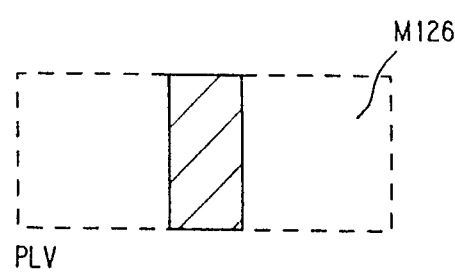
Figure 19A:
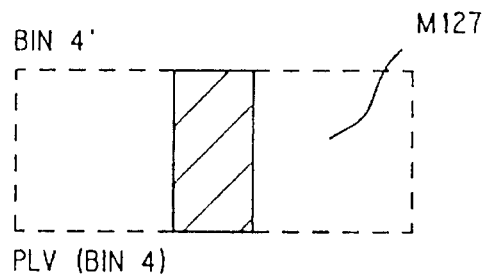
Figure 19A:
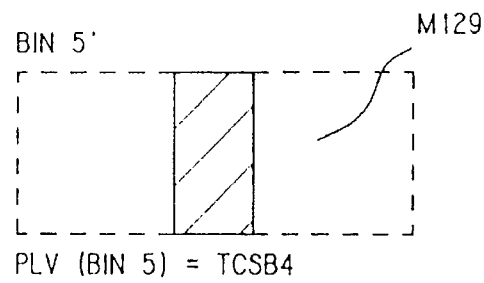
Figure 19A:
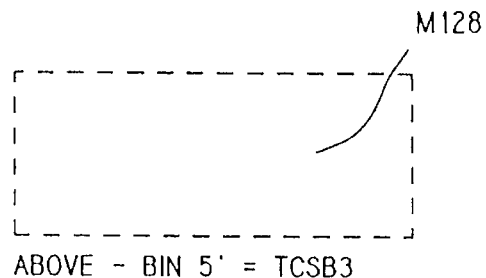
Figure 19B:
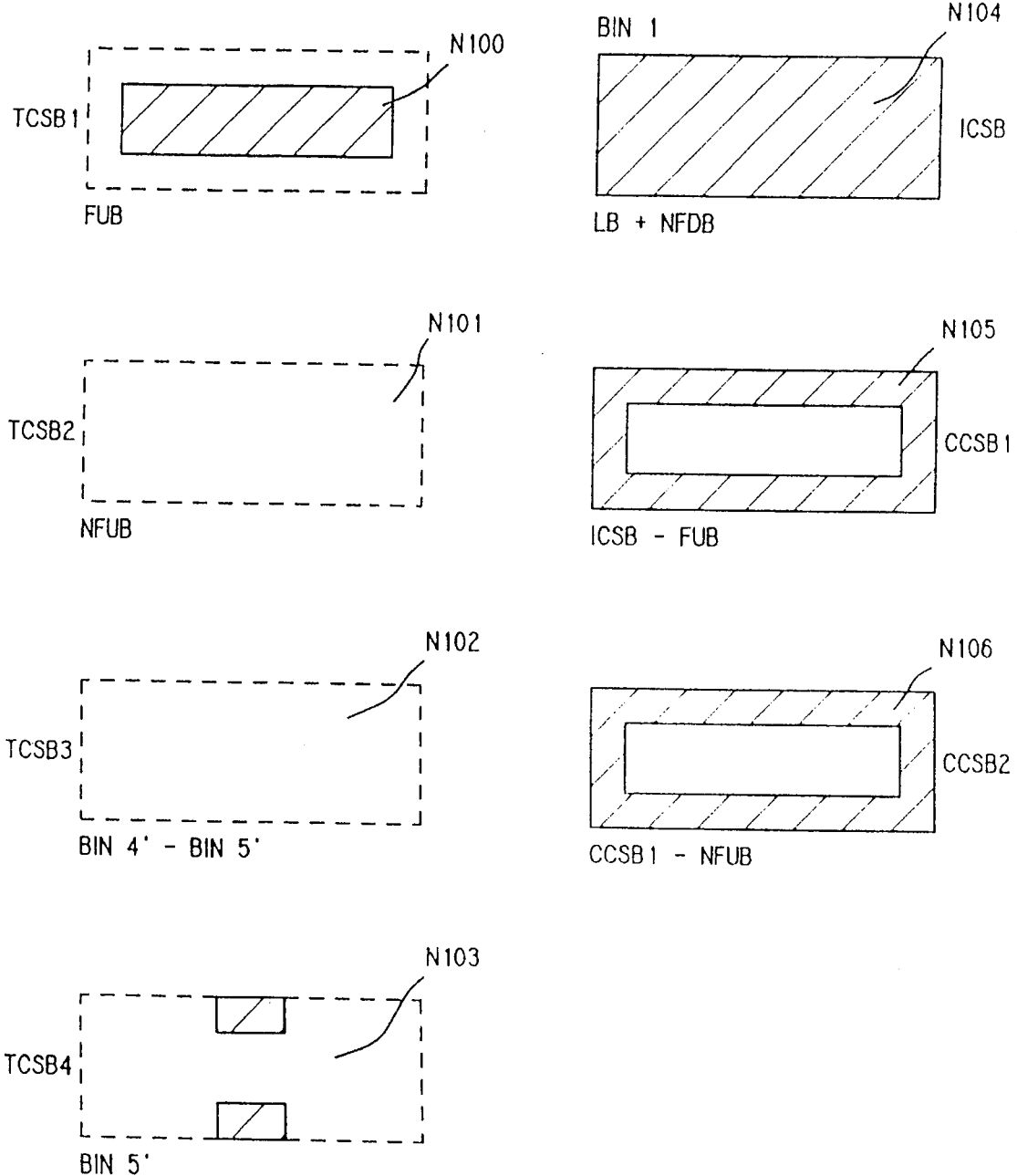
Figure 19B:
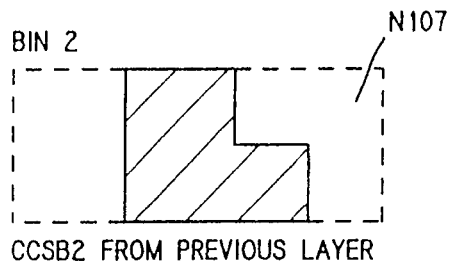
Figure 19B:
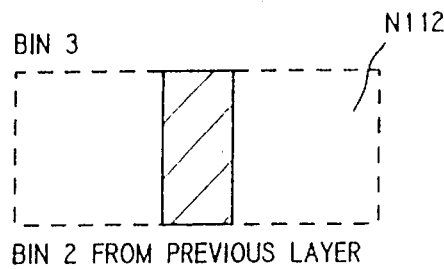
Figure 19B:
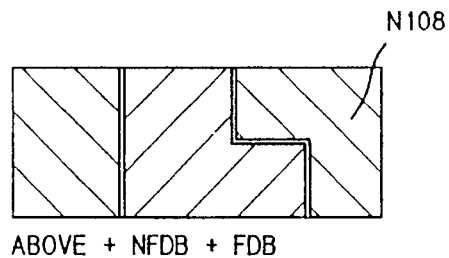
Figure 19B:
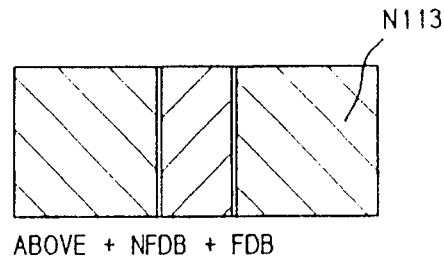
Figure 19B:
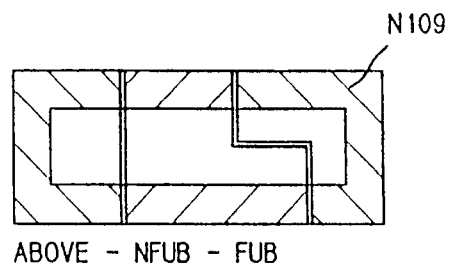
Figure 19B:
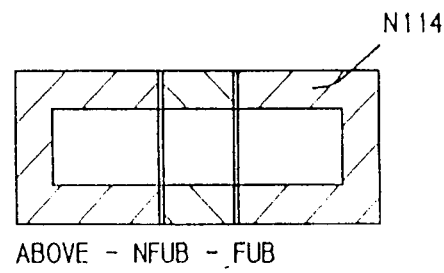
Figure 19B:
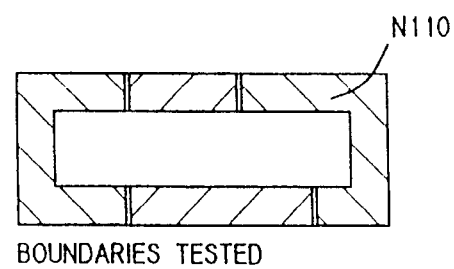
Figure 19B:
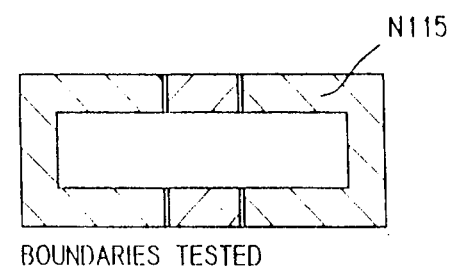
Figure 19B:
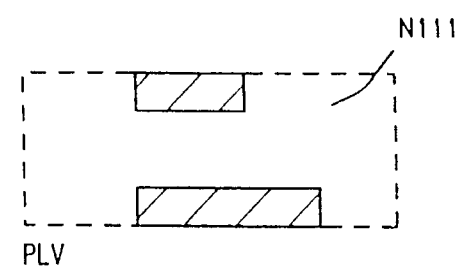
Figure 19B:
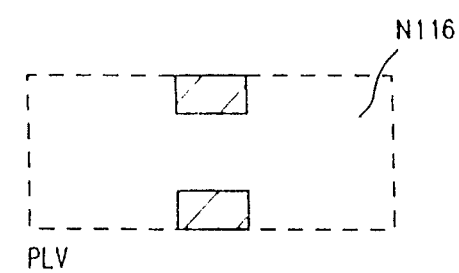
Figure 19B:
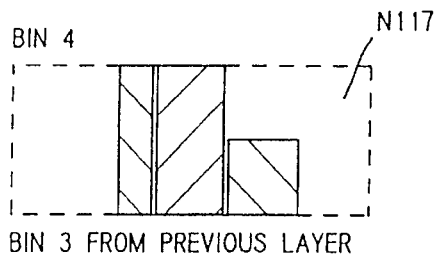
Figure 19B:
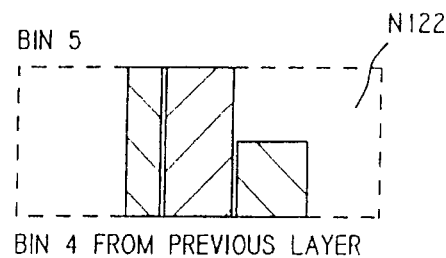
Figure 19B:
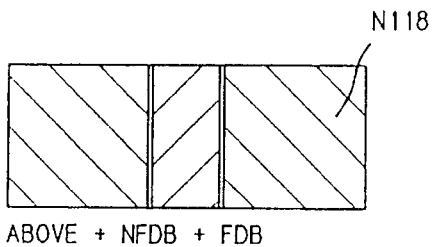
Figure 19B:
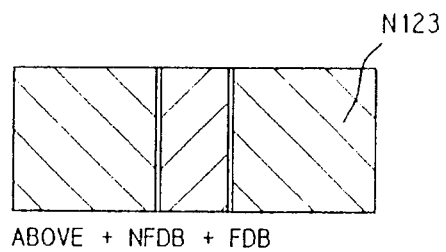
Figure 19B:
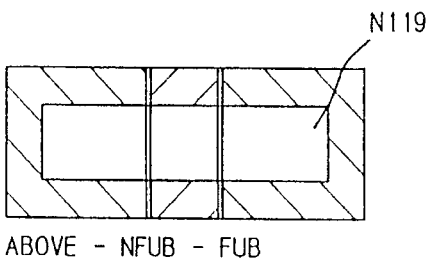
Figure 19B:
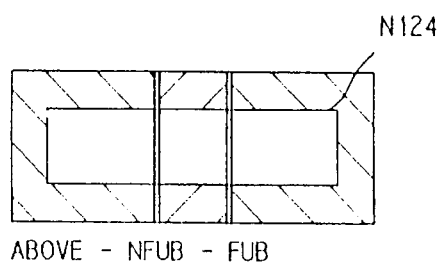
Figure 19B:
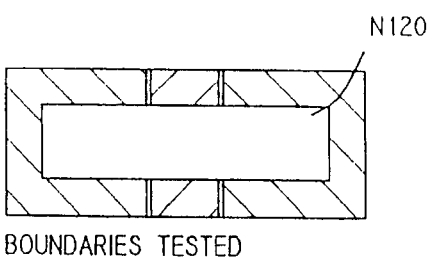
Figure 19B:
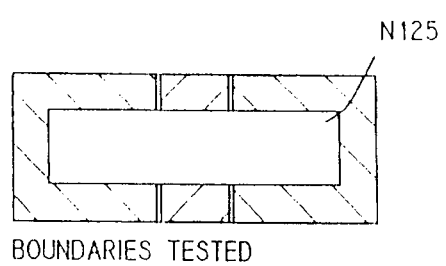
Figure 19B:
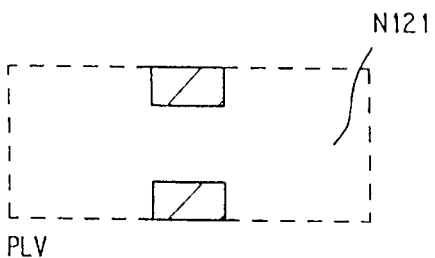
Figure 19B:
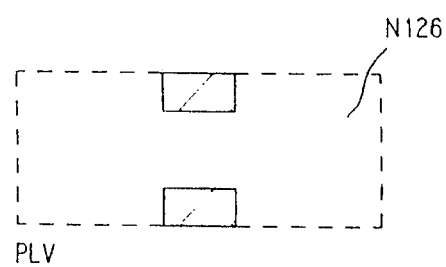
Figure 19B:
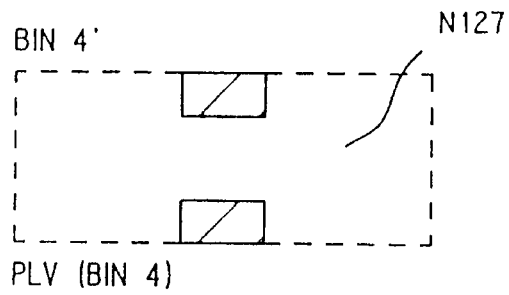
Figure 19B:
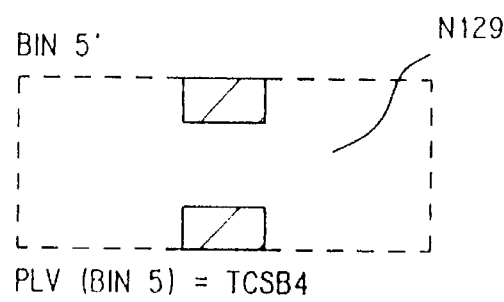
Figure 19B:
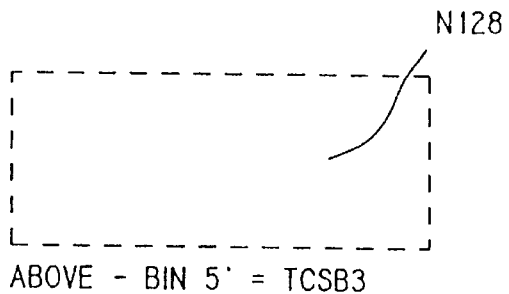
Figure 19B:
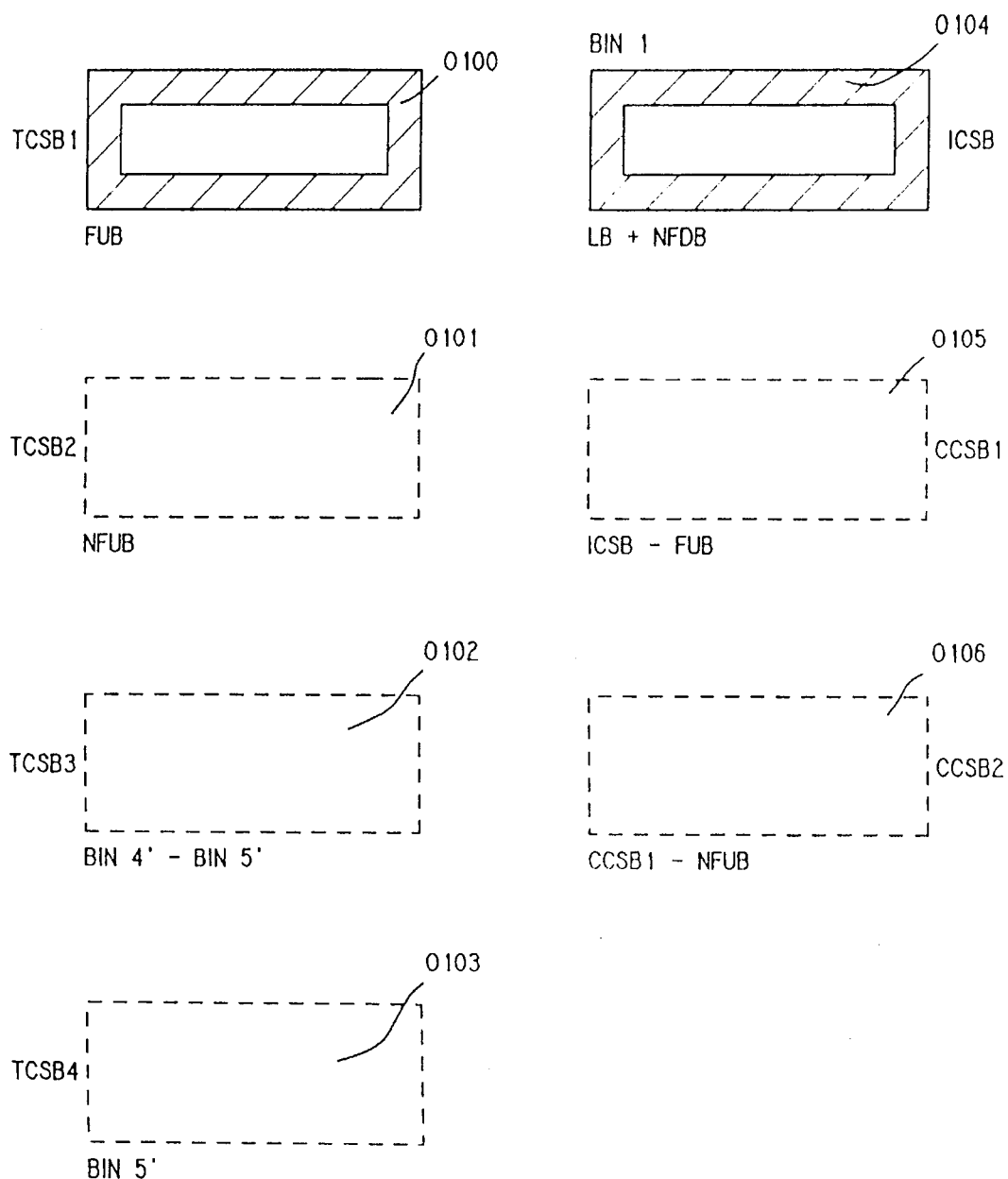
Figure 19B:
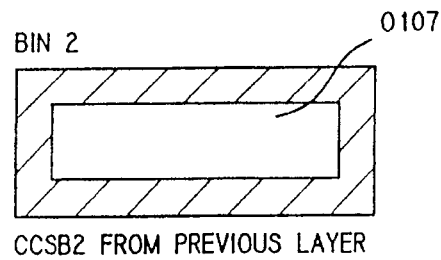
Figure 19B:
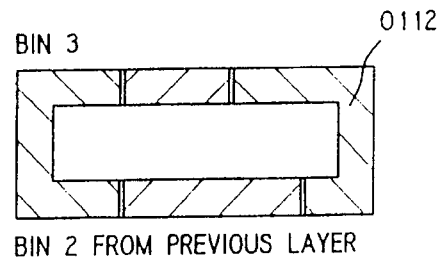
Figure 19B:
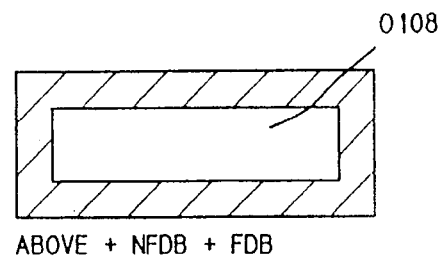
Figure 19B:
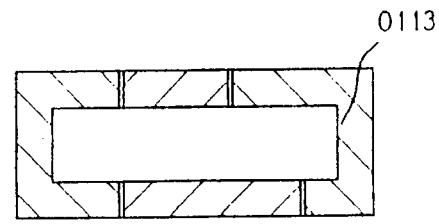
Figure 19B:
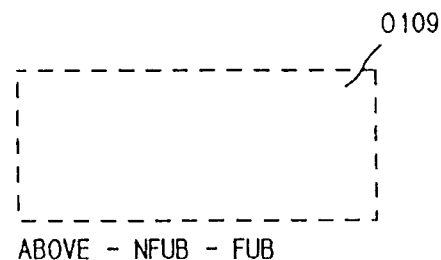
Figure 19B:
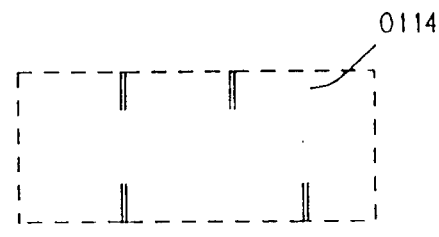
Figure 19B:
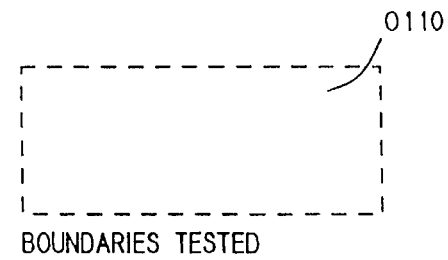
Figure 19B:
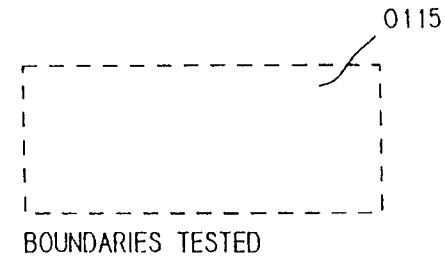
Figure 19B:
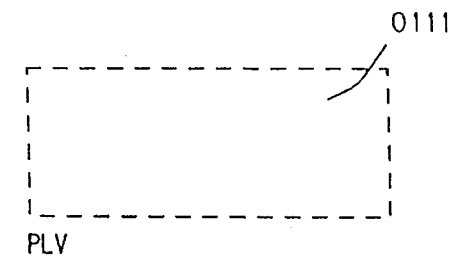
Figure 19B:
Figure 19B:
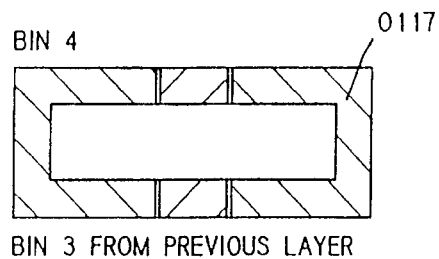
Figure 19B:
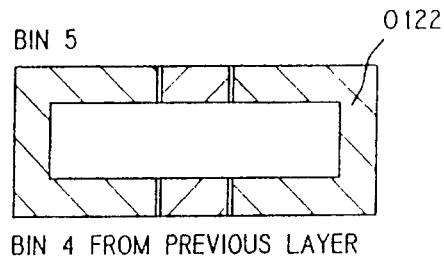
Figure 19B:
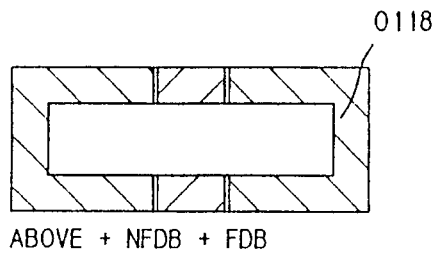
Figure 19B:
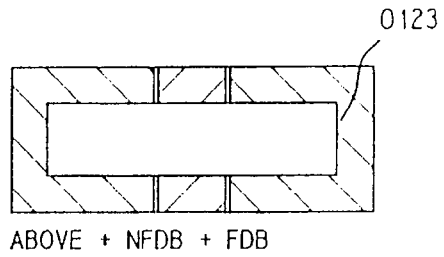
Figure 19B:
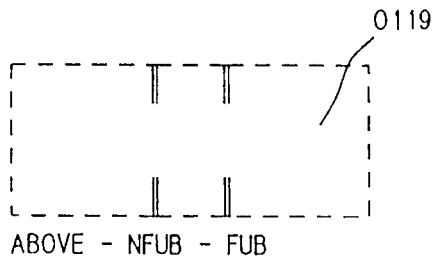
Figure 19B:
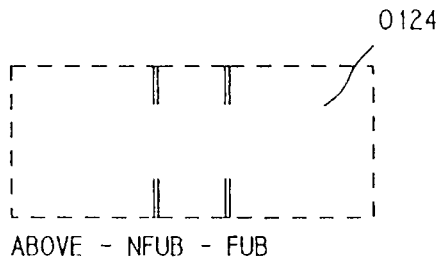
Figure 19B:
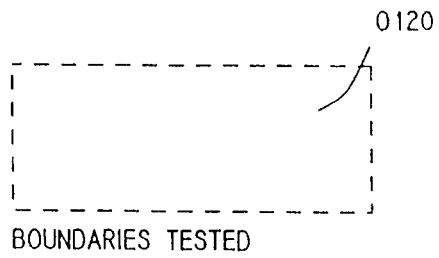
Figure 19B:
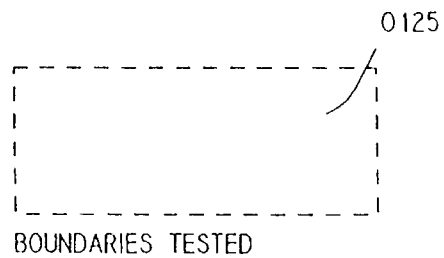
Figure 19B:
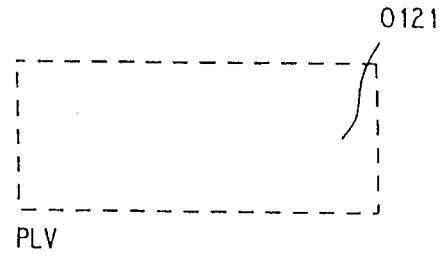
Figure 19B:
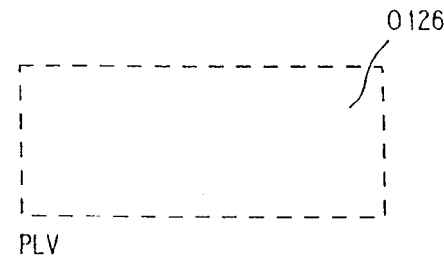
Figure 19B:
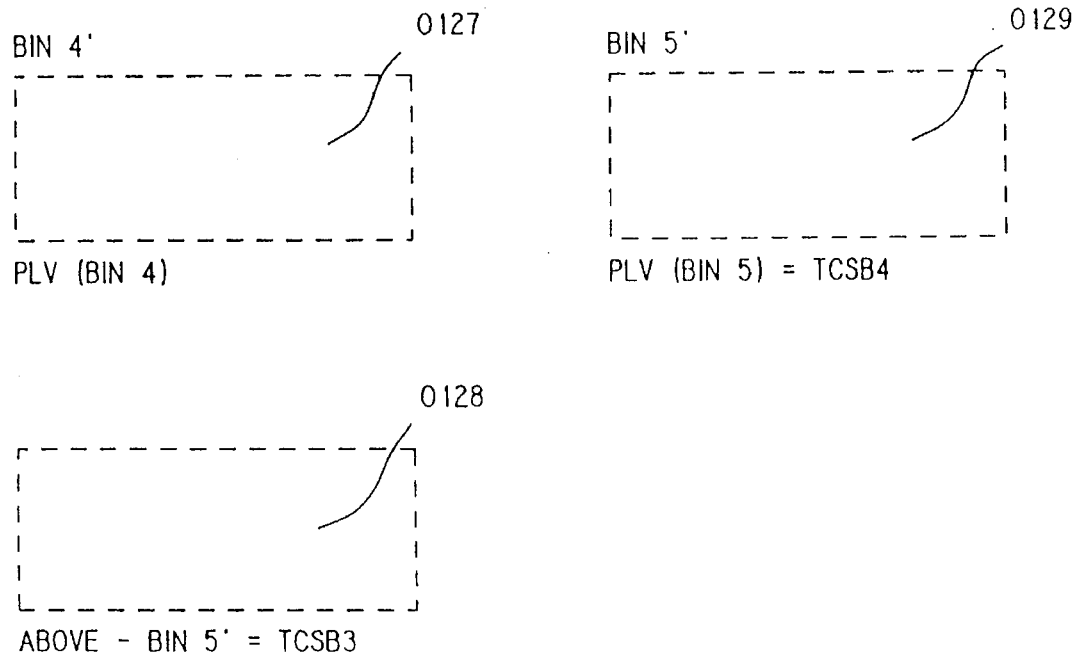
Figure 20:
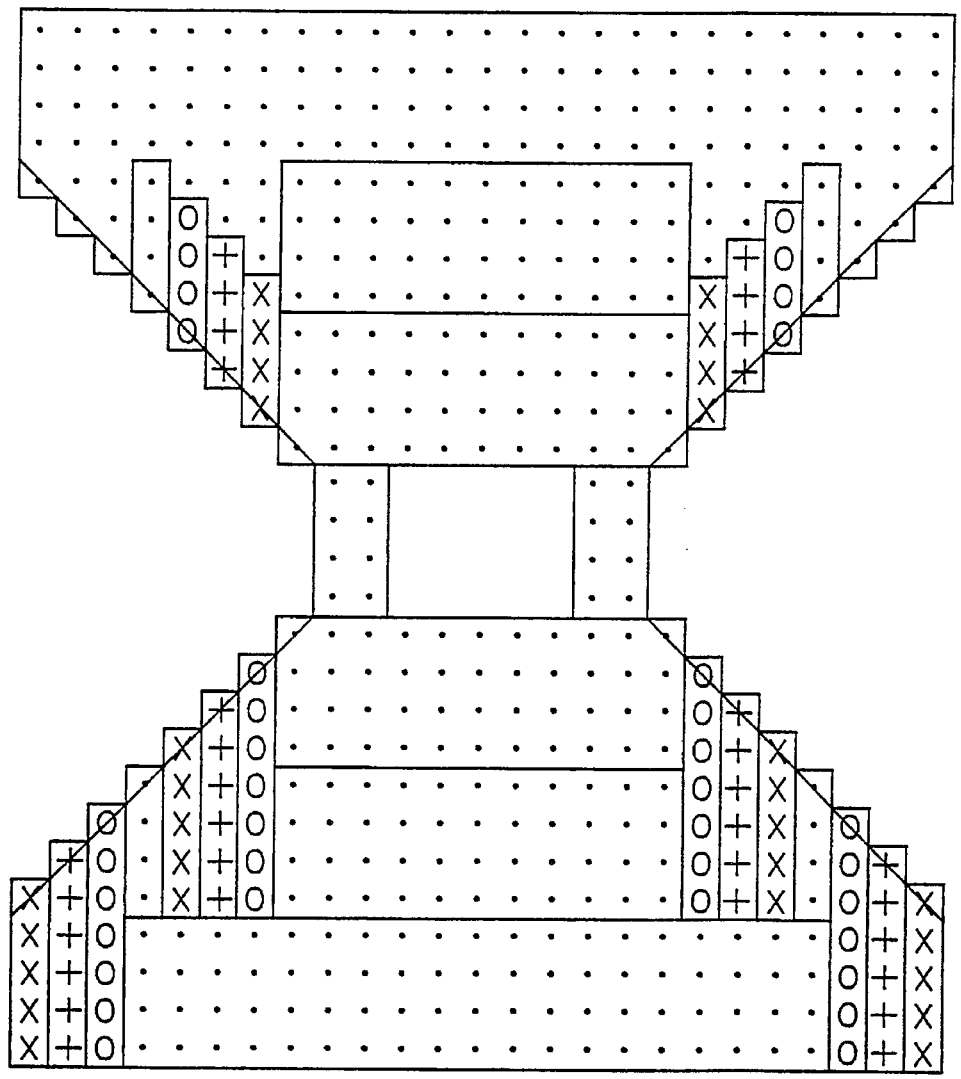

FIG. 13e depicts an embodiment where down-facing features are given priority. The down-facing features are cured so that they are formed at the same position they would be formed at if a higher resolution material were being used. In contrast to the embodiment of FIG. 13a, the up-facing features of FIG. 13e are pushed up above the positions they would actually be formed at if a higher resolution material were being used.

First Preferred Embodiment

The following description sets forth a first preferred embodiment for obtaining the necessary information associated with each layer. This embodiment is based on the terminology and processing techniques of the Slice program as described in U.S. patent application Ser. No. 07/331,644 as previously referred to and incorporated by reference.

This first preferred embodiment is based on the criterion that curing of features will occur in such a way as to give priority to up-facing features (i.e., the second criterion discussed above). Therefore this embodiment is similar to the approach described in terms of FIG. 13a (up-facing priority). This criterion requires that boundary (and fill) information will be output on each cross-section as it is needed for proper placement and cure of up-facing features. If a region of a cross-section does not contain up-facing features, the region may or may not be solidified in association with the current layer. The layer on which the curing of a non-up-facing feature will occur depends on the MSD, the depth that solid extends below the region, and on strength and buildability criterion discussed above (first criteria). Up-facing features will be cured at their proper locations even if this causes the down-facing features to be cured too deep. The object will come out with the proper dimensions except where vertical features become thinner than the MSD and in that case the down-facing features will be inaccurate due to the extra cure.

The first preferred embodiment is implemented by the following processing procedure, which based on the above criteria yields the highest resolution reproduction possible. This procedure yields the appropriate cross-sectional information whether or not the object being sliced has vertical features less than the MSD in thickness. The abbreviations and terminology in the following description are explained in detail in U.S. patent application Ser. No. 07/331,644. Other procedures are possible and the following is meant to only represent a single embodiment. A much simpler approach can be used if it is known that the object being sliced has a minimum vertical thickness of solidified material greater than or equal to the MSD.

To implement the building method of the present embodiment (shown in FIG. 13a) we need to cure certain areas on each layer. On each layer we need to cure the following:

1) All areas of FUB (i.e., flat up-facing boundary), including placing of down-facing skin in appropriate regions.

2) All areas of NFUB (i.e., near-flat up-facing boundary), including placing of down-facing skin in appropriate regions.

3) All areas that are N layers thick including the placement of down-facing skin on these layers, where N equals the minimum solidification depth divided by the layer thickness (N=MSD/LT). For example if the MSD is 40 mils and LT is 10 mils then N equals 4. We will refer continuously to various examples where N is set to four.

4) All areas that are greater than N layers in thickness.

According to Slice Style 1 (U.S. Pat. No. 5,059,359), the vectors of a cross-section that are actually considered to be involved in the creation of structure for each layer are the LBs (i.e., layer boundaries) and the NFDBs (i.e., near-flat down-facing boundaries). The other block types do not form structure but only indicate where skinning needs to occur. We can combine the area of the LBs with that of the NFDBs to form the Initial Cross-Section Boundaries (ICSBs). By doing this we will lose information about which areas of a cross-section need a down-facing skin. However, this is not a problem since anytime an area is cured that has a desired thickness less than or equal to the MSD, this method assumes it needs a down-facing skin (actual thickness formed will equal the MSD). It is further noted that the previously discussed Figures, as well as those to be discussed hereinafter, depict Style 1 type reproduction, that is, they depict reproductions that may be somewhat oversized in the X and Y dimensions.

Rules for a first implementation of the above described embodiment

1) Slice the object and obtain FDB (derived from flat down-facing triangles), NFDB (derived from all non-vertical and non-flat down-facing triangles), FUB (derived from flat up-facing triangles), and NFUB (derived from all non-vertical and nonflat up-facing triangles). LB can also be obtained.

a. All triangle vertices are rounded to slicing planes.

b. LB's are obtained from right at the slicing plane using only triangles that proceed above the slicing plane.

c. FUB's are obtained as normal for Slice Style 1. They are obtained at the cross-section above the present cross-section and are associated with the present cross-section.

d. NFUB's are obtained as normal for Style 1 (MSA=90), but now we keep a little more information about each vector. The orientation of the segment normals are implicit in having the beginning and end point information for the segments. The vectors also originate from one of three places: (1) intersection of a triangle with the cross-section plane of the present cross-section, (2) intersection of the triangle with the cross-section plane for the next layer, or (3) they are derived from connecting the end points of the vectors originating from (1) and (2) above. We keep this additional origination information for each vector.

e. FDB's are obtained as normal for Slice Style 1.

f. NFDB's are obtained as normal for Slice Style 1 (MSA=90), but here more information is kept about each vector. The orientation of the segment normals are implicit in having the beginning and end point information. The vectors originate from one of three places: (1) intersection of a triangle with the cross-section plane for the present layer; (2) intersection of the triangle with the cross-section plane for the next layer; and (3) from connecting the end points of the vectors originating from (1) and (2). This additional origination information is kept for each vector.

The LB can be obtained from appropriate combinations of the flat and near flat boundaries from the present layer in combination with those from all previous layers.

(2) The following information is derived about each individual vector, a) beginning point, b) end point, c) normal, d) type of triangle derived from, and e) whether derived from intersections between a triangle and a slicing plane or from interpolation.

3) Next, the Initial Cross-section Boundaries (ICSBs) for the present layer are defined as the LB plus the NFDB for the present layer. Alternatively we can define the ICSBs for the present layer as the boundaries which enclose the area contained within the FDBs and NFDBs of the present layer combined with those from all the previous layers less the FUB and the NFUB from all previous layers. When it is stated that LB+NFDB=ICSB, it actually means that the areas surrounded by the LBs should be joined with the areas surrounded by the NFDBs to form a new net area that is surrounded by ICSBs. Duplicate vectors are removed. A copy of the original NFDB vectors is placed into a holding bin that is labeled Working Cross-section Boundaries Type 1 (WCSB1). A copy of the FDB is also placed into a holding bin called the Working Cross-section Boundaries Type 2 (WCSB2).

4) Carryover Cross-Section Boundaries Type 1 (CCSB1s) for the present layer are now defined as the ICSBs less the FUBs, i.e., we define a new set of boundaries that surround the area enclosed by ICSBs less the area enclosed by the FUBs. Since the FUBs are actually created from the layer above, they may overlay the ICSBs but the vectors may not match head to tail. Therefore to remove duplicate vectors we may have to break some vectors into smaller pieces so that duplicate segment portions can be removed. The remaining FUB segments need to have their normals reversed and then they are made part of the CCSB1s. We place a copy of the FUBs into a bin called the Temporary Cross-section Boundaries Type 1 (TCSB1).

For a well behaved part, the FUBs surround areas which are actually subsets of the areas enclosed by the ICSBs. A well behaved part (object) is one which does not have degenerate vertical regions, that is there are no regions that simultaneously are both flat up-facing and flat down-facing regions. If an object contains such regions, it is not well behaved and additional steps must be taken to ensure the functionality of this procedure. These steps include determining the regions of overlapping flat skins. This determination is followed by removal of these intersecting regions as undesirable for building or by the separation of the skins to form a true layer of structure. This second option is followed by the continuation of this procedure, where the separated FDB is included on the present layer and the separated FUB is moved down from the layer above. A second copy of the FUB is placed in a holding bin designated as the Working Cross-Section Boundaries Type 3 (WCSB3).

5) Next, Carryover Cross-section Boundaries Type 2 (CCSB2s) for the present layer are defined as the CCSB1s less the NFUBs, i.e., a new set of boundaries that surround the area enclosed by the CCSB1s less the area enclosed by the NFUBs of the present layer is defined. Since the NFUBs are created from the present cross-section in combination with the next cross-section, some boundaries will naturally match those of the CCSB1s and therefore duplicates can be removed easily. However, some segments of the NFUB will not be created from triangle intersections with the present slice plane, but instead some will be created from intersections with the next slice plane and some will be created from interpolation. This means that again we may have to break some vectors into pieces so that we can ensure the removal of duplicate portions of segments. We also make a copy of the NFUBs and place them in a holding bin labeled as Temporary Cross-section Boundaries Type 2 (TCSB2s). We also place a second copy of the NFUBs in another holding bin that called Working Cross-section Boundaries Type 4 (WCSB4s). We place these CCSB2s into Bin 1 for holding for additional operations.

6) Initially the boundary information in Bin 2 comes from the boundary information in Bin 1 which was there at the end of processing information for the previous layer (CCSB2 from cross-section N–1). We take the information from WCSB1 and WCSB2 and add it to the CCSB2 already in Bin 2 (from the previous cross-section). We do not remove duplicates between the CCSB2 and either the WCSB1 or the WCSB2 or remove designations as to how the boundaries originated. However, we do ensure overlapping segments between boundary types are made to match (by dividing vectors into smaller pieces if necessary). We remove duplicates between the CCSB1 and the CCSB2. Duplicates between the CCSB1 s and the CCSB2s are those vectors that have opposite head and tail designations (same points but opposite pointing normals). At this point, we have in Bin 2, four possible types of boundary loops: (1) Loops from CCSB1 alone, (2) Loops from WCSB1 alone, (3) Loops from WCSB2 alone, and 4) Loops that are partially from the WCSB1 and WCSB2. We are now assured that the boundaries in Bin 2 include all possible areas that are surrounded by the boundaries in WCSB3 and WCSB4.

Next we take the present contents of Bin 2 and compare them to the contents of WCSB3 and WCSB4. First, we remove duplicate portions of vectors between the WCSB3 and WCSB4. These duplicates have opposite pointing normals as described before. Next, we remove duplicates between the remaining WCSB3, WCSB4 and the contents of Bin 2. Duplicates in this step are those vectors whose normals point in the same direction, or in other words for vectors to be considered duplicates they must point in the same direction. Next the remaining WCSB3 and WCSB4 vectors are broken down into smaller segments where they cross the boundaries that were already present in Bin 2. All vectors were previously broken down where necessary to remove duplicate vectors. The only place where the WCSB3 and WCSB4 vectors can cross the other boundary vectors are where these boundary vectors are actually double vectors pointing in both directions. These double vectors consist of two vectors, one from the WCSB1 or WCSB2 and one from the CCSB2. Next we reverse the normals and the directions of the vectors remaining from the WCSB3 and WCSB4 categories. We then determine which CCSB2 vectors and down-facing vectors overlap. These vectors that overlap must be handled carefully since they can lead to some erroneous loop formations. Next we want to form loops from our boundary vectors. Loops are formed by picking one of the remaining non-overlapping CCSB2, WCSB1, WCSB2 vectors or one of the remaining WCSB3 or WCSB4 vectors. The picked vector is chosen as the first vector of a first loop to be formed. The vector whose tail is at the head of the first vector becomes the second vector of the loop. This process of matching vectors head to tail is continued until a complete closed loop is formed (one vector of a duplicate pair can participate in the formation of the loop). In this process of forming a complete loop, if at the head of one vector are the tails of two or more vectors, the proper vector to choose in forming the loop is the one which causes the sharpest angle of solid to be formed (this is equivalent to choosing the vector which would tend to form the smallest area for the loop). However, in choosing the vector that forms the sharpest angle, any duplicate vector (opposite pointing normal) to the initial vector is excluded from consideration. After the formation of a first complete loop, a check is made to see if any non-duplicate vectors remain (what was once a duplicate vector but which lost its twin is no longer considered a duplicate). If any non-duplicates remain, another loop is formed. This process of loop formation continues until all non-duplicates have been incorporated into complete loops. After loop formation is done properly, we end up with the following categories: (1) Loops formed only by CCSB2, (2) Loops formed by WCSB1 and WCSB2, (3) Loops formed by CCSB2 and WCSB3 or/and WCSB4, 4) Loops formed by WCSB1 or/and WCSB2 and WCSB3 or/and WCSB4, 5) Loops formed by WCSB3 or/and WCSB4, and 6) CCSB2 and WCSB1 or/and WCSB2 that overlap and do not form loops. The loops and vectors in each of the previous categories are handled as follows:

Type 1) loops are given the designation as Primary Loops and Vectors (PLV);

Type 2) loops are given the designation as Secondary Loops and Vectors (SLV);

Type 3) loops are given the designation as PLV;

Type 4) loops are given the designation as SLV;

Type 5) loops are given the designation as PLV or SLV depending on whether they are completely within a PLV or an SLV; and Type 6) vectors are removed from further consideration.

It is relatively easy to determine whether a given Type 5 loop is within a PLV or an SLV. We can take any line that runs through the loop and start tracing along this line at the origin (assuming the part is to be completely located in the X+, Y+ quadrant). We note what type of loop we have entered immediately before encountering the Type 5 loop.

The purpose of Bin 2 is to function as a holding Bin so that we can have the information available to determine when cross-sections of the object we are working with have reached a thickness of N layers or greater.

7) The initial information in Bin 3 is the information that was in Bin 2 after all the processing was complete from the computations done in association with the previous cross-section. Initially this bin consists of two types of loops: PLV and SLV loops. We add to these initial loops the contents of WCSB1 and WCSB2 from the present layer. We remove duplicates between the SLV, WCSB1, and WCSB2 to form larger down-facing loops. Next, we compare the contents of Bin 3 to the WCSB3 and WCSB4 with the purpose of removing up-facing areas (from this cross-section) from further consideration. This is done identically to how it was approached in Bin 2. Net loop formation is identical to that in Bin 2 also. The resulting loops are categorized again as PLV and SLV.

8) Higher order Bins, up to order N+1, are identical to Bins 2 and 3 except that each higher bin will contain some information from one layer deeper into the object. The operations are the same an we end up with categories of PLV and SLV again.

9) We now look at Bin N' in terms of our example where N=4. We know that Bin 4 contains information about our object from three layers below the current cross-sections. After we do all of our processing on Bin 4 for the current layer we are left with boundaries of the PLV and SLV types. We make a copy of the Bin 4 PLV boundaries into Bin N'. We will use these PLV boundaries later in combination with other boundaries to determine TCSB3 and TCSB4 boundaries.

10) The contents of Bin N+1 are created in much the same way as the previous bins. A copy of the PLV in Bin 4 and Bin N+1 is placed in Bin N+1'. In terms of our example, Bin N+1=Bin 5 and Bin N+1'=Bin 5'.

11) The areas represented by Bin N' include at least the areas of Bin N+1'. We now take the areas covered by Bin N' less the areas covered by Bin N+1' and place them in a category called Temporary Cross-section Boundaries Type 3 (TCSB3s). These TCSB3s represent areas that need to be cured to a depth equal to the MSD and that therefore also need Down-Facing Skin.

12) We take the boundaries from Bin N+1' and place them in a category called Temporary Cross-section Boundaries Type 4 (TCSB4). These boundaries represent the areas that have already been cured on the previous layers and therefore can be given an appropriate cure to attach them to the previous layer. This may be an exposure similar to that given to cure to a depth equal to the MSD or it may not.

13) The TCSB1, 2, 3, 4 boundaries are the boundaries that indicate the areas that are to be cured in association with each cross-section.

TCSB1 & TCSB2 are combined to form a boundary and fill area that will be skinned and cured to the MSD. Due to the particular procedures chosen in this embodiment, we know that these regions form up-facing areas of the part but it is not possible to tell whether the lower surfaces of these regions form down-facing portions of the part. Therefore, according to this particular embodiment both the non-down-facing regions as well as possible down-facing regions must be given the same cure depth, and therefore to ensure adequate adhesion, they might need to be over cured. This may induce a small error in the location of the down-facing features. However, it is noted that these regions must be cured to a depth equal to the MSD. If these regions are not down-facing, then an MSD cure depth should be adequate for adhesion since there will be a solidified material one layer thickness below them. If a material obeying Beers' Law is used, this MSD cure depth should not significantly result in a lowering of down-facing features. With modified processing it is possible to know which portion of these areas are down-facing and therefore it is possible to only over cure the regions that actually have something below them to attach to.

The TCSB3s surround the regions that are definitely both up-facing and down-facing and so are cured to the MSD. There is nothing below these regions so they need not be given any overcure.

The TCSB4s surround regions that are not up-facing or down-facing. These regions have solidified material one layer-thickness below them and therefor need only be given a cure that will yield sufficient structural integrity to ensure completion of the part.

14) This procedure is followed for each layer in turn.

Several other methods for practicing this invention are possible. In the above, we defined areas such that simple vector operations can be done to determine applicability of curing these areas on a given layer. We could have instead used operations such as comparing the areas on a pixel-by-pixel basis creating a net region of pixels indicating the interior of solid regions of a cross-section and those indicating net hollow regions and then creating boundaries at the border of regions where pixels are in one state versus the other. Another approach is to use the techniques in our copending application titled "Boolean Layer Comparison Slice", U.S. patent application Ser. No. 07/606,191 filed concurrently herewith. The disclosure of this copending application is incorporated by reference as if fully set forth herein. In this layer comparison application a method for determining net boundaries is based on the comparison of boundaries from different layers. The technique described in this cited application may be applied directly to the present invention.

Figures 7, 8, 9, 10, 11, 12, 13, 14, 15:
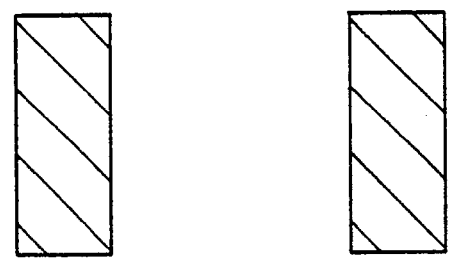
Figures 7, 8, 9, 10, 11, 12, 13, 14, 15, 16:
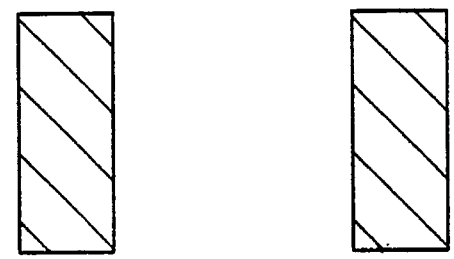
Figures 7, 8, 9, 10, 11, 12, 13, 14, 15, 16, 17:
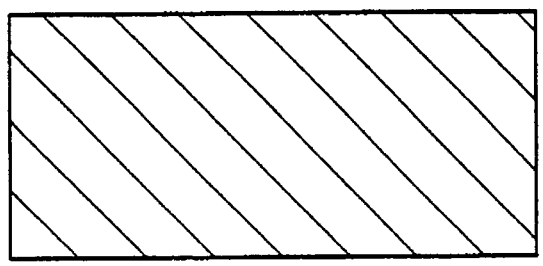
Figures 7, 8, 9, 10, 11, 12, 13, 14, 15, 16, 17, 18:
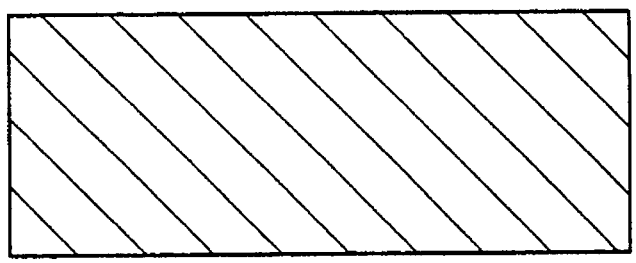
Figures 7, 8, 9, 10, 11, 12, 13, 14, 15, 16, 17, 18, 19:
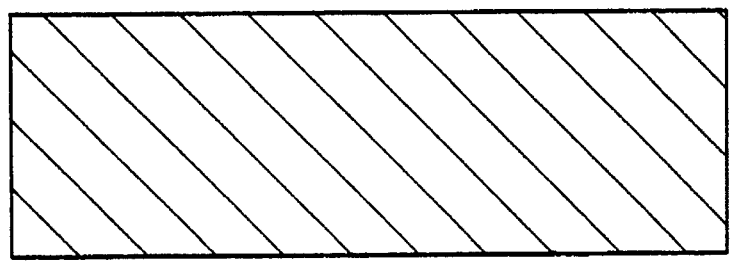

FIG. 19 depicts the cross-sections that are obtained by application of the first preferred embodiment of the present invention to the CAD designed object of FIG. 15, wherein the MSD is considered to be equivalent to 4 layer thicknesses.

FIG. 15 depicts a CAD designed object that contains a variety of vertical features that are thinner than the MSD. This particular object was chosen so that some of the finer points of the first preferred embodiment can be made clear by studying how boundaries can be created even in these very complex situations. Immediately adjacent to the left side of FIG. 15, numerals 0 to 15 indicate the positions of the cross-sections of this example at successive vertical "Z" levels through the object, that are produced by the Slice Style 1 program in the typical stereolithographic reproduction of the object. The numerals 1-16 further to the left of FIG. 15 indicate actual slicing planes. The offset between these two sets of numbers occurs because the Slice Style 1 program builds the object with all cross-sectional data shifted downward relative to the actual part position by one layer. The numerals to the right of the Figure indicate successive layers that are used to reproduce the object based on the slicing planes depicted to the left of the object. The lines indicating the slicing planes depict the vertical level of the slicing planes as referenced from the front plane of the object. The space between successive slicing planes corresponds to the layer thickness. Also shown in this Figure in the lower left hand corner is a coordinate axis symbol, indicating the orientation of the object relative to 'X', 'Y', and 'Z' coordinate axes.

FIG. 16 depicts the object of FIG. 15 as it would be stereolithographically reproduced using a material that has an MSD less than or equal to the layer thickness depicted in FIG. 15, wherein the object is reproduced using the layers depicted in FIG. 15.

FIG. 17 depicts the various boundary types and associated areas as applied to the 16 slicing planes of the object of FIG. 15, wherein these boundaries and areas form the basis of the reproduction depicted in FIG. 16. These boundaries are generated by a Slice program similar to that described in previously referenced U.S. patent application Ser. No. 07/331,644. These 16 slicing planes create cross-sectional data that is associated with the 15 layers that form the reproduced object. Each cross-sectional data for each slicing plane can have up to five boundary types. These boundaries include Layer Boundaries (LB); Flat Down-Facing Boundaries (FDB); Near-Flat Down-Facing Boundaries (NFDB); Near-Flat Up-Facing Boundaries (NFUB); and Flat-Up Facing Boundaries (FUB). These boundary types are described in detail in the above referenced co-pending U.S. Patent Application. In the numbering system of FIG. 17, the letters correspond to the boundary types and the "-No." correspond to the slicing plane number.

FIG. 18 depicts the object that is formed by the application of the first preferred embodiment to the object of FIG. 15, wherein the same layer thickness is used as depicted in FIG. 15, but the MSD of the material is 4 times the layer thickness of FIG. 15. As can be seen from the object of FIG. 18, with such an extremely complex and difficult object even with utilization of the techniques of the present invention, the created object does not form a very good reproduction of the original object. However, even with the flaws of this reproduction, it is considerably better than what would have been produced by the prior art using the same material. It should also be noted that this object (FIG. 15) doesn't represent a typical part. A typical part would not be so diabolical, whereas this part was conceptually created for the purpose of testing the algorithms of the first preferred embodiment.

FIG. 19 depicts an example of how the first preferred embodiment of the present invention is utilized to determine the required cross-sectional boundaries based on the cross-sectional boundaries (FIG. 17) produced by using a typical approach to stereolithography embodied in the present commercially available Slice program. FIG. 19 depicts a plurality of boundaries in both initial and intermediate stages of processing as well as completely processed boundaries for each cross-section. In this example the MSD is assumed to be four layer thicknesses.

The portions of FIG. 19 that describe cross-section 1 have descriptors that begin with the letter "A". The Figure descriptors for the other cross-sections 2 through 16 begin with the letters "B" through "O" respectively. Similar elements for each cross-section are indicated with similar numbers.

FIG. 19 depicts the cross-sections used to reproduce the CAD designed object of FIG. 15 per the teaching of the rules of the first implementation of the first preferred embodiment described previously. These cross-sections combine to create the object of FIG. 18. The length of the cross-sections depicted in FIG. 19 (as well as FIG. 17) are reduced by a factor of two compared to the length in FIGS. 15 or 18 (as well as FIG. 16). The width of the cross-sections of FIG. 19 are depicted as nominally four units whereas the width in FIGS. 15 and 19 are depicted as 1 diagonal unit. It is noted that some elements of FIG. 19, (e.g. 19F) contain what appear to be two slightly offset boundaries. These apparently slightly offset boundaries are actually overlapping boundaries which are depicted as slightly offset for illustrative purposes only.

Referring to the first cross-section, elements A100, A101, A102, and A103 refer to boundary types and therefore hatch or fill or the like that are to be cured in association with the first layer of the object according to the teachings of this embodiment of the invention. In this first preferred embodiment the object as reproduced is shifted downward by a layer so the first layer of the object corresponds to the first cross-section of the object. This idea of down shifting the object is discussed in more detail in U.S. patent application Ser. No. 07/331,644. Methods of compensating for this down shift are discussed in the previously referenced "Boolean Layer Comparison Slice" application.

As seen from FIG. 19, all of these elements depict only empty outlines and therefore indicate that nothing is to be cured in association with the first cross-section of this example.

Element A100 contains any flat up-facing boundaries from a traditional stereolithographic building style which are associated with this cross-section. Boundaries found within this element require curing such that a smooth upper surface is formed. Since this first preferred embodiment did not call for the separate categorization of down-facing regions from that of flat up-facing regions, on a general layer of the object we do not know whether any areas called for in this element are down-facing portions as well as up-facing or whether they are used for adhesion between layers. Therefore these regions must be treated appropriately to yield the desired smoothness of any down-facing portions as well as being given appropriate cure parameters to result in cohesive formation of the layers and to assure adequate adhesion between layers. Additionally the first preferred embodiment does not distinguish between the up-facing features which require a cure-depth equal to or less than the MSD. This is related to not distinguishing between down-facing and adhesive regions. All unsupported regions must be cured to a depth approximately equal to the MSD whereas supported regions may require less cure but since these two regions are not distinguished, the required curing depth is substantially equal to the MSD. It is of course possible in a variation of this embodiment to distinguish between these regions and treat each differently.

Element A101 is similar to element A100 except it contains any near-flat up-facing boundaries and therefore indicates any regions that need to be cured as near-flat up-facing regions. The regions depicted in this group may also have some down-facing portions and therefore must be treated appropriately. Prior to curing, the A100 and the A101 elements may be combined to yield a net area to be cured as an up-facing feature.

Element A102 contains boundaries that surround regions that are N layers thick and are not up-facing. These regions are strictly down-facing regions with a thickness equal to the MSD and therefore should be cured to approximately the MSD in thickness. These regions are not used for adhesion therefore they do not require curing appropriate for adhesion. The boundaries contained in this element are identical to those in element A128.

Element A103 contains boundaries that surround areas associated with the present cross-section and that are not up-facing (according to the traditional approaches to stereolithography) and whose areas overlap areas that were cured in association with the previous cross-section according to the teaching of the present invention. Therefore the boundaries of this element surround areas that are neither up-facing nor down-facing and which have cured material located no more than one layer-thickness below the present level. These regions can be cured in any appropriate manner that produces adequate adhesion with the previous cross-section including the use of cross-hatching that leaves untransformed material within the interior regions of any solid portions of the cross-section.

Elements A104, A105, and A106 depict the starting cross-sectional information associated with the present cross-section (the first cross-section) that are derived according to traditional stereolithographic techniques along with some initial operations on this cross-section.

Element A104 of FIG. 19 depicts the combined layer boundary (LB) and the near-flat down-facing boundary (NFDB) of the first cross-section of FIG. 17 (FIG. 17 depicts the boundaries of the various types of vectors for the object of FIG. 15, wherein FIG. 16 is obtained from the cross-sectional data of FIG. 17 using a traditional approach to stereolithography with the layer thickness greater than or equal to the MSD).

Element A105 contains the net area enclosed by the boundaries of A104 less the area enclosed by any flat up-facing boundaries associated with the present cross-section (the first cross-section). In this example there are no flat up-facing boundaries on the first cross-section so the boundaries of A104 and A105 are identical.

Element A106 contains, the net area enclosed by the boundaries of A105 less the area enclosed by any near-flat up-facing boundaries associated with the present cross-section (the first cross-section). In this example there are no near-flat up-facing boundaries on the first cross-section so the boundaries of A105 and A106 are identical. After the above described processes are performed the contents of A106 are considered to be the contents of Bin 1.

Element A107 contains the boundary information associated with Bin 1 after processing the boundaries of the previous cross-section. Since the cross-section previous to the first cross-section contains no boundary information this element contains no information.

Element A108 is obtained by combining the boundaries of A107 with any near-flat down-facing boundaries and flat down-facing boundaries associated with the present cross-section (the first cross-section). Since there are flat and near-flat down-facing boundaries associated with the present cross-section this element is not empty. The contents of this element are obtained by combining the areas of the FDB and NFDB of Layer No. 1 of FIG. 17 to obtain the new boundary depicted by this element.

Element A109 is obtained by subtracting any flat up-facing and near-flat up-facing areas from the contents of A108. As can be seen from Layer No. 1 of FIG. 17, this cross-section contains no FUB or NFUB; therefore, the contents of this element are identical to the contents of A108.

Element A110 depicts the testing of the boundaries (and areas) of element A109 to determine whether each loop has primary or secondary status. Since the entire area is derived from loops formed by only the WCSB1 and WCSB2 the entire area is designated as having secondary status. After processing is complete the contents of Element A110 are considered to be the contents of Bin 2 associated with the present cross-section.

Element A111 contains any loops and associated areas of element A110 that have primary status. Since in this case no loops in A110 have primary status the contents of A111 consist of the null set.

The elements A112 to A116 are associated with Bin 3 of the present cross-section. After the processing of these elements is complete, element A115 with its distinct secondary and primary loops contain the contents of Bin 3 associated with the present cross-section.

Element A112 consists of the contents of Bin 2 associated with the previous cross-section. Since Bin 2 of the previous cross-section consisted of the null set so does this element.

Element A113 has the same relationship with A112 as A108 did with A107. A113 contains the contents of A112 plus any boundaries associated with FDB or NFDB of the present cross-section. The contents of A113 are boundaries and associated areas obtained from the NFDB and FDB depicted in association with Layer No. 1 of FIG. 17.

Element A114 has the same relationship with A113 as A109 did with A108. A114 contains the areas encompassed by the boundaries of A113 less any areas encompassed FUB or NFUB of the present cross-section. It is noted that by the steps involved in the process assure that the area enclosed by A113 will contain all the area enclosed by any FUB and NFUB associated with the present cross-section (assuming no regions of zero thickness existed in the original object). This is not a requirement but it does make some of the computations simpler. No NFUB or FUB is associated with the present cross-section so A113 and A114 have identical contents.

Element A115 has the same relationship with A114 as A110 did with A109. A115 depicts the separation of the areas of A114 according to their having primary or secondary status. As with A110 all the areas of A114 have secondary status.

Element A116 has the same relationship with A115 as A111 did with A110. A116 contains any areas and boundaries that have primary status. In this example, for this cross-section none of the boundaries have primary status.

Elements A117 through A121 are associated with the contents of Bin 4 of the present cross-section. The relationships between these elements are analogous to the relationships between the corresponding elements associated with Bin 2 and Bin 3. After processing is complete element A120 contains the contents of Bin 4 of the present cross-section. Similarly elements A122 through A126 are associated with the contents of Bin 5. Again, similar relationships hold and element A125 contains the contents of Bin 5.

The elements A127 and A128 are used in further processing to obtain the contents of element A102, which contents are used to cure areas associated with the present cross-section according to the present embodiment of the instant invention. The contents of A127 are simply a duplication of the contents of element A121.

Element A128 is obtained by subtracting the areas of element A126 from the areas of element A127. The contents of A128 are then duplicated for output as TCSB3 of element A102.

The contents of A129 are simply a duplicate of the contents of element A126. The contents of A129 are then duplicated into element A103 as the TCSB4 of the present cross-section.

The elements B100 to B129 through the elements O100 to O129 are obtained in analogous manners to those of A100 to A129 except the contents of the initial elements associated with Bins 2 through 5 do not necessarily start with the null set but contain any boundary and area information associated with the bins of the previous cross-sections.

An object of the invention is to reproduce a part as accurately as possible using a Style 1 reproduction method. Style 1 is the designation, described in the previously referenced 07/331,644 U.S. patent application, given to the reproduction of an object that is based on discontinuities between cross-sections resulting in the oversizing of the X and Y dimensions of the object. This method allows the reproduction of a large class of objects which can be post processed, after formation, by sanding off the appropriate discontinuities to the point that they disappear. At the point of discontinuity disappearance, the part is complete and represents a highly accurate reproduction of the object.

We consider the object to be conceptually sliced into a plurality of layers with each layer representing a structural portion of the object. In terms of the Slice program described in Ser. No. 07/331,644, the structural portion of each layer comprises the area enclosed within the boundaries of the LB and NFDB. These combined boundary types are called the "Initial Cross-Section Boundaries" (ICSBs). The other boundaries define regions that need to be filled or skinned because they form up-facing or down-facing surfaces of the object but they do not form structure. That is, each initial slice cross-section (area contained within the Initial Cross-Section Boundaries) contains the necessary boundary information to form a layer of structure (if cured to one layer-thickness) that will result in proper oversized X and Y dimensions. This oversizing is such that if appropriate removal of material along the edges of the part is done between the intersections of the present layer with the proceeding and succeeding layers, the layer of structure produced will match the original computer representation of the object accurately. This includes appropriate removal of discontinuities between layers as well as appropriate removal of material that was solidified so that hollow volumes were filled in.

Another desirable method of building, Slice Style 3, relates to the building of an object that is undersized in the X and Y dimensions. In the case of Style 3, the discontinuities between layers as well as regions that collapsed to zero thickness are filled in during post processing.

Additional styles of building are disclosed in the 07/331,644 application as well as the previously referenced concurrently filed "Boolean Layer comparison Slice" U.S. Patent Application.

Up-Facing Priority

We now move on to describe generally the major steps involved in an up-facing embodiment, wherein we discuss in more detail some of the steps described or referred to earlier. This description assumes that the MSD of the chosen material is N times as large as the chosen layer thickness.

The preferred materials and sources of synergistic stimulation for utilization with the present invention depend on the layer thickness that will be used, the level of MSD that can be tolerated, and the accuracy of reproduction desired. A preferred material is XB 5081, manufactured by Ciba Geigy of Basel, Switzerland, which has an MSD of approximately 5 to 8 mils when used with a HeCd laser emitting 325 nm radiation. Therefore, using the prior art teachings of stereolithography, this material can be used to make high resolution parts of accuracy of 5 to 8 mils in vertical thickness (when only considering the sources of error addressed in the instant invention). This same material, in combination with the teachings of the instant invention and assuming an MSD of 8 mils, can be used to build many parts with an accuracy, for example, of 4 mils if N=2, or an accuracy of 2 mils if N=4, or even an accuracy of 1 mil if N=8. Another preferred material is Potting Compound 363, manufactured by Loctite Corporation, which has an MSD of approximately 30 mils when used with synergistic stimulation from a high-pressure mercury lamp, or alternatively Tevista Type I material, manufactured by Tokyo Ohka Kogyo Co. Ltd., Kanagawa Prefecture, Japan, which has an MSD of approximately 45–60 mils when used with synergistic stimulation from a high-pressure mercury lamp. For example, when using a material like Tevista it may be advantageous to assume an MSD of 80 mils or more to ensure adequate strength under a wider range of building conditions. This assume 80 mil MSD can still be used in a large number of objects according to the invention to yield a production accuracy of 40 mils when N=2, or even 20 mils when N=4.

Other preferred materials include powders and appropriate forms of synergistic stimulation as well as other fluid-like media. These powder materials when combined with a particular type of synergistic stimulation may or may not have an MSD, as previously described. Even if this type of MSD doesn't exist for these materials they may have another type of MSD (as do photopolymers). This second type of MSD refers to a minimum solidification depth that results in formation of thicknesses of material that are sufficiently rigid or strong to withstand stresses that result from adhering layers together that would tend to "curl" distort the individual layers of the object and therefore result in distortion of the object itself. The ability of a layer of cured material to resist curl increases with increasing cure depth (for many materials it is proportional to the cube of the cure depth). Curl phenomena and several means of addressing this type of distortion are described in several of the previously referenced U.S. Patents and applications. Of particular interest are U.S. Pat. Nos. 4,999,143; 5,015,424; 5,104,592; 5,182,056; 5,130,064; and the concurrently filed curl balancing application.

Therefore, the formation process utilizing such materials can benefit from the deeper cure depths and thinner layers that can be utilized according to the present invention while maintaining little or no loss in placement accuracy. As such, the present invention is not only an extremely valuable method for achieving high resolution placement of features when using low resolution materials, but it is also an extremely valuable method of reducing curl distortion in objects when the desired accuracy of reproduction requires thinner layers than can normally be accommodated due to excessive curl distortion.

In an up-facing priority embodiment, up-facing features are given priority in terms of their placement and every attempt is made to cure down-facing features to the appropriate levels. In considering the steps involved in determining what should be cured in association with a cross-section I, we assume that the previous I-1 cross-sections have been formed in an appropriate manner.

First of all, the possible cure versus cure depth regions that might be encountered and that may need to be distinguished for making decisions about what areas should be cured on a given cross-section must be determined. In this description a building method similar to that depicted in FIG. 5, as opposed to that depicted in FIG. 6 is assumed. Therefore, whenever the depth of solidification is greater than the MSD there is always solidified material one layer thickness below the present level. We exclude FIG. 6 type building techniques, and the like, from further consideration in this analysis since their development will be within the ability of one of ordinary skill in the art after understanding the principles of the present disclosure. Table 1 shows a summary of the various cure depth regions.

TABLE 1

Summary of the various regions that can occur on a given layer when using an Up-Facing Priority Embodiment of Simultaneous Multiple Layer Curing.

| Region Designation | No. of Previous Cross-Sections (Layers) | Thickness | No. of Higher Cross-Sections (Layers) |
|---|---|---|---|
| 1 | >= N | >= N + 1 | >= 1 |
| 2 | N − 1 | N | >= 1 |
| 3 | N − 2 | N − 1 | >= 1 |
| 3 | N − 2 | N − 1 | >= 1 |
| 3 | N − 2 | N − 1 | >= 1 |
| N − 1 | 2 | 3 | >= 1 |
| N | 1 | 2 | >= 1 |
| N + 1 | 0 | 1 | >= 1 |
| 1' | N | N + 1 | 0 |
| 2' | N − 1 | N | 0 |
| 3' | N − 2 | N − 1 | 0 |
| 3' | N − 2 | N − 1 | 0 |
| 3' | N − 2 | N − 1 | 0 |
| N − 1' | 2 | 3 | 0 |
| N' | 1 | 2 | 0 |
| N + 1' | 0 | 1 | 0 |

Region 1: This region is included on at least the next cross-section and on the present cross-section and on at least all N previous cross-sections. This region has solidification depth, below the upper surface of the Ith layer, of at least N+1 layers (MSD+1 layer). Since we assume a FIG. 5 type building method, we know there is solidified material located in this region one layer thickness below the present level. We cure the material in this region with an appropriate cure depth that does not cause print through of solidified material below the solidification level of this region. We also know that the material cured in this region is not used to form a down-facing surface of the object or an up-facing surface of the object. Therefore, an open cure structure (open crosshatch) can be applied to this region if desired. Additionally, the formation of solidified material in this region is used to achieve adhesion between the layers. If N=4, then this region is included on at least the previous 4 cross-sections.

Region 2: This region is included on at lest the next cross-section and on the present cross-section and on all N−1 previous cross-sections. This region has a solidification depth, below the upper surface of the Ith layer of N layers. Since we assume a FIG. 5 type building method, this region has received no cure in association with previous cross-sections and therefore it is not cured for the purpose of adhesion to previous layers. Therefore, no overcure is necessary and it can be given a cure depth equal to the MSD. This causes the lower surface of the solidified material to be formed at the appropriate position to accurately reproduce the particular feature of the object that is being created. Since this region forms a down-facing surface of the object it is cured in such a way as to form a smooth lower surface. If N=4, this region is included on the previous 3 cross-sections.

Region 3: This region is included on at least the next cross-section and on the present cross-section and on all N−2 previous cross-sections. For accurate reproduction of the object, if this region were to be cured in association with the present cross-section, this region requires a depth of cure equal to the MSD less one layer-thickness (MSD−1 layer thickness). Due to the MSD, if this region is cured in association with the present cross-section, it will be cured one layer-thickness too deep. However, since this region has at least one more layer of structure above it, we do not need to cure it in association with the present cross-section. We can postpone the curing of this region until at least the next cross-section is formed. This delay in formation will allow more accurate reproduction of the object. If this region is cured in association with the next cross-section, it will be treated as a down-facing feature and maybe an up-facing feature if this region does not continue on beyond the next cross-section. If N=4, this region is included on the previous two cross-sections.

Region N−1: This region continues on to at least the next cross-section and it is included on the present cross-section and on the two previous cross-sections (as long as N.>=2). This region cannot be cured in association with the present cross-section without causing an N−3 layer-thickness error in the placement of the down-facing feature associated with the bottom of this region. As N becomes larger (assuming a fixed layer-thickness and therefore an increasing MSD), so does the error associated with curing this region in association with the present cross-section. Since we know that there is at least one cross-section above this region, we know that we can delay the curing of this region until at least then. This postponing will allow more accurate placement of down-facing features and therefore more accurate reproduction of the object. If N=2, this region is region 1 and it therefore has similar characteristics to region 1 described above. If N=3, this region corresponds to region 2, and it therefore has similar characteristics to region 2 described above. If N=4, this region is Region 3 and it therefore has similar characteristics to region 3 described above. If N>=4, this region is included on the two previous cross-sections (layers).

Region N: This region is included on at least the next cross-section and on the present cross-section and on the previous cross-section. If N=2, this region is region 2 and therefore is similar to region 2 described above. If N=3, this region is region 3 and therefore is similar to region 3 described above. If N=4, this region is Region 4 and it includes the previous cross-section. With all cases where N>2, more accuracy in reproduction can be obtained by delaying the curing of this region until at least the next layer. This delay is possible since we know that this region continues until at least the next cross-section.

Region N+1: This region is included on at least the next cross-section and on the present cross-section. It does not include any previous cross-sections. With all cases where N>=2, more accuracy in reproduction can be obtained the curing of this region is delayed until at least the next cross-section. If N=4, this is Region 5. If this region were cured in association with the present cross-section (assuming N=4) then the bottom surface of this region would be placed 3 layers thicknesses below its desired location.

We next consider the regions labeled with a prime "'". These primed regions are similar to the unprimed regions except they contain no additional cross-sections above them. Therefore, the primed regions form up-facing areas. With a building technique that calls for the proper placement of up-facing features, these regions must all be cured on the cross-sections on which they occur.

Region 1': This region is included on the present cross-section and on at least all N previous cross-sections. This region is not included on the next cross-section. This region has a solidification depth below, the upper surface of the Ith layer of at least N+1 layers (MSD+1 layer). Since we assume a FIG. 5 type building method, we know there is solidified material located in this region one layer-thickness below the present level. We therefore cure the material in this region with an appropriate cure depth that does not cause print through of solidified material below the solidification level of this region. We note that the MSD is the minimum solidification depth for an unsupported region and since this is a supported region, it may be possible to use a cure depth smaller than the MSD. We also know that the material cured in this region is not used to form a down-facing surface of the object but it is used to form an up-facing surface of the object. Therefore, this region must be cured to form a uniform up-facing surface. Additionally, the formation of solidified material in this region is used to achieve adhesion between the layers. If N=4, then this region is included on at least the previous four layers.

Region 2': This region is included on the present cross-section and on all N−1 previous cross-sections. This region is not included on the next cross-section. This region has a solidification depth, below its upper surface of N layers. Since we assume a FIG. 5 type building method, this region has received no cure in association with previous cross-sections and therefore it is not cured for the purpose of adhesion to previous layers. Therefore, no overcure is necessary and it can be given a cure depth equal to the MSD. This causes the lower surface of the solidified material to be formed at the appropriate position to accurately reproduce the particular feature of the object that is being created. This region forms both a down-facing surface and an up-facing surface and is therefore cured in such away as to form smooth lower and upper surfaces. If N=4, this region is included on the previous three cross-sections.

Region 3': This region is included on the present cross-section and on all N−2 previous cross-sections. This region is not included on the next cross-section. For accurate reproduction of the object, if this region is to be cured in association with the present cross-section, it requires a depth of cure equal to one layer-thickness less than the MSD (MSD−1 layer-thickness). Unfortunately, this cure depth will not form a cohesive layer of structure. Additionally, this region must be cured in association with the present cross-section. Therefore, there will be an error in positioning of the down-facing feature, below this region, of one layer-thickness. This region has three attributes: (1) It is an up-facing region, (2) It is a down-facing region, and (3) When it is cured, it will be solidified one layer-thickness too deep. If N=4, this region is included on the previous 2 cross-sections.

Region N−1': This region is included on the present cross-section and on the 2 previous cross-sections (as long as N>=2). This region is not included on the next cross-section. This region must be cured in association with the present cross-section but this will result in an error in cure depth of N−3 layers. This region forms both an up-facing and down-facing feature of the object and it must therefore be cured appropriately. If N=2, this region is region 1' and it therefore has similar characteristics to region 1' described above. If N=3, this region corresponds to region 2', and it therefore has similar characteristics to region 2' described above. If N=4, this region is Region 3' and it therefore has similar characteristics to region 3' described above.

Region N': This region is included on the present cross-section and on the previous cross-section. This region is not included on the next cross-section. Since curing of this region must occur in association with the present cross-section, there will be an error in placement of the down-facing feature, below this cross-section, of N−2 layers. This region is used to form both an up-facing and a down-facing feature of the object and therefore must be cured appropriately. If N=2, this region is region 2' and therefore is similar to region 2' described above. If N=3, this region is region 3' and therefore is similar to region 3' described above. If N=4, this region is Region 4' and results in an error in placing the down-facing feature of 2 layer-thickness.

Region N+1': This region is included the present cross-section only. It does not include any previous cross-sections or any higher cross-sections. With all cases, where N>=1, this region must be cured in association with the present layer. It forms both an up-facing and a down-facing feature of the object and it will be cured N−1 layers too deep. If N=4, this is Region 5. In the case of N=4, when this region is cured in association with the present cross-section, the bottom surface of this region will be placed 3 layers thicknesses below its desired location.

Having described the various possible regions that can occur on a given cross-section, we proceed with the steps required to determine the net cross-sections that will be used to form each layer in the process of building an object from a plurality of initial cross-sections.

We consider the "initial cross-sections" of an object to be those obtained using standard stereolithography. Each initial cross-section can be subdivided into several regions. These regions, as described above, are distinguished by the relationships between the present cross-section and the N proceeding cross-sections along with their relationships to the next successive cross-section. In association with a given cross-section all of the primed, "'", regions are cured along with regions 1 and 2. Region 1 and 1' are used to assure adhesion between the present cross-section and the previous cross-sections. These regions have solidified material 1 layer-thickness below them. Region 1' also functions as an up-facing surface and must be cured accordingly. Region 2 forms a down-facing surface and must be cured accordingly. Region 2' to region N+1' form both up-facing and down-facing regions and must be cured accordingly. Region 3' to region N+1' are the regions that are prematurely cured, due to the geometry of the object, and are therefore the regions that represent varying degrees of error introduced into the down-facing features of the reproduction.

After determining the extent of the initial cross-section boundaries for cross-section "I" we divide it into the various regions disclosed above. We proceed to divide the next initial cross-section "I+1" into its appropriate regions. The primed regions of cross-section "I" do not contribute to any regions of cross-section "I+1". All of the unprimed regions contribute to the next cross-section. The "1" region from cross-section "I" remains a "1" region for cross-section "I+1" if cross-section "I+2" still contains the region. If "I+2" does not contain the region, the region becomes a 1' region. If "I+2" partially contains the region, it becomes partially a "1" region and partially a 1' region. The other unprimed regions of cross-section "I" carry over to cross-section "I+1" as primed or unprimed regions, or partially as both, depending on whether they continue on to cross-section "I+2" or not. However, these other regions drop one region number with each succeeding layer until they get included into regions 1 of 1' if they are not lost by inclusion in one of the higher prime regions prior to this.

For example, cross-section I, region 3 becomes cross-section "I+1" region 2 or 2', etc. Therefore we can see how the different curing regions on each cross-section are determined on successive layers based on the previous layers and on the initial cross-section boundary of the following layer. For example, cross-section 1 (the first cross-section of the object) can include only type N+1 and type N+1' regions. Whereas cross-section 2 can contain type N+1, N+1', N, and N' regions depending on how the regions of cross-section 1 and cross-section 3 relate to cross-section 2, etc.

These concepts can be implemented in a variety of ways. One method of implementation was discussed in relation to a presently preferred version of Slice (Version 3.64). Another preferred implementation of the present invention is based on the slicing techniques described in concurrently filed U.S. patent application Ser. No. 07/606,191, entitled "Boolean Layer Comparison Slice", filed by Snead et al.

This referenced application discloses a layer comparison method to determine how to transform the object representation into buildable cross-sections. The primary embodiment of this application is directed towards building oversized parts, but the techniques of the invention can easily be modified to produce undersized parts. This referenced application discloses methods of comparing successive cross-sections to determine the up-facing and down-facing features of each cross-section as well as the non-up-facing and down-facing regions.

The distinguishable regions described above associated with each initial cross-section were described in terms of relationships between the present cross-section and adjoining cross-sections. Therefore, a method of generically comparing neighboring cross-sections to determine overlapping regions (intersecting areas on two cross-sections) as well as non-overlapping regions (either included on one cross-section or the other cross-section but not on both) can be used to implement the present invention. There are various ways to optimize the processing of such information to obtain the regions, and their cure depths, associated with each layer. For example we may obtain the boundary (or area) data associated with each region on a given cross-section according to the steps described in Table 2. Table 2 depicts Boolean operations that can be utilized to obtain the regions described in association with Table 1 for an arbitrary cross-section I. These regions, as indicated, are obtainable by intersection and differencing operations. These operations are preformed on intermediate boundaries indicated by an * and initial cross-section boundaries of layer (I−1−N) up to layer (I+1).

TABLE 2

Summary of some possible area comparisons that can be used to obtain regional information for a given cross-section when using an Up-Facing Feature Priority Embodiment.

| Step No. | Steps | Region |
|---|---|---|
| 1 | {I}(ICSB) n {I + 1}(ICSB) = {I}(*) | |
| 2 | {I}(ICSB) − {I + 1}(ICSB) = {I}(*') | |
| 3 | {I}(I) − {I − 1}(ICSB) = | {I}(N + 1) |
| 4 | {I}(*) − {I − 1}(ICSB) = | {I}(N + 1') |
| 5 | {I}(*) N {I − 1}(ICSB) = {I}(N + 1*) | |
| 6 | {I}(*') N {I − 1} − (ICSB) = {I}(N + 1'*) | |
| 7 | {I}(N + 1*) − {I − 2}(ICSB) = | {I}(N) |
| 8 | {I}(N + 1'*) − {I − 2}(ICSB) = | {I}(N') |
| 9 | {I}(N + 1*) n {I − 2}(ICSB) = {I}(N*) | |
| 10 | {I}(N + 1'*) n {I − 2}(ICSB) = {I}(N'*) | |
| 11 | {I}(N*) − {I − 3}(ICSB) = | {I}(N − 1) |
| 12 | {I}(N'*){I − 3}(ICSB) = | {I}(N − 1') |
| 13 | {I}(N*)n{I − 3}(ICSB) = {I}(N − 2*) | |
| 14 | {I}(N'*) n{I − 3}(ICSB) = {I}(N − 2'*) | |
| 15 | {I}(N'*) n{I − 3}(ICSB) = {I}(N − 2*) | {I}(N − 1') |
| 16 | {I}(N'*) n{I − 3}(ICSB) = {I}(N − 2*) | {I}(N − 1') |
| 17 | {I}(5*) n{I + 2 − N}(ICSB) = {I}(4*) | |
| 18 | {I}(5*') n{I + 2 − N}(ICSB) = {I}(4*') | |
| 19 | {I}(4*) − {I + 1 − N}(ICSB) | {I}(3) |
| 20 | {I}(4*') − {I + 1 − N}(ICSB) | {I}(3') |
| 21 | {I}(4*) n{I + 1 − N}(ICSB) = {I}(3*) | |
| 22 | {I}(4*') n{I + 1 − N}(ICSB) = {I}(3'*) | |
| 23 | {I}(3*) − (I − N)(ICSB) = | {I}(2) |
| 24 | {I}(3'*) − (I − N)(ICSB) = | {I}(2') |
| 25 | {I}(3*) n{I − N}(ICSB) = {I}(2*) | |

TABLE 2-continued

Summary of some possible area comparisons that can be used to obtain regional information for a given cross-section when using an Up-Facing Feature Priority Embodiment.

| Step No. | Steps | Region |
|---|---|---|
| 26 | {I}(3'*) n{I − N}(ICSB) = {I}(2'*) | |
| 27 | {I}(2*) − {I − 1 − N}(ICSB) = | {I}(1) |
| 28 | {I}(2'*) − {I − 1 − N}(ICSB) = | {I}(1') |
| 29 | {I}(2*) n{I − 1 − N}(ICSB) = {I}(N − 2*) | |
| 30 | {I}(2'*) n{I − 1 − N}(ICSB) = {I}(N − 2'*) | |

Where { } indicates the Cross-section Number
e.g. {I} = The Present Cross-Section
( ) indicates the particular region of the cross-section in the preceding { }.
e.g. (ICSB) = The Initial Cross-Section Boundary Area
e.g. (N) = The Boundary Area of the Nth region
"n" = the intersection operation
"−" = the difference operation
"=" = the result of the particular operation This generalized up-facing embodiment can be modified for utilization with materials that are not limited, for a given layer-thickness, by the first type of MSD (inability to form a cohesive structure thinner than the MSD), but instead are limited by the second type of MSD (inability to form non-curling or low-curling layers thinner than the MSD when higher layers are adhered to them). In this case the primed regions of the previous disclosure can all be cured to the proper depth. This is because one doesn't need to worry about the next higher layer inducing curl in the material transformed in association with the primed regions of the present cross-section since the next higher layer doesn't exist above these regions. Therefore, each of these primed regions can be given the appropriate cure depth. The unprimed regions, on the other hand, must be cured according to the previous teachings. We can conclude that material/layer-thickness combinations not limited by the first type of MSD but instead that are limited by the second type of MSD can be used to form all types of high resolution objects (of vertical resolution equal to the layer-thickness) without loss of accuracy due to the misplacement of features and with only little or no loss of accuracy due to curl. This represents a significant improvement to the simple approaches to stereolithography that don't address the issue of curl distortion. If this method doesn't completely lead to the desired level of curl reduction, it can be combined with the other methods of curl reduction described in the previously referenced applications.

For combinations that are limited by both types of MSD, an intermediate method can be developed that maximizes the overall accuracy of the object to be formed.

As with the above Up-facing Priority approach, other approaches can be developed regarding the placement of features when regions become thinner than the MSD. Similarly other approaches can be developed regarding the curing of regions that are thicker than the MSD.

Down-Facing Priority

As with up-facing priority embodiments as well as other priority embodiments, there are many methods for implementing a down-facing priority embodiment. These various methods may have their origin in different algorithms that are used to obtain the desired data or they may have their differences arise from the desire to obtain different types of data. For example, one embodiment may require knowledge of which regions are up-facing while another embodiment may not require such information. As another example, embodiments may differ due to the desired method of curing internal regions of the object. Such differences are depicted in the cure styles of FIGS. 5 and 6.

A simple down-facing priority embodiment has one major aspect that differs form a simple up-facing priority embodiment. When a down-facing feature is encountered on a given layer "I", the area of the feature is conceptually pushed up through the next N−1 layers (assuming the MSD=N layer thicknesses). This down-facing feature will be associated with layer "I+N−1" for curing instead of layer "I" from which it was derived. This down-facing feature is cured to a depth equal to the MSD, thereby placing the lower surface of the down-facing feature at the proper vertical level of the part. As a down-facing region is pushed up through the next N−1 layers, its area is removed from curing consideration on the first N−2 of these higher layers.

This above discussion refers to layers not slicing planes. One can consider a down-facing feature to be found at a slicing plane which indicates the lower extent of a layer, whereas the vertical level or value associated with the layer is equal to the value of the next higher slicing plane. This next higher slicing plane indicates the upper extent of the layer which contains the down-facing feature. Presently preferred methods (as taught in the above referenced application) form down-facing features by curing them from the top of their associated layers down to the bottom of their layers.

The following steps can be followed in implementing a simple Down-Facing Priority Embodiment of the present invention. These steps are based on the ability to perform Boolean layer comparisons as disclosed in the previously referenced U.S. patent application Ser. No. 07/606,191, entitled "Boolean Layer Comparison Slice" filed concurrently herewith. These steps can be performed by processing data one layer at a time followed by transformation of material for that layer (this does require some memory of previously formed layers and it does assume that knowledge about up-facing regions isn't necessary) and then processing the data for the next successive layer. This first possibility relates to slicing and obtaining data as needed. This is sometimes referred to as "Slicing on the Fly". Alternatively, these steps may be performed on a multiple layer basis prior to material transformation or on all the layers of the object prior to transforming material.

The procedure begins by processing each layer of the object according to the teachings of U.S. patent application Ser. No. 07/606,191. One first obtains down-facing, up-facing, and continuing (volume) regions for each layer. Only the boundaries need be determined for these individual regions. It is not necessary to determine cross-hatch and fill at this point.

In standard stereolithography the LBi(I), i.e., layer boundary vectors, are cured to a depth of one layer-thickness plus any necessary overcure to obtain adhesion to the previous cross-section. The area within the LBi(I) can be cured in any appropriate manner including complete solidification (e.g. Skintinuous methods as described in U.S. patent application Ser. Nos. 07/429,435 and 08/121,846) or partial solidification (e.g. hatching methods). Additionally, these areas can be cured by methods that include various curl reduction techniques (e.g. multipass, rivets, tiles, or the like).

Likewise in standard stereolithography, the UBi(I) are similarly cured except that the entire upper surface of the region must be transformed to form a smooth up-facing feature. The DBi(I) are to be cured to a depth of one layer-thickness and are formed so that a substantially uniform cure depth is supplied so that a smooth down-facing feature is formed.

In the present embodiment, the DBi(I) are shifted up by N−1 layers to become the final down-facing boundaries of layer "I+N−1", DBi(I+N−1). This leaves the UBi(I) and LBi(I) associated with layer I.

Next, the DBi(I−N+1) are shifted up to layer I to become the final down-facing boundaries of layer "I", DBi(I).

Next, any area within the UBi(I) and LBi(I) which is also in the DBi(I) is removed from the UBi(I) and LBi(I) to form the first modified up-facing boundaries and continuing boundaries of layer "I", UBm1(I) and LBm1(I).

Next, the UBm1(I) and LBm1(I) undergo a second modification by removal of any intersecting area with the DBi(I−N+2) for N>2) yielding the UBm2(I) and LBm2(I).

Similar modifications continue to occur until any down-facing features originally associated with the previous layer are removed from the UBmn-2(I) and the LBmn-2(I) to form the UBmn-1(I)=UBi(I) and the LBmn-1(I)=LBi(I) wherein m=modification and n=N and f=final.

The LBi(I), UBi(I), and the DBi(I) represent the regions which will be cured in association with layer I. Appropriate cross-hatch, fill or other area transformation parameters are determined for these areas. Methods for making such determinations are described in detail in the previously referenced patent application.

The DBi(I) is cured to the MSD with appropriate parameters for creating a smooth lower surface. The down-facing features created by following these teachings will be appropriately placed.

The LBi(I) is cured to an appropriate depth which is generally greater than or equal to one layer-thickness (the exact depth depends on the MSD for supported regions). By definition, there is material transformed one layer-thickness below this region. Furthermore, by definition this region does not form an up-facing feature of the object. Therefore, this region can be cured to an appropriate depth to form an adequately cohesive layer as well as to ensure adequate adhesion to the previously cured layer of material without regard to the necessity of complete area transformation. Various curl reduction methods can be utilized in transforming this region, including an open cross-hatch structure, if desired.

The UBi(I) region is cured to a similar depth as the LBi(I) region but the region is cured so as to form a continuously transformed upper surface resulting in a smooth up-facing feature.

This procedure is followed for all layers. The data obtained from this embodiment can be used to form a substantially high resolution object, wherein any deviations, due to features being thinner than the MSD, will result in placing the upper surfaces of the up-facing features out of position. Down-facing features will be accurately placed. This is indicated in FIG. 13e.

Other down-facing priority embodiments are possible as well as embodiments implementing the other styles depicted in FIG. 13 or the like.

Figures 7, 8, 9, 10, 11, 12, 13, 14, 15, 16, 17, 18, 19, 20:
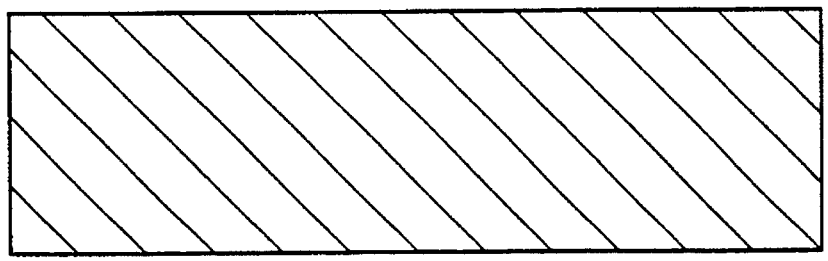

Additional Embodiments:

The SMLC techniques described herein can be implemented for an MSD, which is greater than the desired resolution, and/or an MRD, which is greater than the desired resolution. For example, FIG. 20, depicts a side view of the three-dimensional object of FIG. 1 as formed using an embodiment wherein the material has an MSD which is four times greater than the desired resolution and an MRD which is also four times greater than the desired resolution. In practice for a given exposure style, the MSD and MRD may have different values. In present circumstances, the most useful ratios of MSD to layer-thickness (i.e. desired resolution) are in the range of one to four and more specifically in the range of two to three. Similarly, in present circumstances, the most useful ratios of MRD to layer thickness are in the range of one to four and more specifically in the range of two to three. However, the usefulness, techniques for defining, and implementation of embodiments with higher ratios are readily apparent from the instant disclosure.

As noted previously, with regard to the MSD, the resolution of the object will be that of the layer thickness except in those portions of the object which have thicknesses less than the MSD. Also as noted previously, for those portions of an object with a thickness less than the MSD, a single default style may exist or a series of selectable styles can be made available. As flat surfaces are the easiest to smooth (e.g. sand), a preferred priority embodiment is one that emphasizes accurately locating non-flat features and shifting any necessary distortion to the flat surfaces.

With regard to an MRD greater than one-layer-thickness, the layer comparisons must ensure that a when an up-facing feature is reached, material wasn't cured below that feature within a depth which is less than the MRD. For example, if the MRD is 2 layer thicknesses, it must be ensured that the region one layer-thickness below the up-facing feature isn't cured. As a result, in this example, when an up-facing feature is reached, the feature will either need to be cured to a thickness of two or three layers plus any necessary over-cure amount. As an alternative, the algorithms used to generate the exposure data could ensure that the up-facing features have cured material located two layer thicknesses below the them while these lower cured regions are formed from coatings of material that have been given thicknesses of one, two or three layer thicknesses. In the one layer thickness case, a coating of one layer thickness is attempted and hopefully formed. A second alternative might accommodate utilization of appropriate coating thicknesses for the particular MRD by making adjustments in the cure depth which is applied to down-facing features. The algorithms described above, and to be described below, for working with both an MSD and an MRD, start the slicing process from the bottom of the object and work upward; however, in some circumstances it may be useful to reverse the order of slicing.

The techniques described herein and associated MSD definitions can be modified to deal with any print through problems that may exist. If the overcure necessary for adhesion and structural integrity doesn't cause intolerable print through of a previously formed layer which is given a cure depth at least as large as the MSD and which forms a down-facing region, then it can be ignored. However, if the necessary overcure does cause intolerable print through of down-facing features, then it must be taken into consideration when determining cure parameters.

For example, if the print through is only due to the curing of the first layer above a Final Down-Facing Boundary (FDFB) region and one wants to account for the print through, one must consider several things. Part of the FDFB may be both up-facing and down-facing and thus print through will not effect the cure depth of this region. Furthermore, another part of the FDFB may be only down-facing which implies that there is at least one additional layer, to be solidified, located above it, and thus print through must be considered. An FDFB with at least one additional object layer above can only be cured in association with its assigned cross-section if the MSD plus the print through can yield a net thickness equal to the distance between the assigned cross-section and the lower edge of the down-facing feature. If this is the case, an appropriate exposure can be used on the FDFB to yield a thickness greater than or equal to the MSD wherein the remaining depth of cure will be achieved when exposing the next layer. If this is not the case, the FDFB region must be pushed up one additional layer so as to provide sufficient thickness, between the upper surface of the layer being cured and the lower edge of the down-facing feature, to allow a combined FDFB exposure, which is at least equal to the MSD, and print through exposure so as to place the lower edge of the down-facing feature at its proper location. If a portion of the upshifted FDFB overlays what was a final up-facing boundary FUFB region, this portion should be given an exposure to yield the full cure depth need so as to place the down-facing feature at its proper location. On the other hand, if a portion of the upshifted FDFB region doesn't overlay an FUFB region, then that portion of the FDFB region should be given an exposure that yields a cure depth which is less than the necessary cure depth by the amount which will be added when the next higher layer is adhered to the upshift FDFB region. It must be further remembered that when curing the region immediately above a FDFB, wherein print through is a concern, the print through will produce a pattern at the lower edge of the down-facing feature matching exposure pattern that is used. Thus, exposure of such a region should be applied in a manner so as to maintain or produce a smooth down-facing surface in the final object.

There are a number of important parameters that can be incorporated into the SMLC techniques disclosed herein. The range of possibilities that these parameters can take results in a large number of possible embodiments. Several of the primary parameters and some of their possible values are listed in Table 3 below:

TABLE 3

IMPORTANT SMLC PARAMETERS AND PRIMARY VALUES

| Factor | Typical Values |
|---|---|
| MSD | a. 1 LT (Standard Stereolithography) |
| | b. 2 – 4 LT |
| | c. Other |
| MRD | a. 1 LT (Standard Stereolithography) |
| | b. 2 – 4 LT |
| | c. Other |
| Features | a. None thinner than MSD |
| | b. Some Thinner than MSD |
| |    1. Cure all portions even if thinner than the MSD |
| |    2. Cure only portions which are thicker than ½ the MSD |
| |    3. Cure no portions which are thinner than the MSD |
| |    4. Other |
| | c. Other |
| Priority | a. Up-Facing |
| | b. Down-Facing |
| | c. Sloped Features, e.g. Ratio of Slopes |
| | d. Flat Features |
| | e. Other |
| Skin | a. Single (Standard Stereolithography) |
| | b. Double |
| | c. Other |
| Print Through | a. Adhesion from 1 Layer |
| | b. Other |
| Boundary Removal | a. Inner (for QUICKCAST) |
| | b. Other |
| Uniformity | a. Though a particular MSD is okay use thicker layers as much as possible to achieve a more uniform cure depth. |
| | b. Though a particular MSD is okay use a thicker Z-error correction factor as much as possible to achieve a more uniform cure depth. |
| | c. Other |
| Hatch Spacing | a. Inner and outer = equal |
| | b. Inner wider |

TABLE 3-continued

IMPORTANT SMLC PARAMETERS AND PRIMARY VALUES

| Factor | Typical Values |
|---|---|
| | c. Other |
| Line Width | a. Single value for all boundaries |
| Compensation | b. Boundary specific values |
| | c. Other |
| Level | a. Basic (move boundaries with little regard to what they encounter) |
| | b. Moderately Perceptive (Remove multiple curing of regions) |
| | c. Highly perceptive (Stop the up-shifting of SDFBs when they are bounded from below due to up-shifting of SDFBs from lower layers |
| | d. Other |
| Multiple Objects | a. Don't worry about merging of multiple objects |
| | b. Consider the merging of multiple objects |
| | c. Other |
| Variable Specification | a. General specification |
| | b. Region specific |
| | c. Other |
| Cross-sectional Erosion or Expansion | a. Determination of offset FLBs |
| | b. Determination of at least first and second regions at different distances from the FLBs for applying different exposure parameters. |
| | c. Combine with SMLC for multiple boundaries and multiple skins. |
| Other | |

Table 4 depicts the primary characteristics of a few example embodiments which are further described below. As is apparent from Table 3, many other embodiments are possible.

TABLE 4

PRIMARY CHARACTERISTICS FOR EMBODIMENTS A–L

| No | MSD (LT) | MRD (LT) | Priority | Other |
|---|---|---|---|---|
| A | 2 | 1 | Up-Facing | Level = Basic |
| B | 2 | 1 | Down-Facing | Level = Basic |
| C | 2 | 1 | Down-Facing | Level = Highly Perceptive |
| D | 2 | 1 | Down-Facing | Level = Highly Perceptive Skinning = Double |
| E | 3 | 1 | Down-Facing | Level = Basic |
| F | 3 | 1 | Down-Facing | Level = Moderately Perceptive |
| G | 3 | 1 | Down-Facing | Level = Highly Perceptive |
| H | 3 | 1 | Down-Facing | Level = Highly Perceptive Skinning = Double |
| I | 2 | 2 | Down-Facing | Level = Highly Perceptive |
| J | 3 | 2 | Down-Facing | Level = Highly Perceptive |
| K | 3 | 2 | Down-Facing | Level = Highly Perceptive Boundary = Inner Removal |
| L | 3 | 2 | Down-Facing | Level = Highly Perceptive Skinning = Double Boundary = Inner Removal |

In implementing these embodiments, layer comparisons are required to determine with which final cross-sections each portion of each initial cross-section will be associated and each portion's appropriate cure depth.

Figure 36A:
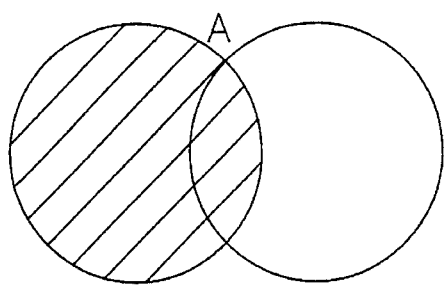
FIGS. 36a to 36f depict top views of two horizontal regions "A" and "B" which are operated on by Boolean union, intersection, and differencing operations.
Figure 36B:
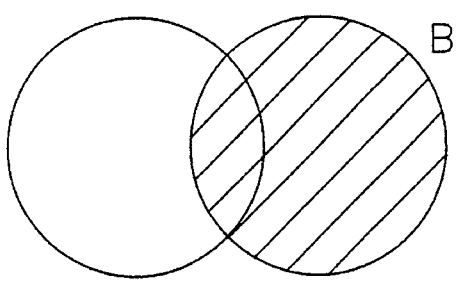
Figure 36C:
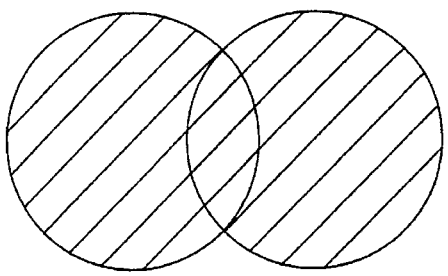
Figure 36D:
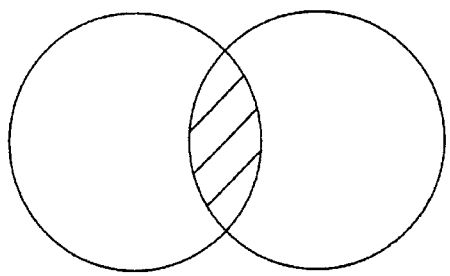
Figure 36E:
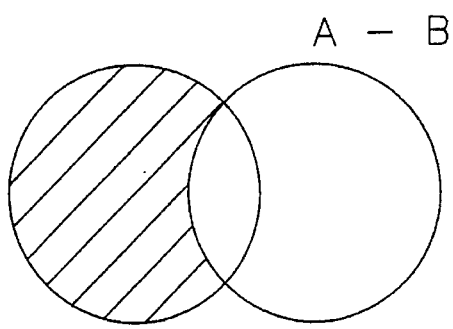
Figure 36F:
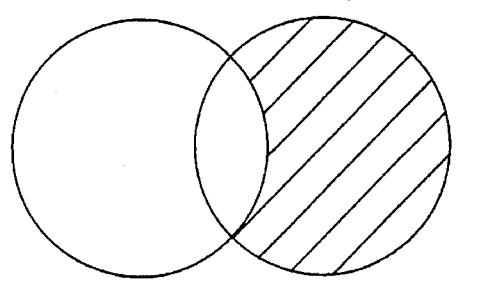

Layer Comparison Slice (CSlice) as described in U.S. patent application Ser. No. 07/606,191, already does generic layer comparisons in the form of Boolean unions (+), differences (−), and intersections ("n" or "*"). FIG. 36 graphically depicts these Boolean operations. The shaded portion within the circle of FIG. 36A depicts a first region known as region A. The other circle represents the physical placement of a second region, known as region B, relative to region A. In an analogous manner the shaded portion within the circle of FIG. 36B depicts region B, while the other circle represents region A. The shaded portion of FIG. 36C represents the result of the Boolean union of regions "A" and "B" (A+B). The shaded portion of FIG. 36D represents the Boolean intersection of regions "A" and "B" (A∩B, or alternatively A* B). The shaded portion of FIGS. 36E and 36F, respectively, depict the result of the Boolean differencing operation of A minus B and B minus A. CSlice also uses the NOT operator (−). This operator is equivalent to the differencing operator depicted in FIGS. 36e and 36f but instead of the first element being a finite region of space it is the entire working space. Thus the NOT operator reverses whatever it operates on. The above Boolean operations have been found to be useful in the CSlice program, of course other Boolean operations can also be used as needed.

To aid in understanding each embodiment, several Figures are provided which depict the results of the Boolean operations as required by each embodiment and as specifically applied to three objects. It should be noted that these objects are not typical, as they contain extremely thin features that would not normally be found. These objects were chosen specifically because of these small features in order to verify the algorithms utilized by each embodiment. Only a side view X-Z plane of each object is provided, and thus even though the Boolean operations operate on regions which are two-dimensional in the horizontal plane, only a single dimension of this plane is shown (X-dimension). It is to be understood that the objects possess some unspecified configuration in the other horizontal dimension (Y-dimension) which extends into the plane of the paper.

Figures 7, 8, 9, 10, 11, 12, 13, 14, 15, 16, 17, 18, 19, 20, 21:
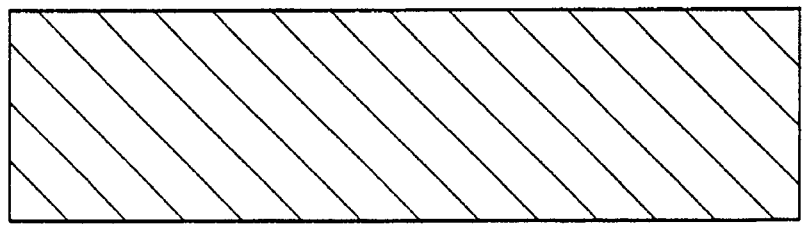
Figures 7, 8, 9, 10, 11, 12, 13, 14, 15, 16, 17, 18, 19, 20, 21, 22:
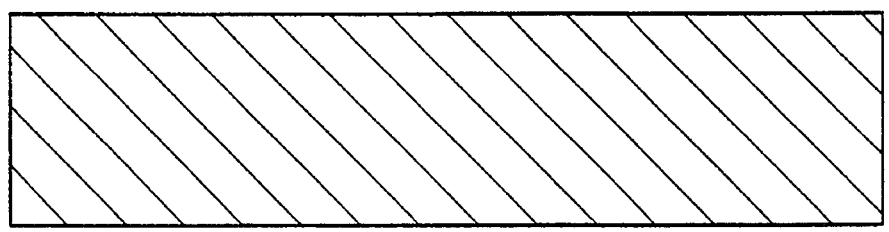

The starting point for these embodiments are the boundaries currently produced and utilized by CSlice. FIGS. 21 and 22 depict the three objects as would ideally be formed using standard stereolithography along with the individual boundary types utilized, assuming MSD<=1, MRD<=1 and appropriate cured depths are applied.

Figure 21A:
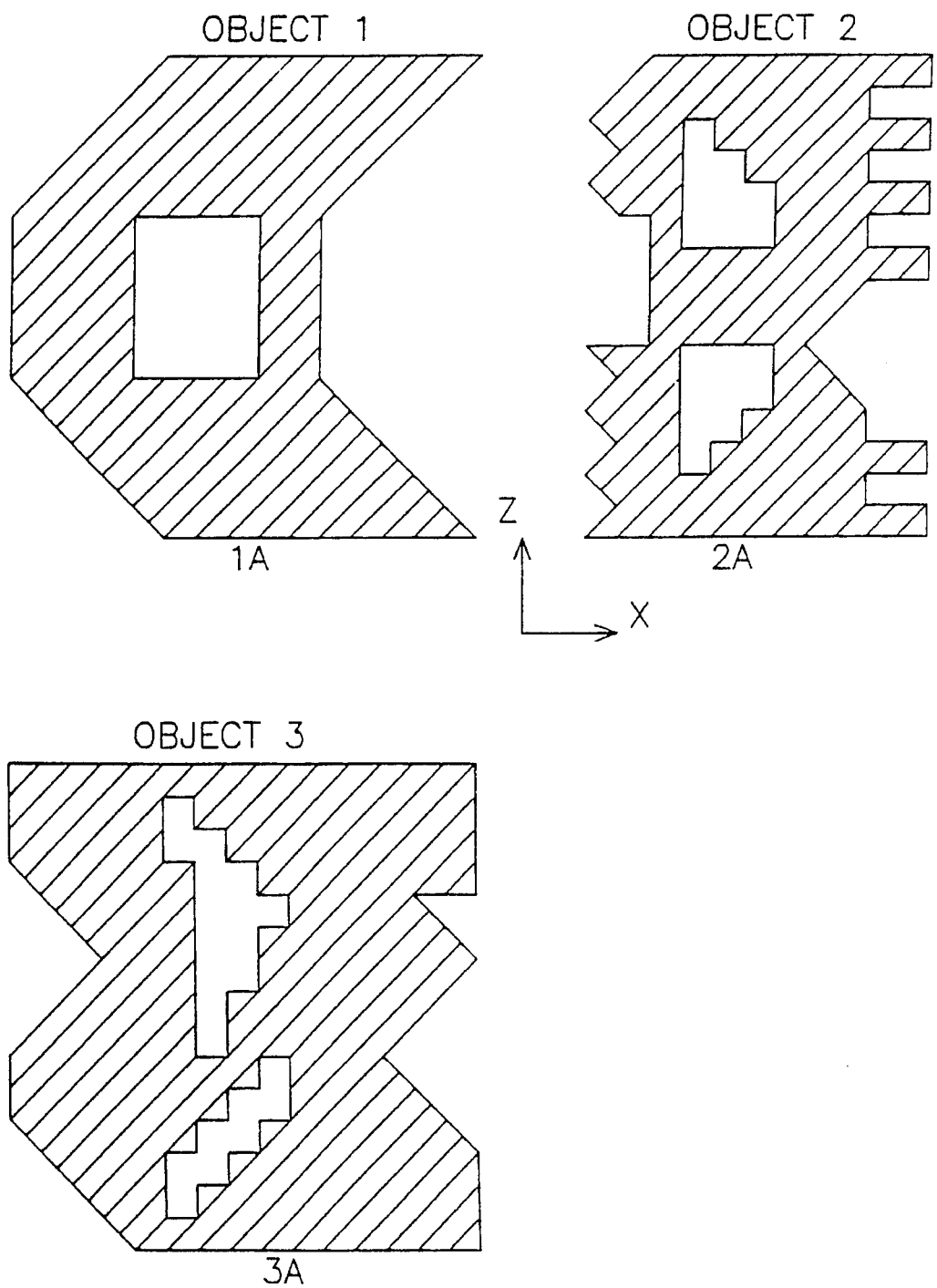
FIG. 21A depicts side views of a first, second and third object, respectively, to be stereolithographically formed.

FIG. 21A depicts side views of a first, second and third objects, respectively, to be stereolithographically formed. These objects are the first, second and third objects referred to in FIGS. 22–35.

Figure 21B:
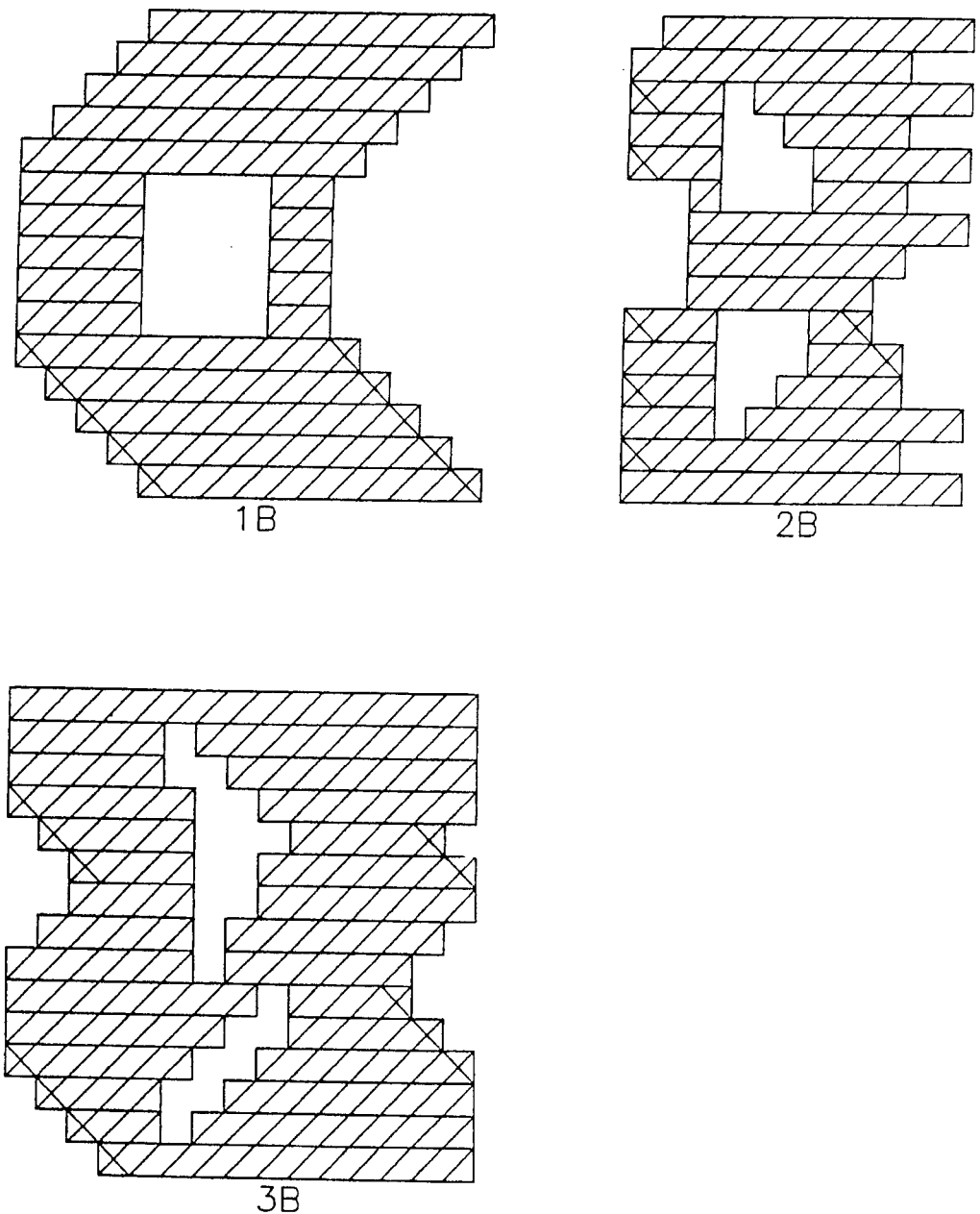
FIGS. 21B depicts side views of the first, second and third objects, respectively, as formed using standard stereolithography with a desired resolution (MSD=1 LT, MRD=1 LT).

FIG. 21B depicts side views of the first, second and third objects, respectively, as formed using standard stereolithography with a desired resolution (MSD=1, MRD=1). These Figures depict the desired resolution to be achieved by the embodiments of FIGS. 25–35.

Figure 22A:
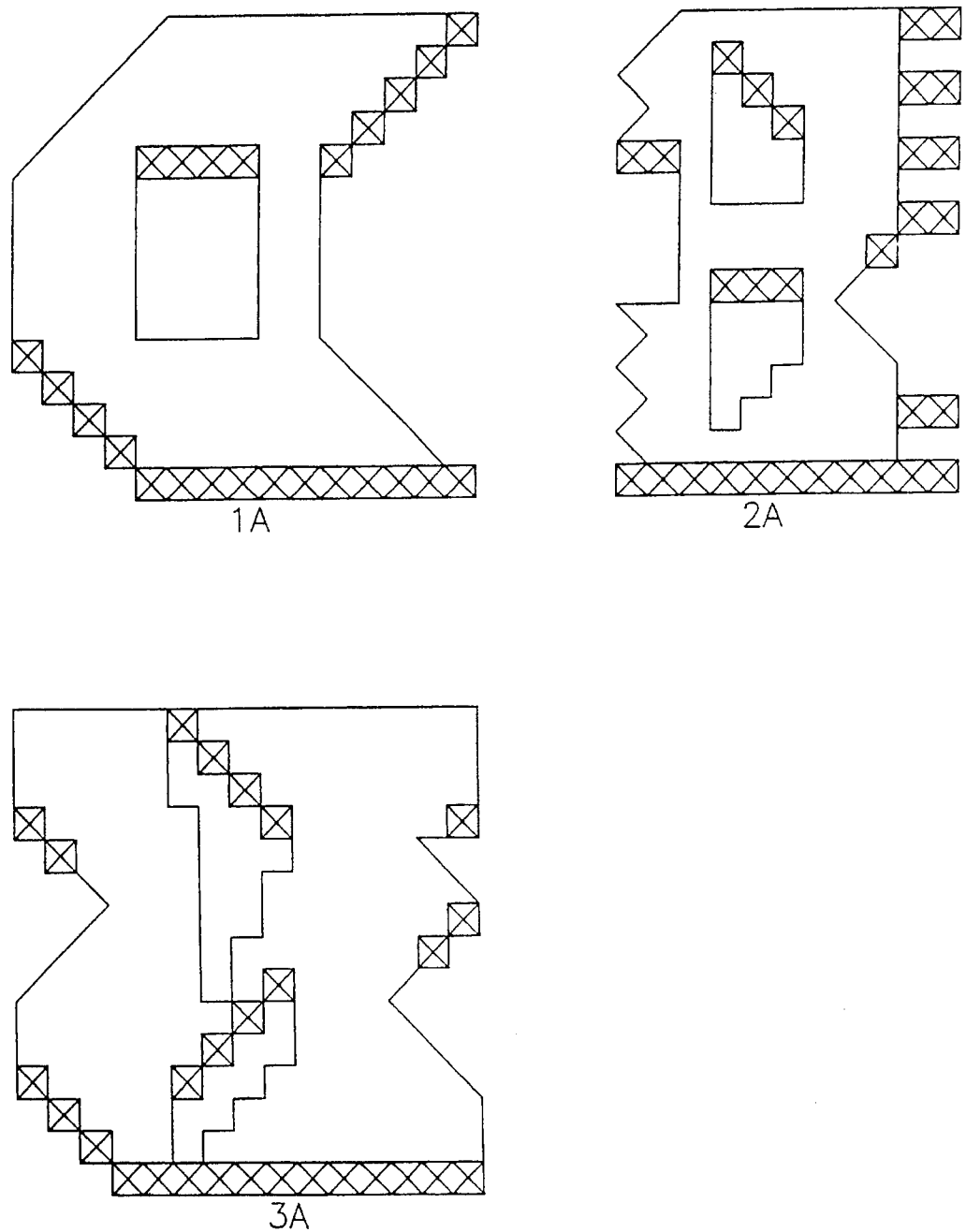
FIG. 22A depicts side views of the standard down-facing boundaries (SDFB) of the object of FIG. 21B, respectively.

FIG. 22A depicts side views of the first, second and third objects, respectively, with the down-facing boundaries of the objects of FIG. 21B, respectively. The down-facing boundaries are known as standard down-facing boundaries (SDFB). It is noted that the upper surface of the FDFB dictate the cross-section with which they are associated.

Figure 22B:
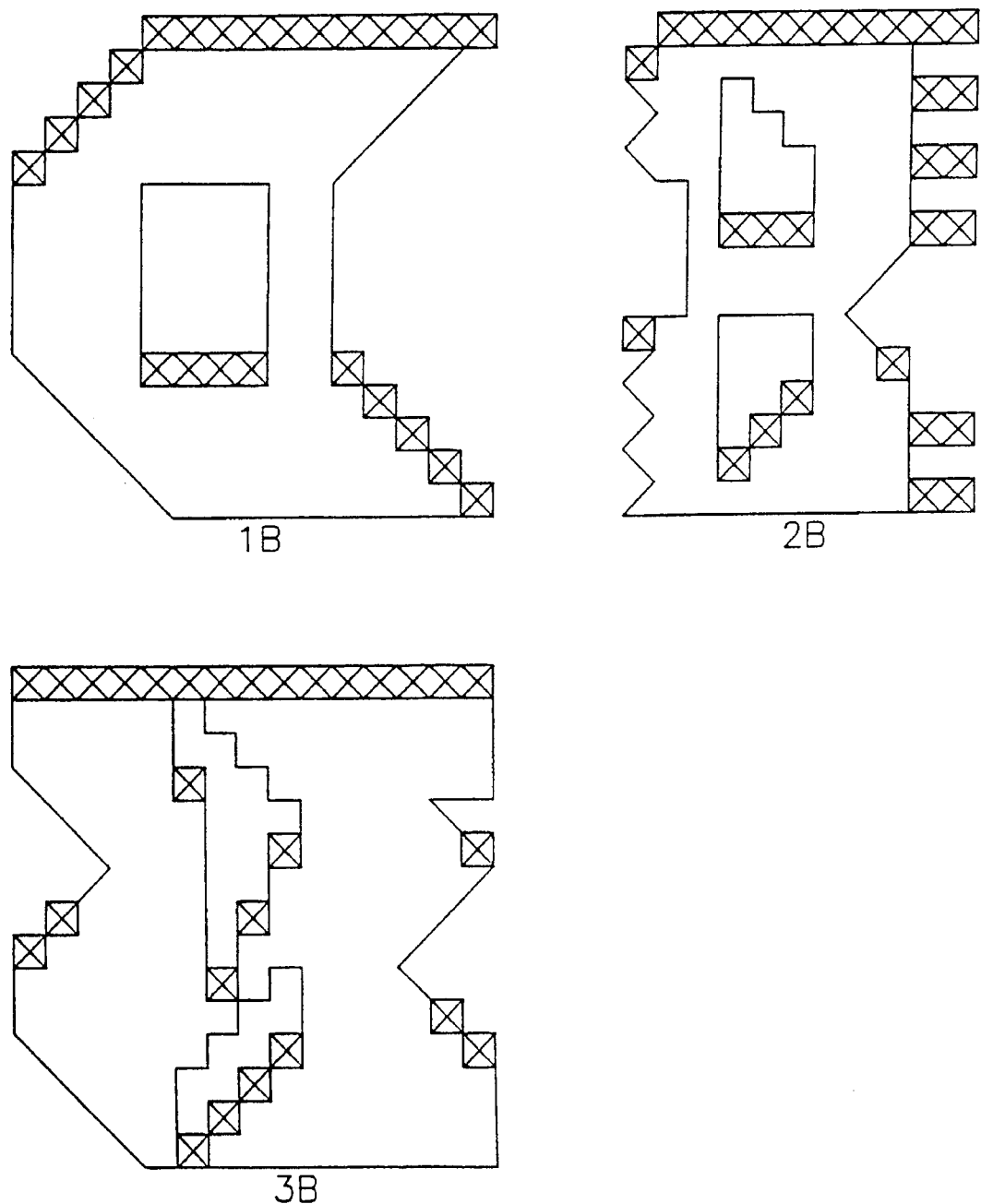
FIG. 22B depicts side views of the intermediate up-facing boundaries (IUFB) of the object of FIGS. 21B, respectively.

FIG. 22B depicts side views of the first, second and third objects, respectively, with the up-facing boundaries of the objects of FIG. 21B respectively, which have not been reduced by any overlap with down-facing boundaries of FIG. 22A, respectively. These unreduced up-facing boundaries are known as intermediate up-facing boundaries (IUFB). It is noted that the upper surface of the IUFB dictate the cross-section with which they are associated.

Figure 22C:
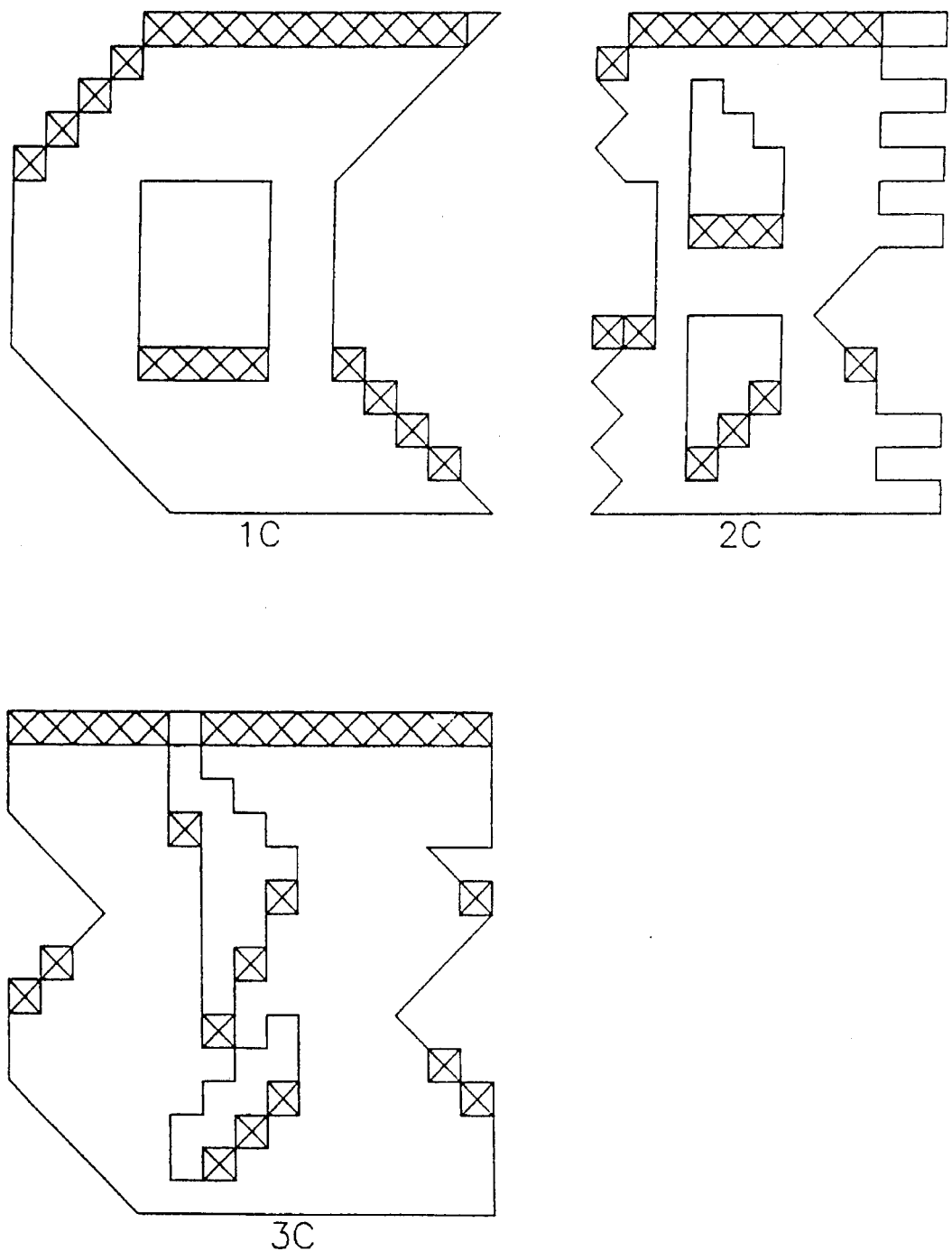
FIG. 22C depicts side views of the standard up-facing boundaries (SUFB) of the objects of FIGS. 21B.

FIG. 22C depicts side views of the first, second and third objects, respectively, with the up-facing boundaries of the objects of FIG. 21B, respectively, which have been reduced by any overlap with down-facing boundaries of FIG. 22A respectively. These reduced up-facing boundaries are known as standard up-facing boundaries (SUFB). It is noted that the upper surface of the SUFB dictate the cross-section with which they are associated.

Figure 22D:
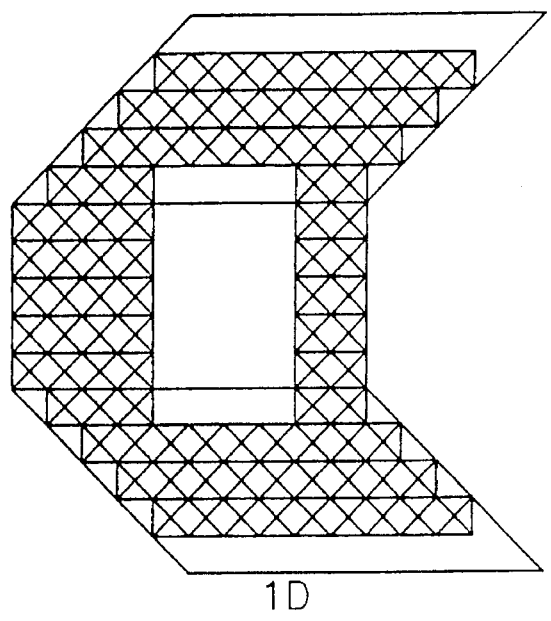
FIG. 22D depicts side views of the continuing boundaries (SLB) of the objects of FIG. 21B.
Figure 22D:
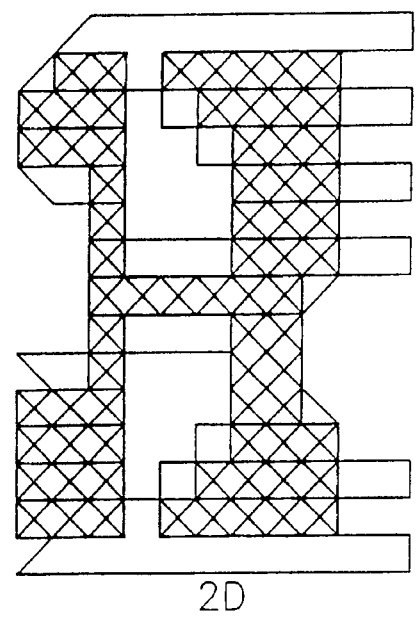
Figure 22D:
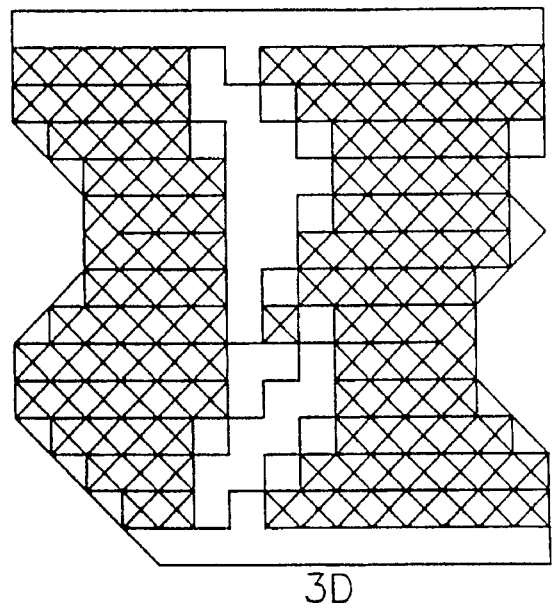

FIG. 22D depicts side views of the first, second and third objects, respectively, with the continuing boundaries of the objects of FIG. 21B, respectively. These continuing boundaries are known as standard layer boundaries (SLB). It is noted that the upper surface of the SLB dictate the cross-section with which they are associated.

Figures 7, 8, 9, 10, 11, 12, 13, 14, 15, 16, 17, 18, 19, 20, 21, 22, 23:
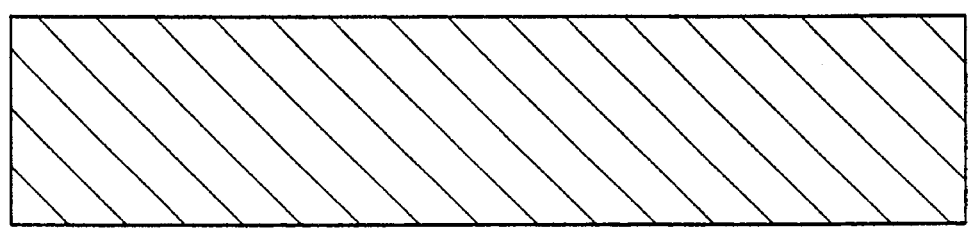
Figures 7, 8, 9, 10, 11, 12, 13, 14, 15, 16, 17, 18, 19, 20, 21, 22, 23, 24:
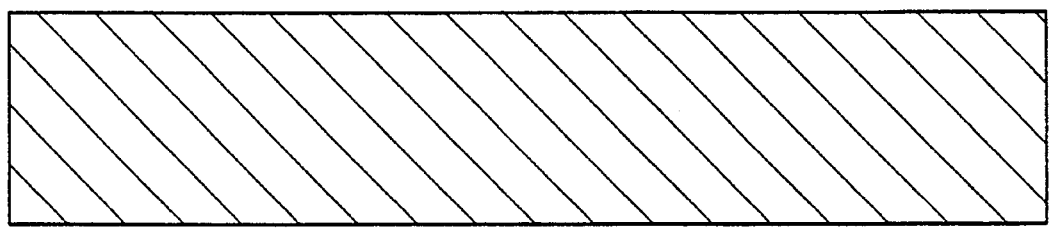

FIGS. 23 and 24 depict alternative ways the first second and third objects might be formed with standard stereolithography when the material properties aren't optimal.

Figure 23A:
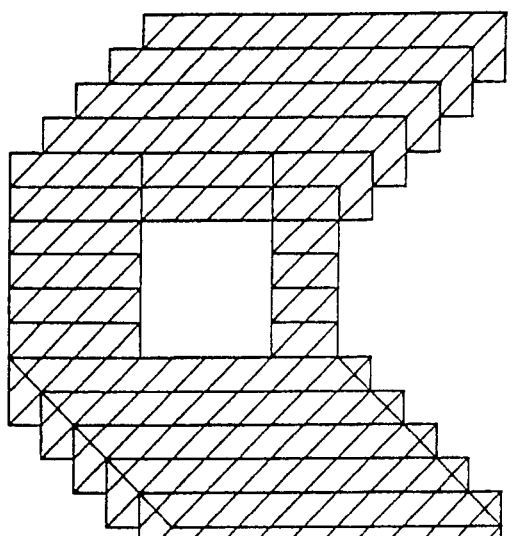
FIG. 23A depicts side views of the first, second and third objects of FIG. 21A, respectively, as formed using a first approach to standard stereolithography wherein the building material has an MSD of two layer thicknesses.
Figure 23A:
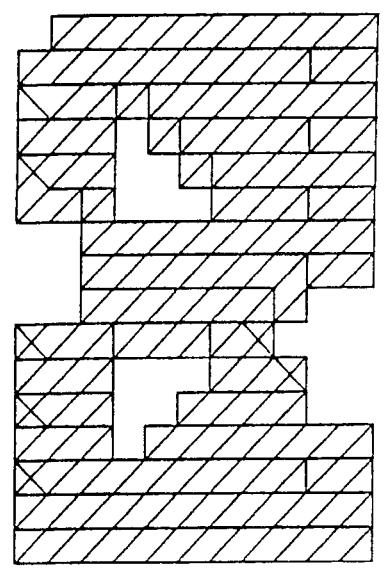
Figure 23A:
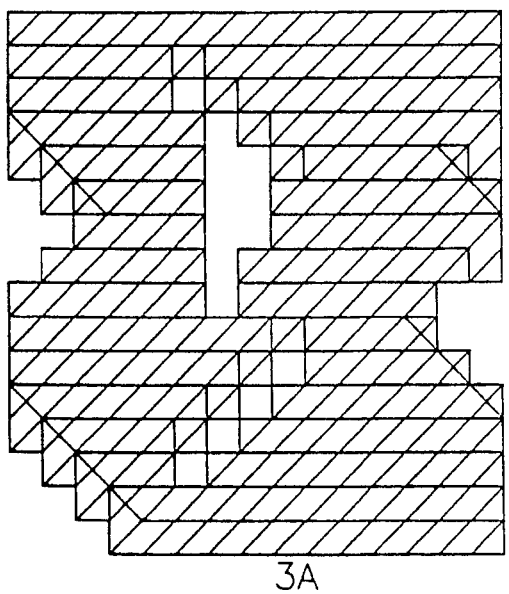

FIG. 23A depicts side views of the first, second and third objects, respectively, as formed using a first approach to standard stereolithography wherein the building material has a MSD of two layer-thicknesses.

Figure 23B:
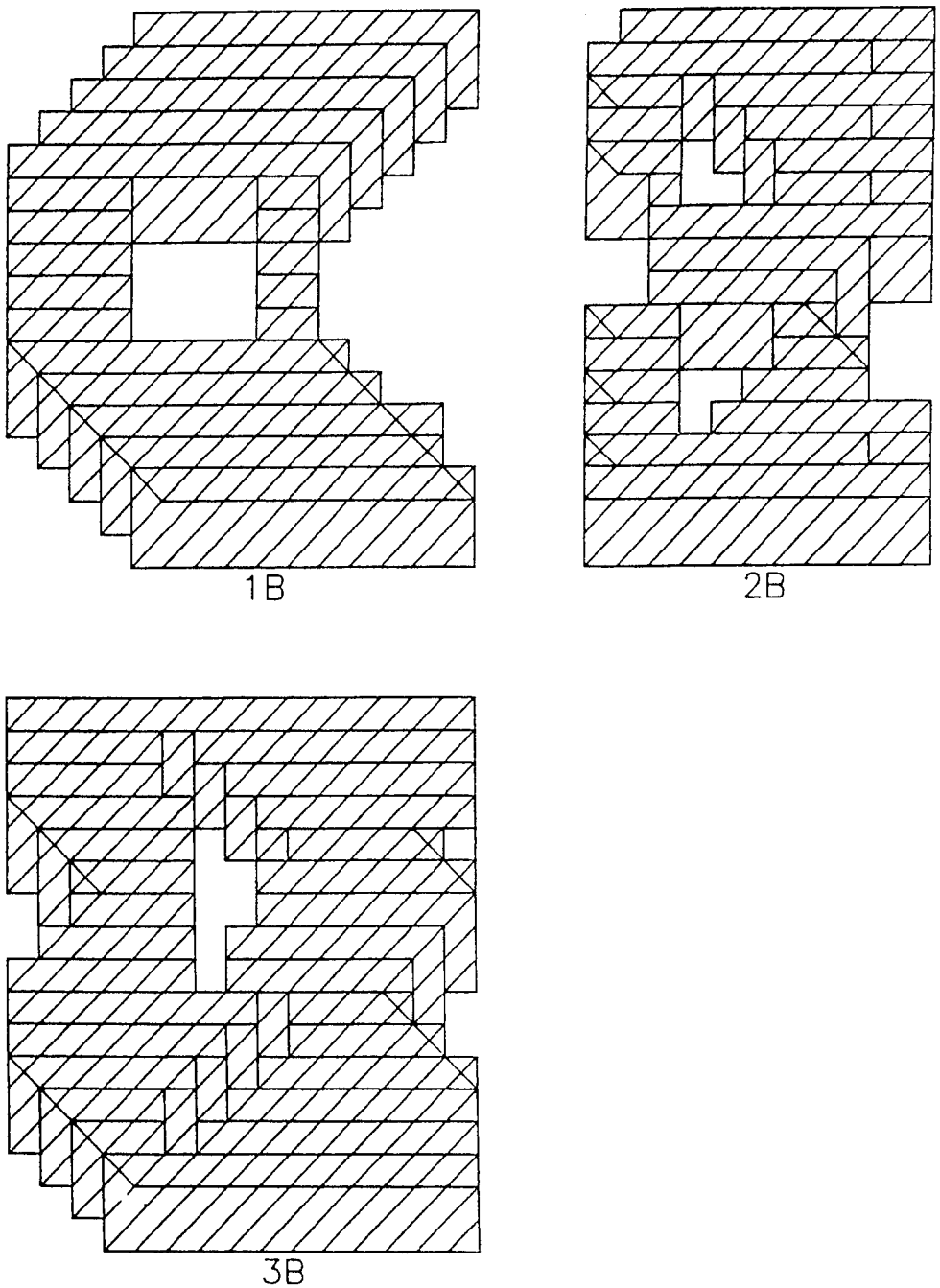
FIG. 23B depicts side views of the first, second, and third objects, respectively, as formed using a first approach to standard stereolithography wherein the building material has an MSD of 3 layer thicknesses.

FIG. 23B depicts side views of the first, second and third objects, respectively, as formed using a first approach to standard stereolithography wherein the building material has a MSD of three layer-thicknesses.

Figure 24A:
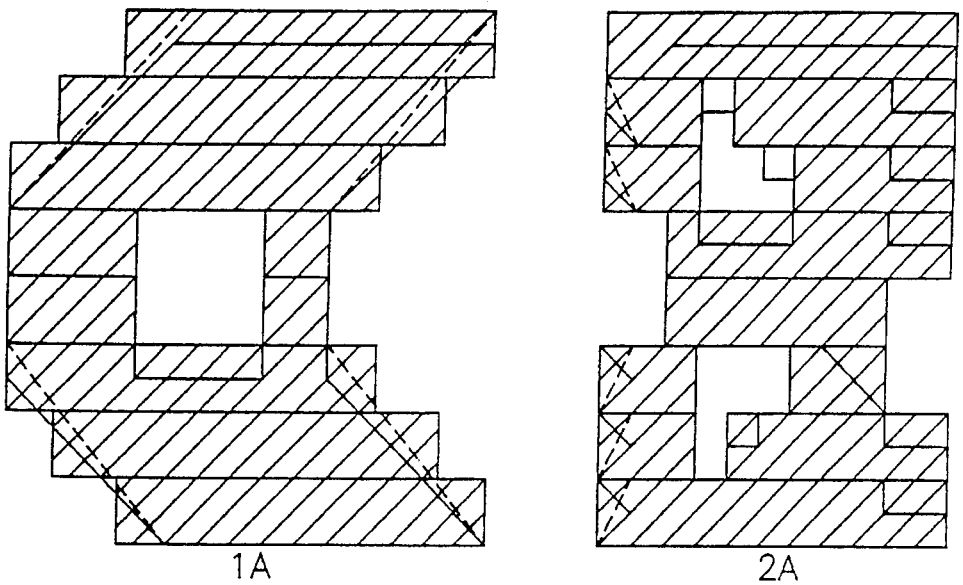
FIG. 24A depicts side views of the first, second and third objects, respectively, as formed using a second approach to standard stereolithography wherein the building material has an MSD of 2 layer thicknesses and possibly an MRD of 2 layer thicknesses.
Figure 24A:
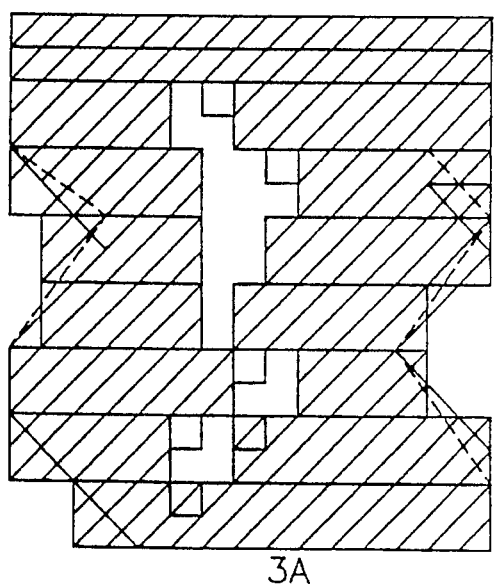

FIG. 24A depicts side views of the first, second and third objects, respectively, as formed using a second approach to standard stereolithography wherein the building material has a MSD of two layer-thicknesses and possibly an MRD of two layer-thicknesses.

Figure 24B:
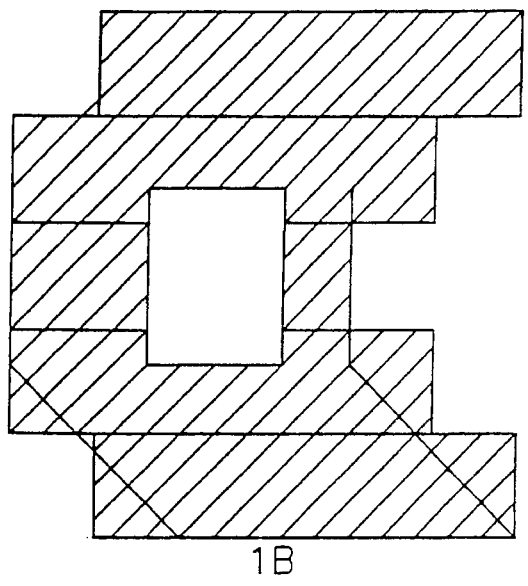
FIG. 24B depicts side views of the first, second, and third objects, respectively, formed using a second approach to standard stereolithography wherein the building material has an MSD of 3 layer thicknesses and possibly an MRD of 3 layer thicknesses.
Figure 24B:
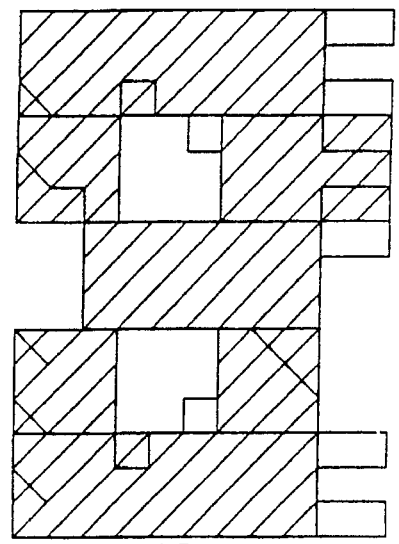
Figure 24B:
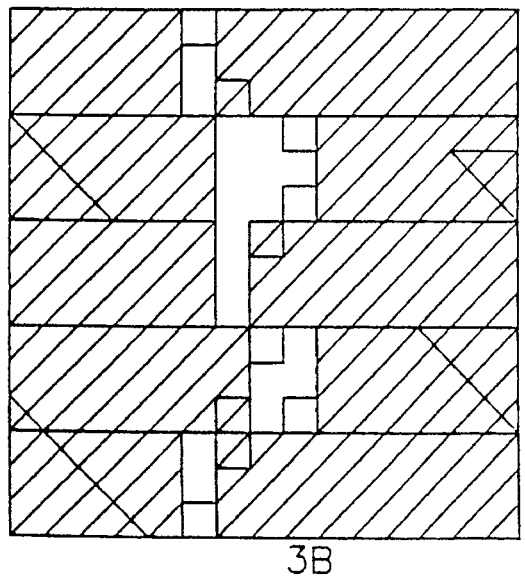
Figure 25:
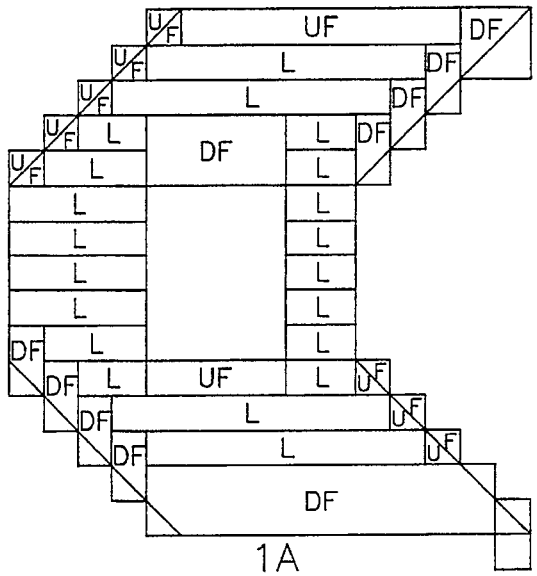
Figure 25:
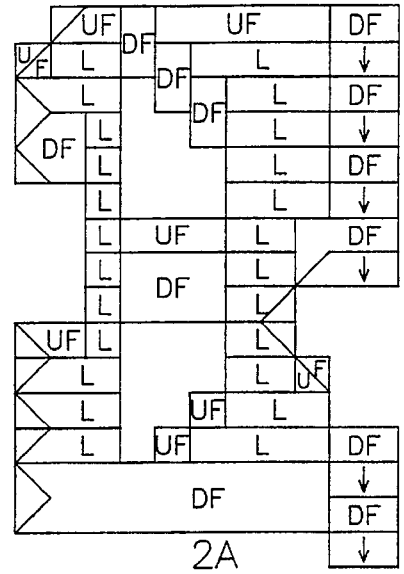
Figure 25:
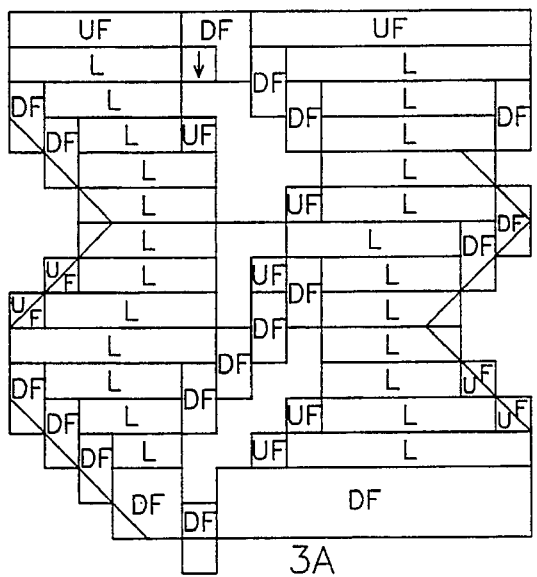
Figure 26:
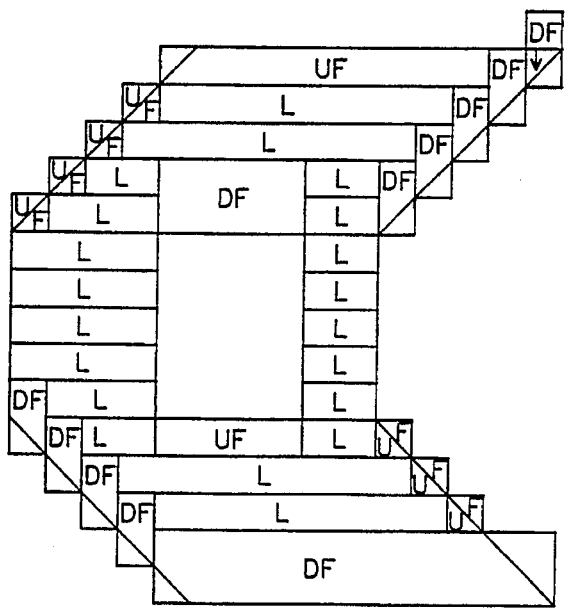
Figure 26:
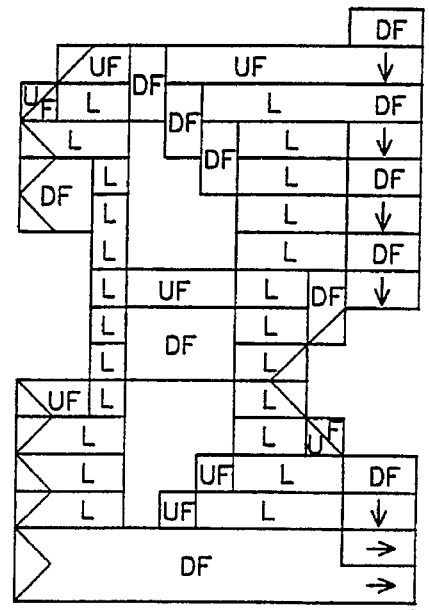
Figure 26:
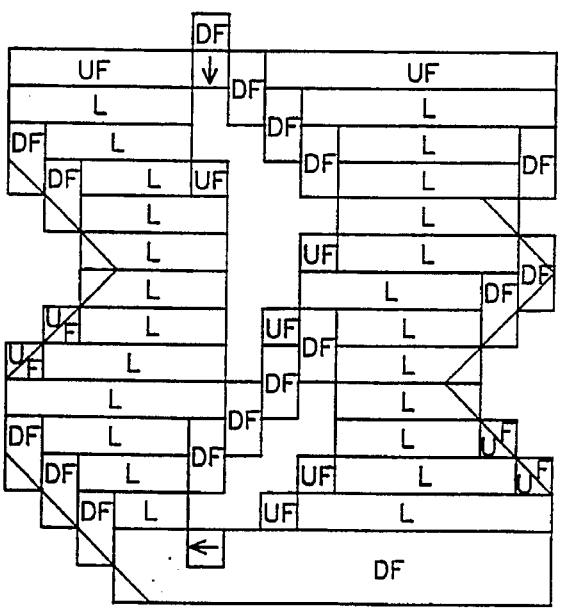

FIG. 24B depicts side views of the first, second and third objects, respectively, as formed using a second approach to standard stereolithography wherein the building material has a MSD of 3 layer thicknesses and possibly an MRD of three layer-thicknesses.

Comparisons can be made between the objects depicted in FIGS. 23 and 24 and the objects depicted in FIGS. 25 to 35 which result from Embodiments A to L. These comparisons can illuminate some of the advantages these embodiments offer to stereolithography. Furthermore, studying the Figures during review of the details of each embodiment will aid in understanding them. To further aid in understanding the shorthand notation used in the detailed descriptions of the example embodiments, a table of acronyms is provide as Table 5.

TABLE 5

| List of Acronyms | |
|---|---|
| − = | Boolean Difference |
| + = | Boolean Union |
| ∩ = | Boolean Intersection |
| * = | Boolean Intersection |
| 1FDFB = | First Final Down-Facing Boundary |
| 1FUFB = | First Final Up-Facing Boundary |
| 1TDFB = | First Temporary Down-Facing Boundary |
| 1TUFB = | First Temporary Up-Facing Boundary |
| 2FDFB = | Second Final Down-Facing Boundary |
| 2FUFB = | Second Final Up-Facing Boundary |
| 2TDFB = | Second Temporary Down-Facing Boundary |
| 2TUFB = | Second Temporary Up-Facing Boundary |
| FDFB = | Final Down-Facing Boundary |
| FLB = | Final Layer Boundary |
| FUFB = | Final Up-Facing Boundary |
| FXDFB = | Final Multiple Down-Facing Boundary |
| FXUFB = | Final Multiple Up-Facing Boundary |
| ICSB = | Initial Cross-Section Boundary (Standard Stereolithography) |
| IUFB = | Intermediate Up-Facing Boundary |
| LC = | Layer Comparison |

TABLE 5-continued

| List of Acronyms | |
|---|---|
| LT = | Standard Stereolithoqraphic Layer Thickness |
| MSD = | Minimum Solidification Depth |
| MRD = | Recoating Minimum Solidification Depth |
| OC = | Overcure necessary for causing adhesion |
| SDFB = | Standard Down-Facing Boundary |
| SL = | Stereolithography |
| SLB = | Standard Layer Boundary |
| SMLC = | Simultaneous Multiple Layer Curing |
| SUFB = | Standard Up-Facing Boundary |
| TDFB = | Temporary Down-Facing Boundary |
| TLB = | Temporary Layer Boundary |
| TUFB = | Temporary Up-Facing Boundary |

The details of each embodiment outlined in Table 4 are presented below.

EMBODIMENT A:

This is a two-layer, z-error correction embodiment with up-facing priority, basic sophistication, and full cure of regions thinner than the MSD.

The first step of this embodiment is to determine Initial Cross-Section Boundaries, ICSB, for all cross-sections. This is the full cross-sectional boundaries before determination of any down-facing and up-facing regions. The ICSB may dictate over-sized or under-sized objects. These type of boundaries are derived by CSlice though not output. We assume that use of a single line-width compensation factor is adequate, as we are merely adjusting the cross-sectional data and applying cure depths as normal.

The second step is to determine the Standard Up-Facing boundaries, SUFB(N), Standard Down-Facing Boundaries, SDFB(N), and Standard Continuing Boundaries, SLB(N) for each cross-section (N). These are the boundaries output by CSlice. Additionally, Intermediate Up-Facing Boundaries for each cross-section N, IUFB(N), are determined. The IUFB(N) are more basic than the SUFB(N) as they are the up-facing boundaries which have not been reduced by any overlap with the Standard Down-Facing Boundary regions. The Boolean operations used in obtaining these boundaries are as follows:

SDFB(N)=ICSB(N)−ICSB(N−1),

IUFB(N)=ICSB(N)−ICSB(N+1),

SUFB(N)=IUFB(N)−SDFB(N),

SLB(N)=ICSB(N)−SDFB(N)−SUFB(N).

The SDFB are down-facing and maybe up-facing. The IUFB are up-facing and maybe down-facing. The SUFB are up-facing only and the SLB are neither up-facing nor down-facing.

The third step is to perform Boolean operations to determine Final Down-Facing Boundaries, FDFB(N), Final Up-Facing Boundaries, FUFB(N), and Final Continuing Boundaries, FLB(N), for cross-section (N).

1FDFB(N)=SDFB(N)∩IUFB(N),

2FDFB(N)=SDFB(N−1)−IUFB(N−1),

FDFB(N)=1FDFB(N)+2FDFB(N),

FUFB(N)=SUFB(N)−2FDFB(N),

FLB(N)=SLB(N)−2FDFB(N).

The forth step is to repeat step 3 for all cross-sections.

The fifth step is to use the FDFB, FUFB and FLB for obtaining hatch and fill.

Finally, the object is formed from the derived data. FDFBs and enclosed regions are cured to a depth of two layer thicknesses plus given appropriate exposure to yield smooth lower surfaces. FUFBs and enclosed regions are cured to a depth of one layer-thickness plus any overcure amount necessary for causing adhesion to the previous layer. In addition FUFB regions are given appropriate exposure to yield smooth upper surfaces. The FLBs and enclosed regions are cured to a depth of one layer-thickness plus any over cure amount necessary for causing adhesion. The FLB regions can be cured in any appropriate manner (e.g. ACES, QUICKCAST, WEAVE, STARWEAVE, TRIHATCH, etc).

Figures 7, 8, 9, 10, 11, 12, 13, 14, 15, 16, 17, 18, 19, 20, 21, 22, 23, 24, 25:
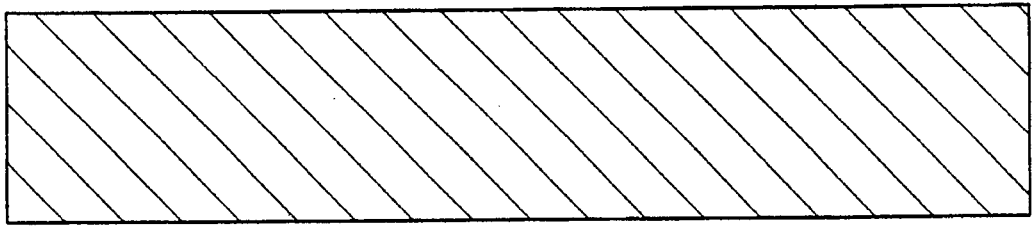

FIG. 25 depicts side views of the FDFB, FUFB, and FLB regions derived via this embodiment for the first, second, and third objects of FIG. 21, respectively. In these Figures the regions indicated with a DF define the FDFB regions, while the regions designated with UF define the FUFB regions and the regions designated with L define the FLB regions. Each region is depicted with its desired cure depth (excluding any overcure amount necessary for layer-to-layer adhesion.)

EMBODIMENT B:

This is a two-layer, z-error correction embodiment with down-facing priority, basic sophistication, and with full cure of regions thinner than the MSD.

The first step of this embodiment is identical to step 1 of the Embodiment A.

The second step of this embodiment is identical to step 1 of Embodiment A but the IUFB(N) are not used.

The third step is to perform Boolean operations to determine, for cross-section (N), Final Down-Facing Boundaries, FDFB(N), Final Up-Facing Boundaries, FUFB(N), and Final Continuing Boundaries, FLB(N). The Boolean operations necessary to obtain these boundaries are as follows:

FDFB(N)=SDFB(N−1),

FUFB(N)=SUFB(N)−FDFB(N),

FLB(N)=SLB(N)−FDFB(N).

The forth step is to repeat step 3 for all cross-sections.

The fifth step is to use the FDFB, FUFB and FLB for obtaining hatch and fill.

Finally, the object is formed from the derived data. The particulars about exposure parameters are identical to those noted above for embodiment A.

Figures 7, 8, 9, 10, 11, 12, 13, 14, 15, 16, 17, 18, 19, 20, 21, 22, 23, 24, 25, 26:
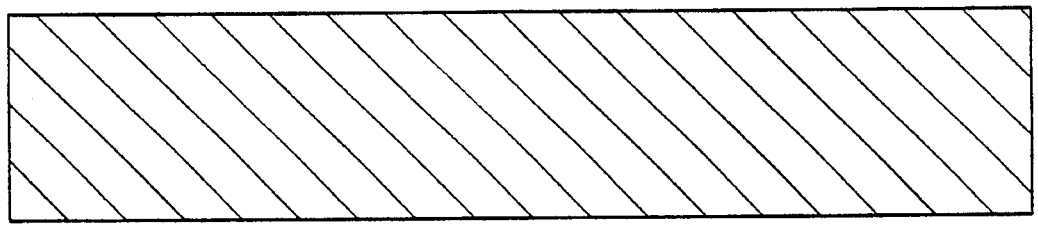
Figures 7, 8, 9, 10, 11, 12, 13, 14, 15, 16, 17, 18, 19, 20, 21, 22, 23, 24, 25, 26, 27:
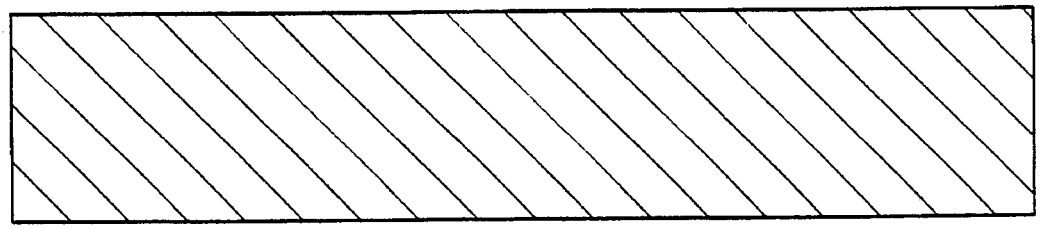

FIG. 26 depicts side views of the FDFB, FUFB, and FLB regions derived via this embodiment for the first, second, and third objects of FIG. 21, respectively. The boundary designations in these Figures are identical to those used in FIG. 25.

EMBODIMENT C:

This is a two-layer, z-error correction embodiment with down-facing priority, a high level of sophistication, and with full cure of regions thinner than the MSD.

The first step of this embodiment is identical to step 1 of Embodiment A.

The second step of this embodiment is identical to step 2 of Embodiment A.

The third step of this embodiment is to perform Boolean operations to determine, for cross-section (N), Final Down-Facing Boundaries, FDFB(N), Final Up-Facing Boundaries, FUFB(N), and Final Continuing Boundaries, FLB(N). The Boolean operations necessary to obtain these boundaries are as follows:

FDFB(N)=SDFB(N−1)−FDFB(N−2),

FUFB(N)=SUFB(N)+{SDFB(N) n IUFB(N) n FDFB(N−1)}−FDFB(N),

FLB(N)=SLB(N)+{SDFB(N)−IUFB(N)}n FDFB(N−1)−FDFB(N).

The forth step is to repeat step 3 for all cross-sections.

The fifth step is to use the FDFB, FUFB and FLB for obtaining hatch and fill.

Finally, the object is formed from the derived data. The particulars about exposure parameters are identical to those noted above for Embodiment A.

A detailed description of the logic utilized in determining the appropriate Boolean operations for yielding the FDFB, FUFB, and FLB for this embodiment is provided below.

First, the constraints each one of the above definitions puts on object formation is recalled. An MSD=2 indicates that a cure depth of two layer-thicknesses is required when forming down-facing features so that they are adequately cohesive. In general this requires the down-facing features to be shifted up one layer-thickness. An MRD=1 indicates that coatings having a thickness of one layer-thickness can readily be formed. The down-facing priority indicates that even when the object thickness becomes thinner than the MSD the down-facing features of the object will be properly positioned.

The boundary types needed for object formation include: (1) FDFB, (2) FUFB, and (3) FLB.

The thickness of regions bounded by FDFB is equal to the MSD and the exposure supplied should result in a smooth down facing surface. These FDFB regions do not require any further overcure for adhesion since there is at least one layer-thickness of empty space below them. The FUFB regions are located one layer-thickness above cured material. The exposure applied to the FUFB regions should form a smooth upper surface and cause adhesion to the cured material below. The FLB regions are located one layer-thickness above cured material. The exposure applied to the FLB regions should cause adhesion to the cured material below.

For accurate object formation generally the down-facing feature data should be shifted up one layer-thickness.

FDFB(N)=SDFB(N−1)

However for enhanced accuracy the SDFB(N−1) should not be shifted upward if it is no longer down-facing due to the upward shifting of SDFBs from lower layers. Additionally unshifted regions should be redefined as either up-facing or continuing. It is noted that, by definition, the minimum vertical distance between down-facing features is two layer thickness. Thus no SDFB(N−1) can exist directly below an SDFB(N).

For a down-facing feature to loose it down-facing nature, a lower down-facing feature needs to be pushed upward to its same level (which is not possible due to the single layer shifting) or to a level 1 layer thickness below it. The lower down-facing features of concern are those which become FDFB(N−2) since they dictate whether or not the SDFB(N−1) should be shifted upward. Thus the above definition of the FDFB(N) must be modified. The complete definition of the FDFB(N) is,

FDFB(N)=SDFB(N−1)−FDFB(N−2).

Nominally the FUFB(N) and the FLB(N) are equivalent to the SUFB(N) and the SLB(N), respectively, less any FDFB(N) which have landed on them. Thus,

FUFB(N)≈SUFB(N)−FDFB(N),

FLB(N)≈SLB(N)−FDFB(N).

However as noted in deriving the FDFB, some of the SDFB(N) aren't shifted upward because they are no longer down-facing. As such, these SDFB(N) are redefined so as to become either up-facing or continuing. If an SDFB(N) is unshifted, it is because an FDFB on N−1 overlaps it. Furthermore, if it is to become up-facing, it is because it always was up-facing and if it is to become continuing, it is because it was never up-facing. Thus the above definition of the FUFB(N) must be modified by the addition of,

SDFB(N) * IUFB(N) * FDFB(N−1), and the above definition of the FLB(N) must be modified by the addition of,

{SDFB(N)–IUFB(N)* FDFB(N–1)}.

It doesn't matter whether the addition of the above expressions or the subtraction of the FDFB(N) is done first as they define independent regions since, FDFB(N) * FDFB(N–1)=Null.

Thus the final definitions of the FUFB(N) and FLB(N) are,

FUFB(N)=SUFB(N)+{SDFB(N)*IUFB(N)*FDFB(N–1)}–FDFB(N),

FLB(N) =SLB(N)+{SDFB(N)–IUFB(N)}* FDFB(N–1)–FDFB(N).

Figure 27A:
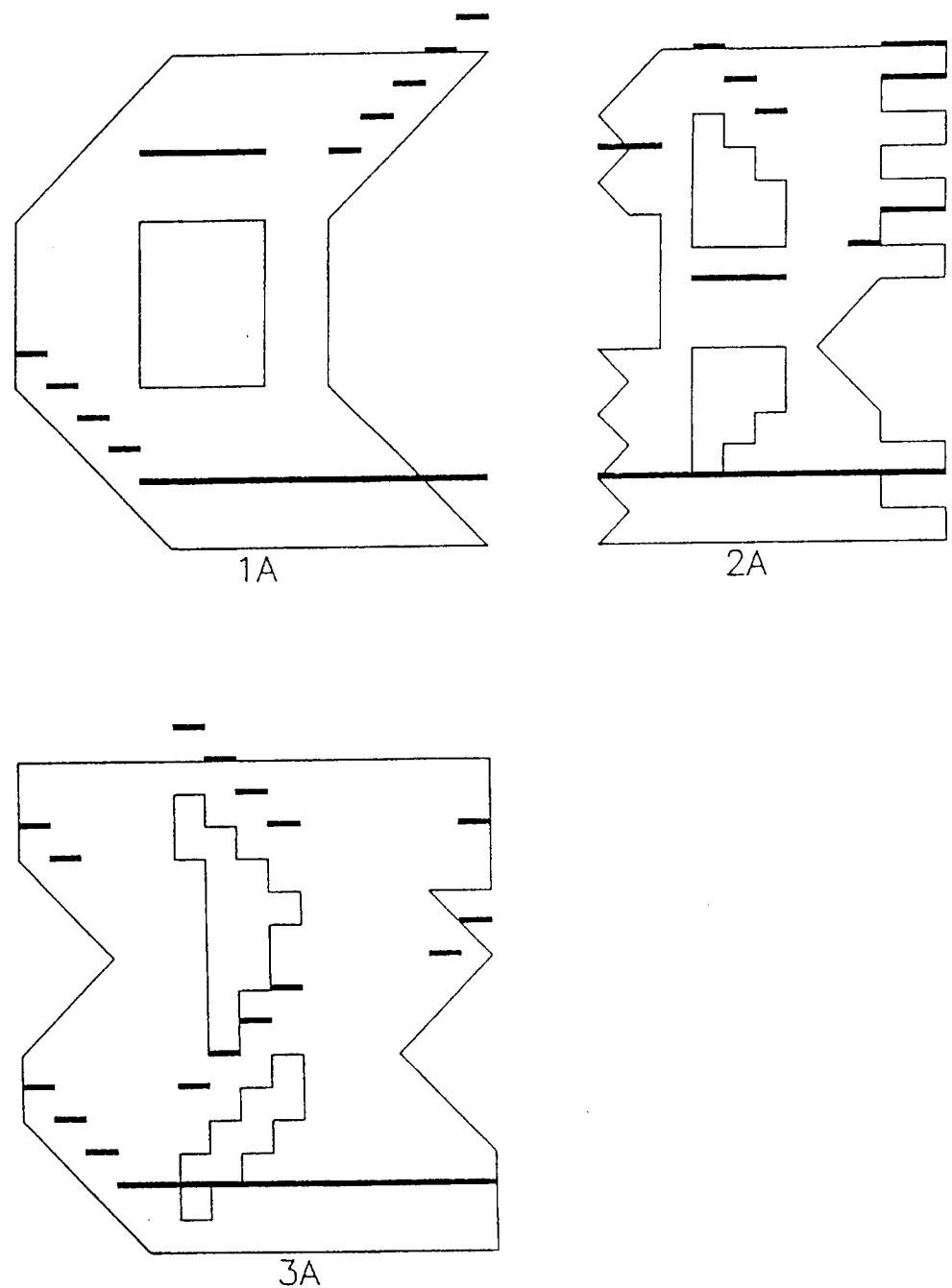
FIG. 27A depicts a side views of the first, second and third objects, respectively, with the FDFBs derived from embodiment C.

FIG. 27A, respectively, depicts the FDFB for the three different objects of FIG. 21 as obtained utilizing this embodiment.

Figure 27B:
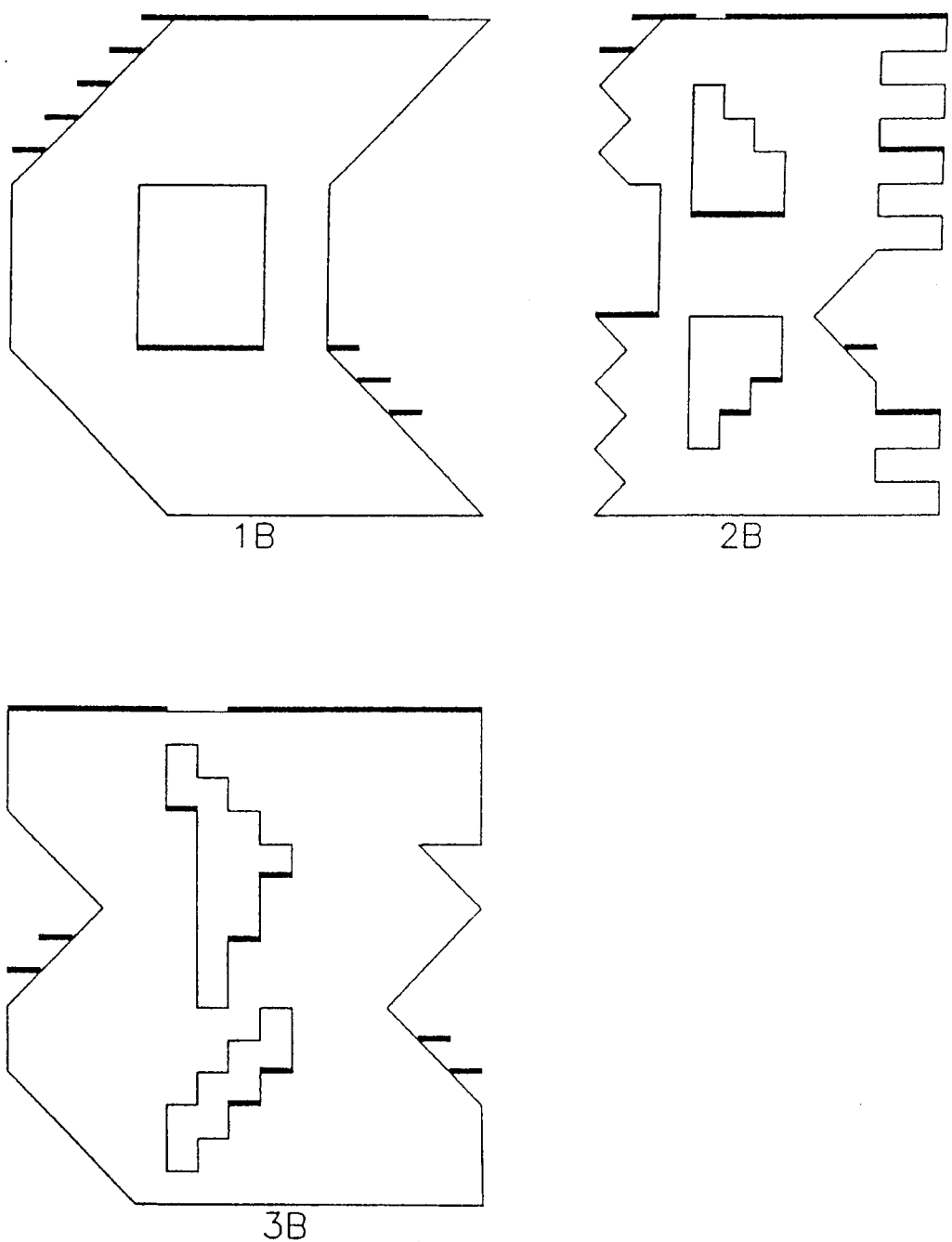
FIG. 27B depicts side views of the first, second and third objects, respectively, with the FUFBs derived from embodiment C.

FIG. 27B, respectively, depicts the FUFB for the three different objects of FIG. 21 as obtained utilizing this embodiment.

Figure 27C:
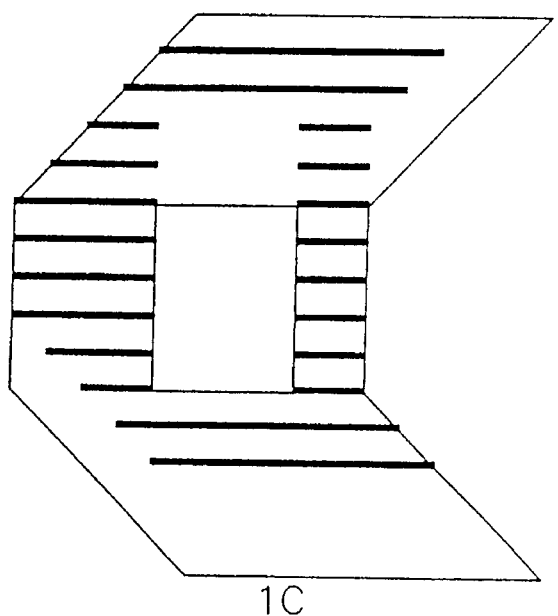
FIG. 27C depicts side views of the first, second and third objects, respectively, with the FLBs derived from embodiment C.
Figure 27C:
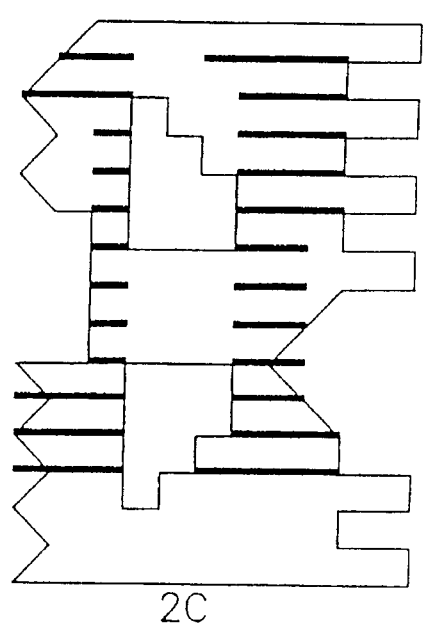
Figure 27C:
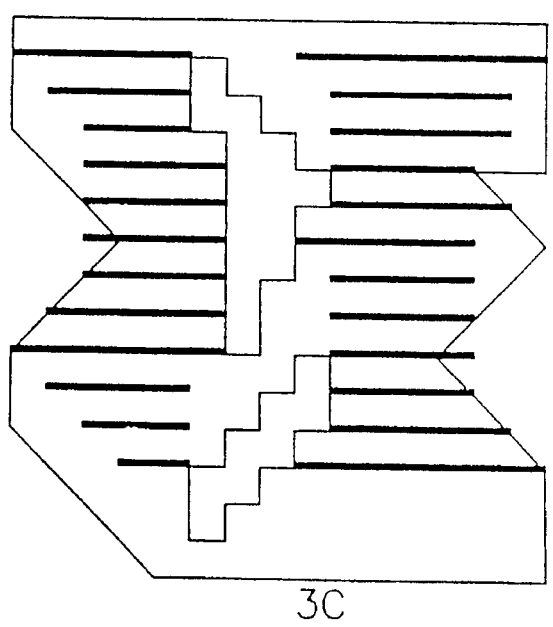

FIG. 27C, respectively, depicts the FLB for the three different objects of FIG. 21 as obtained utilizing this embodiment.

Figure 27D:
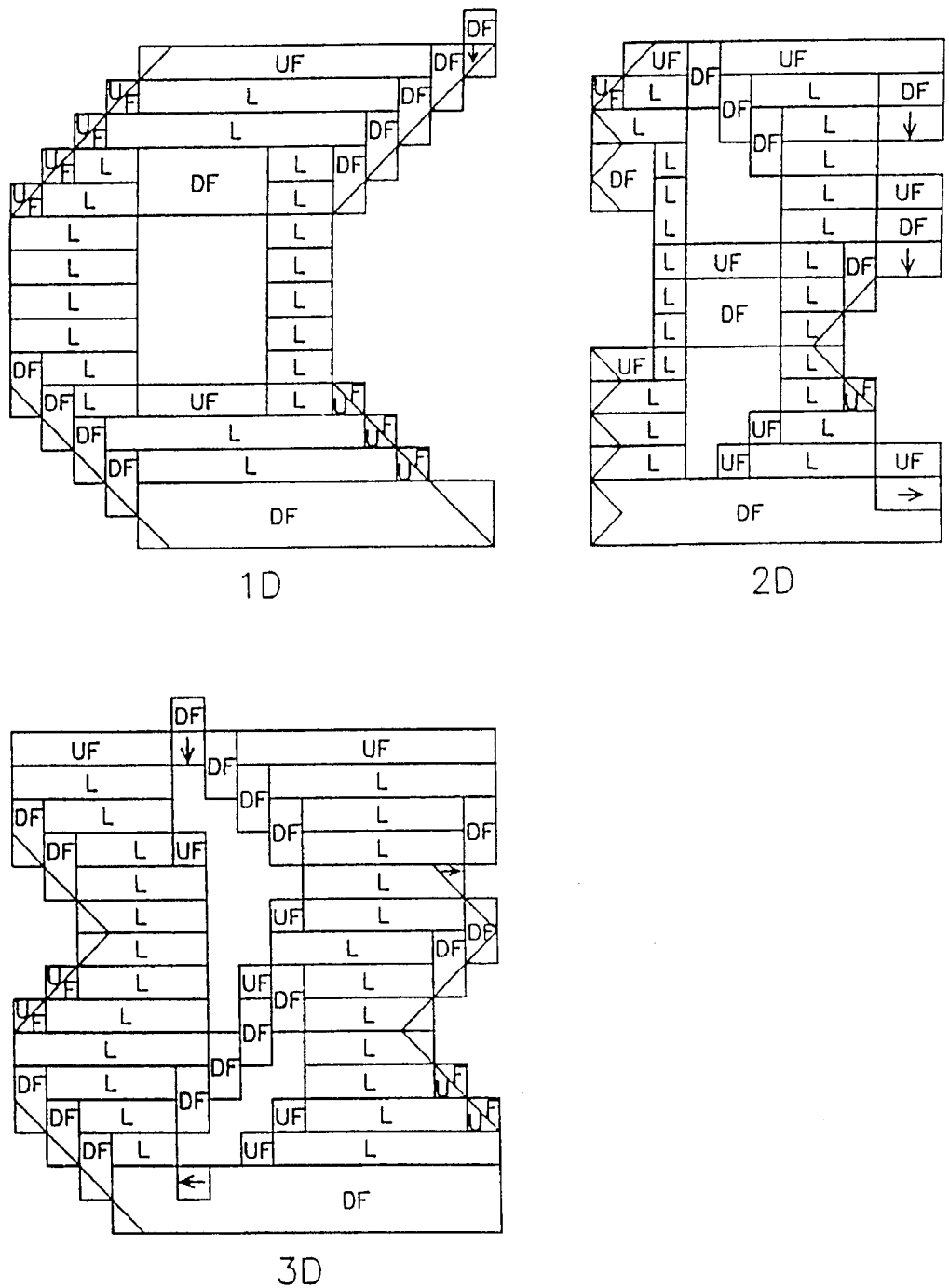
FIG. 27D depicts side views of the first, second and third objects, respectively, as formed with the FDFBs, FUFBs, and FLBs for embodiment C.
Figure 28:
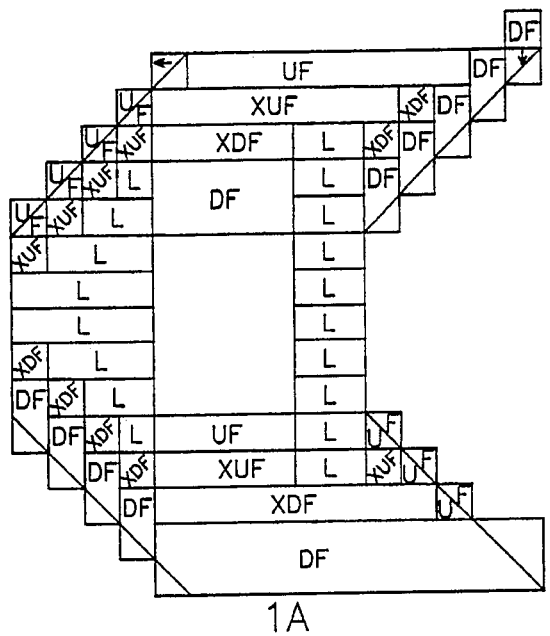
Figure 28:
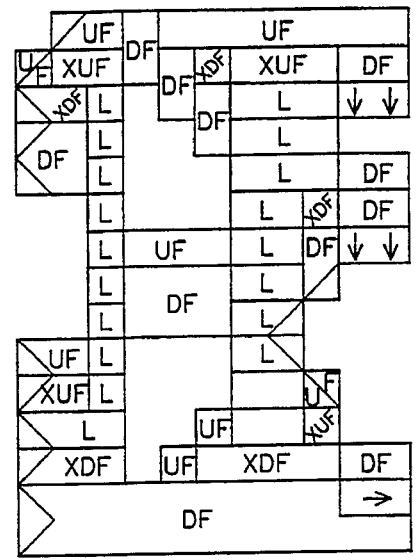
Figure 28:
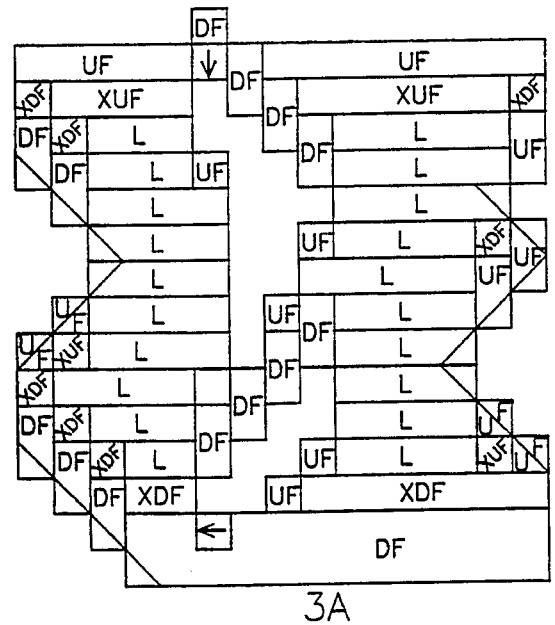

FIG. 27D, respectively, depicts the object as formed using this embodiment. The boundary designations in these Figures are identical to those used in FIG. 25.

If one knew that the object being sliced had no solid features thinner than the MSD+1 layer thickness (i.e. three layer-thicknesses), one could reduce the required Boolean operations to,

FDFB(N)=SDFB(N–1),

FUFB(N)=SUFB(N),

FLB(N)=SLB(N)–FDFB(N).

Alternatively, if one knew nothing about the thickness of solid features but knew the object had no hollow features thinner than the MSD, i.e. two layer-thicknesses, the Boolean operations could still be reduced to,

FDFB(N)=SDFB(N–1),

FUFB(N)=SUFB(N)–FDFB(N),

FLB(N)=SLB(N)–FDFB(N).

This last set of Boolean operations is also applicable to an object which has no solid features thinner than the MSD regardless of the thicknesses of hollow features.

EMBODIMENT D:

This is a two-layer, z-error correction embodiment with double-skinning, down-facing priority, a high level of sophistication, and with full cure of regions thinner than the MSD.

The first step of this embodiment starts with the FDFB(N), FUFB(N), and the FLB(N) from the Embodiment C with the following definitions being made:

FDFB(N)–FDFB(N) from C,

FUFB(N)–FUFB(N) from C,

TLB(N)=FLB(N) from C.

The second step of this embodiment is to perform Boolean operations to determine the Final Multiple Down-Facing Boundaries, FXDFB(N), Final Multiple Up-Facing Boundaries, FXUFB(N), and Final Continuing Boundaries, FLB(N), all for cross-section (N). This second step involves three substeps. The first substep is to determine the FXDFB(N). The regions defined by these boundaries are located one layer-thickness above solidified material and one curing-level above the down-facing regions. These regions are defined by, FXDFB(N)=TLB(N)nFDFB(N–1).

The second substep is to determine the FXUFB(N). The regions defined by these boundaries are located one curing-level below up-facing features and one layer-thickness above cured material. These regions are defined by, FXUFB(N)=TLB(N) n FUFB(N+1)–FXDFB(N).

The third substep is to determine the FLB(N). The regions defined by these boundaries are located one layer above cured material. These regions are defined by,

FLB(N)=TLB(N)–FXDFB(N)–FXUFB(N).

The third step of this embodiment is to repeat step 2 for all cross-sections.

The forth step is to use the FDFB, FXDFB, FUFB, FXUFB, and the FLB for obtaining hatch and fill.

Finally the object is formed from the derived data. The FDFB, FUFB, and FLB are cured identically to that of the Embodiment C. The FXUFB and FXDFB are cured as skins to an appropriate depth which is no less than 1 layer thickness plus an amount necessary for adhesion.

Figures 7, 8, 9, 10, 11, 12, 13, 14, 15, 16, 17, 18, 19, 20, 21, 22, 23, 24, 25, 26, 27, 28:
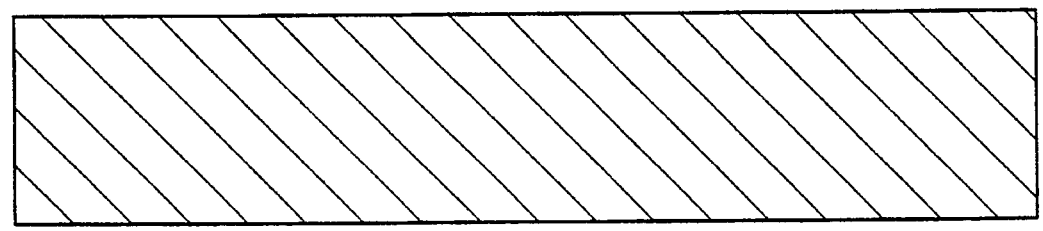
Figures 5, 8:
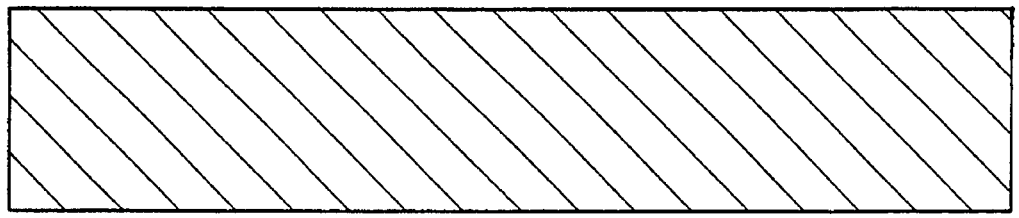
Figures 6, 8:
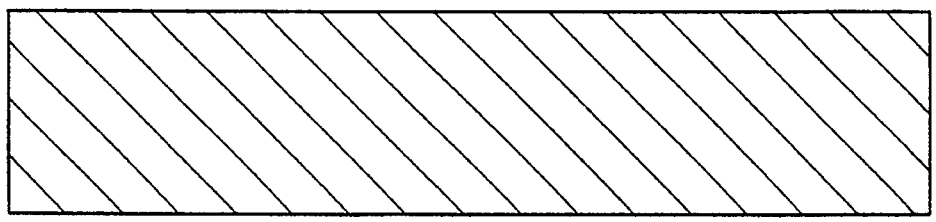
Figures 7, 8:
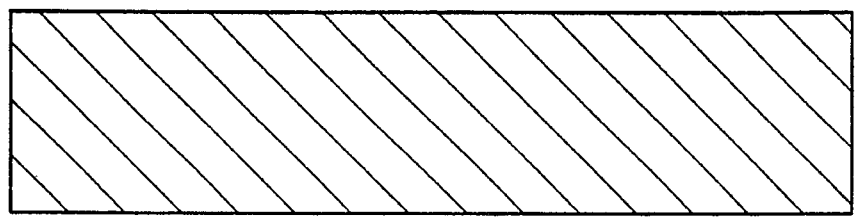
Figure 8:
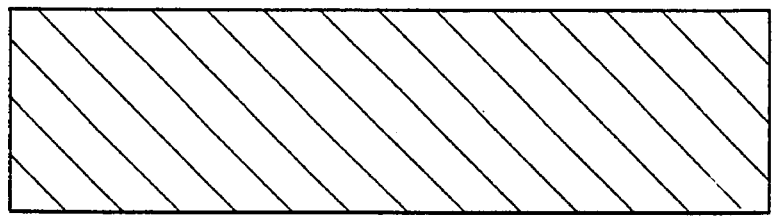
Figures 8, 9:
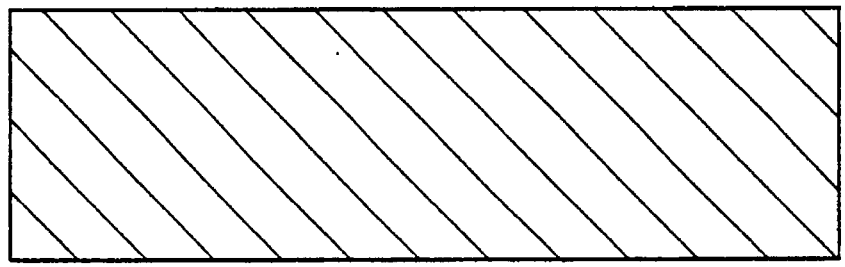
Figures 8, 9, 10:
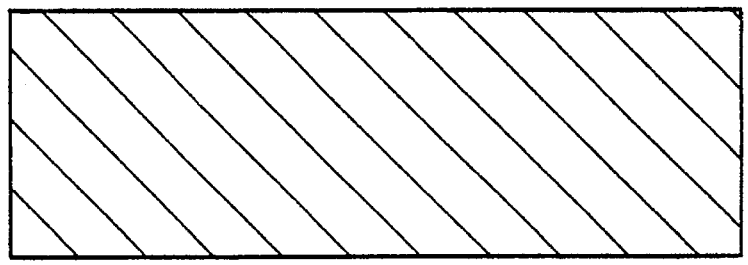
Figures 8, 9, 10, 11:
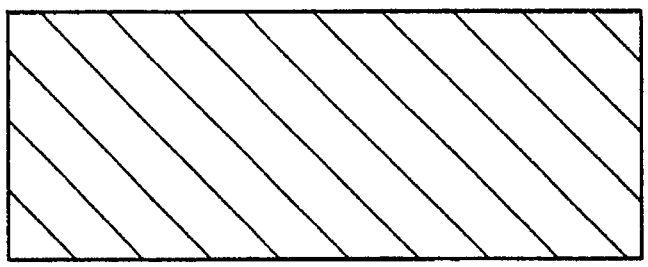
Figures 8, 9, 10, 11, 12:
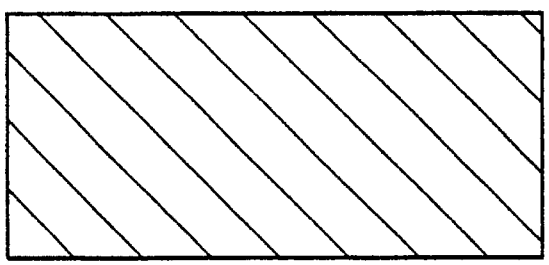
Figures 8, 9, 10, 11, 12, 13:
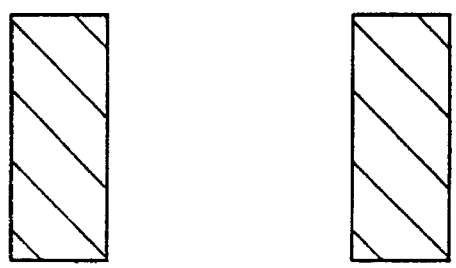
Figures 8, 9, 10, 11, 12, 13, 14:
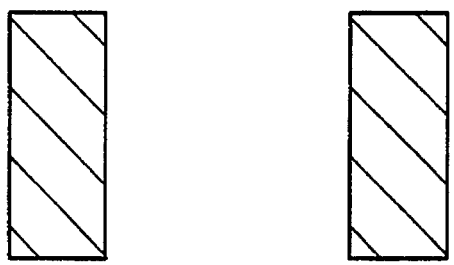
Figures 8, 9, 10, 11, 12, 13, 14, 15:
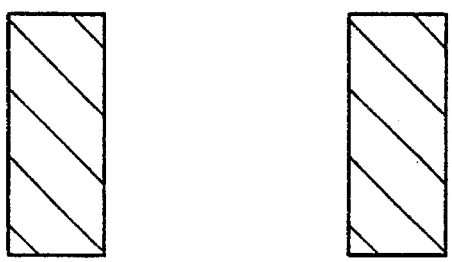
Figures 8, 9, 10, 11, 12, 13, 14, 15, 16:
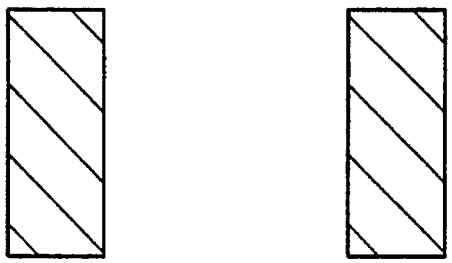
Figures 8, 9, 10, 11, 12, 13, 14, 15, 16, 17:
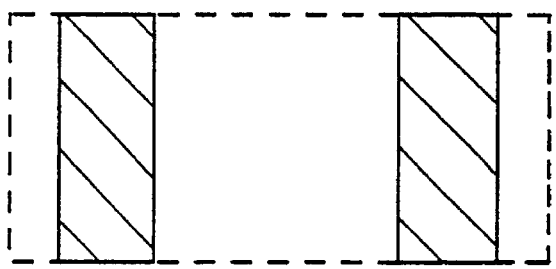
Figures 8, 9, 10, 11, 12, 13, 14, 15, 16, 17, 18:
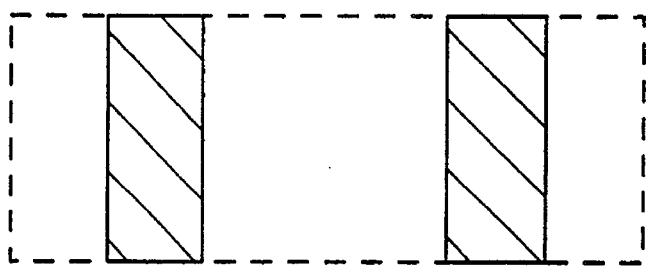
Figures 8, 9, 10, 11, 12, 13, 14, 15, 16, 17, 18, 19:
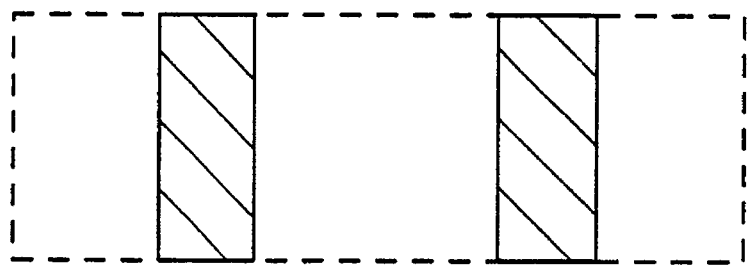
Figures 8, 9, 10, 11, 12, 13, 14, 15, 16, 17, 18, 19, 20:
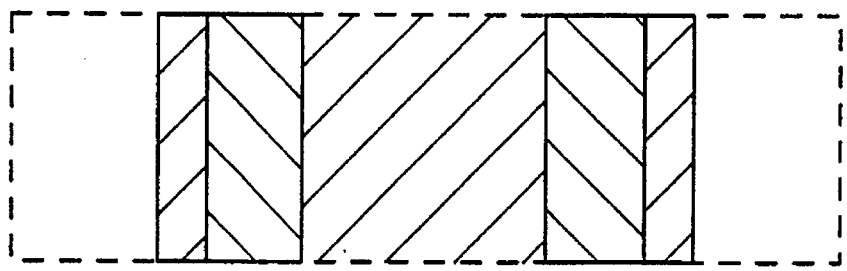
Figures 8, 9, 10, 11, 12, 13, 14, 15, 16, 17, 18, 19, 20, 21:
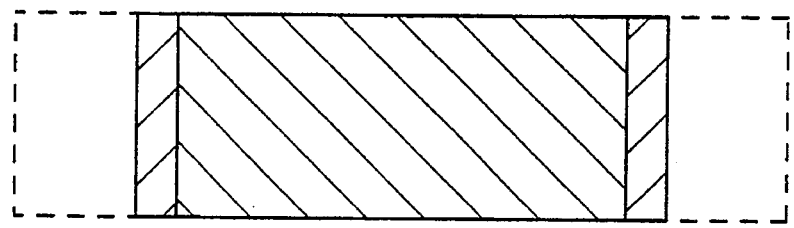
Figures 8, 9, 10, 11, 12, 13, 14, 15, 16, 17, 18, 19, 20, 21, 22:
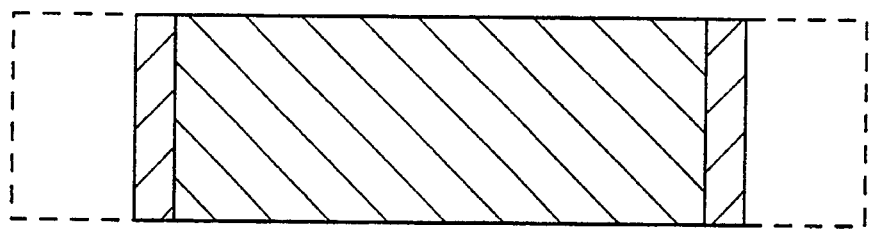
Figures 8, 9, 10, 11, 12, 13, 14, 15, 16, 17, 18, 19, 20, 21, 22, 23:
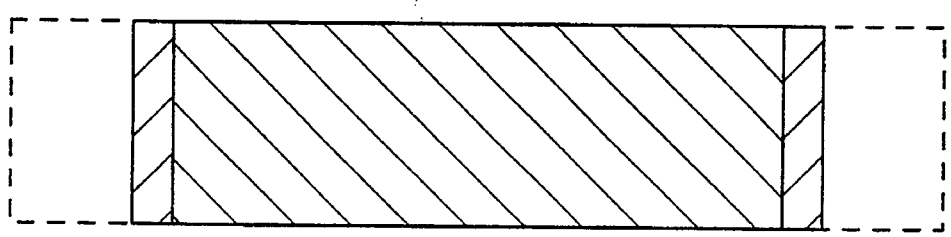
Figures 8, 9, 10, 11, 12, 13, 14, 15, 16, 17, 18, 19, 20, 21, 22, 23, 24:
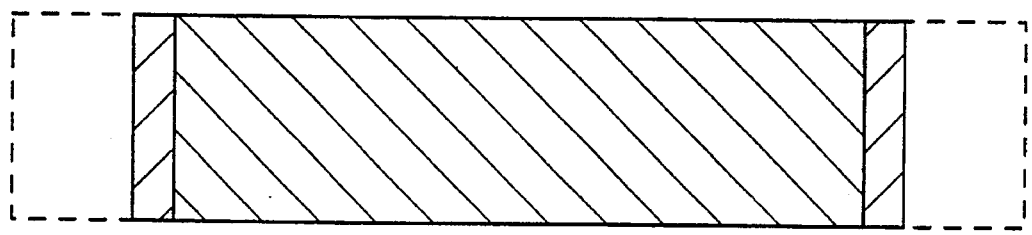
Figures 8, 9, 10, 11, 12, 13, 14, 15, 16, 17, 18, 19, 20, 21, 22, 23, 24, 25:
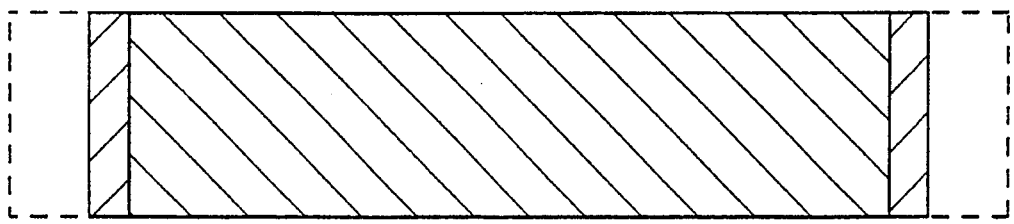
Figures 8, 9, 10, 11, 12, 13, 14, 15, 16, 17, 18, 19, 20, 21, 22, 23, 24, 25, 26:
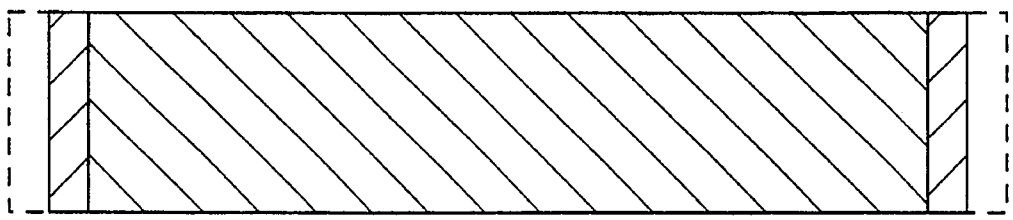
Figures 8, 9, 10, 11, 12, 13, 14, 15, 16, 17, 18, 19, 20, 21, 22, 23, 24, 25, 26, 27:
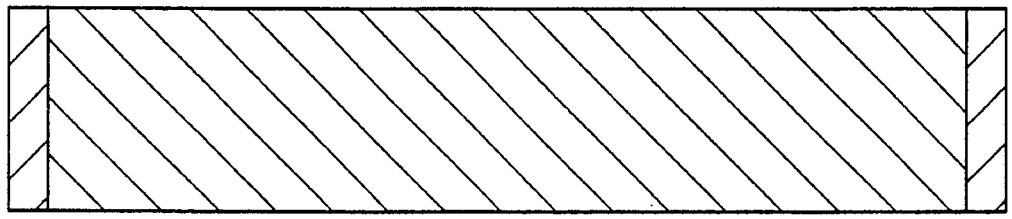
Figures 8, 9, 10, 11, 12, 13, 14, 15, 16, 17, 18, 19, 20, 21, 22, 23, 24, 25, 26, 27, 28:
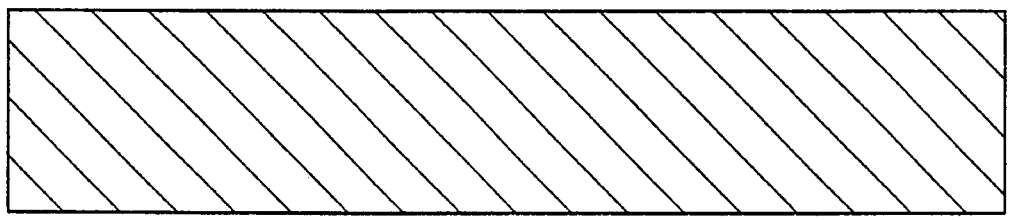
Figures 1, 9:
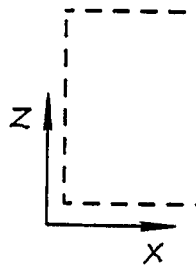
Figures 2, 9:
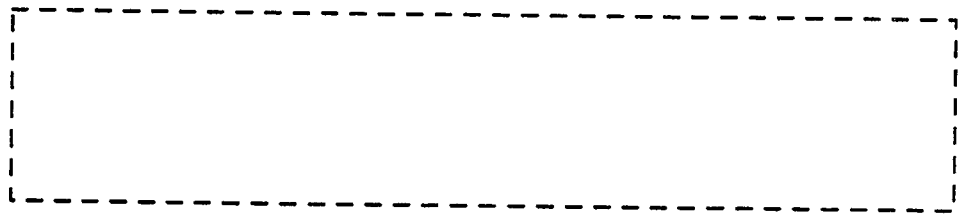
Figures 3, 9:
Figures 4, 9:
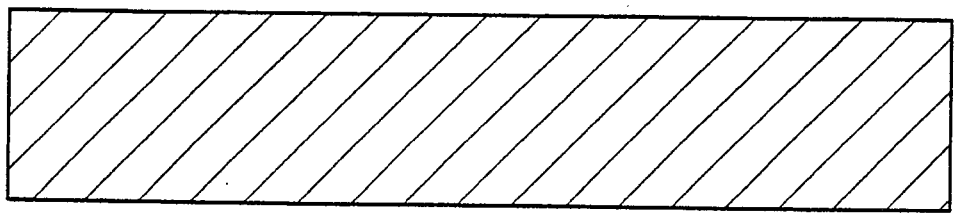
Figures 5, 9:
Figures 6, 9:
Figures 7, 9:
Figures 8, 9:
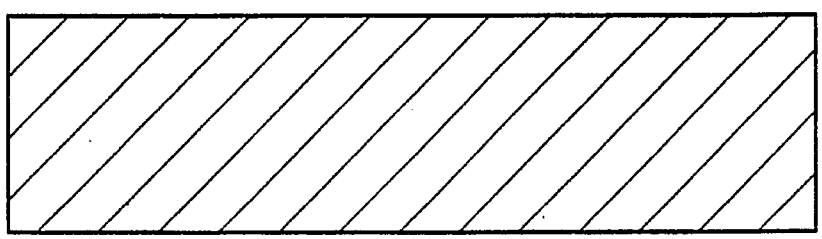
Figure 9:
Figures 9, 10:
Figures 9, 10, 11:
Figures 9, 10, 11, 12:
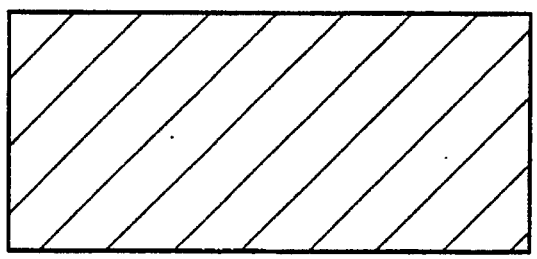
Figures 9, 10, 11, 12, 13:
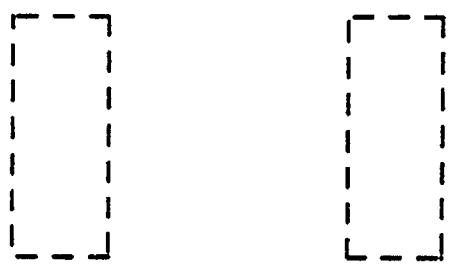
Figures 9, 10, 11, 12, 13, 14:
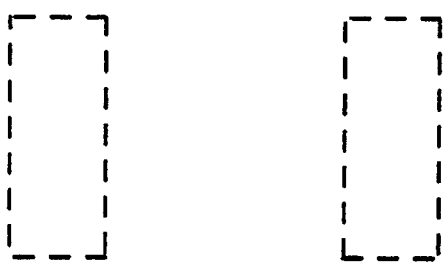
Figures 9, 10, 11, 12, 13, 14, 15:
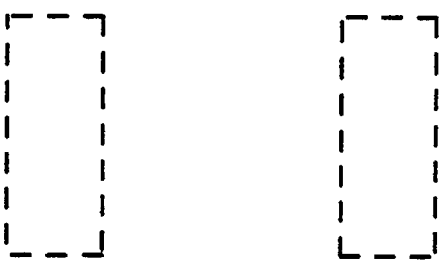
Figures 9, 10, 11, 12, 13, 14, 15, 16:
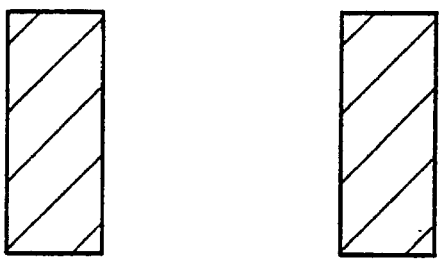
Figures 9, 10, 11, 12, 13, 14, 15, 16, 17:
Figures 9, 10, 11, 12, 13, 14, 15, 16, 17, 18:
Figures 9, 10, 11, 12, 13, 14, 15, 16, 17, 18, 19:
Figures 9, 10, 11, 12, 13, 14, 15, 16, 17, 18, 19, 20:
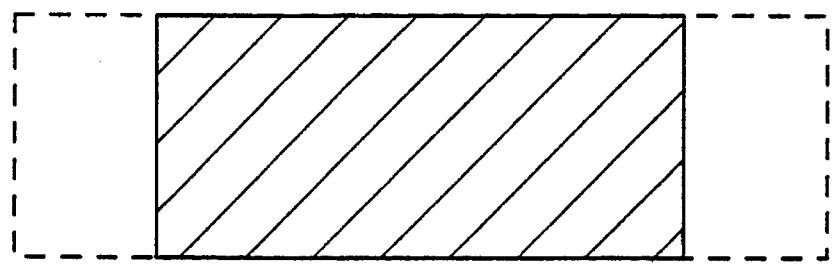
Figures 9, 10, 11, 12, 13, 14, 15, 16, 17, 18, 19, 20, 21:
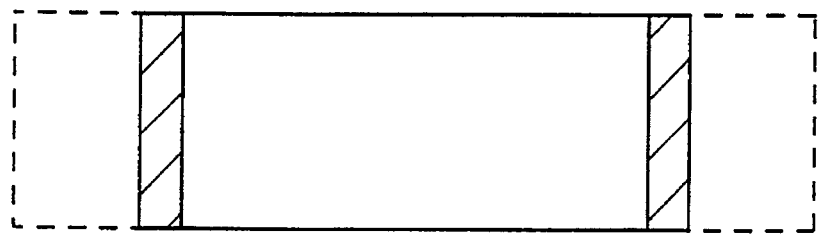
Figures 9, 10, 11, 12, 13, 14, 15, 16, 17, 18, 19, 20, 21, 22:
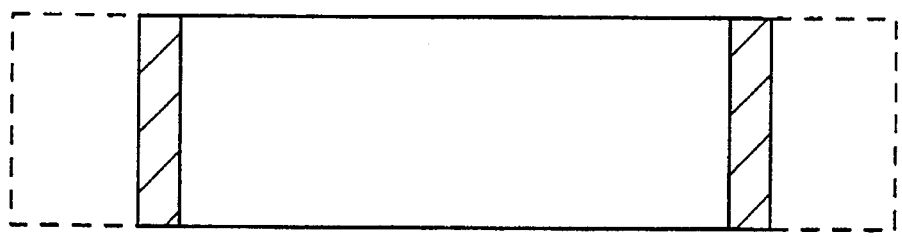
Figures 9, 10, 11, 12, 13, 14, 15, 16, 17, 18, 19, 20, 21, 22, 23:
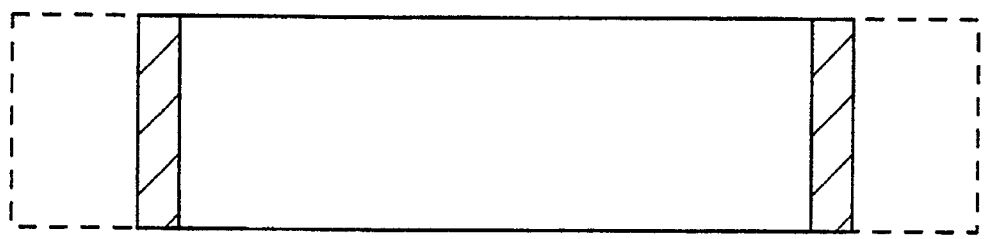
Figures 9, 10, 11, 12, 13, 14, 15, 16, 17, 18, 19, 20, 21, 22, 23, 24:
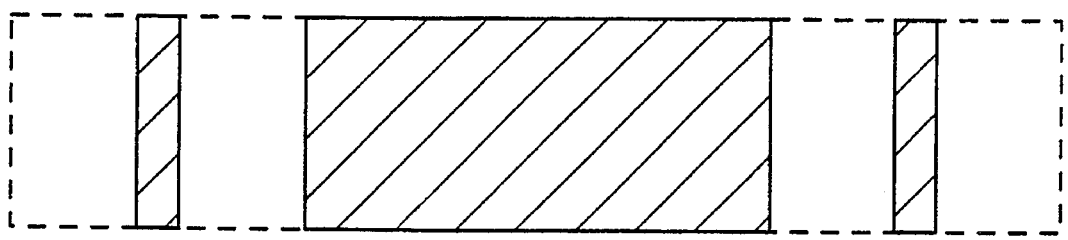
Figures 9, 10, 11, 12, 13, 14, 15, 16, 17, 18, 19, 20, 21, 22, 23, 24, 25:
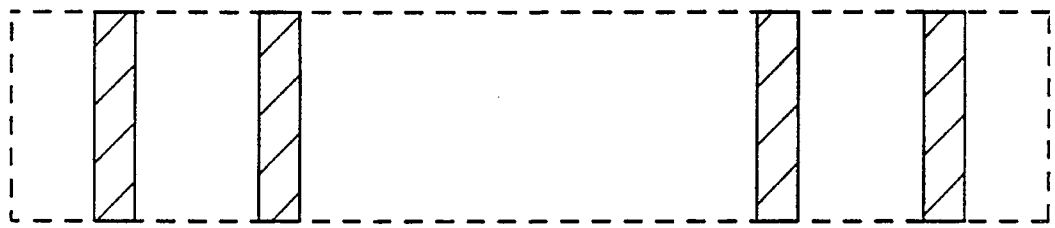
Figures 9, 10, 11, 12, 13, 14, 15, 16, 17, 18, 19, 20, 21, 22, 23, 24, 25, 26:
Figures 9, 10, 11, 12, 13, 14, 15, 16, 17, 18, 19, 20, 21, 22, 23, 24, 25, 26, 27:
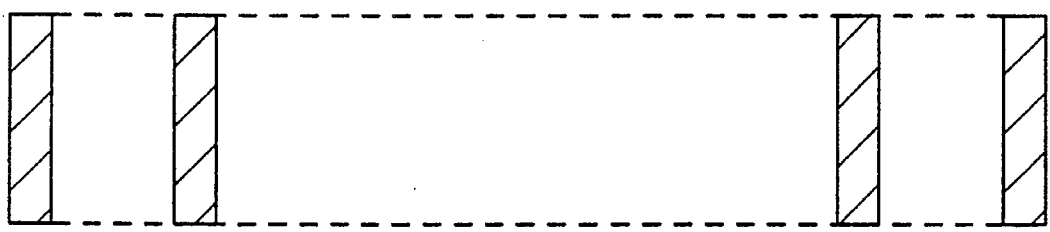
Figures 9, 10, 11, 12, 13, 14, 15, 16, 17, 18, 19, 20, 21, 22, 23, 24, 25, 26, 27, 28:
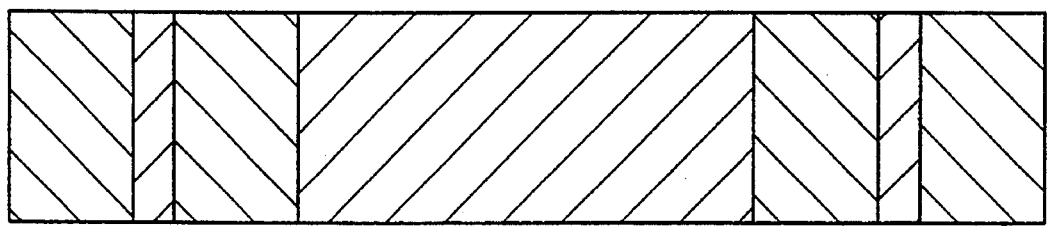
Figure 10:
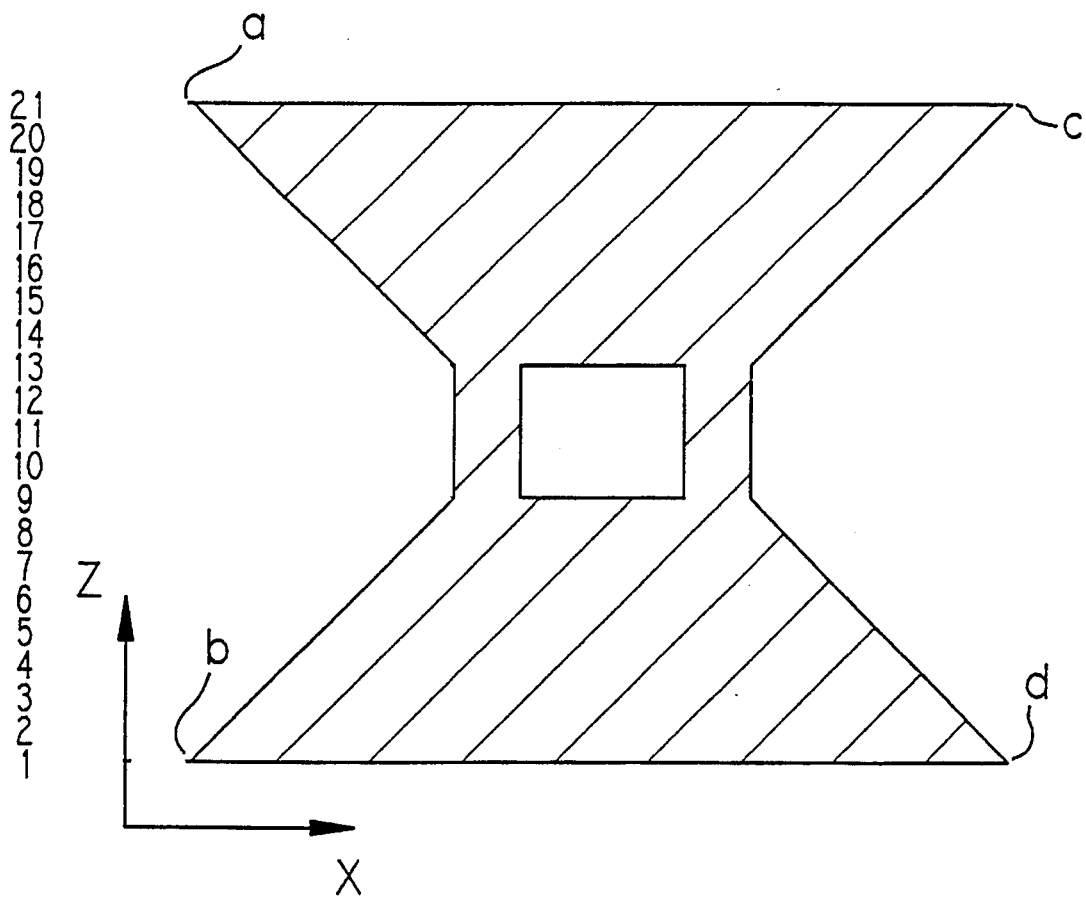
Figure 11:
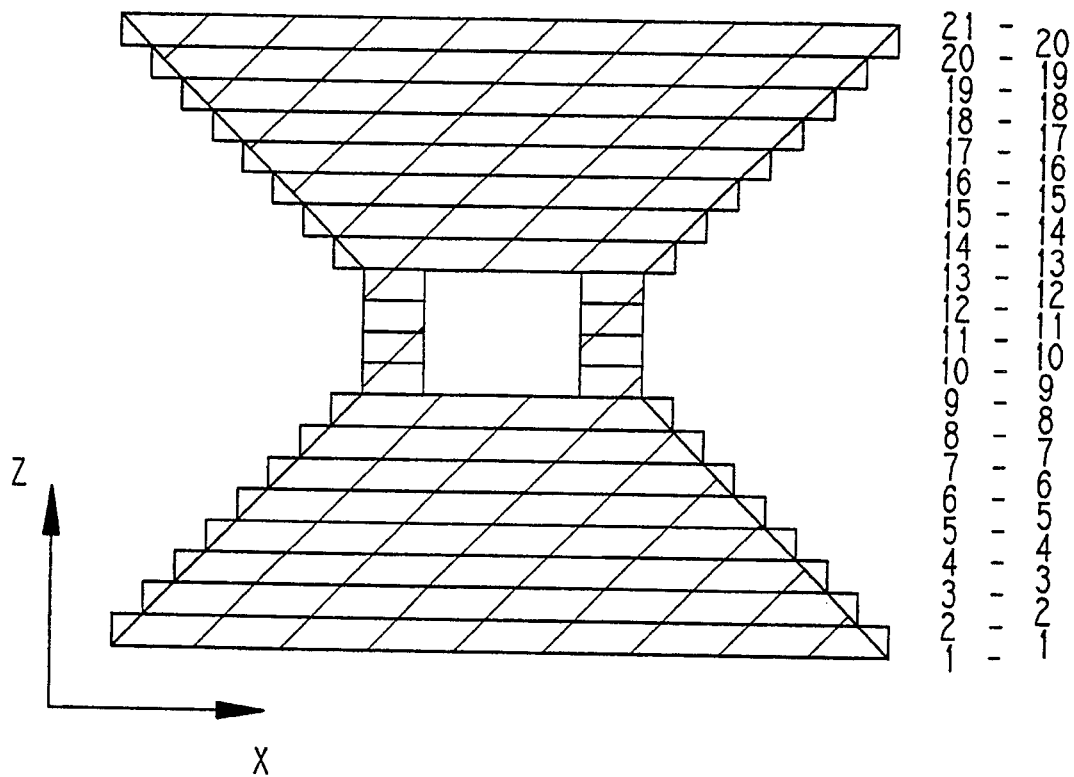
Figure 12:
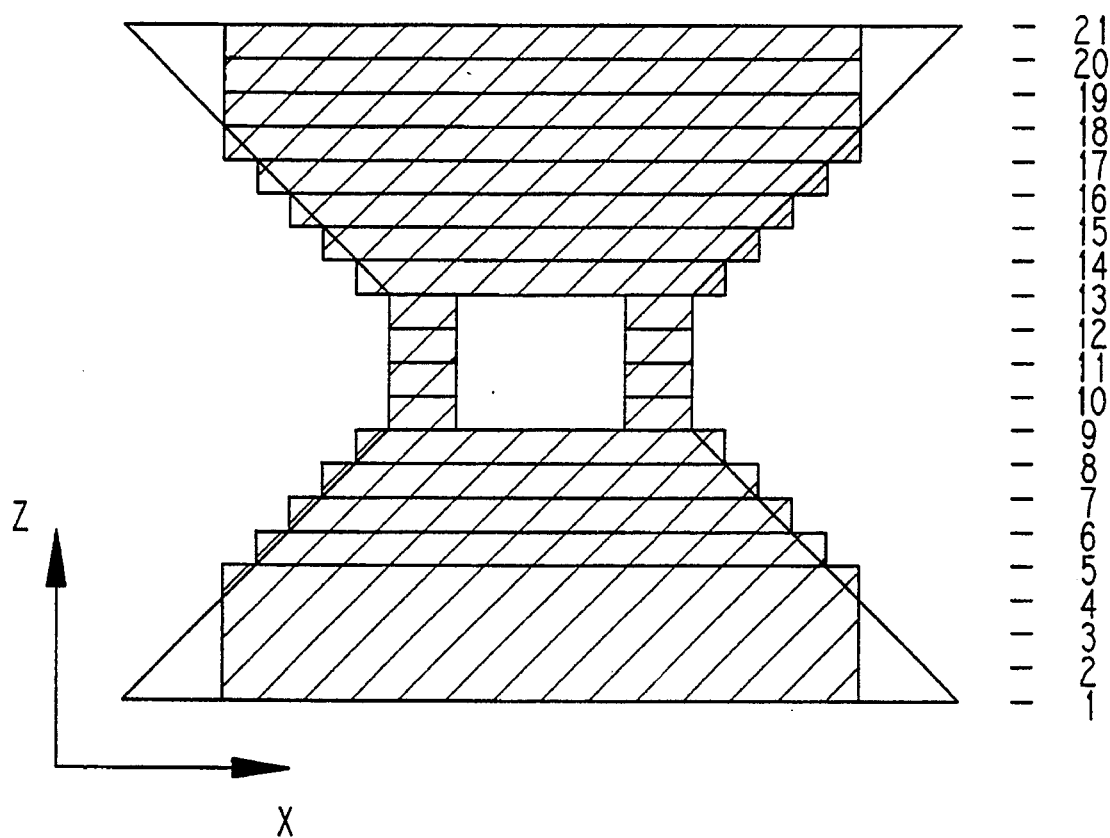
Figure 29:
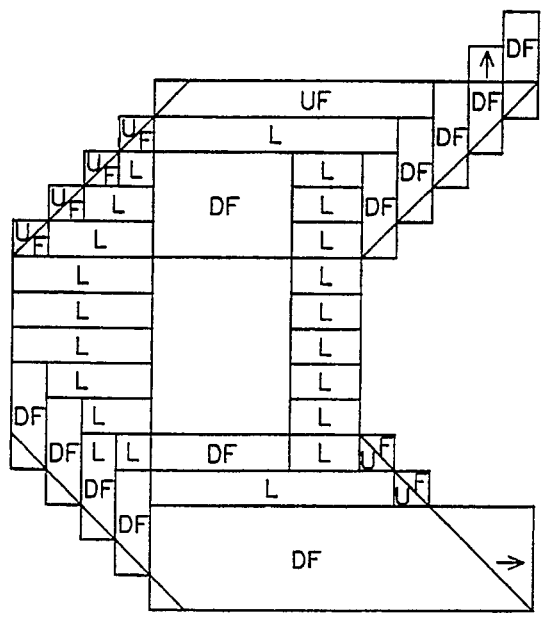
FIG. 29 depicts side views of the first, second, and third objects, respectively, as formed with the FDFBs, FUFBs, and FLBs for embodiment E.
Figure 29:
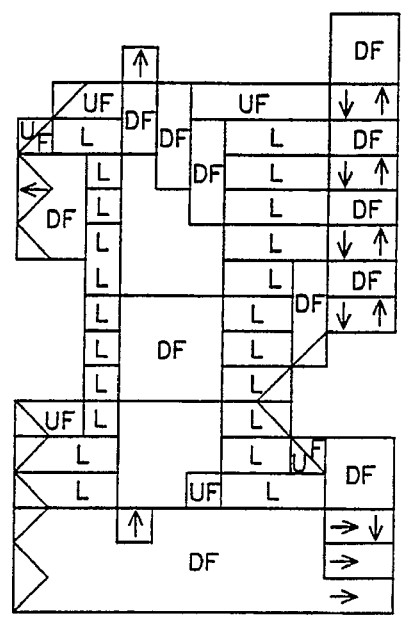
Figure 29:
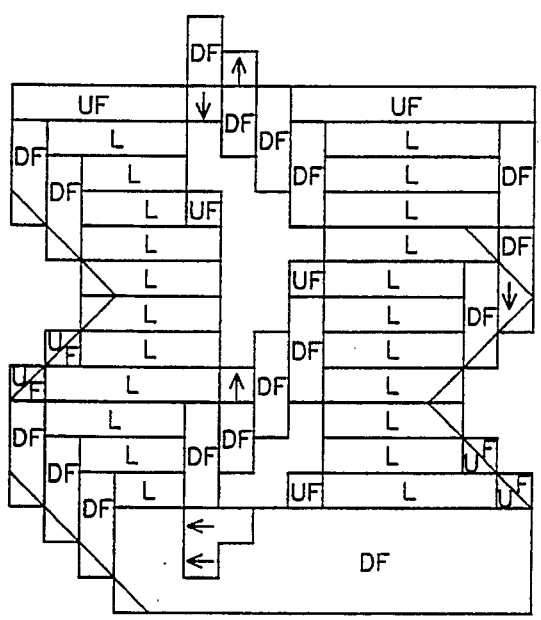

FIG. 28 depicts side views of the three objects of FIG. 29 depicts as formed with this Embodiment. The FDFB, FUFB, FXDFB, FXUFB, and FLB are depicted in these Figures by the designations DF, UF, XDF, XUF, and L, respectively.

EMBODIMENT E:

This is a three-layer, z-error correction embodiment with down-facing priority, basic sophistication, and with full cure of regions thinner than the MSD.

The first step of this embodiment is identical to step 1 of Embodiment A.

The second step of this embodiment is identical to step 2 of Embodiment A.

The third step of this embodiment is to perform Boolean operations to determine Final Down-Facing Boundaries, FDFB(N), Final Up-Facing Boundaries, FUFB(N), and Final Continuing Boundaries, FLB(N), for cross-section (N). These boundaries are defined by,

FDFB(N)=SDFB(N–2),

FUFB(N)=SUFB(N)–FDFB(N)–SDFB(N–1),

FLB(N)=SLB(N)–FDFB(N)–SDFB(N–1).

The fourth step is to repeat step 3 for all cross-sections.

The fifth step is to use the FDFB, FUFB and FLB for obtaining hatch and fill.

Finally, the object is formed from the derived data. FDFBs, and included area, are cured to a depth of three layer-thicknesses plus given appropriate exposure to produce smooth lower surfaces. The exposure parameters for the FUFBs, FLBs and included areas are identical to that discussed above for Embodiment A.

FIGS. 29-1A, 29-2A, and 29-3A depict side views of the three objects of FIG. 21 as formed with this embodiment. As with the previous embodiments, the FDFB, FUFB, and FLB and their associated cure depths are depicted in these Figures as DF, UF, and L respectively.

EMBODIMENT F:

This is a three-layer, z-error correction embodiment with moderate sophistication, down-facing priority, and with full cure of regions thinner than the MSD. The moderate sophistication of this embodiment removes multiple curings of regions near features thinner than the MSD.

The first step of this embodiment is identical to step 1 of Embodiment A.

The second step of this embodiment is identical to step 2 of Embodiment A.

The third step of this embodiment is to perform Boolean operations to determine Final Down-Facing Boundaries, FDFB(N), Final Up-Facing Boundaries, FUFB(N), and Final Continuing Boundaries, FLB(N), all for cross-section (N). These boundaries are defined by,

FDFB(N)=SDFB(N–2)–FDFB(N–2),

FUFB(N)=SUFB(N)–SDFB(N–1)–FDFB(N),

FLB(N)=SLB(N)–SDFB(N–1)–FDFB(N).

As the final down-facing boundary for layer N–2 must be used in determining the final down-facing boundary for layer N, it is apparent that the processing of layers must proceed from the lowest to the highest.

The fourth step is to repeat step 3 for all cross-sections.

The fifth step is to use the FDFB, FUFB and FLB for obtaining hatch and fill.

Finally, the object is formed from the derived data. The exposure parameters for the FDFBs, FUFBs and FLBs, and enclosed regions, are identical to those noted above for Embodiment E.

Figure 30:
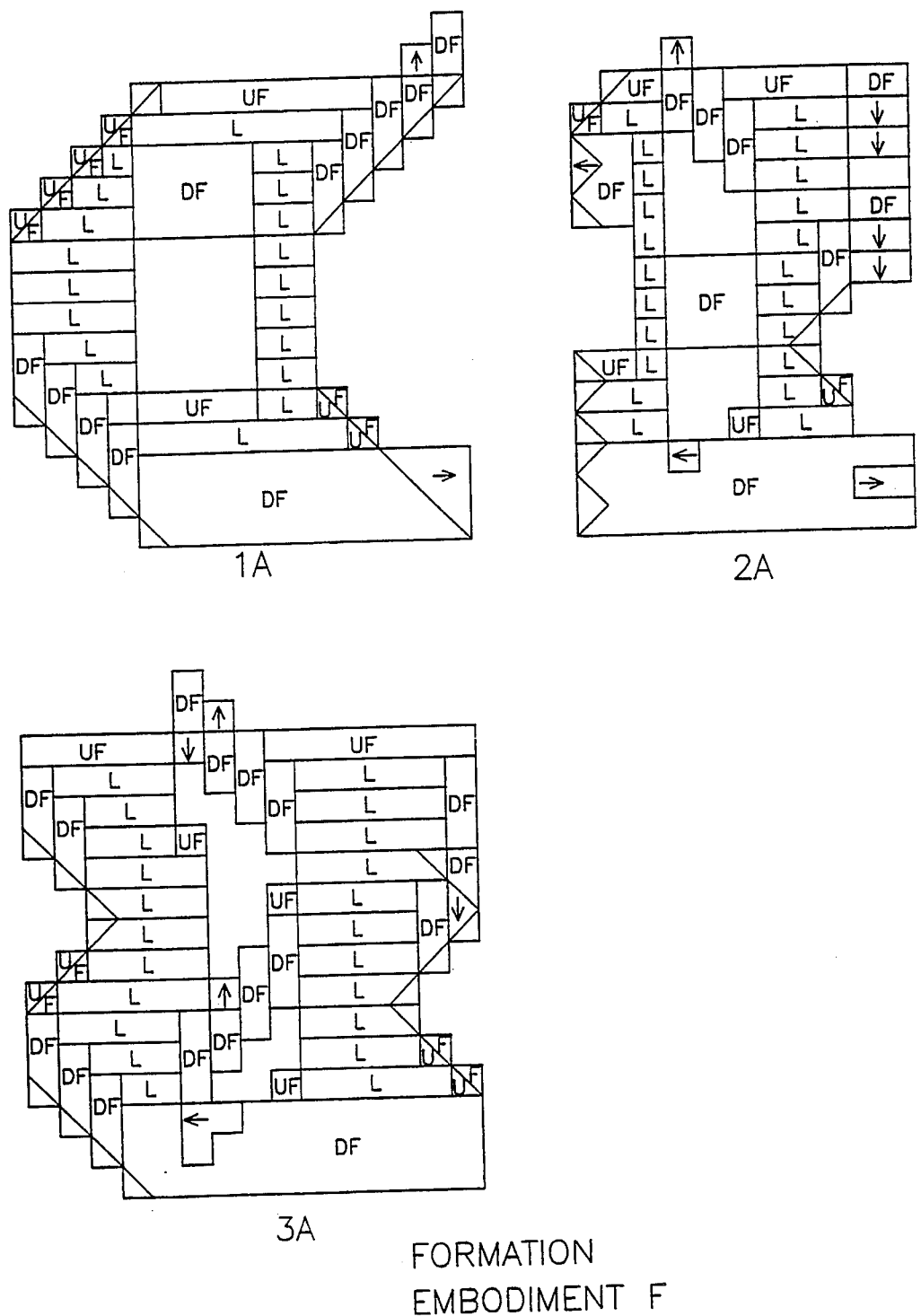
FIG. 30 depicts side views of the first, second, and third objects, respectively, as formed with the FDFBs, FUFBs, and FLBs for embodiment F.

FIG. 30 depicts side views of the three objects of FIG. 21 as formed with this embodiment. As with the above embodiments, the FDFB, FUFB, and FLB and their associated cure depths are depicted in these Figures as DF, UF, and L respectively.

EMBODIMENT G:

This is a three-layer, z-error correction embodiment with a high level of sophistication, down-facing priority, and with full cure of regions thinner than the MSD. The high level of sophistication of this embodiment removes multiple curing of regions near features thinner than the MSD, it stops the upward shift of SDFBs when they become bounded from below due to the upward shifting of SDFBs from lower layers and redefines the unshifted FDFBs as either FUFBs or FLBs.

The first step of this embodiment is identical to step 1 of Embodiment A.

The second step of this embodiment is identical to step 2 of Embodiment A.

The third step of this embodiment is to perform Boolean operations to determine Final Down-Facing Boundaries, FDFB(N), Final Up-Facing Boundaries, FUFB(N), and Final Continuing Boundaries, FLB(N), all for cross-section (N). These boundaries are defined by, $FDFB(N) = SDFB(N-2) - FDFB(N-2) - FDFB(N-3),$ $FUFB(N) = SUFB(N) +$ $\{SDFB(N) \cap IUFB(N) \cap FDFB(N-1)\} -$ $FDFB(N) - \{SDFB(N-1) - FDFB(N-1) - FDFB(N-2)\}$ $FLB(N) = SLB(N) + \{SDFB(N) - IUFB(N)\} \cap FDFB(N-1) -$ $FDFB(N) - \{SDFB(N-1) - FDFB(N-1) - FDFB(N-2)\}.$ As the final boundaries for layers N–1, N–2, and N–3 must be used in determining the final boundaries for layer N, it is apparent that the processing of layers must proceed from the lowest to the highest.

The fourth step is to repeat step 3 for all cross-sections.

The fifth step is to use the FDFB, FUFB and FLB for obtaining hatch and fill.

Finally the object is formed from the derived data. The exposure parameters required for the FDFBs, FUFBs and FLBs, and the included regions, are identical to those noted above for Embodiments E and F.

A detailed description of the logic utilized in determining the appropriate Boolean operations to use to produce the FDFB, FUFB, and FLB for this embodiment is provided below. First, the constraints that each of the above definitions puts on object formation is recalled. MSD=3 indicates that a cure depth of three layer-thicknesses is required when forming down-facing features so that they are adequately cohesive. In general this requires the down-facing features to be shifted up two layer-thickness. An MRD=1 indicates that coatings of one layer-thickness can readily be formed. Down-facing priority indicates that even when the object thickness becomes thinner than the MSD the down-facing features of the object will be properly positioned.

The boundary types needed for object formation include: (1) FDFB, (2) FUFB, and (3) FLB.

The thickness of regions defined by the FDFB is equal to the MSD and the exposure supplied should result in a smooth down-facing surface. These FDFB regions do not require any overcure for adhesion since there is at least one layer-thickness of empty space below them. The FUFB regions are located one layer-thickness above cured material. The exposure applied to the FUFB regions should form a smooth upper surface and cause adhesion to the cured material below. The FLB regions are located one layer-thickness above cured material. The exposure applied to the FLB regions should cause adhesion to the cured material below.

For accurate object formation generally the down-facing feature data should be shifted up twoe layer-thicknesses. Therefore, the starting point for defining the FDFB is, $FDFB(N) \approx SDFB(N-2).$ However for enhanced accuracy the SDFB(N–2) should not be shifted upward if they are no longer down-facing due to the upward shifting of SDFBs from lower layers. Additionally, if these regions are not completely replaced by up-shifted FDFBs they should be redefined as either up-facing or continuing regions.

It is noted that by definition the minimum vertical distance between down-facing features is two layer thicknesses. Thus no SDFB(N–1) can exist directly below an SDFB(N).

For a down-facing feature to loose it down-facing nature, a lower down-facing feature needs to be pushed upward to its same level, or to one layer-thickness below it. The lower down-facing features of concern are those which become FDFB(N–2) and FDFB(N–3) since they dictate whether or not the SDFB(N–2) should be shifted up-ward. Any portion of the SDFB(N–2) which is overlapped by the FDFB(N–2) are simply removed from further consideration as they are completely equivalent to the FDFB(N–2). When a down-facing feature is shifted upward from 3 layers below the SDFB(N–2) it becomes a FDFB(N–3). Any portions of the SDFB(N–2) which are located above the FDFB(N–3) are no longer down-facing since they will be located one layer thickness above cured material. Thus these portions of the SDFB(N–2) should not be shifted but instead redefined as either up-facing or continuing.

The formation of FDFBs on any cross-sections below N–3 doesn't effect whether the SDFB(N–2) should be shifted or not since at least a one-layer gap exists between the features. As no standard down-facing features can exist one layer-thickness directly below the SDFB(N–2), we needn't consider their effect on the shifting of the SDFB(N–2). Thus the above preliminary definition of the FDFB(N) must be modified. The complete definition of the FDFB(N) is,

FDFB(N)=SDFB(N–2)–FDFB(N–2)–FDFB(N–3)

Nominally the FUFB(N) and the FLB(N) are equivalent to the SUFB(N) and SLB(N), respectively, less any FDFB(N) which have landed on them.

FUFB(N)≈SUFB(N)–FDFB(N)

FLB(N)≈SLB(N)–FDFB(N)

However shifting or lack of shifting of down-facing features can add to or subtract from the up-facing boundaries and layer boundaries on cross-section (N).

As noted previously, SDFB(N) which are not shifted should be should be dropped or redefined as up-facing or continuing. The SDFB(N) which are shifted on the other hand have no impact on defining the FUFB(N) and the FLB(N).

Furthermore the SDFB(N−1) which aren't shifted cannot affect the regions within the up-facing and layer boundaries on cross-section (N). However, the SDFB(N−1) which are shifted up to N+1 do affect these regions. The areas within the FDFB(N+1) should be removed from the regions enclosed by both the up-facing boundaries and layer boundaries for cross-section (N). Additionally, the SDFB(N−2) which are shifted upward become the FDFB(N). The impact of the FDFB(N) on the FUFB(N) and FLB(N) has already been taken into account. The SDFB(N−2) which have not been shifted have no impact on the FUFB(N) and FLB(N).

Finally whether shifted upward or not, the SDFB from cross-section (N−3) or from lower cross-sections have no impact on the FUFB(N) or the FLB(N).

Turning back to the unshifted SDFB(N), it is seen that besides having an FDFB(N) land on it, the other reason why an SDFB(N) is unshifted is because an FDFB on N−1 overlaps it. Furthermore, if it is to become up-facing, it is because it was always up-facing and if it is to become continuing, it is because it was never up-facing. Thus the above preliminary definition of FUFB(N) must be modified by the addition of

{SDFB(N) * IUFB(N) * FDFB(N−1)}.

Similarly the above definition of FLB(N) must be modified by the addition of

{SDFB(N)−IUFB(N)}* FDFB(N−1).

It doesn't matter whether the addition of the above expressions or the subtraction of the FDFB(N) is done first as they define independent regions. This is because FDFB(N) * FDFB(N−1)=Null.

Next we turn back to the SDFB(N−1) which are shifted upward, by two layers, to become FDFB(N+1). Any up-facing or continuing boundary regions on layer N must be reduced by the SDFB(N−1) which are shifted upward. As with the final FDFB(N), the portion of the SDFB(N−1) which is not shifted upward is that portion which overlaps FDFB(N−1) or which overlaps FDFB(N−2). Thus the up-facing boundaries and layer boundaries defined above must be further adjusted by subtracting the quantity,

{SDFB(N−1)−FDFB(N−1)−FDFB(N−2)}.

Noting that since,

SDFB(N−1) * SDFB(N)=Null, and since

SDFB(N−1) * FDFB(N)=Null, the order in which the unions and differences are made doesn't affect the final result. Thus the final up-facing boundaries and layer boundaries for cross-section N are defined by:

$FUFB(N) = SUFB(N) + \{SDFB(N) * IUFB(N) *$ $FDFB(N-1)\} - FDFB(N) - \{SDFB(N-1) -$ $FDFB(N-1) - FDFB(N-2)\}$

Figure 31A:
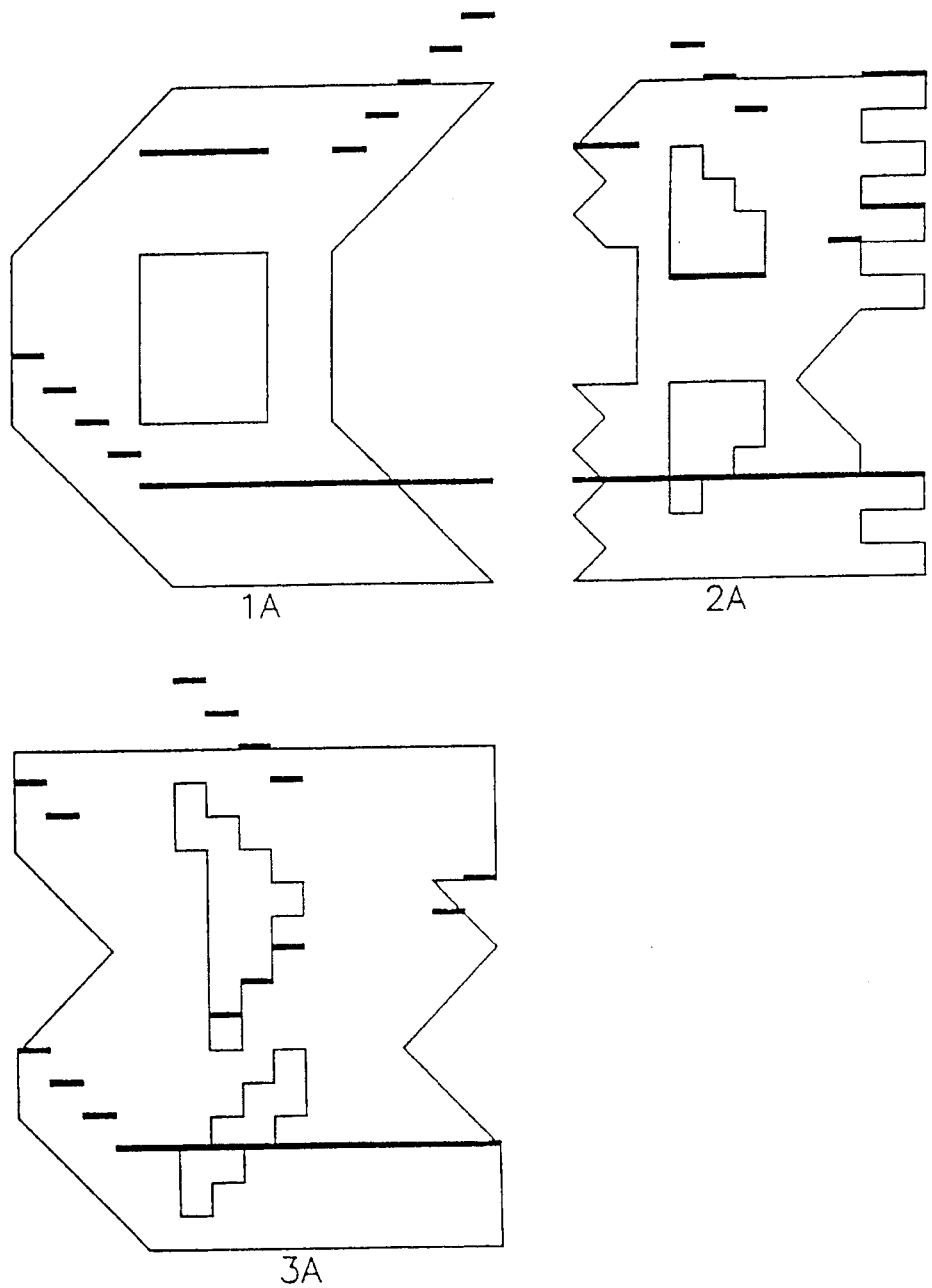
FIG. 31A depicts a side views of the first, second, and third objects, respectively, with the FDFBs derived from embodiment G.

FIG. 31A, respectively, depicts the FDFB for the three different objects of FIG. 21 as obtained utilizing this embodiment.

Figure 31B:
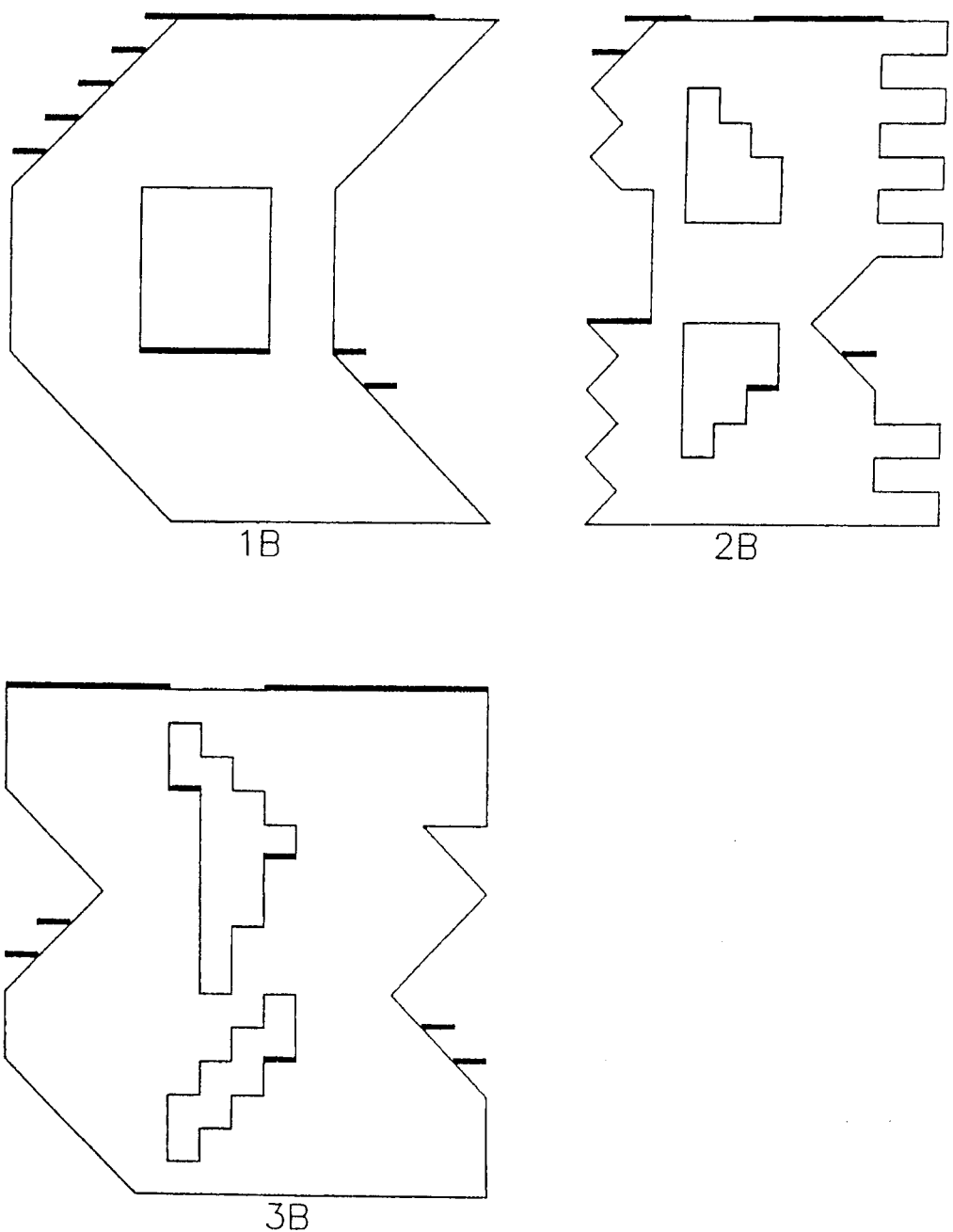
FIG. 31B depicts side views of the first, second, and third objects, respectively, with the FUFBs derived from embodiment G.

FIG. 31B, respectively, depicts the FUFB for the three different objects of FIG. 21 as obtained utilizing this embodiment.

Figure 31C:
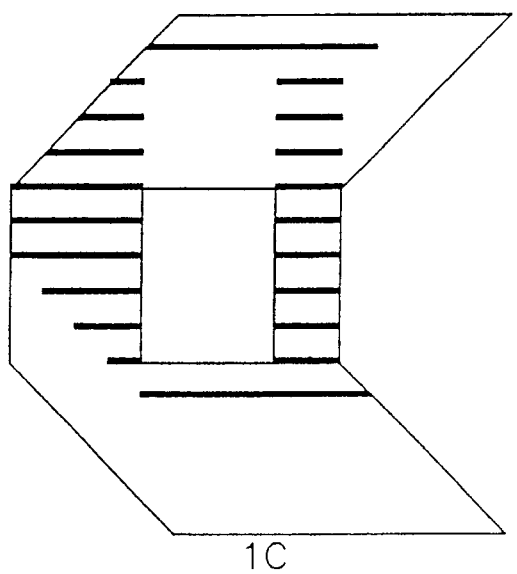
FIG. 31C depicts side views of the first, second and third objects, respectively, with the FLBs derived from embodiment G.
Figure 31C:
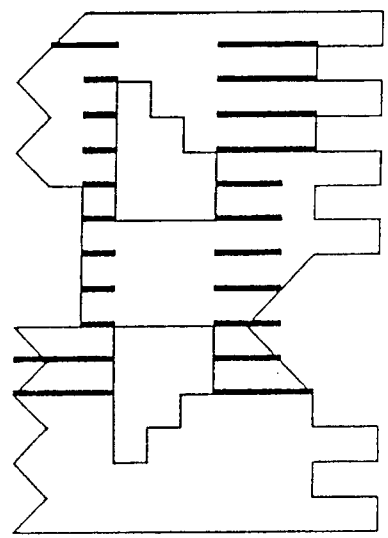
Figure 31C:
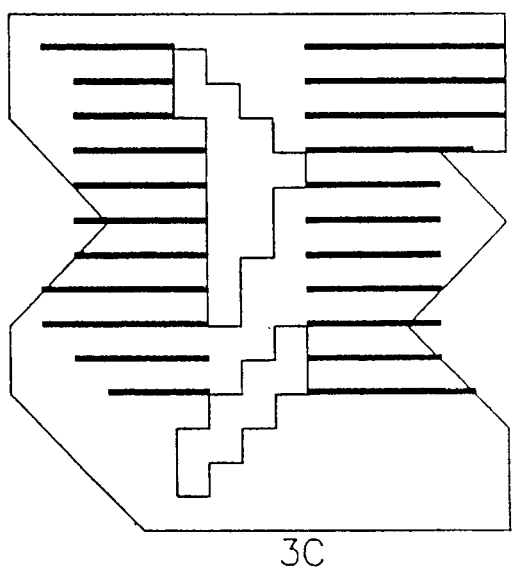

FIG. 31C, respectively, depicts the FLB for the three different objects of FIG. 21 as obtained utilizing this embodiment.

Figure 31D:
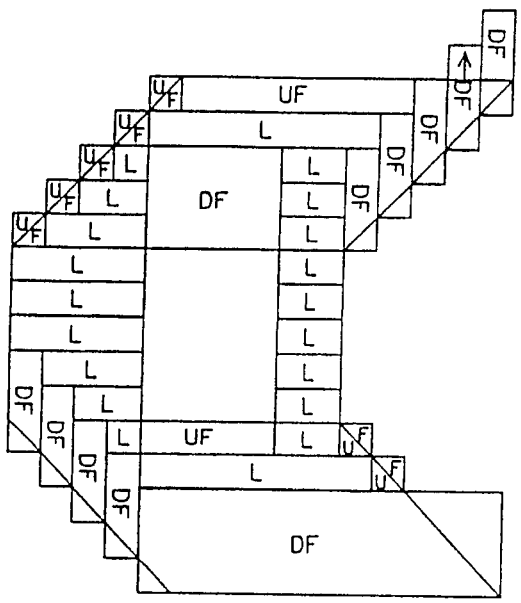
FIG. 31D depicts side views of the first, second and third objects, respectively, as formed with the FDFBs, FUFBs, and FLBs for embodiment G.
Figure 31D:
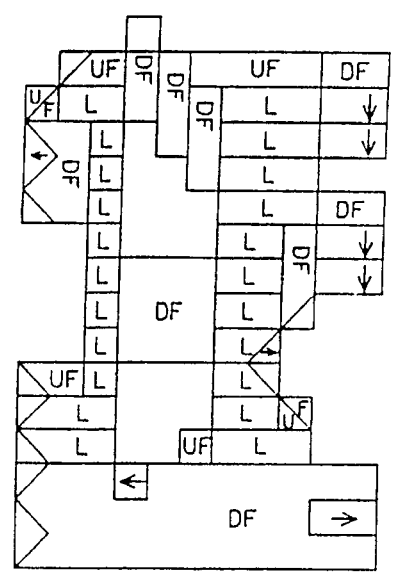
Figure 31D:
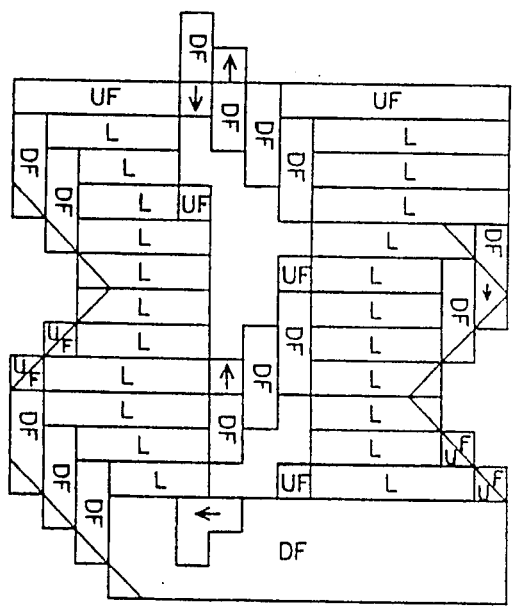

FIG. 31D, respectively, depicts the three different objects as formed using this embodiment. The boundary designations in these Figures are identical to those used in FIGS. 25 to 30.

If one knew that the object being sliced had no solid features thinner than the MSD+one layer-thickness, i.e. four layer-thicknesses, one could reduce the Boolean operations to,

FDFB(N)=SDFB(N−2),

FUFB(N)=SUFB(N),

FLB(N)=SLB(N)−SDFB(N−2)−SDFB(N−1).

Alternatively, if one knew nothing about the thickness of solid features but knew the object had no hollow features thinner than the MSD, i.e. three layer-thicknesses, the Boolean operations could still be reduced to,

FDFB(N)=SDFB(N−2),

FUFB(N)=SUFB(N)−SDFB(N−2)−SDFB(N−1),

FLB(N)=SLB(N)−SDFB(N−2)−SDFB((N−1).

This last set of operations is also applicable to an object which has no solid features thinner than the MSD regardless of the thickness of hollow features.

EMBODIMENT H:

This is a 3-layer, z-error correction embodiment with a high level of sophistication, double skinning, down-facing priority, and with full cure of regions thinner than the MSD.

The first step of this embodiment is to start with the FDFB(N), FUFB(N), and the FLB(N) from Embodiment G. The following definitions are made:

FDFB(N)=FDFB(N) from G

FUFB(N)=FUFB(N) from G

TLB(N)=FLB(N) from G

The second step of this embodiment is to perform Boolean operations to determine Final Multiple Down-Facing Boundaries, FXDFB(N), and Final Multiple Up-Facing Boundaries, FXUFB(N), and Final Continuing Boundaries, FLB(N), all for cross-section (N). This step involves three substeps. The first substep is to determine the FXDFB(N). The regions defined by these boundaries are located one layer thickness above solidified material and one curing level above down-facing regions. They are defined by, FXDFB(N)=TLB(N) n FDFB(N−1).

The second substep is to determine the FXUFB(N). The regions defined by these boundaries are located one curing level below up-facing features and one layer thickness above cured material. They are defined by, FXUFB(N)=TLB(N) n FUFB(N+1)−FXDFB(N).

The third substep is to determine the FLB(N). The regions defined by these boundaries are located 1 layer above cured material. They are defined by,

FLB(N)=TLB(N)−FXDFB(N)−FXUFB(N).

The third step of this embodiment is to repeat step 2 for all cross-sections.

The fourth step is to use the FDFB, FXDFB, FUFB, FXUFB, and the FLB for obtaining hatch and fill.

Finally the object is formed from the derived data. The FDFB, FUFB, and FLB are cured identically to that of the Embodiment C. The FXUFB and FXDFB are cured as skins to an appropriate depth which is typically one layer-thickness plus an amount necessary for adhesion.

Figure 32:
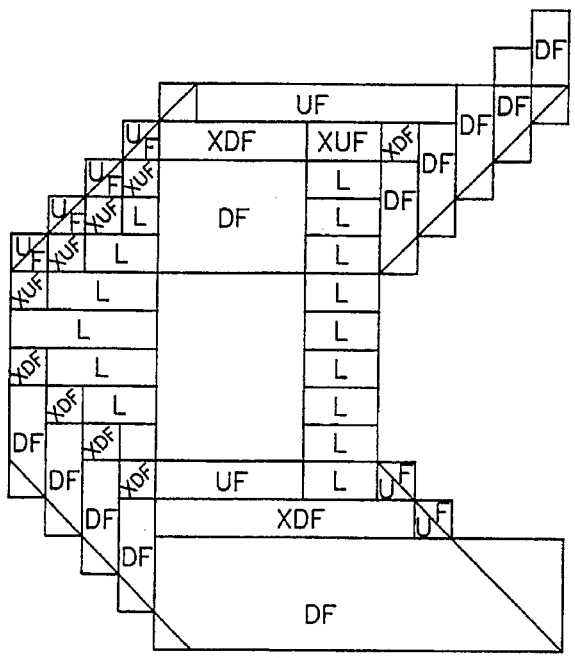
FIG. 32 depicts side views of the first, second, and third objects, respectively, as formed with the FDFBs, FUFBs, FXDFBs, FXUFBs, and FLBs for embodiment H.
Figure 32:
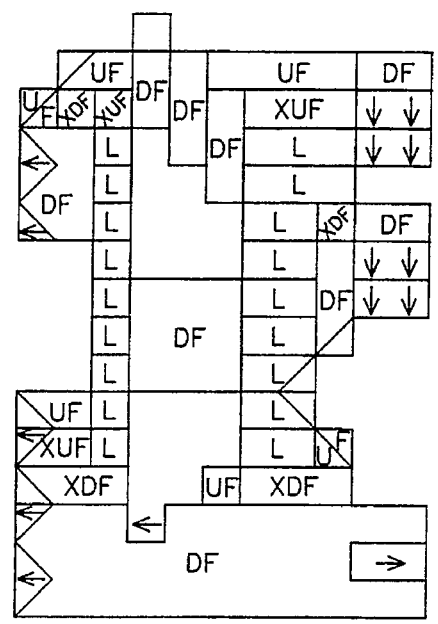
Figure 32:
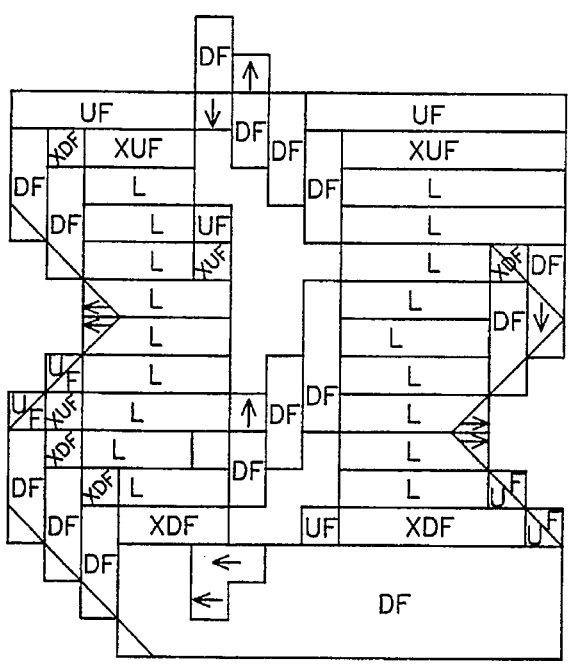

FIG. 32 depicts side views of three objects of FIG. 21 as formed with this embodiment. The FDFB, FXDFB, FUFB, FXUFB, and the FLB, and their associated cure depths are depicted in these Figures as DF, XDF, UF, XUF, and L, respectively.

EMBODIMENT I:

This is a two-level, z-error correction and two-level, minimum coating thickness (e.g. Dewetting work around)

embodiment with a high level of sophistication, down-facing priority, and with full cure of regions thinner than the MSD. If necessary, due to a mismatch between the MRD and any portion of the object thickness, any odd cure will be applied in association with the curing of up-facing features.

The first step of this embodiment is to start with the FDFB(N), FUFB(N) and the FLB(N) from Embodiment C. The following definitions are made:

TDFB(N)=FDFB(N) from 3,

TUFB(N)=FUFB(N) from 3,

TLB(N)=FLB(N) from 3.

The second step of this embodiment is to perform Boolean operations to determine First and Second Final Down-Facing Boundaries, 1FDFB(N) and 2FDFB(N), Final Continuing Boundaries, FLB(N), and First and Second Final Up-Facing Boundaries, 1FUFB(N) and 2FUFB(N), all for cross-section N. This second step is divided into five substeps. The first substep is to determine a first type of FDFB(N), 1FDFB(N). The regions defined by these boundaries should be cured to a depth of two layer-thicknesses. These boundaries are defined by,

1FDFB(N)–TDFB(N)–TUFB(N+1).

The second substep is to determine a second type of FDFB(N), 2FDFB(N). The regions defined by these boundaries should be cured to a depth of three layer-thicknesses. These boundaries are defined by, 2FDFB(N)=TDFB(N–1) n TUFB(N).

The third substep is to determine the FLB(N). The regions defined by these boundaries are located 2 layers above cured material. These regions should be cured to a depth of two layer-thicknesses plus any overcure necessary for adhesion. These boundaries are defined by,

FLB(N)=TLB(N)–FLB(N–1)–1FDFB(N–1)–TUFB(N+1).

The fourth substep is to determine a first type of FUFB(N), 1FUFB(N). The regions defined by these boundaries are located 3 layers above cured material. These regions should be cured to a depth of three layer-thicknesses plus any amount necessary for adhesion. These boundaries are defined by,

1FUFB(N)=TUFB(N)–FLB(N–2)–1FDFB(N–2)–2FDFB(N).

The fifth substep is to determine a second type of FUFB(N), 2FUFB(N). The regions defined by these boundaries are located 2 layers above cured material. These regions should be cured to a depth of two layer-thicknesses plus any overcure necessary for adhesion. These boundaries are defined by,

2FUFB(N)=TUFB(N)–1FUFB(N)–2FDFB(N).

The third step of this embodiment is to repeat step 2 for all cross-sections.

The fourth step is to use the 1FDFB, 2FDFB, FLB, 1FUFB, and the 2FUFB for obtaining hatch and fill.

Finally, the object is formed from the derived data.

Figure 33:
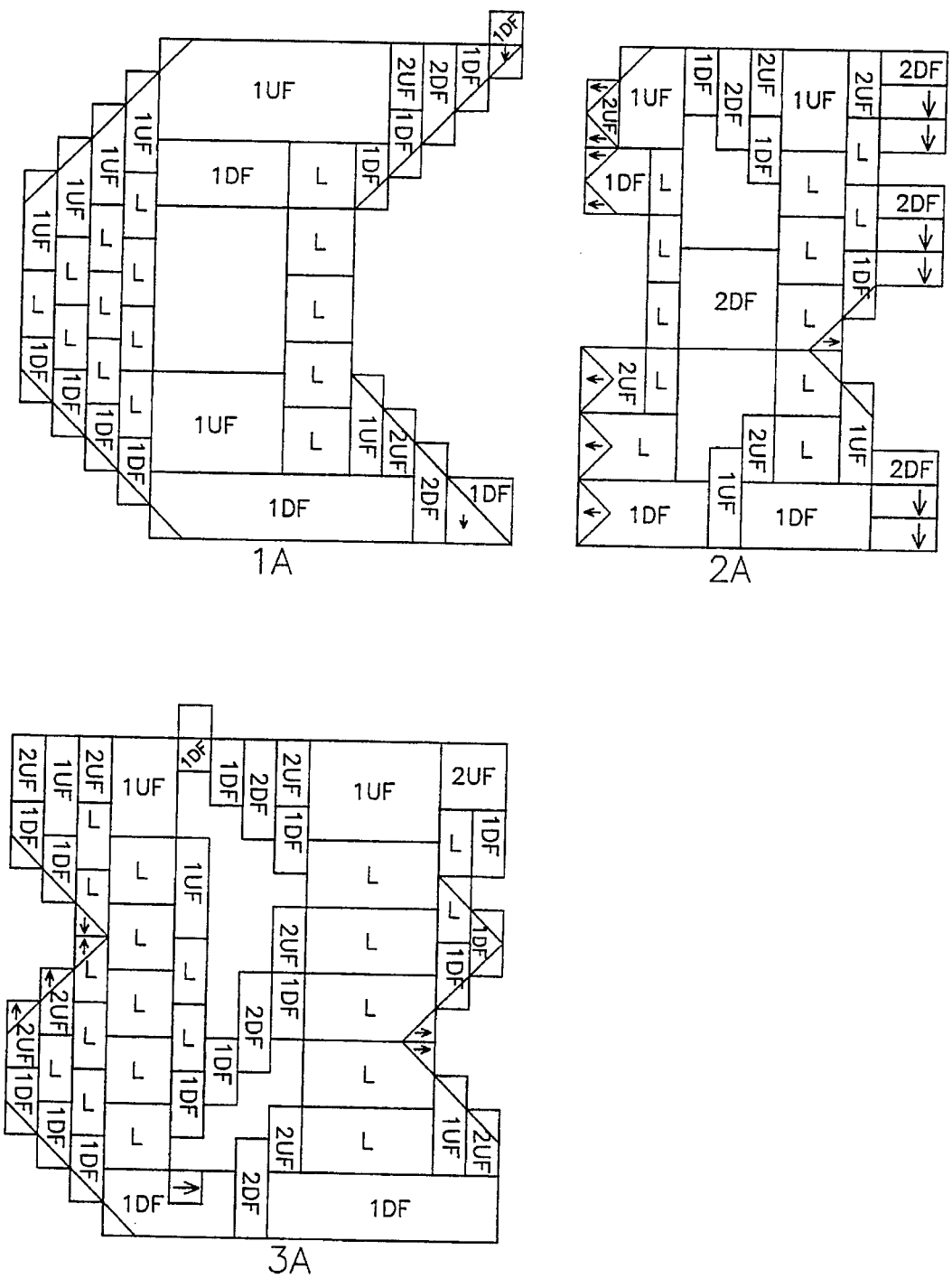
FIG. 33 depicts side views of the first, second, and third objects, respectively, as formed with the 1FDFBs, 2FDFBs, FLBs, 1FUFBs, and 2FUFBs for embodiment I.

FIG. 33 depicts side views of the objects of FIG. 21 as formed using this embodiment. The 1FDFB, 2FDFB, FLB, 1FUFB, and 2FUFB regions and their cure depths are depicted in these Figures with the designations of 1DF, 2DF, L, 1UF, and 2UF.

EMBODIMENT J:

This is a three-layer, z-error correction and two-layer, minimum coating thickness embodiment with a high level of sophistication, down-facing priority, and full cure of regions thinner than the MSD. If necessary, due to a mismatch between the MRD and any portion of the object thickness, any odd cure will be applied in association with curing of up-facing features.

The first step of this embodiment is to start with the FDFB(N), FUFB(N) and the FLB(N) from Embodiment G. The following definitions are made, TDFB(N)=FDFB(N) from G, TUFB(N)=FUFB(N) from G, TLB(N)=FLB(N) from G.

The second step of this embodiment is to perform Boolean operations to determine First and Second Final Down-Facing Boundaries, 1FDFB(N) and 2FDFB(N), Final Continuing Boundaries, FLB(N), and First and Second Final Up-Facing Boundaries, 1FUFB(N) and 2FUFB(N), all for cross-section N. This step is divided into five substeps. The first substep is to determine a first type of FDFB(N), 1FDFB(N). The regions defined by these boundaries should be cured to a depth of three layer-thicknesses. These boundaries are defined by,

1FDFB(N)=TDFB(N)–TUFB(N+1).

The second substep is to determine a second type of FDFB(N), 2FDFB(N). The regions defined by these boundaries should be cured to a depth of 4 layer thicknesses. These boundaries are defined by, 2FDFB(N)=TDFB(N–1) n TUFB(N).

The third substep is to determine the FLB(N). The regions defined by these boundaries are located two layers above cured material. These regions should be cured to a depth of two layer-thicknesses plus any overcure necessary for adhesion. These boundaries are defined by,

FLB(N)=TLB(N)–FLB(N–1)–1FDFB(N–1)–TUFB(N+1).

The fourth substep is to determine a first type of FUFB(N), 1FUFB(N). The regions defined by these boundaries are located 3 layers above cured material. These regions should be cured to a depth of three layer-thicknesses plus any amount necessary for adhesion. These boundaries are defined by,

1FUFB(N)=TUFB(N)–FLB(N–2)–1FDFB(N–2)–2FDFB(N).

The fifth substep is to determine a second type of FUFB(N), 2FUFB(N). The regions defined by these boundaries are located 2 layers above cured material. These regions should be cured to a depth of two layer-thicknesses plus any overcure necessary for adhesion. These boundaries are defined by,

2FUFB(N)=TUFB(N)–1FUFB(N)–2FDFB(N).

The third step of this embodiment is to repeat step 2 for all cross-sections.

The fourth step is to use the 1FDFB, 2FDFB, FLB, 1FUFB, and the 2FUFB for obtaining hatch and fill.

Finally, the object is formed from the derived data.

Figure 34:
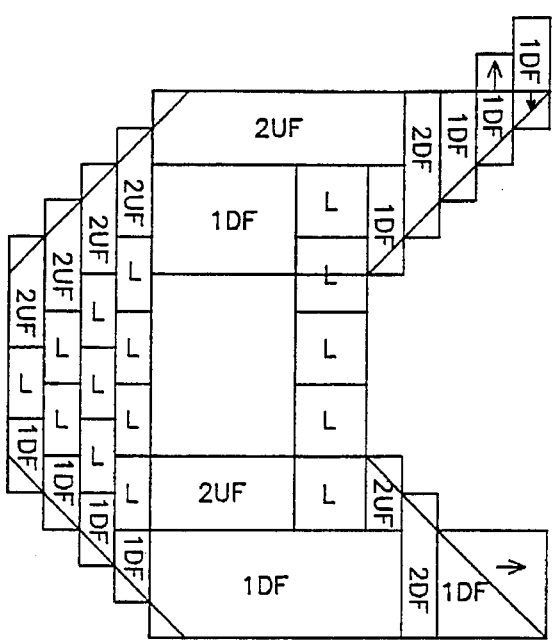
FIG. 34 depicts side views of the first, second, and third objects, respectively, as formed with the 1FDFBs, 2FDFBs, FLBs, 1FUFBs, and 2FUFBs for embodiment J.
Figure 34:
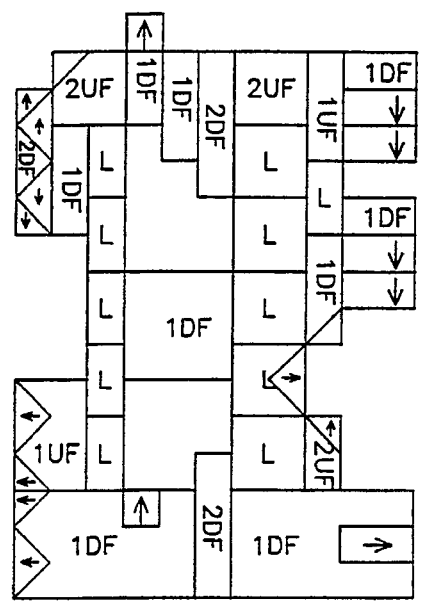
Figure 34:
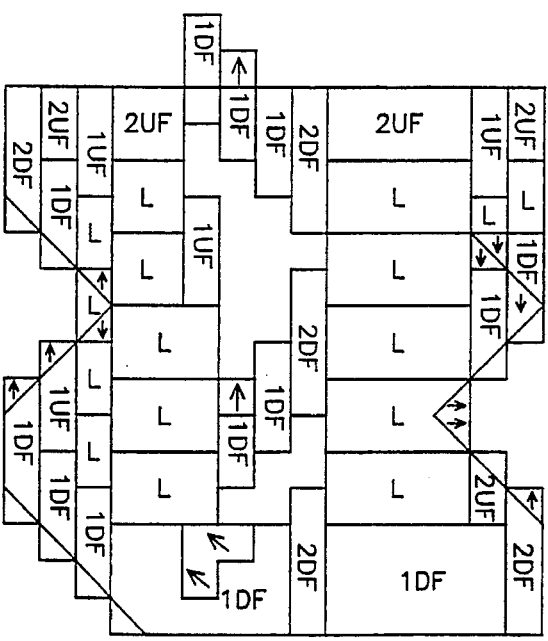

FIG. 34 depicts side views of the objects of FIG. 21 as formed using this embodiment. The 1FDBF, 2FDFB, FLB, 1FUFB, and 2FUFB regions and their cure depths are depicted in these Figures with the designations of DF, 2DF, L, 1UF, and 2UF.

EMBODIMENT K:

This is a three-layer, z-error correction (MSD) and two-layer, minimum coating thickness (MRD) embodiment with inner boundary removal, a high level of sophistication, down-facing priority, and full cure of regions thinner than the MSD. If necessary, due to a mismatch between the MRD and any portion of the object thickness, any odd cure will be applied in association with curing of up-facing features.

The first step of this embodiment is to start with the 1FDFB, 2FDFB, FLB, 1FUFB, and the 2FUFB from Embodiment J. The following definitions are made:

1TDFB(N)=1FDFB(N) from J,

2TDFB(N)=2FDFB(N) from J,

TLB(N)=FLB(N) from J,

1TUFB(N)=1FUFB(N) from J,

2TUFB(N)=2FUFB(N) from J.

The second step is to use the 1TDFB(N), 2TDFB(N), TLB(N), 1TUFB(N) and the 2TUFB(N) to determine all necessary hatch and fill for layer N.

The third step is to determine which of the 1TDFB(N), 2TDFB(N), TLB(N), 1TUFB(N) and the 2TUFB(N) boundary vectors, or portions thereof, that form part of the external boundaries of the object according to the following substeps. The following substeps are expressed in Boolean form but instead of applying the operations to the regions enclosed by the boundaries, as with the previous embodiments, the operations are applied to vector segments on a segment-by-segment basis.

| | | | |
|---|---|---|---|
| $1FDFB1(N)$ | = | $1TDFB(N)\ n\ ICSB(N)$ | A) |
| $1FDFB2(N)$ | = | $1TDFB(N)\ n\ ICSB(N-1)$ | |
| $1FDFB3(N)$ | = | $1TDFB(N)\ n\ ICSB(N-2)$ | |
| $1FDFB(N)$ | = | $1FDFB1(N) + 1FDFB2(N) +$ | |
| | | $1FDFB3(N)$ | |
| $2FDFB1(N)$ | = | $2TDFB(N)\ n\ ICSB(N)$ | B) |
| $2FDFB2(N)$ | = | $2TDFB(N)\ n\ ICSB(N-1)$ | |
| $2FDFB3(N)$ | = | $2TDFB(N)\ n\ ICSB(N-2)$ | |
| $2FDFB4(N)$ | = | $2TDFB(N)\ n\ ICSB(N-3)$ | |
| $2FDFB(N)$ | = | $2FDFB1(N) + 2FDFB2(N) +$ | |
| | | $2FDFB3(N) + 2FDFB4(N)$ | |
| $FLB1(N)$ | = | $TLB(N)\ n\ ICSB(N)$ | C) |
| $FLB2(N)$ | = | $TLB(N)\ n\ ICSB(N-1)$ | |
| $FLB(N)$ | = | $FLB1(N) + FLB2(N)$ | |
| $1FUFB1(N)$ | = | $1TUFB(N)\ n\ ICSB(N)$ | D) |
| $1FUFB2(N)$ | = | $1TUFB(N)\ n\ ICSB(N-1)$ | |
| $1FUFB3(N)$ | = | $1TUFB(N)\ n\ ICSB(N-2)$ | |
| $1FUFB(N)$ | = | $1FUFB1(N) + 1FUFB2(N) +$ | |
| | | $1FUFB3(N)$ | |
| $2FUFB1(N)$ | = | $2TUFB(N)\ n\ ICSB(N)$ | E) |
| $2FUFB2(N)$ | = | $2TUFB(N)\ n\ ICSB(N-1)$ | |
| $2FUFB(N)$ | = | $2FUFB1(N) + 2FUFB2(N)$ | |

The fourth step is to use the 1FDFB(N), 2FDFB(N), FLB(N), 1FUFB(N) and 2FUFB and the previously obtained hatch and fill to form the object. The required cure depths are identical to those of Embodiment J. As the internal boundaries have been removed, any impedance they would have caused to resin drainage is eliminated and thus this embodiment can be used with a QUICKCAST build style.

EMBODIMENT L:

This is a three-layer, z-error correction (MSD) and two-layer, minimum coating thickness (MRD) embodiment with a high level of sophistication, double skinning, inner boundary removal, down-facing priority, and with full cure of regions thinner than the MSD.

The first step of this embodiment starts with the 1FDFB(N), 2FDFB(N), 1FUFB(N), 2FUFB(N), and the FLB(N) from Embodiment J. The following definitions are made:

1FDFB(N)=1FDFB(N) from J,

2FDFB(N)=2FDFB(N) from J,

1FUFB(N)=1FUFB(N) from J,

2FUFB(N)=2FUFB(N) from J,

TLB(N)=FLB(N) from J.

The second step of this embodiment is to perform Boolean operations to determine Final Multiple Down-Facing Boundaries, XDFB(N), Final Continuing Boundaries, FLB(N), and Final Multiple Up-Facing Boundaries, FXUFB(N), all for cross-section N. This step is divided into three substeps. The first substep is to determine the FXDFB(N). The regions defined by these boundaries are located 2 layers above cured material and these regions are located one curing level above down-facing regions. They are defined by, FXDFB'(N)=TLB(N) n 1FDFB(N−2).

The second substep is to determine the FXUFB(N). The regions defined by these boundaries are located one curing level below any up-facing features and are located 2 layers above cured material. These regions are defined by, FXUFB'(N)=TLB(N) n {2FUFB(N+2)+1FUFB(N+3)}− FXDFB(N).

The third substep is to determine the FLB(N). The regions defined by these boundaries are located 2 layers above cured material. These regions are defined by,

FLB'(N)=TLB(N)−FXDFB(N)−FXUFB(N).

The third step of this embodiment is to repeat step 2 for all cross-sections.

The fourth step is to use the 1FDFB, 2FDFB, FXDFB, 1FUFB, 2FUFB, FXUFB, FLB for obtaining hatch and fill.

As was done in step 4 of Embodiment K, the fifth step is to determine the which portions of the above boundaries form external portions of the object and then to keep only those portions when solidifying boundaries.

The comparisons necessary to for the 1FDFB(N), 2FDFB(N), 1FUFB(N) and the 2FUFB(N) can be found above in association with Embodiment K. As the FLB(N) have been redefined in this embodiment and as the FXUFB(N) and FXDFB(N) are new, the necessary comparisons are as follows:

| | | | |
|---|---|---|---|
| $FLB1(N)$ | = | $FLB'(N)\ n\ ICSB(N)$ | A) |
| $FLB2(N)$ | = | $FLB'(N)\ n\ ICSB(N-1)$ | |
| $FLB(N)$ | = | $FLB1(N) + FLB2(N)$ | |
| $FXDFB1(N)$ | = | $FXDFB'(N)\ n\ ICSB(N)$ | B) |
| $FXDFB2(N)$ | = | $FXDFB'(N)\ n\ ICSB(N-1)$ | |
| $FXDFB(N)$ | = | $FXDFB1(N) + FXDFB2(N)$ | |
| $FXUFB1(N)$ | = | $FXUFB'(N)\ n\ ICSB(N)$ | C) |
| $FXUFB2(N)$ | = | $FXUFB'(N)\ n\ ICSB(N-1)$ | |
| $FXUFB(N)$ | = | $FXUFB1(N) + FXUFB2(N)$ | |

Finally the object is formed from the derived data.

Figure 35:
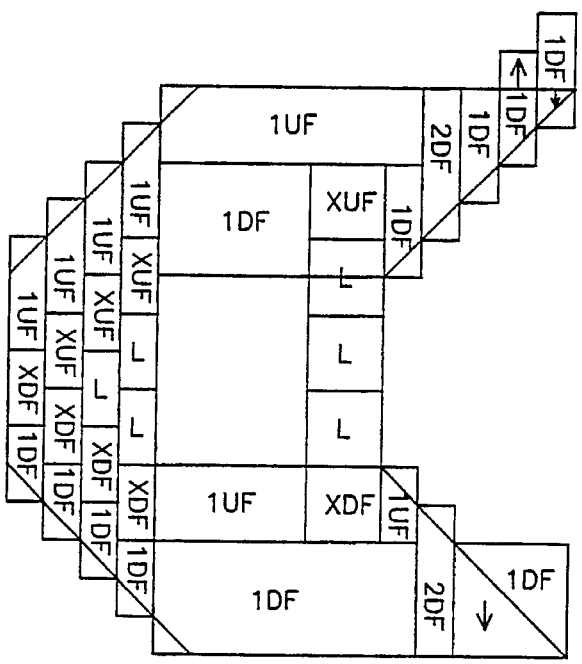
FIG. 35 depicts side views of the first, second, and third objects, respectively, as formed with the 1FDFBs, 2FDFBs, 1FUFBs, and 2FUFBs, FXDFBs, FXUFBs, and FLBs for embodiment L.
Figure 35:
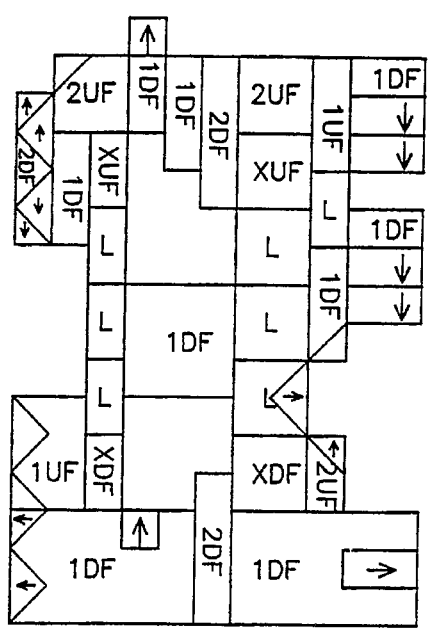
Figure 35:
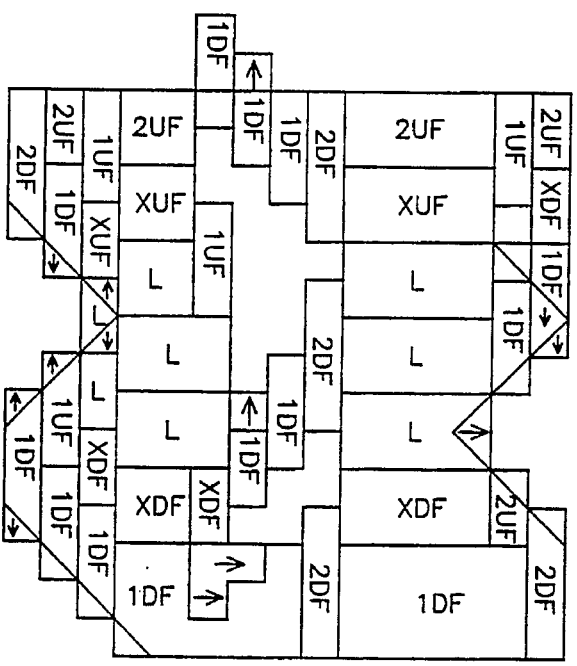

FIG. 35 depicts side views of the objects of FIG. 21 as formed with this embodiment. The 1FDFB, 2FDFB, 1FUFB, 2FUFB, FLB, FXDFB, and FXUFB and their cure depths (excluding over cure) are depicted in these Figures as 1DF, 2DF, 1UF, 2UF, L, XDF, and XUF, respectively.

In the above embodiments the various Boolean operations are done to ensure that all the defined regions are fully independent of the all other regions. However, in many practical circumstances, independence may not be an absolute requirement. In fact, if one is willing to sacrifice some regional independent, many of the embodiments can be greatly simplified. As an example, the multiple skinning embodiments can be simplified if one is willing to allow the extra skins, which are being produced, to overlay other regions. If this is the case, to determine which portions of an up-facing or down-facing skin can be moved to a particular cross-section, take an intersection between the desired skin boundary (i.e. region) and the ICSB of the cross-section the skin is to be moved to. The result of the operation yields that portion of the skin that can be placed on the desired cross-section. In equation form we get, FXDFB(N)=ICSB(N) * FDFB(original cross-section), and FXUFB(N)=ICSB(N) * FUFB(original cross-section).

HORIZONTAL COMPARISON TECHNIQUES:

In the practice of stereolithography, object cross-sections have been differentiated into various regions, relating to how portions of each cross-section interact with the external surfaces of the object. Using the slicing techniques described in U.S. patent application Ser. No. 07/331,644 each cross-section was potentially divided into five regions while with the techniques described in U.S. patent application Ser. No. 07/606,191 each cross-section was divided into potentially three regions. Whether from the teachings of the '644 application or the '191 application, these separated regions were derived based on whether or not each portion of a cross-section was an up-facing surface, a down-facing surface, or neither and up-facing nor down-facing surface of the object. Though the cross-sectional divisions as taught in these referenced applications are very useful, other divisions can be used, either in addition to those above or in replacement of some or all of them. These alternative or additional divisions can lead to significant advantages in the practice of stereolithography. In this embodiment erosion, expansion and other offsetting techniques are used to divide a cross-section into different regions based on the separation of individual portions of the cross-section from one or more points, one or more lines, or one or more surfaces.

Figure 37:
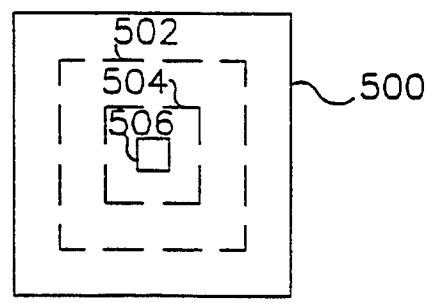
FIG. 37 depicts a top view of a square cross-section on which multiple line width compensations have been performed to create secondary boundaries.

The preferred implementation of the horizontal comparison technique, is to offset selected points, lines or surfaces known amounts and utilize the offset elements to define new cross-sectional regions. In particular, a preferred embodiment utilizes positive and negative line width compensation type offsets of existing cross-sectional boundaries. Techniques for performing line width compensation are described in detail in U.S. patent application Ser. Nos. 07/331,644 and 07/606,191, both previously referenced. FIG. 37 depicts a simple square cross-section of an object having a boundary 500 as well as first, second, and third offset secondary boundaries, labeled 502, 504 and 506, respectively. These secondary boundaries were created using a line width compensation technique. Offset boundary 506 may have been created directly from boundary 500 or alternatively may have been created from boundary 504 which may have been created from boundary 502 which in turn was created from boundary 500. Depending on the purpose to be achieved, any one or all of the offset boundaries could be used to define separate exposure regions for the object. For example the interior of 506 might be one exposure region, the region between 502 and 506 might be a second exposure region and the region between 502 and 500 might be a third exposure region. Furthermore, the boundaries on which the above offsets are made may be the overall cross-sectional boundaries for a cross-section or alternatively one or more of the down-facing, up-facing or continuing boundaries of the cross-section, either taken in combination or alone.

A preferred embodiment utilizing this technique involves making improved patterns for investment casting. These improved techniques for forming investment casting patterns are further discussed in U.S. patent application Ser. No. 08/233,026, filed on Apr. 25, 1994, now pending entitled "Method of and Apparatus for Making a Three-Dimensional Object by Stereolithography". In this embodiment, the horizontal comparisons operate on the LB regions of each cross-section to divide them into three regions. The first region is that closest to the original LB boundaries and is approximately 15–30 mils wide. This first region forms a completely solidified shell region. The solidification of the first region may occur via multiple overlapping offset boundaries (preferred technique) or alternatively it may be filled by a utilization of skin vectors. The second region borders the first region and proceeds deeper into the cross-section another 50 to 100 mils. This region is solidified using minimal structure, e.g. a very wide spaced hatch, or possibly a broken hatch pattern, that may be used on only periodic layers. Each hatch line might be solidified via a single hatch vector or by two or more hatch vectors which are offset from one another. For example, it might be used once every 25 to 150 mils and be offset with consecutive uses. Alternatively, for example, it might be used every 100 to 150 mils but when used it may be exposed on a series of two or three, or more, consecutive layers without offset. The spacing between the vectors might be 100 to 250 mils.

In this embodiment, the third region occupies the rest of the original LB region. The third region is solidified with a tighter hatch pattern, or one with fewer breaks, than that used in the second region. For example, hatch with a spacing of 100 to 150 mils might be used on every layer and offset periodically. This embodiment offers a strong outer shell which is directly supported by a very fine grid structure, which in turn is supported by a more rigid grid structure. As drainage of stereolithographically produced investment casting patterns is critical to their successful use, and as resin entrapment between the surfaces of the object and the hatch lines can result in failure of the ceramic mold on burn out, the utilization of the horizontal comparison technique allows implementation of an internal grid structure that is fine enough near the object surfaces to allow resin drainage but structurally rigid enough in the deep interior portions of the object to provide adequate support for large structures so as to ensure structural integrity. Without the horizontal comparison techniques described herein, this embodiment could not readily be implemented on an automated basis.

Furthermore, in a more preferred embodiment these horizontal comparison techniques will be combined with the SMLC techniques in order to produce a pattern with multiple skins as well as with thicker boundary regions. The combination embodiment is readily implemented by deriving the multiple skins first by utilization of the SMLC techniques and then using the Horizontal comparison technique to further dissect the FLB regions resulting from the layer comparisons.

The most preferred embodiment extends the last embodiment one step further, by continuing the layer comparison into one or more layers immediately above the multiple down-facing skins and immediately below the multiple up-facing skins so as to provide region designations that allow the regions immediately above and below the down-facing and up-facing surfaces, respectively, to be transformed using a minimal amount of hatch. Preferably, these regions extend beyond the skins by 25 to 150 mils and most preferably by 70 to 100 mils and are solidified using a series of point exposures, e.g. columns, which may be one, two, three or more linewidths in diameter and spaced from each other by 25 to 150 mils. Alternatively, the columns may not be circular in cross-sectional dimension but may take on some other shape, such as small crosses, boxes or the like.

Figure 39:
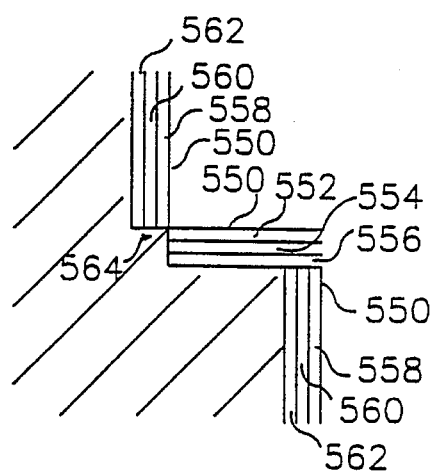
FIG. 39 depicts a partial side view of an object with multiple skins, wide boundary regions, and a gap in the solidified region near the surface.

Other more advanced embodiments are possible where the most exterior portions of the FLB regions are not given a widened solid cure where the FLB is bounded by a region which is being skinned. More particularly, it is possible to judge the skin width which bounds a portion of the FLB, and thus based on this width to determine how the region within and near the FLB should be cured. Of course the wider the adjacent skin the less need for a wide outer solidified FLB zone. In fact, in the presence of a wide skin, a wide outer solidified FLB zone could be detrimental. In an extension of this embodiment, additional care can be taken to ensure that object regions close to inside corners, are not inadvertantly unexposed due to the potential lack of multiple skins being copied into these corner regions and lack of an FLB zone that is not bounded by an adjacent region being skinned. FIG. 39 depicts such a region 564. FIG. 39 depicts a side view of a portion of an object, wherein lines 550 define the outer surface of the object, region 552 indicates an up-facing skin, and regions 558 depict the boundaries of continuing regions (FLB). Regions being skinned due to the use of multiple skins are indicated by numerals 552 and 554, while regions being transformed due to the widened solidification zone around the FLBs (e.g. by use of multiple boundaries) are indicated by reference numerals 560 and 562. As can be seen, region 564 should be solidified but is not. This is due to blanket decision not to utilize widened cure zones around the FLB that are adjacent to skinned regions. The extra care involves utilization of additional comparisons to determine whether or not corresponding FLBs exist on the next consecutive layer and whether or not they are adjacent to skin regions. If such a next consecutive layer is found then The corresponding FLBs for the present layer, and probably one or more previous layers, are supplied with the widened solidification zone.

Figure 38:
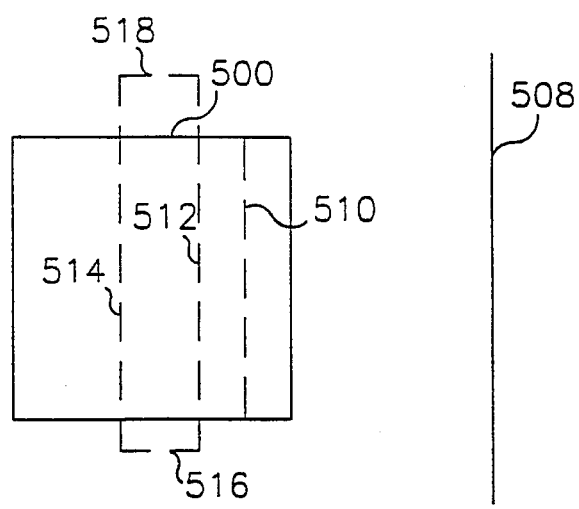
FIG. 38 depicts a top view of a square cross-section on which an offset line has made secondary boundaries.

Other horizontal comparison techniques are also possible. For example, regions on a cross-section can be designated by their distance from a line which lies parallel to the plane of the cross-section and which either intersects the cross-section or is outside it. This situations is illustrated in FIG. 38. A cross-section is depicted which is defined by boundary 500. A line 508 is depicted outside the cross-section. In a manner analogous to offsetting boundary vectors during a line width compensation routine, line 508 is offset from its original position by known amounts. At desired intervals, the offset line can be used to create secondary boundary lines for the cross-section. These secondary boundary lines can be used to define regions of the object which are located at particular distances from the original line 508. Numerals 510, 512 and 514 depict such secondary boundary lines. If it is desired to define actual boundary loops based on the secondary lines, the region between two secondary boundary lines can considered an imaginary solid which is partially defined by the secondary boundary lines. To complete the definition of this imaginary solid region, two additional line segments are attached to the secondary boundaries wherein the attachment is made on either side of the regions which contain the actual cross-section. Two such lines are depicted in the Figure with numerals 516 and 518. The fully defined imaginary solid region can be intersected with the cross-sectional region defined by boundary 500 so as to yield the region common to both. This common region is located at a given distance from the original line 508. This type of comparison can find utility in a variety of situations. For example, if the line 508 represents an axis around which the completed object is going to be rotated then the moment of inertia from each cross-sectional strip can be used to determine the overall moment of inertia for the object. Appropriate cure parameters can be applied to each strip so as to give the object an overall moment of inertia or to give the strips at similar distances from the line 508 the same cure parameters.

As a another example of a horizontal comparison technique, a point like region, either within the cross-section or outside the cross-section, can be defined from which a series of negative compensations (expansions) will be performed in order to determine the distance between each portion of the cross-section and the initial point. The initial point may be defined as a small square, hexagon, octagon, or other polygon which will give the appropriate geometric shape with each expansion.

As an example, the horizontal comparison techniques can be utilized to help automate the recoating process. If positive multiple line width compensations, i.e. reductions, are made, wherein each compensation step has a known width, wherein the number of steps are counted, and wherein the compensations are repeated until the entire cross-section has been traversed, one can determine the maximum distance from the outer portions of the cross-section to its deepest internal point. This distance determines the maximum distance resin must travel over the surface of the previous cross-section in order to reach the most distance point on the cross-section. This distance is the diameter of what is known as the critical circle. One can correlate the critical circle diameter to the dip depth required to most rapidly form a preliminary coating over the previous cross-section. This in turn can lead to a reduction in build time as the net dipping times can be reduced. Thus before performing the recoating process for each cross-section a look up table or the like can be consulted to determine the appropriate dipping parameters to use during recoating.

The recoating process can be further automated by utilizing a combination of the horizontal and vertical comparison techniques to characterize the object configuration over which a smoothing member is passed. Though, many potential object configurations can exist, the characterization of these configurations can hopefully be reduced to a tolerable set. The set of different configurations may be divided into two or more categories. Preferably, the set of distinct configurations will have less than 10 to 20 categories. For each predefined category, the optimum recoating parameters can be determined and stored for use during the recoating process for each layer. There are various recoating parameters that can be varied depending on the object configuration. For example, these parameters may include: (1) the number of sweeps, (2) the clearance between the smoothing member and object surface during each sweep, (3) the velocity of each sweep, (4) the gap between the bottom of the smoothing member and the desired building level, (5) the sweeping direction, etc.

In a modified apparatus another recoating parameter which may be varied might include the type of device utilized, e.g. a flexible blade or a rigid blade, a rotating device, a blade with teeth or multiple appendages, etc. Another recoating parameter which might be varied is the orientation of the object relative to the sweeping device, e.g. the object may be formed on a platform that can be rotated in the horizontal plane. The rotatable platform that can be turned to an appropriate direction for sweeping then rotated back for curing of the next layer or alternatively solidification of the next layer can occur by rotating the orientation of the exposure pattern to be utilized, followed by another rotation of the object for recoating purposes when appropriate and possibly additional rotations and offsets of the exposure pattern.

A number of variables may be utilized in categorizing the object configuration. For example, these variables may include: (1) layer thickness, (2) maximum depth of the widest trapped volume, (2) the maximum width of the deepest trapped volume, (3) the cross-sectional area of the previously solidified layer, (4) the primary orientation and dimensions of the largest trapped volume, and (5) the primary orientation and dimensions of the previously solidified layer. The use of a smoothing member in the stereolithographic recoating process, e.g. a doctor blade, is described in U.S. patent application Ser. No. 08/146,562, filed Nov. 2, 1993. This application is incorporated herein by reference as if set forth in full.

A number of preferred parameter values have been given for the various embodiments described herein. However, further parameter values can be derived by one of skill in the art based on the teachings herein and the building of sample objects.

Even though the embodiments of this disclosure have been directed toward obtaining cure parameters through data processing, this only represents one approach to causing appropriate transformation of material in association with each layer. Therefore, the data processing terminology should be interpreted to include any means for modifying original object descriptive parameters that result in the transformation of material according to the teaching of this invention. The teachings of this invention relate to interpreting object descriptive parameters and reproducing the object in a manner which deviates from a strict layer by layer formation, as necessary to achieve a higher accuracy reproduction. The methods and apparatus of this invention lead to higher accuracy reproductions by utilization of the simultaneous multiple layer curing techniques disclosed herein.

Thus, while several embodiments have been shown and described, it will be obvious that many changes and modifications may be made thereunto, without departing from the spirit and scope of the present invention.

We claim:

1. An improved method of stereolithographically forming a three-dimensional object by forming cross-sectional layers of said object from a material capable of physical transformation upon exposure to synergistic stimulation comprising the steps of receiving data descriptive of said cross-sectional layers, forming said cross-sectional layers by selectively exposing said material to said synergistic stimulation according to said data descriptive of said cross-sectional layers to build up the three-dimensional object layer-by-layer, the improvement comprising the steps of:

modifying data descriptive of at least a portion of at least one cross-sectional layer by copying said data from a first cross-section to a second cross-section; and using said modified data in forming said three-dimensional object.

2. The method of claim 1 further comprising the step of:

further modifying data descriptive of said second cross-section by differencing the copied data from any other data on the second cross-section and on any intermediate cross-sections between said first and second cross-sections;

using said further modified data in forming said three-dimensional object.

3. The method of claim 2 wherein said step of modifying comprises copying data descriptive of at least a portion of a down-facing feature.

4. The method of claim 3 wherein said step of copying of at least a portion of a down-facing feature comprises exposing said copied portion with an amount of synergistic stimulation necessary to achieve a cure depth of approximately the amount shifted plus one layer thickness.

5. The method of claim 4 wherein the synergistic stimulation is electromagnetic radiation and the material is a photopolymer which solidifies in response to said radiation.

6. The method of claim 4 wherein the copying is from one layer thickness away and the exposure applied to the copied portion is approximately two layer thicknesses.

7. The method of claim 4 wherein the copying is from at least two layer thicknesses away and the exposure applied to the copied portion is at least approximately three layer thicknesses.

8. The method of claim 2 wherein said step of modifying comprises shifting data descriptive of a non-down-facing feature such that at least a two layer thickness separation occurs between at least a portion of said modified cross-sectional data on said second layer and any modified data located directly below said portion.

9. The method of claim 8 wherein the synergistic stimulation is electromagnetic radiation and the material a photopolymer which is solidifies in response to said radiation.

10. The method of claim 8 wherein the shifting of data is at least two layer thicknesses.

11. The method of claim 10 wherein the shifting of data is at least three layer thicknesses.

12. An improved method of stereolithographically forming a three-dimensional object by forming cross-sectional layers of said object from a material capable of physical transformation upon exposure to synergistic stimulation comprising the steps of receiving data descriptive of said cross-sectional layers, forming said cross-sectional layers by selectively exposing said material to said synergistic stimulation according to said data descriptive of said cross-sectional layers to build up the three-dimensional object layer-by-layer, the improvement comprising the steps of:

modifying data descriptive of at least portions of two cross-sectional layers by shifting said data from a first cross-sectional layer through at least one intermediate cross-sectional layer to a second cross-sectional layer and by differencing the shifted data from data descriptive of said second and said at least one intermediate cross-sectional layers; and using said modified data in forming said three-dimensional object.

13. An improved method of stereolithographically forming a three-dimensional object by forming cross-sectional layers of said object from a material capable of physical transformation upon exposure to synergistic stimulation comprising the steps of receiving data descriptive of said cross-sectional layers, forming said cross-sectional layers by selectively exposing said material to said synergistic stimulation according to said data descriptive of said cross-sectional layers to build up the three-dimensional object layer-by-layer, the improvement comprising the steps of:

modifying data descriptive of at least a portion of one cross-sectional layer by copying said data from a first cross-section to a second cross-section and intersecting the copied data with data descriptive of the second cross-sectional layer and utilizing only that portion which is common; and using said modified data in forming said three-dimensional object.

14. The method of claim 13 wherein the first layer is located below the second layer and the shifted data is down-facing skin data.

15. The method of claim 14 wherein the down-facing skin data on the first layer is final down-facing skin data that was shifted from a layer below the first layer to the first layer prior to copying the down-facing data from the first layer to the second layer.

16. The method of claim 13 wherein the first layer is located above the second layer and the shifted data is up-facing skin data.

17. The method of claim 13 wherein a non-flat priority embodiment is used to determine appropriate regions to misplace in regions where the object thickness is less than the MSD.

18. The method of claim 13 wherein only exterior portions of at least some regional boundaries are used in forming boundary portions of the cross-sectional layers of the object.

19. An improved method of stereolithographically forming a three-dimensional object by forming cross-sectional layers of said object from a material capable of physical transformation upon exposure to synergistic stimulation comprising the steps of receiving data descriptive of said cross-sectional layers, forming said cross-sectional layers by selectively exposing said material to said synergistic stimulation according to said data descriptive of said cross-sectional layers to build up the three-dimensional object layer-by-layer, the improvement comprising the steps of:

delaying forming a portion of a first cross-sectional layer to enhance proper placement of object features.

20. The method of claim 19 wherein said delaying step includes the step of shifting said data descriptive of at least said portion of said first cross-section to a second cross-section.

21. The method of claim 20 wherein said shifting step includes the step of copying said data descriptive of said portion of said first cross-section to said second cross-section.

22. An improved method of stereolithographically forming a three-dimensional object by forming cross-sectional layers of said object from a material capable of physical transformation upon exposure to synergistic stimulation comprising the steps of receiving data descriptive of said cross-sectional layers and forming said cross-sectional layers by selectively exposing said material to said synergistic stimulation according to said data descriptive of said cross-sectional layers to build up the three-dimensional object layer-by-layer, the improvement comprising the step of:

delaying forming a portion of a first cross-sectional layer to allow for physical transformation of an appropriate depth of material.

23. An improved method of stereolithographically forming a three-dimensional object by forming cross-sectional layers of said object from a material capable of physical transformation upon exposure to synergistic stimulation comprising the steps of receiving data descriptive of said cross-sectional layers and forming said cross-sectional layers by selectively exposing said material to said synergistic stimulation according to said data descriptive of said cross-sectional layers to build up the three-dimensional object layer-by-layer, the improvement comprising the step of:

modifying data descriptive of at least a portion of at least one cross-sectional layer by shifting said data from a first cross-section to a second cross-section; and using said modified data in forming said three-dimensional object.

24. An improved apparatus for stereolithographically forming a three-dimensional object by forming cross-sectional layers of said object from a material capable of physical transformation upon exposure to synergistic stimulation comprising means for receiving data descriptive of said cross-sectional layers and means for forming said cross-sectional layers by selectively exposing said material to said synergistic stimulation according to said data descriptive of said cross-sectional layers to build up the three-dimensional object layer-by-layer, the improvement comprising:

means for delaying forming a portion of a first cross-sectional layer to enhance proper placement of object features.

25. The apparatus of claim 24 wherein said delaying means includes means for shifting said data descriptive of at least said portion of said first cross-sectional layer to a second cross-sectional layer.

26. The apparatus of claim 25 wherein said shifting means includes means for copying said data descriptive of said portion of said first cross-sectional layer to said second cross-sectional layer.

27. An improved apparatus for stereolithographically forming a three-dimensional object by forming cross-sectional layers of said object from a material capable of physical transformation upon exposure to synergistic stimulation comprising means for receiving data descriptive of said cross-sectional layers and means for forming said cross-sectional layers by selectively exposing said material to said synergistic stimulation according to said data descriptive of said cross-sectional layers to build up the three-dimensional object layer-by-layer, the improvement comprising:

means for delaying forming a portion of a first cross-sectional layer to allow for physical transformation of an appropriate depth of material.

28. An improved apparatus for stereolithographically forming a three-dimensional object from layers of a material capable of physical transformation upon exposure to synergistic stimulation comprising means for receiving data descriptive of cross-sections of the three-dimensional object, each cross-section representing one layer of the object to be formed, means for forming layers of said material, and means for exposing said layers to synergistic stimulation according to said data descriptive of said cross-sections to build up the three-dimensional object layer-by-layer, the improvement comprising:

means for modifying data descriptive of at least two cross-sections by shifting said data from a first cross-section to a second cross-section and by differencing the shifted data from any other data on the second cross-section and on intermediate cross-section.

29. An improved apparatus for stereolithographically forming a three-dimensional object by forming cross-sectional layers of said object from a material capable of physical transformation upon exposure to synergistic stimulation comprising means for receiving data descriptive of said cross-sectional layers and means for forming said cross-sectional layers by selectively exposing said material to said synergistic stimulation according to said data descriptive of said cross-sectional layers to build up the three-dimensional object layer-by-layer, the improvement comprising:

means for modifying data descriptive of at least a portion of at least one cross-sectional layer by shifting said data from a first cross-section to a second cross-section; and means for using said modified data in forming said three-dimensional object.

30. An improved apparatus for stereolithographically forming a three-dimensional object by forming cross-sectional layers of said object from a material capable of physical transformation upon exposure to synergistic stimulation comprising means for receiving data descriptive of said cross-sectional layers and means for forming said cross-sectional layers by selectively exposing said material to said synergistic stimulation according to said data descriptive of said cross-sectional layers to build up the three-dimensional object layer-by-layer, the improvement comprising:

means for modifying data descriptive of at least portions of two cross-sectional layers by shifting said data from a first cross-sectional layer through at least one intermediate cross-sectional layer to a second cross-sectional layer and by differencing the shifted data from data descriptive of said second and said at least one intermediate cross-sectional layers; and means for using said modified data in forming said three-dimensional object.

31. An improved apparatus for stereolithographically forming a three-dimensional object by forming cross-sectional layers of said object from a material capable of physical transformation upon exposure to synergistic stimulation comprising means for receiving data descriptive of said cross-sectional layers and means for forming said cross-sectional layers by selectively exposing said material to said synergistic stimulation according to said data descriptive of said cross-sectional layers to build up the three-dimensional object layer-by-layer, the improvement comprising:

means for modifying data descriptive of at least portions of two cross-sectional layers by copying said data from a first cross-section to a second cross-section and intersecting the copied data with data descriptive of the second cross-sectional layer and keeping only that portion which is common; and means for using said modified data in forming said three-dimensional object.

* * * * *